United States Patent
Ciceri et al.

(10) Patent No.: US 12,312,284 B2
(45) Date of Patent: *May 27, 2025

(54) POTASSIUM-RELEASING MATERIAL

(71) Applicants: Massachusetts Institute of Technology, Cambridge, MA (US); Advanced Potash Technologies Ltd., Camana Bay (KY)

(72) Inventors: Davide Ciceri, Washoe Valley, NV (US); Marcelo de Oliveira, Boston, MA (US); Antoine Allanore, Brentwood, NH (US); Dennis P. Chen, Boston, MA (US); Thomas C. Close, Cambridge, MA (US)

(73) Assignees: Massachusetts Institute of Technology, Cambridge, MA (US); Advanced Potash Technologies Ltd, Camana Bay (KY)

( * ) Notice: Subject to any disclaimer, the term of this patent is extended or adjusted under 35 U.S.C. 154(b) by 64 days.

This patent is subject to a terminal disclaimer.

(21) Appl. No.: 18/198,663

(22) Filed: May 17, 2023

(65) Prior Publication Data

US 2024/0002306 A1    Jan. 4, 2024

Related U.S. Application Data

(63) Continuation of application No. 17/061,092, filed on Oct. 1, 2020, now Pat. No. 11,691,927, which is a
(Continued)

(51) Int. Cl.
C05D 1/04    (2006.01)
C05D 3/00    (2006.01)
(Continued)

(52) U.S. Cl.
CPC ............... *C05D 1/04* (2013.01); *C05D 3/00* (2013.01); *C05D 5/00* (2013.01); *C05D 9/02* (2013.01)

(58) Field of Classification Search
CPC ..... C05D 1/04; C05D 3/00; C05D 5/00; C05D 9/02; Y02P 40/10; C01B 33/26
See application file for complete search history.

(56) References Cited

U.S. PATENT DOCUMENTS 9,340,465 B2    5/2016    Skorina et al.
10,800,712 B2   10/2020   Ciceri et al.
(Continued)

FOREIGN PATENT DOCUMENTS

CN    1365857    8/2002
CN    1365957    8/2002
(Continued)

OTHER PUBLICATIONS

[No Author Listed] "Economic Value of the Wet Tropics World Heritage Area," Wet Tropics Management Authority, State of the Tropics, Cairns, Australia, State of t., 2014, 54 pages.
(Continued)

*Primary Examiner* — Jennifer A Smith
(74) *Attorney, Agent, or Firm* — Fish & Richardson P.C.

(57) ABSTRACT

The present disclosure, in various embodiments, discloses hydrothermal methods, hydrothermally modified materials and dried hydrothermally modified materials. Certain dried hydrothermally modified materials can readily releases ionic species such as alkali metal ions ($K^+$, $Na^+$), silicate salts, and alkaline earth metal ions ($Mg^{2+}$, $Ca^{2+}$). Some dried hydrothermally modified materials can readily release aluminum ions and/or silicon, such as in the form of soluble silicates. Such processes and materials are useful, for example in economically preparing potassium releasing fertilizers.

20 Claims, 122 Drawing Sheets
(61 of 122 Drawing Sheet(s) Filed in Color)

Related U.S. Application Data continuation of application No. 15/874,801, filed on Jan. 18, 2018, now Pat. No. 10,800,712.

(60) Provisional application No. 62/520,976, filed on Jun. 16, 2017, provisional application No. 62/447,657, filed on Jan. 18, 2017.

(51) Int. Cl.
  *C05D 5/00* (2006.01)
  *C05D 9/02* (2006.01)

(56) References Cited

U.S. PATENT DOCUMENTS

| | | |
|---|---|---|
| 11,691,927 B2 | 7/2023 | Ciceri et al. |
| 2014/0345348 A1 | 11/2014 | Skorina et al. |
| 2016/0067693 A1 | 3/2016 | Brandts et al. |
| 2016/0319395 A1 | 11/2016 | Bu et al. |
| 2018/0273436 A1 | 9/2018 | Ciceri et al. |
| 2021/0053885 A1 | 2/2021 | Ciceri et al. |

FOREIGN PATENT DOCUMENTS

| | | |
|---|---|---|
| CN | 1365958 | 8/2002 |
| CN | 1508092 | 6/2004 |
| CN | 101450874 | 5/2012 |
| CN | 102781826 | 11/2012 |
| CN | 104350010 | 2/2015 |
| CN | 105154101 | 12/2015 |
| CN | 105377760 | 3/2016 |
| WO | WO 9202024 | 2/1992 |
| WO | WO 2014182693 | 11/2014 |

OTHER PUBLICATIONS

[No Author Listed] "FAO Statistical Pocketbook World Food and Agriculture 2015," Food Agric. Organ. United Nations, 2015, 236 pages.

[No Author Listed] "Potash, Soda Ash, and Borates," ITP Mining: Energy and Environmental Profile of the U.S. Mining Industry, 2002, pp. 1-20.

Abouzeid, "Physical and thermal treatment of phosphate ores—An overview," Int. J. Miner. Process., 2008, 85:59-84.

Baligar et al., "Nutrient Use Efficiency in Plants," Commun. Soil Sci. Plant Anal., 2001, 32:921-950.

Bell et al., "Morphological Forms of Tobermorite in Hydrothermally Treated Calcium Silicate Hydrate Gels," J. Am. Ceram. Soc., 1996, 79:2175-2178.

Biagioni et al., "The tobermorite supergroup: a new nomenclature," Mineral. Mag., 2015, 79:485-495.

Brunauer et al., "Adsorption of Gases in Multimolecular Layers," J. Am. Chem. Soc., 1938, 60:309-319.

Chappex et al., "Alkali fixation of C—S—H in blended cement pastes and its relation to alkali silica reaction," Cement and Concrete Research, 2012, 42:1049-1054.

Chinese Office Action, for Application No. 2018800151050.0, dated Nov. 16, 2022, with English translation, 17 pages [3745-17609].

Chinese Search Report, for Application No. 2018800151050.0, dated Nov. 16, 2022, with English translation, 7 pages [3745-17609].

Ciceri et al., "Characterization of potassium agrominerals: Correlations between petrographic features, comminution and leaching of ultrapotassic syenites," Miner. Eng., 2017, 102:42-57.

Ciceri et al., "Historical and technical developments of potassium resources," Sci. Total Environ., 2015, 502:590-601.

Davidovits, Geopolymer Chemistry & Applications, Institut Géopolymèr, Saint-Quentin, 4th edn., 2015, 37 pages.

De Oliveira et al., "Ultrapotassic syenites: an alternative K-source worldwide," 2nd International Workshop on Alternative Potash. 2017.

Deer et al., "Framework Silicates. Feldspars," The Geological Society, London, 2nd edn., 2001, p. 489-490.

El-Korashy, "Cation Exchange of Alkali Metal Hydroxides with Some Hydrothermally Synthesized Calcium Silicate Compounds," Monatshefte fur Chemie, 2004, 333-343 10.5182/jaie.15.2.

Extended European Search Report for European Patent Application No. 18741131.9, dated Oct. 1, 2020, 66 pages.

Extended European Search Report for European Patent Application No. 2217441.3, dated Sep. 9, 2022, 12 Pages [3745-17617].

Fujita et al., "The mild hydrothermal synthesis of hydrogrossular from coal ash," Cycles Waste Manag., 2002, 4:41-45.

Galvánková et al., "Tobermorite synthesis under hydrothermal conditions," Procedia Eng., 2016, 151:100-107.

Hattori et al., "Sensitivity to Salts and Organic Compounds of Soil Bacteria Isolated on Diluted Media," J. Gen. Appl. Microbiol., 1980, 16:1-14.

Hollyer et al., "The Allowed* Use of Commercial Fertilizers, Pesticides, and Synthetic Substances on U.S. Farms Under the USDA National Organic Program," Food Saf. Technol., 2013, 56, 9 pages.

Hong et al., "Alkali binding in cement pastes: Part I. The C—S—H phase," Cement and Concrete Research, 2000, 29:1893-1903.

Hong et al., "Alkali sorption by C—S—H and C—A—S—H gels: Part II. Role of alumina," Cement and Concrete Research, 2002, 32:1101-1111 10.1016/S0008-8846(02)00753-6.

Hongwen et al., "20 Years Advances in Preparation of Potassium Salts from Potassic Rock: A Review," Acta Geol. Sin., 2015, 89:2058-2071.

Hopital et al., "Alkali uptake in calcium alumina silicate hydrate (C—A—S—H)," Cement and Concrete Research, 2016, 85:22-136 10.1016/j.cemconres.2016.03.009.

Houston et al. "Transformation of meta-stable calcium silicate hydrates to tobermorite: reaction kinetics and molecular structure from XRD and NMR spectroscopy," Geochem. Trans., 2009, 10, 1.

India Intellectual Property, First Examination Report, for Application No. 201917033104, dated Apr. 13, 2021, 5 pages [3745-17612].

Ishida et al., "α-Dicalcium Silicate Hydrate: Preparation, Decomposed Phase, and Its Hydration," J. Am. Chem. Soc., 1993, 76, 1707-1712.

Juo et al., "Tropical soils: properties and management for sustainable agriculture," Oxford University Press, 2003, pp. 630-631.

Kalousek et al., "Studies on the Lime-Rich Crystalline Solid Phases in the System Lime-Silica-Water," J. Am. Ceram. Soc., 1954, 37:7-13.

Khan et al., "The potassium paradox: Implications for soil fertility, crop production and human health," Renew. Agric. Food Syst., 2014, 29:3-27.

Kleiv et al., "Production of mechanically activated rock flour fertilizer by high intensive ultrafine grinding," Miner. Eng., 2007, 20:334-341.

Komarneni et al., "Cation-Exchange Properties of (Al + Na)-Substituted Synthetic Tobermorites," Clays Clay Miner., 1987, 35:385-390.

Komarneni et al., "Comparison of cation exchange in ganophyllite and [Na+Al]-substituted tobermorite: crystal-chemical implications," Mineralogical Magazine, 1988, 52-371-5.

Komarneni et al., "Selective Cation Exchange in Substituted Tobermorites," J. Am. Ceram. Soc., 1989, 72(9):1668-74.

Komarneni, "Tobermorites: A New Family of Cation Exchangers," Science, 1983, 221:647-648.

Kongshaug et al., "Phosphate Fertilizers," Ullmann's Encyclopedia Ind. Chem., 2014, 1-49.

Kyritsis et al., "Chemistry and Morphology of Hydrogarnets Formed in Cement-Based CASH Hydroceramics Cured at 200° to 350° C.," J. Am. Ceram. Soc., 2009, 92:1105-1111.

Lagache, "Structures, Properties and Occurrences," in Feldspars and Feldspathoids, ed. W. L. Brown, Springer-Science + Business Media, B.V., Dordrecht, Holland, 1984, pp. 247-279.

Leonardos et al., "The Use of Ground Rocks in Laterite Systems: An Improvement to The Use of Conventional Soluble Fertilizers?," Chem. Geol., 1987, 60:361-370.

(56) References Cited

OTHER PUBLICATIONS

Lian et al., "Microbial release of potassium from K-bearing minerals by thermophilic fungus Aspergillus fumigatus," Geochim. Cosmochim. Acta, 2008, 72:87-98.
Liu et al., "Hydrothermal decomposition of potassium feldspar under alkaline conditions," RSC Adv., 2015, 5:93301-93309.
Lotz et al., "Dose-response relationships between occupational exposure to potash, diesel exhaust and nitrogen oxides and lung function: cross-sectional and longitudinal study in two salt mines," Int. Arch. Occup. Environ. Health, 2008, 81:1003-1019.
Lucero et al., "Chapter 10. Using microbial community interactions within plant microbiomes to advance an evergreen agricultural revolution," Sustain. Agroecosystems Clim. Chang. Mitig., 2014:183-202.
Ma et al. "Hydrothermal extraction of potassium from potassic quartz syenite and preparation of aluminum hydroxide," Int. J. Miner. Process., 2016, 147:10-17.
Maeda et al., "Control of chemical composition of hydrogrossular prepared by hydrothermal reaction," Materials Lett., 2014, 131:132-134.
Malmström et al., "Biotite dissolution at 25: The pH dependence of dissolution rate and stoichiometry," Cosmochim. Acta, 1997, 61:2779-2799.
Mangrich et al., "A slow-release K+ fertilizer from residues of the Brazilian oil-shale industry: Synthesis of kalsilite-type structures," Environmental Geology, 2001, 40:1030-1036.
Manning et al., "Testing the ability of plants to access potassium from framework silicate minerals," Sci. Total Environ., 2017, 574:476-481.
Manning, "Mineral sources of potassium for plant nutrition. A review," Agron. Sustain. Dev., 2010, 30:281-294.
Max, "Ammonia, 2. Production Processes," Ullmann's Encyclopedia of Industrial Chemistry, 2011, pp. 139-225.
Meena et al. "Does a rhizospheric microorganism enhance K+availability inagricultural soils?," Microbiol. Res., 2014, 169:337-347.
Midgley, "The composition of the ferrite phase in Portland cement," Mag. Concr. Res., 1960, 12, 19-26.
Mitsuda et al., "Influence of Aluminum on the Conversation of Calcium Silicate Hydrate Gels into 11 A Tobermorite at 90° C. and 120° C.," Cem. Concr. Res., 1975, 5:203-209.
Morandeau et al., "In situ X-ray pair distribution function analysis of accelerated carbonation of a synthetic calcium-silicate-hydrate gel," Journal of Materials Chemistry A, 2015, 8597-8605.
Motlep et al., "Mineral composition of Estonian oil shale semi-coke sediments." Oil Shale 24.3 (2007): 405-423.
Ngqing et al. "Hydrothermal decomposition of K-feldspar in KOH—NaOH—H2Omedium," Hydrometallurgy, 2015, 156:47-52.
Pattabathula et al., "Introduction to Ammonia Production," Chem. Eng. Prog., Sep. 2016, 112:69-75.
Perrin et al., "Ammonium-loaded clinoptilolite: a slow-release nitrogen fertilizer for sweet corn," Journal of Plant Nutrition, 2008, 515-529.
Pickering et al., "Zeolite/rock phosphate—a novel slow release phosphorus fertiliser for potted plant production," 2001, 94:333-343.
Richardson, "The calcium silicate hydrates," Cem. Concr. Res., 2008, 38:137-158.
Ríos et al., "Hydrothermal synthesis of hydrogarnet and tobermorite at 175° C. from kaolinite and metakaolinite in the CaO—Al2O3—SiO2—H2O system: A comparative study," Appl. Clay Sci., 2009, 43:228-237.
Sato et al., "Effect of Starting Materials on the Synthesis of Tobermorite," Mater. Res. Soc. Symp. Proc., 1992, 245:235-240.
Schultz et al., "Potassium Compounds," Ullmann's Encycl. Ind. Chem., 2000, 66 pages.
Sevelsted et al., "Carbonation of C—S—H and C—A—S—H samples studied by 13C, 27Al and 29Si MAS NMR spectroscopy," Cement and Concrete Research, 2015, 71: 56-65 2015.
Shaw et al. "Hydrothermal formation of the calcium silicate hydrates, tobermorite (Ca5Si6O16(OH)2 4H2O) and xonotlite (Ca6Si6O17(OH)2): an in situ synchrotron study," Geol., 2000, 167, 129-140.
Skorina et al., "Aqueous alteration of potassium-bearing aluminosilicate minerals: from mechanism to processing," Green Chem., 2015, 17:2123-2136.
Stillings et al., "Protonadsorption at an adularia feldspar surface," Geochim. Cosmochim. Acta, 1995, 59:1473-1482.
Sun et al., "The role of Al in C—S—H: NMR, XRD, and compositional results for precipitatedsamples," Cement and Concrete Research, 2005, 36:18-29.
Van Aardt et al., "Calcium Hydroxide Attack on Feldspars and Clays: Possible Relevance to Cement-Aggregate Reactions," Cem. Concr. Res., 1977, 7:643-648.
Van Aardt et al., "Formation of Hydrogarnets: Calcium Hydroxide Attack on Clays and Feldspars," Cem. Concr. Res., 1977, 7:39-44.
Wang et al., "Mineralization of CO2 Using Natural K-Feldspar and Industrial Solid Waste to Produce Soluble Potassium," Ind. Eng. Chem. Res., 2014, 53:7971-7978.
Watanabe et al., "Hydrothermal Treatment of a Silica Sand Complex with Lime," J. Am. Ceram. Soc., 2001, 22:2318-2322.
Yang et al., "Alkali-Hydrothermal Synthesis of Acicular Tobermorite Using Natural Mineral KFeldsparPowder," Ferroelectrics, 2015, 481:57-63.
Youssef et al., "Synthesis of 11A Al-substituted tobermorite from trachyte rock by hydrothermal treatment", Ceramics International, Elsevier, Amsterdam, NL, vol. 36, No. 1, Aug. 11, 2009 (Aug. 11, 2009), pp. 203-209.
Zhang et al., "Laboratory and Pilot Scale Studies of Potassium Extraction from K-feldspar Decomposition with CaCl2 and CaCO3," Chem. Eng. Japan, 2016, 49:111-119.
Zhong et al., "Recovery of Potassium from K-Feldspar by Thermal Decomposition with Flue Gas Desulfurization Gypsum and CaCO3: Analysis of Mechanism and Kinetics," Energy & Fuels, 2016, 31:699-707.
Zörb et al., "Potassium in agriculture—Status and perspectives," Plant Physiol., 2014, 171:656-669.
International Search Report and Written Opinion in International Appln. No. PCT/US18/14285, mailed on May 1, 2018, 7 pages.
Notice of Allowance in Chinese Appln. No. 201880015105.0, dated Oct. 16, 2023, 3 pages (with English translation).
Notice of Allowance in Japanese Appln. No. 2019-539957, dated Apr. 4, 2022, 5 pages (with English translation).
Notice of Allowance in Japanese Appln. No. 2022-076309, dated Feb. 7, 2024, 5 pages (with English translation).
Office Action in Australian Appln. No. 2022268326, dated Feb. 23, 2024, 5 pages.
Office Action in Brazilian Appln. No. 1120190148744, dated Jan. 24, 2024, 10 pages (with English translation).
Office Action in Brazilian Appln. No. 1120190148744, dated May 15, 2024, 10 pages (with English translation).
Office Action in Canadian Appln. No. 3,050,280, dated May 24, 2024, 6 pages.
Office Action in Chinese Appln. No. 201880015105.0, dated Jun. 8, 2023, 19 pages (with English translation).
Office Action in Japanese Appln. No. 2019-539957, dated Oct. 27, 2021, 15 pages (with English translation).
Office Action in Japanese Appln. No. 2022-076309, dated Jun. 20, 2023, 10 pages (with English translation).
Office Action in Brazilian Appln. No. 1120190148744, dated Sep. 18, 2024, 11 pages (with English translation).

| K-bearing ore | K source |
|---|---|
| Sylvinite | KCl |
| n/a | $K_2SO_4$ |
| Other evaporitic ores: | |
| Langbeinitite | $K_2Mg_2(SO_4)_3$ |
| Carnallitite | $KMgCl_3 \cdot 6(H_2O)$ |
| Polyhalite | $K_2Ca_2Mg(SO_4)_4 \cdot 2H_2O$ |
| Micas: | |
| Phlogopite | $KMg_3(Si_3Al)O_{10}(F,OH)_2$ |
| Muscovite | $KAl_3Si_3O_{10}(OH)_2$ |
| Biotite | $K(Mg,Fe^{++})_3[AlSi_3O_{10}(OH,F)_2$ |
| Ultrapotassic syenite | $KAlSi_3O_8$ |
| Ultrapotassic syenite | Hydrothermal processed material (this study) |

FIG. 2

(1) orthoclase
(2) 11 Å tobermorite
(3) plazolite
(4) panunzite
(5) microcline
(6) α-dicalcium silicate hydrate
(7) albite

POTASSIUM-RELEASING MATERIAL

CROSS-REFERENCE TO RELATED APPLICATIONS

This application is a continuation of U.S. patent application Ser. No. 17/061,092, filed Oct. 1, 2020, which is a continuation of U.S. patent application Ser. No. 15/874,801, filed on Jan. 18, 2018 (U.S. Pat. No. 10,800,712), which claims the benefit of priority to U.S. Provisional Application No. 62/447,657, filed on Jan. 18, 2017 and U.S. Provisional Application No. 62/520,976, filed on Jun. 16, 2017, the disclosures of which are hereby incorporated by reference in their entirety for all purposes.

BACKGROUND

Minerals, including those releasing soluble potassium, silica, and other salts, are useful for a variety of purposes. For example, sources of soluble potassium (potash) are useful for sustaining productive agriculture, particularly in tropical regions, where large populations rely on soil with poor fertility.

BRIEF SUMMARY

Disclosed herein are materials that exhibit beneficial properties in a wide variety of industries and applications including, but not limited to, soil fertility, soil remediation, geopolymer materials, waterglass, colloidal silica, and cement manufacturing. In some embodiments, the materials of the present disclosure are metal-ion releasing materials (including alkali metals such as potassium, alkaline earth metals such as calcium and magnesium, other metals such as aluminum, and additional elements such as silicon), which are in some cases (e.g., potassium, calcium, magnesium, and/or silicon) suitable for use as e.g., fertilizers in tropical agriculture. In some instances, such materials can provide an alternative to known fertilizers, such as, for example, KCl.

Several process routes for preparing materials according to the present disclosure have been developed. In some embodiments, the process routes consider soil science and/or economic principles to reduce and/or avoid unwanted excess of soluble (e.g., potassium) species, formation of waste or byproducts, and/or high processing and environmental cost, thereby overcoming one or more disadvantages that can be associated with certain known processes, such as certain process associated with KCl. In addition or alternatively, the process routes can be of a modular nature, which can result in straightforward adaptation to any of the aforementioned applications.

When used as a potassium fertilizer, materials as disclosed herein can provide a number of advantageous properties such as: i) continuous and controlled potassium release to satisfy the needs of crops at different stages of growth, and avoiding both sudden saturation of the soil and excessive leaching; ii) high residual effect (e.g., by providing a reservoir of available potassium) which improves plant nutrition over multiple agronomic cycles; iii) the ability to buffer soil pH at optimal levels for a given crop and microbiome; iv) synergistic supplies of micronutrients (e.g., magnesium); vi) supporting and improving soil mechanical strength and porosity; vii) improved cation exchange capacity (CEC); viii) low salinity index; ix) enhancement of Water Holding Capacity (WHC) and carbon storage capacity; x) relatively low cost; xi) minimum hurdle for adoption by farmers; and/or xii) environmentally friendly manufacturing process implementable at industrial scale, and with local resources.

In some embodiments, the processes of the present disclosure use feedstocks such as ultrapotassic syenite (see e.g., FIGS. 1 and 2 for other non-limiting examples of K-bearing ores), CaO (including hydrated and other forms of CaO) and water, which are abundant and/or affordable. Ultrapotassic syenites are generally available worldwide in bulk quantities, and can constitute a relatively readily available resource of comparatively inexpensive $K_2O$. CaO can be obtained by roasting limestone in rotary kilns, and is a raw material of several industries (e.g., glass and cement), many of which operate based on already optimized costs and logistics. Dolomite ($CaMg(CO_3)_2$) and other calcium-containing material are also viable alternatives. In some embodiments, the present disclosure provides the design and set-up of suitable hydrothermal reactors (e.g., autoclaves).

In some embodiments, the present disclosure provides processes that are environmentally friendly because they can reduce (e.g., minimize) waste and/or byproduct formation, particularly compared to certain other processing technologies where the disposal of tailings and saline wastewater together with the use of chemical additives such as alkylamine frother agents, result in a process that is less environmentally friendly. The materials disclosed herein can be, for example, applied directly to soils. In some cases, this means that the hydrothermally modified material derived from a feedstock mineral (e.g., K-feldspar) does not require separation from the rest of the solid material. In certain embodiments, K-feldspar, hydrogarnet and tobermorite are naturally occurring mineral phases whereas α-dicalcium silicate hydrate and non-stoichiometric calcium-silicate-hydrate are components of concrete, and are not envisaged to pose major environmental hazards. Because in some embodiments a portion of the initial (e.g. K-feldspar) feedstock material is converted to new mineral phases, process parameters such as reaction temperature (T) and reaction time (t) can be selected to minimize the environmental footprint of the process. Further, $CO_2$ emissions due to transport can be reduced because the materials disclosed herein can be manufactured locally and from local resources.

The materials (e.g., hydrothermally modified or dried hydrothermally modified materials) disclosed herein may have value in improving soil mechanics, e.g., by improving the soil pore space. For example, the water holding capacity of oxidic soils is often low due to the lack of mesopores that are responsible for storing water for long-term release. However, the volume occupied by the mineral particles disclosed herein can be in a range which is suitable for improving the mesopore population and reduce infiltration rates. This can serve to reduce (e.g., prevent) the dispersion of soil colloids and/or to reduce (e.g., prevent) the dispersion of other fertilizers added to the soil. Furthermore, it has been shown that solidified pastes of fine hydrogarnet and calcium silicate hydrates such as those composing at least a portion of the materials disclosed herein can have a flexural strength of 20 mPa, which is suitable for mitigating erosion and for promoting soil strength, without providing micro aggregates which are too large (>1 mm) so as to provide undesirable infiltration rates. Conventional potassium salts (KCl or $K_2SO_4$) generally do not provide such improvements to soil mechanics.

The processes described herein can be used to produce materials, such as dried hydrothermally modified materials that have distinct, unexpected, and improved metal releasing properties (as described herein) compared to previously known materials.

The disclosure provides, in various embodiments, materials, including dried hydrothermally modified materials providing both an initial, relatively rapid release of potassium and a relatively extended release of potassium. In some embodiments, the initial release of potassium (e.g., as measured according to the one-minute potassium release test) can be larger than the extended release (e.g., as measured according to the 24-hour potassium release test). In general, it is believed that the extended release of potassium can be redistributed among several phases formed during hydrothermal processing, and thus potassium can be released at a slower rate over a more prolonged period of time compared to some known materials known. In various embodiments, the dried hydrothermally modified materials of the present disclosure have the added benefit of releasing micronutrients such as, for example, Si, Ca, Na and Mg, which can be also useful to infertile soil. In addition, dried hydrothermally modified materials according to certain embodiments of the disclosure can have levels of alkalinity that may partially replace the need to add lime to the soil. As such, the mineralogy of the dried hydrothermally modified materials of the present disclosure can be particularly suited to tropical soils.

In some embodiments, a method comprises: exposing a first composition to water and conditions selected from heat and pressure, thereby forming a combination that comprises water and a second composition (e.g., a hydrothermally modified material); and removing at least some of the water from the combination, thereby providing a third composition (e.g., a dried hydrothermally modified material), wherein: the first composition comprises a first alkali metal silicate; the third composition comprises a second alkali metal silicate; and according to the 24-hour potassium release test, an amount of potassium released from the third composition is at least about two about times greater than an amount of potassium released from the first composition.

In some embodiments, a method comprises: exposing a first composition to water and conditions selected from heat and pressure, thereby forming a combination comprising water and a second composition (e.g., a hydrothermally modified material); and removing at least some of the water from the combination, thereby providing a third composition (e.g., a dried hydrothermally modified material), wherein: the first composition comprises an alkali metal silicate in a first amount; the third composition comprises an alkali metal silicate in a second amount that is less than the first amount; and according to the 24-hour potassium release test, an amount of potassium released from the third composition is at least about two times greater than an amount of potassium released from the first composition.

In some embodiments, a method comprises: exposing a first composition to water and conditions selected from heat and pressure, thereby forming a combination comprising water and a second composition, the second composition (e.g., a hydrothermally modified material) comprising a K-feldspar phase; and removing at least some of the water from the combination, thereby providing a third composition (e.g., a dried hydrothermally modified material), wherein: the third composition comprises the K-feldspar phase in an amount of at most about 65 wt. %; and at least one of the following holds: the third composition further comprises at least about 1 wt. % of a dicalcium silicate hydrate phase; the third composition further comprises at least about 1 wt. % of a tobermorite phase; and the third composition further comprises at least about 1 wt. % of a hydrogarnet phase.

In certain embodiments, according to the 24-hour potassium release test, the amount of potassium released from the third composition is at least about three (e.g., at least about four, at least about five, at least about 10, at least about 25, at least about 50, at least about 100) times as much as the amount of potassium released from the first composition.

In some embodiments, a method comprises: exposing a first composition to water and conditions selected from heat and pressure, thereby forming a combination comprising water and a second composition (e.g., a hydrothermally modified material); removing at least some of the water from the combination, thereby providing a third composition (e.g., a dried hydrothermally modified material), wherein: the first composition comprises a first alkali metal silicate; the third composition comprises a second alkali metal silicate; and according to a 24-hour potassium release test, an amount of potassium released from the third composition is at least about 5,000 mg of potassium per kilogram of the third composition.

In some embodiments, a method comprises: exposing a first composition to conditions selected from heat and pressure, thereby forming a second composition (e.g., a hydrothermally modified material); removing at least some of the water from a combination that comprises: a) water; and b) the second composition, thereby providing a third composition (e.g., a dried hydrothermally modified material), wherein: the first composition comprises a first alkali metal silicate; the third composition comprises a second alkali metal silicate; and according to a 24-hour calcium test, an amount of calcium released from the third composition is at least about 15 mg of calcium per kilogram of the third composition.

In some embodiments, a method comprises: exposing a first composition to water and conditions selected from heat and pressure, thereby forming a combination comprising water and a second composition (e.g., a hydrothermally modified material); removing at least some of the water from the combination, thereby providing a third composition (e.g., a dried hydrothermally modified material), wherein: the first composition comprises a first alkali metal silicate; the third composition comprises a second alkali metal silicate; and according to a 24-hour aluminum test, an amount of aluminum released from the third composition is at most about 50 mg of aluminum per kilogram of the third composition.

In some embodiments, a method comprises: exposing a first composition to water and conditions selected from heat and pressure, thereby forming a combination comprising a second composition (e.g., a hydrothermally modified material); removing at least some of the water from the combination, thereby providing a third composition (e.g., a dried hydrothermally modified material), wherein: the first composition comprises a first alkali metal silicate; the third composition comprises a second alkali metal silicate; and according to a 24-hour aluminum test, an amount of aluminum released from the third composition is at most about 10 mg of aluminum per kilogram of the third composition.

In some embodiments, a method comprises: exposing a first composition to water and conditions selected from heat and pressure, thereby forming a combination comprising a second composition (e.g., a hydrothermally modified material); removing at least some of the water from the combination, thereby providing a third composition (e.g., a dried hydrothermally modified material), wherein: the first composition comprises a first alkali metal silicate; the third composition comprises a second alkali metal silicate; and according to a 24-hour silicon test, an amount of silicon released from the third composition is at least about 40 mg of silicon per kilogram of the third composition.

In some embodiments, a method comprises: exposing a first composition to water and conditions selected from heat and pressure, thereby forming a combination comprising a second composition (e.g., a hydrothermally modified material); removing at least some of the water from the combination, thereby providing a third composition (e.g., a dried hydrothermally modified material), wherein: the first composition comprises a first alkali metal silicate; the third composition comprises a second alkali metal silicate; and according to a 24-hour sodium test, an amount of sodium released from the third composition is at least about 5 mg of sodium per kilogram of the third composition.

In some embodiments, a method comprises: exposing a first composition to water and conditions selected from heat and pressure, thereby forming a combination comprising a second composition (e.g., a hydrothermally modified material); removing at least some of the water from the combination, thereby providing a third composition (e.g., a dried hydrothermally modified material), wherein: the first composition comprises a first alkali metal silicate; the third composition comprises a second alkali metal silicate; and according to a 24-hour magnesium test, an amount of magnesium released from the third composition is at least about 5 mg of magnesium per kilogram of the third composition.

In some embodiments, a method comprises: exposing a first composition to water and conditions selected from heat and pressure, thereby forming a combination comprising water and a second composition (e.g., a hydrothermally modified material); removing at least some of the water from the combination, thereby providing a third composition (e.g., a dried hydrothermally modified material), wherein: the first composition comprises a first alkali metal silicate; the third composition comprises a second alkali metal silicate; and according to a one-minute potassium release test, an amount of potassium released from the third composition is at least about 5,000 mg of potassium per kilogram of the third composition.

In some embodiments, a method comprises: exposing a first composition to water and conditions selected from heat and pressure, thereby forming a combination comprising water and a second composition (e.g., a hydrothermally modified material); removing at least some of the water from the combination, thereby providing a third composition (e.g., a dried hydrothermally modified material), wherein: the first composition comprises a first alkali metal silicate; the third composition comprises a second alkali metal silicate; and the third composition has a relative potassium release of at least about five.

In some embodiments, the first alkali metal silicate comprises at least one member selected from K-feldspar, kalsilite, phlogopite, muscovite, biotite, trachyte, rhyolite, micas, ultrapotassic syenite, leucite, nepheline, syenite, phonolite, fenite, ugandite, sanidine, aplite, and pegmatite and combinations thereof.

In some embodiments, the second alkali metal silicate comprises at least one member selected from K-feldspar, kalsilite, phlogopite, muscovite, biotite, trachyte, rhyolite, micas, ultrapotassic syenite, leucite, nepheline, syenite, phonolite, fenite, ugandite, sanidine, aplite, and pegmatite and combinations thereof.

In some embodiments, the third composition has a higher potassium content than the second composition.

In some embodiments, the third composition comprises: a K-feldspar phase; and a calcium silicate hydrate phase comprising at least one phase selected from a dicalcium silicate hydrate phase, tobermorite phase, and a hydrogarnet phase, wherein: the third composition comprises the K-feldspar phase in an amount of at most about 65 wt. %; and at least one of the following holds: the third composition comprises at least about 1 wt. % of the dicalcium silicate hydrate phase; the third composition comprises at least about 1 wt. % of the tobermorite phase; and the third composition comprises at least about 1 wt. % of the hydrogarnet phase.

In some embodiments, an amount of aluminum released from the third composition is at most about 25 mg (e.g., at most about 10 mg) of aluminum per kilogram of the third composition.

In some embodiments, an amount of magnesium released from the third composition is at least about 100 mg of magnesium per kilogram of the third composition.

In some embodiments, removing water from the combination comprises drying the combination.

In some embodiments, removing water from the combination comprises flash drying the combination.

In some embodiments, removing water from the combination comprises drying under a vacuum the combination.

In some embodiments, exposing the combination occurs for a duration of at least about 5 minutes.

In some embodiments, removal of at least some of the water from the combination occurs for a duration of at least about 15 minutes (e.g., at least about 30 minutes, at least about one hour, at least about two hours, at least about three hours, at least about five hours, at least about 16 hours) and/or at most about 20 hours.

In some embodiments, removal of at least some of the water from the combination comprises heating the combination to at least about 50° C. (e.g., at least about 100° C., at least about 150° C.) and/or at most about 200° C.

In some embodiments, removal of at least some of the water from the combination comprises exposing the combination to an atmospheric pressure.

In some embodiments, removal of at least some of the water from the combination comprises exposing the combination to a pressure of at least about 5 atm (e.g., of at least about 30 atm, at least about 50 atm) and/or at most about 80 atm.

In certain embodiments, removal of at least some of the water from the combination occurs at a pressure of less than one atm (e.g., under vacuum).

In some embodiments, during removal of at least some of the water from the combination, the combination is exposed to a reactive atmosphere. The reactive atmosphere can comprise at least one member selected from air, oxygen, ammonia, carbon monoxide, and carbon dioxide.

In some embodiments, during removal of at least some of the water from the combination, the combination is exposed to an atmosphere comprising air.

In some embodiments, during removal of at least some of the water from the combination, the combination is exposed to an inert atmosphere. The inert atmosphere can comprise at least one member selected from argon and nitrogen.

In some embodiments, an alkali metal silicate comprises at least one member selected from K-feldspar, kalsilite, phlogopite, muscovite, biotite, trachyte, rhyolite, micas, ultrapotassic syenite, leucite, nepheline, syenite, phonolite, fenite, ugandite, sanidine, aplite, pegmatite, and combinations thereof.

In some embodiments, the method further comprises milling a pre-combination that comprises: a) an alkali metal silicate; and b) at least one member selected from an alkali metal oxide, an alkaline metal hydroxide, an alkaline earth metal oxide, and an alkaline earth metal hydroxide, thereby providing the first composition.

In some embodiments, the conditions to which the first composition is exposed comprise a temperature of at least about 150° C. (e.g., at least about 200° C., at least about 220° C., at least about 230° C.) and/or at most about 300° C.

In some embodiments, the conditions to which the first composition is exposed comprise a pressure of at least about 5 atm (e.g., at least about 30 atm, at least about 50 atm) and/or at most about 80 atm. In certain embodiments, the conditions to which the first composition is exposed comprise a pressure of less than one atm (e.g., vacuum).

In some embodiments, the exposing the first composition occurs for a duration of at least about 5 minutes (e.g., at least about 5 minutes, at least about 10 minutes, at least about 15 minutes, at least about 20 minutes, at least about 30 minutes, at least about 1 hour, at least about 2 hours, at least about 5 hours, at least about 10 hours) and/or at most about 20 hours.

In some embodiments, the first composition comprises a calcium to silicon ratio of at least about 0.075 (e.g., at least about 0.15, at least about 0.3) and/or at most of about 0.6.

In some embodiments, milling comprises ball milling or rod milling.

In some embodiments, the pre-combination comprises at least one member selected from potassium hydroxide, potassium oxide, potassium carbonate, calcium oxide, calcium hydroxide, calcium carbonate, sodium carbonate, magnesium carbonate, and combinations thereof.

In some embodiments, the third composition comprises a zeolite.

In some embodiments, the third composition is a fertilizer, such as, for example, a potassium fertilizer, a calcium fertilizer, a silicon fertilizer, a sodium fertilizer, and/or a magnesium fertilizer. In some embodiments, the fertilizer comprises a multi-nutrient fertilizer.

In some embodiments, a method forms a material useful in cement chemistry.

In some embodiments, the third composition is useful in producing alkali solutions for at least one industry selected from the geopolymer industry, the waterglass industry, and the colloidal silica industry.

In some embodiments, the third composition is useful in soil remediation.

In some embodiments, a method further comprises using the third composition as a fertilizer (e.g., a potassium fertilizer, a calcium fertilizer, a silicon fertilizer, a sodium fertilizer, and/or a magnesium fertilizer).

In some embodiments, the third composition is a soil conditioner.

In some embodiments, a method further comprises using the second composition to produce an alkali solution for at least one industry selected from geopolymer industry, the waterglass industry and the colloidal silica industry.

In some embodiments, a method further comprises using the second composition in soil remediation.

In some embodiments, a composition (e.g., a hydrothermally modified material or a dried hydrothermally modified material) comprises: a K-feldspar phase; and a calcium silicate hydrate phase comprising at least one phase selected from dicalcium silicate hydrate phase, tobermorite phase, and a hydrogarnet phase, wherein: the composition comprises the K-feldspar phase in an amount of at most about 65 wt. %; and at least one of the following holds: the composition comprises at least about 1 wt. % of the dicalcium silicate hydrate phase; the composition comprises at least about 1 wt. % of the tobermorite phase; and the composition comprises at least about 1 wt. % of the hydrogarnet phase.

In some embodiments, the composition comprises at most about 60 (e.g., at most about 55, at most about 50, at most about 45, at most about 40, at most about 34.9, at most about 32.3) wt. % of the K-feldspar phase, and/or at least about 1 (at least about 5, at least about 10) wt. % of the K-feldspar phase.

In some embodiments, the composition comprises at least about 1 (e.g., at least about 2, at least about 3, at least about 5, at least about 10, at least about 15, at least about 20, at least about 25) wt. % of the calcium silicate hydrate phase, and/or at most about 30 (e.g., at most about 25, at most about 20, at most about 15) wt. % of the calcium silicate hydrate phase.

In some embodiments, the composition comprises from about 1 wt. % to about 30 wt. % of the calcium silicate hydrate phase.

In some embodiments, the composition comprises the dicalcium silicate hydrate phase in an amount of at least about 1 (at least about 5, at least about 10, at least about 15, at least about 20, at least about 25, at least about 30, at least about 25, at least about 40) wt. %, and/or at most about 38.6 (e.g., at most about 37.7, at most about 35, at most about 30) wt. %.

In some embodiments, the composition comprises the tobermorite phase in an amount of at least about 1 (e.g., at least about 2, at least about 3, at least about 4, at least about 5, at least about 6, at least about 7, at least about 8, at least about 9, at least about 10) wt. %, and/or at most about 10 (e.g., at most about 9, at most about 8) wt. %.

In some embodiments, the composition comprises the hydrogarnet phase in an amount of at least about 1 (e.g., at least about 5, at least about 8, at least about 9, at least about 10, at least about 11, at least about 12, at least about 13) wt. %, and/or at most about 15 (e.g., at most about 13.2, at most about 12.7, at most about 12, at most about 11, at most about 10, at most about 9, at most about 8, at most about 5, at most about 1) wt. %.

In some embodiments, the hydrogarnet phase comprises plazolite or hydrogrossular.

In some embodiments, the composition further comprises an amorphous phase.

In some embodiments, the composition comprises at most about 51.1 (e.g., at most about 50, at most about 49, at most about 48, at most about 47, at most about 46, at most about 45) wt. % of the amorphous phase, and/or at least about 18.2 wt. % of the amorphous phase.

In some embodiments, the amorphous phase comprises a zeolite.

In some embodiments, the amorphous phase comprises at least one member selected from silica and calcium silica hydrates.

In some embodiments, the composition further comprises a zeolite.

In some embodiments, the composition further comprises carbonates.

In some embodiments, a composition (e.g., a dried hydrothermally modified material) comprises a K-feldspar phase, wherein the composition has a potassium release of at least about 5,000 (e.g., at least about 6,502, at least at least about 6,763, at least about 7,500, at least about 10,000, at least about 10,377, at least about 11,648, at least about 15,000) mg of potassium per kilogram of the composition according to the 24-hour potassium release test, and/or at most about 15,000 mg of potassium per kilogram of the composition according to the 24-hour potassium release test.

In some embodiments, a composition (e.g., a dried hydrothermally modified material) comprises a K-feldspar phase, wherein the composition has a calcium release of at least about 15 (e.g., at least about 16, at least about 34, at least about 50, at least about 63, at least about 100, at least about 250, at least about 315, at least about 355, at least about 500) mg of calcium per kilogram of the composition according to the 24-hour calcium release test, and/or at most about 657 mg of calcium per kilogram of the composition according to the 24-hour calcium release test.

In some embodiments, a composition (e.g., a dried hydrothermally modified material) comprises a K-feldspar phase, wherein the composition has an aluminum release of at most 50 (e.g., at most about 41, at most about 40, at most about 28, at most about 25, at most about 10) mg of aluminum per kilogram of the composition according to the 24-hour aluminum release test.

In some embodiments, a composition (e.g., a dried hydrothermally modified material) comprises a K-feldspar phase, wherein the composition has a silicon release of at least about 40 (e.g., at least about 100, at least about 500, at least about 1,000, at least about 1,388, at least about 1,500, at least about 1,652) mg of silicon per kilogram of the composition according to the 24-hour silicon release test, and/or at most about 1,700 mg of silicon per kilogram of the composition according to the 24-hour silicon release test.

In some embodiments, a composition (e.g., a dried hydrothermally modified material) comprises a K-feldspar phase, wherein the composition has a sodium release of at least about 6.2 (e.g., at least about 6.4, at least about 10, at least about 15, at least about 20, at least about 30, at least about 40, at least about 50, at least about 60, at least about 70, at least about 80, at least about 90, at least about 100) mg of sodium per kilogram of the composition according to the 24-hour sodium release test, and/or at most about 100 mg of sodium per kilogram of the composition according to the 24-hour sodium release test.

In some embodiments, a composition (e.g., a dried hydrothermally modified material) comprises a K-feldspar phase, wherein the composition has a magnesium release of at least about 5 (e.g., at least about 7, at least about 10, at least about 20, at least about 30, at least about 40, at least about 50, at least about 75, at least about 100, at least about 500, at least about 1,000, at least about 2,000, at least about 5,000) mg of magnesium per kilogram of the composition according to the 24-hour magnesium release test.

In some embodiments, a composition (e.g., a dried hydrothermally modified material) comprises a K-feldspar phase, wherein the composition has a potassium release of at least about 5,000 (e.g., at least about 6,000, at least about 7,000, at least about 8,000, at least about 9,000, at least about 10,000, at least about 11,000) mg of potassium per kilogram of the composition according to the one-minute potassium release test.

In some embodiments, a composition (e.g., a dried hydrothermally modified material) comprises a K-feldspar phase, wherein the composition has a relative potassium release of at least about five (e.g., at least about six, at least about seven, at least about eight, at least about nine, at least about 10) and/or at most about 20.

In some embodiments, a composition further comprises a calcium silicate hydrate phase. The calcium silicate hydrate phase can comprise at least one phase selected from a dicalcium silicate hydrate phase, tobermorite phase, and a hydrogarnet phase.

In some embodiments, a composition further comprises at least one member selected from potassium hydroxide, potassium oxide, potassium carbonate, calcium oxide, calcium hydroxide, calcium carbonate, sodium carbonate, magnesium carbonate, and combinations thereof.

In some embodiments, a composition further comprises panunzite, portlandite, albite, or combinations thereof.

In some embodiments, a composition (e.g., a dried hydrothermally modified material) comprises a K-feldspar phase, wherein: the composition comprises the K-feldspar phase in an amount of at most about 65 wt. %; the composition is derived from a starting composition comprising greater than about 65 wt. % K-feldspar; and, according to the 24 hour potassium release test, an amount of potassium released from the composition is at least about twice (e.g., at least about three times, at least about four times, at least about five times, at least about 10 times, at least about 25 times, at least about 50 times, at least about 100 times) as much as an amount of potassium released from the starting composition.

In some embodiments, a composition (e.g., a dried hydrothermally modified material) comprises an alkali metal silicate phase; and a calcium silicate hydrate phase comprising at least one phase selected from a dicalcium silicate hydrate phase, tobermorite phase, and a hydrogarnet phase, wherein: the composition comprises the alkali metal silicate phase in an amount of at most about 65 wt. %; and at least one of the following holds: the composition comprises at least about 1 wt. % of the dicalcium silicate hydrate phase; the composition comprises at least about 1 wt. % of the tobermorite phase; and the composition comprises at least about 1 wt. % of the hydrogarnet phase.

In some embodiments, a composition (e.g., a dried hydrothermally modified material) comprises an alkali metal silicate phase, wherein the composition has a potassium release of at least about 5,000 mg of potassium per kilogram of the composition according to the 24-hour potassium release test.

In some embodiments, a composition (e.g., a dried hydrothermally modified material) comprises an alkali metal silicate phase, wherein the composition has a calcium release of at least about 15 mg of calcium per kilogram of the composition according to the 24-hour calcium release test.

In some embodiments, a composition (e.g., a dried hydrothermally modified material) comprises an alkali metal silicate phase, wherein the composition has an aluminum release of at most about 10 mg of aluminum per kilogram of the composition according to the 24-hour aluminum release test.

In some embodiments, a composition (e.g., a dried hydrothermally modified material) comprises an alkali metal silicate phase, wherein the composition has a silicon release of at least about 40 mg of silicon per kilogram of the composition according to the 24-hour silicon release test.

In some embodiments, a composition (e.g., a dried hydrothermally modified material) comprises an alkali metal silicate phase, wherein the composition has a sodium release of at least about 6.2 mg of sodium per kilogram of the composition according to the 24-hour sodium release test.

In some embodiments, a composition (e.g., a dried hydrothermally modified material) comprises an alkali metal silicate phase, wherein the composition has a magnesium release of at least about 5 mg of magnesium per kilogram of the composition according to the 24-hour magnesium release test.

In some embodiments, a composition (e.g., a dried hydrothermally modified material) comprises an alkali metal silicate phase, wherein the composition has a potassium release of at least about 5,000 mg of potassium per kilogram of the composition according to the one-minute potassium release test.

In some embodiments, a composition (e.g., a dried hydrothermally modified material) comprises an alkali metal silicate phase, wherein: the composition comprises the alkali metal silicate phase in an amount of at most about 65 wt. %; the composition is derived from a starting composition comprising greater than about 65 wt. % alkali metal silicate; and, according to the 24 hour potassium release test, an amount of potassium released from the composition is at least about twice as much as an amount of potassium released from the starting composition (e.g., a hydrothermally modified material).

In some embodiments, a composition (e.g., a dried hydrothermally modified material) comprises an alkali metal silicate phase, wherein the composition has a relative potassium release of at least about five.

In some embodiments, an alkali metal silicate comprises at least one member selected from K-feldspar, kalsilite, phlogopite, muscovite, biotite, trachyte, rhyolite, micas, ultrapotassic syenite, leucite, nepheline, syenite, phonolite, fenite, ugandite, sanidine, aplite, and pegmatite, and combinations thereof.

In some embodiments, a composition further comprises a carbonaceous material. The carbonaceous material can comprise at least one material selected from KOH, NaOH, $Mg(OH)_2$, $Ca(OH)_3$, $K_2CO_3$, $Na_2CO_3$, $MgCO_3$, and $CaCO_3$.

In some embodiments, a composition has a multimodal particle size distribution comprising particles having a diameter of from about 1 micron to about 1000 microns.

In some embodiments, a composition comprises aggregated particles having a size of from about 100 microns to about 1000 microns.

In some embodiments, a composition comprises particles having and a specific surface area according to the BET method of from about 15.1 square meters per gram to about 46.9 square meters per gram.

In some embodiments, a composition has a particle size distribution of from about 0.01 micron to about 100 microns (e.g., from about 0.1 micron to about 100 microns).

In some embodiments, the composition is useful in cement chemistry.

In some embodiments, the composition is useful in producing alkali solutions for at least one industry selected from the geopolymer industry, the waterglass industry and the colloidal silica industry.

In some embodiments, the composition is useful in soil remediation.

In some embodiments, a fertilizer comprises a composition disclosed herein. The fertilizer can be, for example, a potassium fertilizer, a calcium fertilizer, a silicon fertilizer, a sodium fertilizer, and/or a magnesium fertilizer. The fertilizer can be a multi-nutrient fertilizer.

In some embodiments, a soil conditioner comprises a composition disclosed herein.

BRIEF DESCRIPTION OF THE FIGURES

The patent or application file contains at least one drawing executed in color. Copies of this patent or patent application publication with color drawing(s) will be provided by the Office upon request and payment of the necessary fee.

The drawings are primarily for illustrative purposes and are not intended to limit the scope of the inventive subject matter described herein.

FIG. 2 is a table providing an overview of the naturally occurring potassium-bearing materials with current or potential applications in global agriculture.

FIG. 37E is a schematic diagram showing a process to remove soluble $K^+$ from a dried hydrothermally modified material by washing with water followed by a leaching process, according to some embodiments.

FIG. 37F is a bar graph showing the mass of potassium (K) released from rinsed or unrinsed hydrothermally modified materials dried under argon or carbon dioxide and using a leaching solution with a pH 5 $HNO_3$ solution, according to some embodiments.

FIG. 37G is a bar graph showing the difference in the mass of potassium (K) released between an unrinsed and rinsed sample dried under either argon or carbon dioxide.

FIG. 37H is a bar graph showing the mass of potassium (K) released from hydrothermally modified materials using a leaching process with a pH 5 $CsNO_3/HNO_3$ (33.3 mM) solution or a pH 5 $HNO_3$ solution, according to some embodiments.

FIG. 38 is a flow chart showing the reaction pathways that can occur during hydrothermal processing of CaO and feldspar raw materials, according to some embodiments.

DETAILED DESCRIPTION

Disclosed herein are various embodiments of hydrothermally modified materials, dried hydrothermally modified materials, and processes for making the same. In some embodiments, the properties of the materials described herein can be tuned by modification of a number of identified parameters (including, but not limited to processing time and temperature, drying conditions, processing atmosphere, ratio of raw materials in the feedstock mixture, surface area of the raw materials, etc.) such that the properties of the hydrothermally modified materials or dried hydrothermally modified materials can be aligned with the requirements of a wide variety of industrial applications. Various concepts introduced above and discussed in greater detail below that are encompassed by the processes of the present disclosure may be implemented in any of numerous ways, as the disclosed concepts are not limited to any particular manner of implementation. Examples of specific implementations and applications are provided primarily for illustrative purposes.

In various embodiments, the processes disclosed herein produce minimal or no waste or byproducts. This is a departure from certain conventional processing technologies that are intended to transform raw materials such as K-feldspar, as well as KCl processing, where the disposal of tailings and saline wastewater together with the use of alkylamine as frother agents provide a process that is a less environmentally friendly process. In some embodiments, the hydrothermally modified materials and/or dried hydrothermally modified materials are suitable for direct application to soils. In such embodiments, in general, the modified fraction of the hydrothermally modified potassium-containing mineral (e.g., the hydrothermally modified portion of a K-feldspar raw material) is not separated from the rest of the solid material. In such embodiments, the hydrothermally modified material and/or a dried hydrothermally modified material can include some amount of unmodified K-feldspar, hydrogarnet and tobermorite, which are naturally occurring mineral phases, as well as α-dicalcium silicate hydrate and non-stoichiometric calcium-silicate-hydrate, which are components of concrete, and do not pose significant environmental hazards. Furthermore, in certain embodiments of the present disclosure, since only a portion of the initial feedstock material (e.g., K-feldspar) is converted into new mineral phases, process temperatures (T) and process times (t) are set so as to minimize the environmental footprint of the process. Finally, in certain embodiments, the processes disclosed herein can reduce (e.g., minimize) $CO_2$ emissions as the hydrothermally modified materials and/or dried hydrothermally modified materials of the present disclosure can be readily manufactured locally and from local resources.

Figure 1:
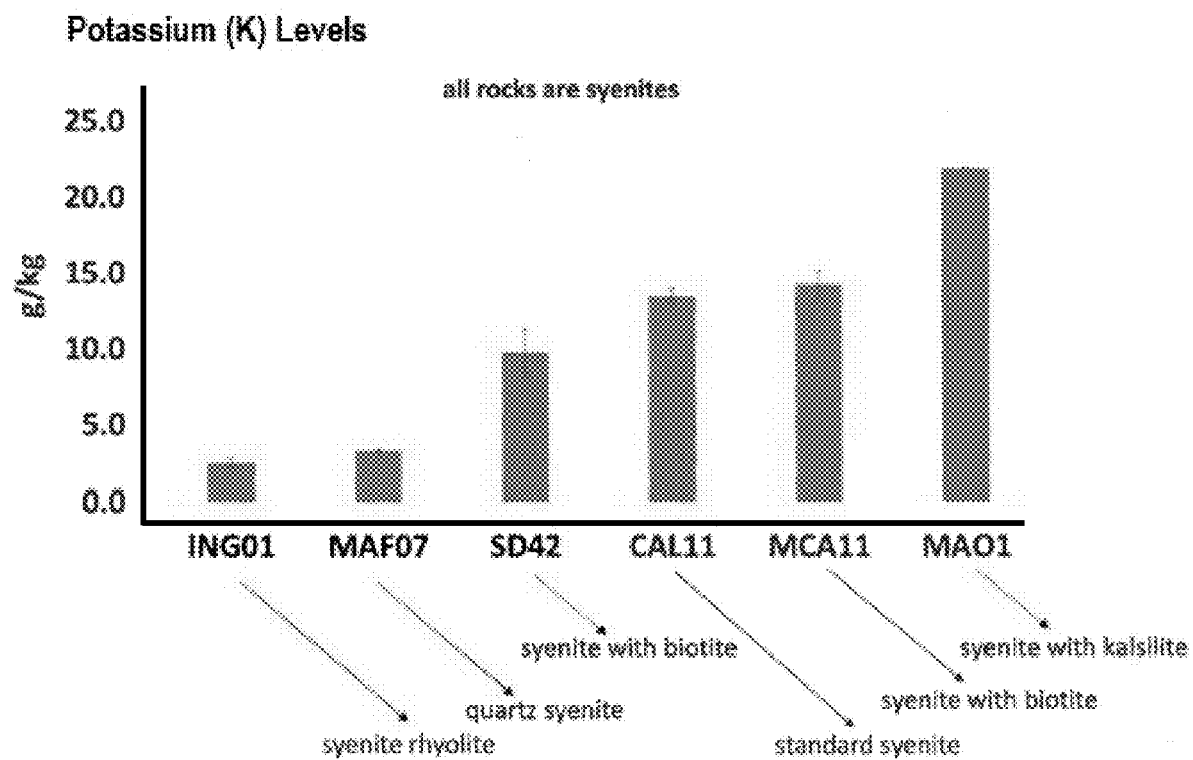
FIG. 1 is a chart showing the amount of potassium present in a variety of processed syenites. Processing of the material occurred at 200° C. for 5 h.
Figure 3:
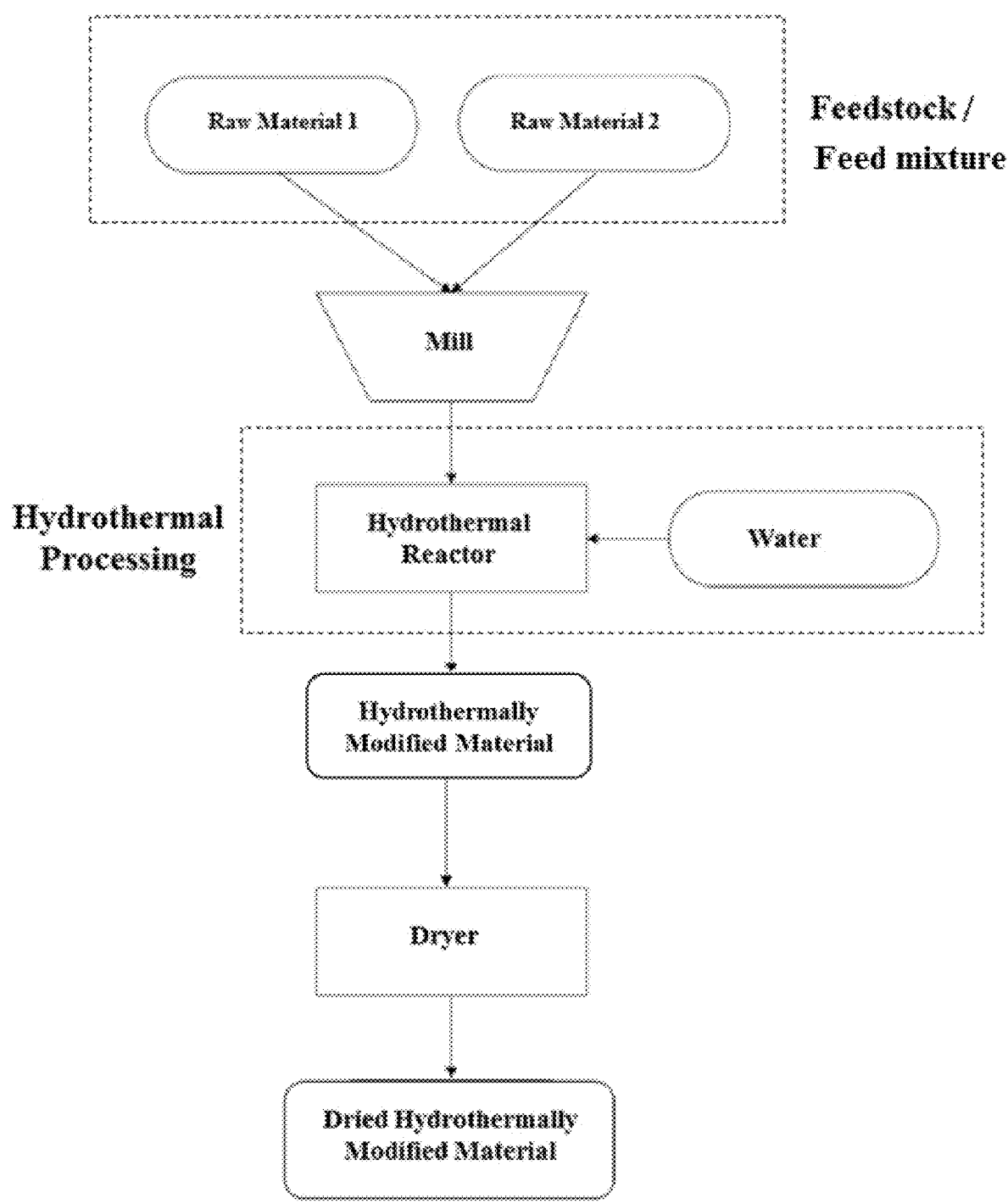
FIG. 3 provides a flow chart showing an overview of the various non-limiting steps in a process that affords materials, including dried hydrothermally modified materials of the present disclosure.

A flow chart providing a non-limiting, general overview of a process according to the disclosure that ultimately affords a dried hydrothermally modified material is provided in FIG. 3. The feedstock mixture comprises one or more first raw materials (a1) and one or more second raw materials (a2). The first raw materials (a1) include materials such as alkaline earth metal-containing raw materials (i.e., CaO) and/or other related metal-containing materials, as described herein. The second raw materials (a2) include naturally sourced minerals such as alkali metal-bearing silicates (e.g., K-feldspar) as described herein. The respective raw material components of the feedstock mixture can then be milled, comminuted, ground, pulverized etc. using any number of techniques known in the art, of which a non-limiting list is provided herein. The skilled artisan will recognize that the first and second raw materials (a1, a2) may be milled individually or together, or some combination thereof. Upon completion of this step, the feedstock mixture can be transferred into a hydrothermal reactor, such as an autoclave or similar reaction vessel, where the hydrothermal processing step takes place. Without specifying any particular sequence of events, the materials in the hydrothermal reactor can be contacted with water (in liquid or vapor form, or some combination thereof) in step (b), and the resulting mixture may then be subjected to temperature, pressure, and/or atmospheric conditions as described herein, for a time sufficient to provide a hydrothermally modified material and a supernatant aqueous phase as represented by step (c). The drying step (d) can be carried out using conventional means, such as commercially available dryers (or can be air-dried), and implemented according to any of the non-limiting methods as described herein. The hydrothermally modified material of step (c) can be dried together with at least a portion (or all) of the supernatant, or the supernatant can be removed (partially or completely) from the hydrothermally modified material, such that each component is dried separately. In either case, a dried hydrothermally modified material is obtained from the overall process. While we refer to step (d) as a drying step, it is to be understood that this step does not require the complete removal of all water. Also, it is to be understood that while a dried hydrothermally modified material will have been exposed to drying step (d), this does not require the dried hydrothermally modified material to have undergone the complete removal of all of the water.

The process described above takes into consideration (but is not necessarily constrained by) both soil science and economic principles to reduce (e.g., avoid) the production of an unwanted excess of soluble metal ion (e.g. potassium) species, as well as waste and/or byproducts.

Described in more detail below are various embodiments of the process depicted in FIG. 3. The process as disclosed herein can be carried out in batch, semi-batch, or continuous mode starting from the raw materials that comprise the feedstock mixture. In some embodiments of the present disclosure, raw material (a2) can be selected from among the K-bearing ores found in FIG. 2. In other embodiments of the present disclosure, the raw material (a2) is one or more alkali metal silicate materials selected from a non-limiting group of minerals including K-feldspar, kalsilite, phlogopite, muscovite, biotite, trachyte, rhyolite, micas, ultrapotassic syenite, leucite, nepheline, syenite, phonolite, fenite, ugandite, sanidine, aplite, pegmatite, and combinations thereof.

Any of the foregoing alkali metal-bearing minerals is suitable for combination with one or more raw materials (a2). In various embodiments of the present disclosure, the one or more raw materials of (a1) comprise calcium oxide, calcium hydroxide, or mixtures thereof. In other non-limiting embodiments, the one or more raw materials of (a1) comprise lithium oxide, sodium oxide, potassium oxide, rubidium oxide, cesium oxide, lithium hydroxide, sodium hydroxide, potassium hydroxide, rubidium hydroxide, cesium hydroxide, or mixtures thereof. In still other embodiments, the one or more raw materials of (a1) comprise magnesium oxide, calcium oxide, calcium carbonate, beryllium oxide, strontium oxide, radium oxide, magnesium hydroxide, calcium hydroxide, beryllium hydroxide, strontium hydroxide, radium hydroxide, or mixtures thereof. In some embodiments, the one or more compounds of (a2) comprise calcium hydroxide. In certain embodiments, the one or more compounds of (a2) comprise calcium oxide.

The step (a) of forming a mixture of particles of raw materials (a1) and (a2) as described herein above can include co-grinding or separately comminuting (a1) and (a2) using methods known in the art, such as crushing, milling, grinding, etc. of dry or slurried materials, for example using jaw-crushers, gyratory crushers, cone crushers, ball mills, rod mills, etc. as described herein.

In various embodiments of the present disclosure, the step (a) of forming a mixture is by milling (i.e., grinding, comminuting, pulverizing, etc.) the particles of (a1) and (a2), either separately or together. In some embodiments, the unmilled particles of (a1) and (a2) are first combined and then subsequently milled to form the desired feed mixture (joint milling). In other embodiments, each component, (a1) and (a2) is separately milled prior to combination of the components. In some embodiments, only one of (a1) or (a2) is separately milled prior to combination of the components, such that a milled component is combined with an unmilled component. In certain embodiments of the present disclosure, the milling can be ball milling, fluid energy milling, wet milling, media milling, high pressure homogenization milling, cryogenic milling, rod milling, autogenous milling, semi-autonomous milling, buhrstone milling, vertical shaft impactor milling, tower milling, or any combination thereof. In some embodiments, the milling of the mixture of (a1) and (a2) is formed by joint ball milling. In certain embodiments, the joint ball milling is of a mixture comprising an alkali metal silicate (i.e., K-feldspar) and an alkaline earth metal oxide or hydroxide (i.e., CaO and Ca(OH)$_2$).

The step (a) of forming a mixture of the particles of (a1) and (a2) as described herein above can include co-grinding or separately comminuting (a1) and (a2) using methods known in the art, such as crushing, milling, grinding, etc. of dry or slurried materials, for example using jaw-crushers, gyratory crushers, cone crushers, ball mills, rod mills, etc. as described herein. Each component, (a1) or (a2), as well as the resulting mixture can be sized as desired, via, for example, sieves, screens, and/or other known methods. In various embodiments, suitable mean particle sizes for (a1), (a2), or the resulting mixture, independently range from about 10 µm to about 250 µm. In certain embodiments, the mean particle size of (a1), (a2), or the mixture of (a1) and (a2), is independently about 10 µm, about 20 µm, about 30 µm, about 40 µm, about 50 µm, about 60 µm, about 70 µm, about 80 µm, about 90 µm, about 100 µm, about 110 µm, about 120 µm, about 130 µm, about 140 µm, about 150 µm, about 160 µm, about 170 µm, about 180 µm, about 190 µm, about 200 µm, about 210 µm, about 220 µm, about 230 µm, about 240 µm, about 250 µm, about 260 µm, about 270 µm, about 280 µm, about 290 µm, about 330 µm, including all ranges and values between any of these values. In certain embodiments, (a1), (a2), or the resulting mixture, independently has a mean particle size of about 17 µm, about 85 µm, about 151 µm, or about 220 µm. If desired, the (a1) and (a2) components can have similar particle sizes, or different particle sizes as described above. That is, the (a1) component can have the same, larger, or smaller mean particle size compared to the (a2) component.

In various embodiments of the method described herein, the mixture (i.e., the feedstock) from step (a) is contacted with water in step (b). Contacting the feedstock of step (a) with water in step (b) can be carried out by any suitable method, such as adding water to the feedstock of step (a), or by adding the feedstock of step (a) to water, or by sequentially or simultaneously adding the water and feedstock of step (a) to a suitable vessel, such as a reactor vessel in which the combination of water and the feedstock of step (a) can be heated to a temperature, optionally under a pressure and/or suitable atmosphere as described herein to form a hydrothermally modified material. In any of these embodiments, water can be added as a liquid, a vapor (i.e., steam), or some combination thereof.

In certain embodiments, the contacting in step (b) of the method is carried out with a weight excess of water relative to the raw material (a2) (e.g., an alkali metal silicate as described herein). In some embodiments, the weight excess of water relative to raw material (a2) presented as a ratio is about 1:1, 2:1, about 3:1, about 4:1, about 5:1, about 6:1, about 7:1, about 8:1, about 9:1, about 10:1, about 11:1, about 12:1, about 13:1, about 14:1, about 15:1, 1 about 6:1, about 17:1, about 18:1, about 19:1, and about 20:1; where, for example a 4:1 ratio means that water is present at 4-times the amount by weight of the raw material (a2) used. In some embodiments, the contacting in step (b) of the method is with a weight ratio of alkali metal silicate raw material (a2) to water of about 1:1, about 2:1, about 3:1, about 4:1, about 5:1, about 6:1, about 7:1, about 8:1, about 9:1, about 10:1, about 11:1, about 12:1, about 13:1, about 14:1, about 15:1, 1 about 6:1, about 17:1, about 18:1, about 19:1, and about 20:1; where, for example a 4:1 ratio means that the alkali metal silicate raw material is present at 4-times the amount by weight of the water used.

In some embodiments, the milled feedstock mixture that is contacted with water is introduced into an autoclave or other suitable container or reaction vessel known in the art in order to prepare the hydrothermally modified material formed in step (c). In other embodiments, reaction conditions such as atmosphere, time, temperature, and pressure can be modulated to tune the properties of the product. In certain embodiments, modification of these parameters can be used to adjust the relative amounts of the constituent phases, including but not limited to, amorphous phase, calcium silicate hydrate, hydrogarnet, tobermorite, and K-feldspar. In some embodiments, these parameters can be adjusted to drive conversion of the alkali aluminosilicate (e.g., K-feldspar) specifically into other phases such as amorphous phase(s) and/or calcium silicate hydrate phase(s) (C-S-H; tobermorite). In certain embodiments, the leaching properties of the hydrothermally modified materials and/or dried hydrothermally modified materials provided herein are adjusted by tuning the aforementioned parameters.

In some embodiments, the pressure used in the hydrothermal processing step (c) ranges of from about 5-85 atm. In certain embodiments, the hydrothermal processing step (c) is carried out at pressures of about 5 atm, of about 10 atm, of about 15 atm, of about 20 atm, of about 25 atm, of about 30 atm, of about 35 atm, of about 40 atm, of about 45 atm, of about 50 atm, of about 55 atm, of about 60 atm, of about 65 atm, of about 70 atm, of about 75 atm, of about 80 atm, of about 85 atm, and any ranges of values between any of these values. In some embodiments, the hydrothermal processing step (c) is carried out at temperature ranges of from about 120° C.-300° C. In certain embodiments, the hydrothermal processing step (c) is carried out at a temperature of about 120° C., about 130° C., about 140° C., about 150° C., about 160° C., about 170° C., about 180° C., about 190° C., about 200° C., about 210° C., about 220° C., about 230° C., about 240° C., about 250° C., about 260° C., about 270° C., about 280° C., about 290° C., about 300° C., and all ranges of values between any of these values. In some embodiments, the duration of step (c) of the method (i.e. the hydrothermal processing step) ranges from about 0.1-20 hours. In certain embodiments, the duration of step (c) of the method is about 0.1 h, about 0.25 h, about 0.5 h, about 0.75 h, about 1 h, about 2 h, about 3 h, about 4 h, about 5 h, about 6 h, about 7 h, about 8 h, about 9 h, about 10 h, about 11 h, about 12 h, about 13 h, about 14 h, about 15 h, about 16 h, about 17 h, about 18 h, about 19 h, about 20 h, and all ranges of values therebetween. In some embodiments, the hydrothermal processing step (c) is carried out at pressure ranges from about 5-85 atm, temperature ranges from about 120° C.-300° C., for a duration ranging from about 0.1-20 hours. In general, the hydrothermal processing step (c) can be performed in any appropriate atmosphere, such as, for example, a reactive atmosphere or an inert atmosphere. In certain embodiments, the atmospheric composition of the hydrothermal processing step (c) include, but are not limited to, argon (Ar), nitrogen (N), air, carbon dioxide ($CO_2$), or mixtures thereof.

The hydrothermally modified material formed in step (c), can include, e.g., an altered form of an alkali metal aluminosilicate relative the form of the alkali metal aluminosilicate in the raw material. The altered form of the alkali metal aluminosilicate can contain some amount of an alkali metal, alkaline earth metal, or other metal or ionic species exchanged from other materials (e.g., CaO, Ca(OH)$_2$ etc. present in the mixture heated in the presence of water optionally under pressure and/or modified atmosphere as described in various embodiments herein). Exemplary alkali metal aluminosilicates can include potassium aluminosilicates (e.g., K-feldspar, ultrapotassic syenite, or any of the other such materials disclosed herein).

In some embodiments, the method includes a drying step (d), where the hydrothermally modified material formed in step (c) and at least a portion of the supernatant aqueous phase formed during hydrothermal processing (e.g., the water added in step (b) contacting the hydrothermally modified material) are dried together. In some embodiments, drying of step (d) is carried out at a temperature of from about 20° C. to about 300° C. (e.g., from about 30° C. to about 290° C., from about 40° C. to about 280° C., from about 50° C. to about 270° C., from about 60° C. to about 260° C., from about 70° C. to about 250° C., from about 80° C. to about 240° C., from about 90° C. to about 230° C., from about 100° C. to about 220° C., from about 110° C. to about 210° C., from about 120° C. to about 200° C., from about 130° C. to about 190° C., from about 140° C. to about 180° C., or from about 150° C. to about 170° C.). In some embodiments, the drying step is carried out at a temperature of from about 50° C. to about 160° C. (e.g., from about 60° C. to about 150° C., from about 70° C. to about 140° C., from about 80° C. to about 130° C., from about 90° C. to about 120° C., or from about 100° C. to about 110° C.). In some embodiments, the drying step is carried out at a temperature of at least about 20° C. (e.g., at least about 25° C., at least about 30° C., at least about 40° C., at least about 50° C., at least about 60° C., at least about 70° C., at least about 80° C., at least about 90° C., at least about 100° C., at least about 110° C., at least about 120° C., at least about 130° C., at least about 140° C., at least about 150° C., at least about 160° C., at least about 170° C., at least about 180° C., or at least about 190° C.), and/or at most about 300° C. (e.g., at most about 290° C., at most about 280° C., at most about 270° C., at most about 260° C., at most about 250° C., at most about 240° C., about 230° C., at most about 220° C., or at most about 210° C.). In some embodiments, drying is carried out under ambient temperatures, e.g., by allowing the supernatant water to evaporate. In certain embodiments, drying step (d) is performed using flash drying. In some embodiments, the drying step (d) occurs for a duration of from about 1 minute (min) to about 24 hours (h) (e.g., from about 5 min to about 23 h, from about 10 min to about 22 h, from about 20 min to about 21 h, from about 30 min to about 20 h, from about 40 min to about 19 h, from about 50 min to about 18 h, from about 1 h to about 17 h, from about 2 h to about 16 h, from about 3 h to about 15 h, from about 4 h to about 14 h, from about 5 h to about 13 h, from about 6 h to about 12 h, from about 7 h to about 11 h, or from about 8 h to about 10 h). In some embodiments, the drying step occurs for a duration of from about 12 h to about 24 h (e.g., from about 13 h to about 23 h, from about 14 h to about 22 h, from about 15 h to about 21 h, from about 16 h to about 20 h, or from about 17 h to about 19 h). In some aspects, the drying step (d) is carried out for a duration of at least about 1 min (e.g., at least about 5 min, at least about 10 min, at least about 20 min, at least about 30 min, at least about 40 min, at least about 50 min, at least about 1 h, at least about 2 h, at least about 3 h, at least about 4 h, at least about 5 h, at least about 6 h, at least about 7 h, at least about 8 h, or at least about 9 h), and/or at most about 24 h (e.g., at most about 23 h, at most about 22 h, at most about 21 h, at most about 20 h, at most about 19 h, at most about 18 h, at most about 17 h, at most about 16 h, at most about 15 h, at most about 14 h, at most about 13 h, at most about 12 h, or at most about 11). In some embodiments, drying of step (d) is carried out at a pressure of from about 1 bar to about 30 bar (e.g., from about 2 bar to about 29 bar, from about 3 bar to about 28 bar, from about 4 bar to about 27 bar, from about 5 bar to about 26 bar, from about 6 bar to about 25 bar, from about 7 bar to about 24 bar, from about 8 bar to about 23 bar, from about 9 bar to about 22 bar, from about 10 bar to about 21 bar, from about 11 bar to about 20 bar, from about 12 bar to about 19 bar, from about 13 bar to about 18 bar, from about 14 bar to about 17 bar, or from about 15 bar to about 16 bar). In some embodiments, the drying step (d) is carried out at a pressure of at least about 1 bar (e.g., at least about 2 bar, at least about 3 bar, at least about 4 bar, at least about 5 bar, at least about 6 bar, at least about 7 bar, at least about 8 bar, at least about 9 bar, or at least about 10 bar), and/or at most about 30 bar (e.g., at most about 25 bar, at most about 20 bar, at most about 15 bar, at most about 14 bar, at most about 13 bar, at most about 12 bar, or at most about 11 bar). In some embodiments, the drying step (d) is carried out under ambient pressures (e.g., about 1 bar). In some embodiments, drying is carried out at two or more different temperatures (e.g., for a period of time at a particular temperature, then for another period of time at a different temperature), at two or more different pressures, and/or for two or more different time frames. It is to be understood that various combinations of the foregoing process parameters for drying step (d) can be used as appropriate.

In certain embodiments, hydrothermal processing step (c) and drying of step (d) are independently carried out under an inert atmosphere or a reactive atmosphere. As an example, in some embodiments, step (c) is carried out in an inert atmosphere, and step (d) is carried out in an inert atmosphere. As another example, in certain embodiments, step (c) is carried out in a reactive atmosphere, and step (d) is carried out in an inert atmosphere. As a further example, in some embodiments, step (c) is carried out in an inert atmosphere, and step (d) is carried out in a reactive atmosphere. As yet another example, in some embodiments, step (c) is carried out in a reactive atmosphere, and step (d) is carried out in a reactive atmosphere. In some embodiments, an inert atmosphere comprises Ar and/or $N_2$. In certain embodiments, a reactive atmosphere comprises air, oxygen, carbon dioxide, carbon monoxide, and/or ammonia. In some embodiments, step (c) of the method is carried out under an inert atmosphere comprising Ar, or a reactive atmosphere comprising air or carbon dioxide. In certain embodiments, drying step (d) of the method is carried out under an inert atmosphere comprising Ar, or a reactive atmosphere comprising air or carbon dioxide. In some embodiments, step (c) and/or step (d) is carried out in air.

In some embodiments, a reactive atmosphere can comprise an inert gas such as Ar or $N_2$, provided that other components of the atmosphere are reactive. For example, air is a mixture of $N_2$, which is generally inert, and oxygen and traces of $CO_2$, which are reactive. The term reactive atmosphere thus does not exclude gas compositions which include inert gases, provided at least one of the gases in the atmosphere are reactive. The percentage of reactive gas as described herein in a reactive atmosphere can be at least about 10%, and can be up to 100% (by volume), including about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, or about 100% by volume, including all ranges and subranges between any of these values. Any combination of reactive and inert gas described herein can be used.

The conditions used for drying the hydrothermally modified material formed in step (c) can impact the fundamental properties (e.g., mineralogy) of the dried hydrothermally modified material, such as, for example, leaching properties and/or porosity of the dried hydrothermally modified material. In some embodiments, the step (d) drying the hydrothermally modified material of step (c) can include drying the hydrothermally modified material in the presence of the supernatant (e.g., aqueous phase) present during step (c), such that any species dissolved in the supernatant could potentially be recovered as part of the dried hydrothermally modified material. In certain embodiments, at least a portion of the supernatant can be separated from the hydrothermally modified material prior to the step (d) drying of the material, for example by decanting or filtering a portion (or essentially all) of the water from the reactor in which the hydrothermally modified material from step (c) is prepared, then drying the resulting material. When the hydrothermally modified material from step (c) is dried without prior removal/decanting of the supernatant, drying can be carried out via any suitable means, such as a flow of a desired gas, such that the gas flows over a slurry produced in step (c) (i.e., the mixture of the hydrothermally modified material suspended in the supernatant). In certain embodiments, drying of the hydrothermally modified material from step (c) in the presence of the supernatant can be carried out by any appropriate method known in the art, including, but not limited to bubbling a gas directly through the slurry. In some embodiments, drying step (d) includes adiabatic drying or non-adiabatic drying. With adiabatic dryers, solid materials can be exposed to heated gases via methods such as blowing gas across the surface (cross-circulation), blowing gas through solid beds (through-circulation), dropping solids slowly through a slow-moving gas stream (as in a rotary dryer), blowing gases through a bed of solids that fluidize the particles (i.e., fluidized-bed dryer), and by passing solids through a high-velocity hot gas stream (flash drying). Drying can occur via any appropriate mechanism of heat transfer including, but not limited to: direct (convection), indirect (conduction), radiant, or dielectric. In some embodiments, the hydrothermally modified materials prepared are, e.g., oven dried to produce dried hydrothermally modified materials. In some embodiments, oven drying is carried out at about 90° C. for a duration of 18 h.

In various embodiments, the drying step (d) is performed either in the presence of supernatant (water), or after at least a portion of the supernatant has been separated as described above, uses air, argon, carbon dioxide, vacuum, or any combination thereof. In certain embodiments, drying step (d) is carried out with one or more reactive gases comprising ammonia, carbon dioxide, carbon monoxide, oxygen, air, or combinations thereof. In some embodiments, drying step (d) is carried out with one or more inert gases such as argon or nitrogen. In some embodiments, drying step (d) is performed with air. In certain embodiments, drying step (d) is carried out with Ar. In some embodiments, drying step (d) is carried out with carbon dioxide. In certain embodiments, drying step (d) is performed under vacuum. In some embodiments, the material is flash dried in drying step (d).

In various embodiments, the present disclosure provides methods of preparing a hydrothermally modified material, and/or a dried hydrothermally modified material, which readily releases ions (e.g., alkali-metal ions such as $K^+$). In a step (a), the methods can include forming a feed mixture (or feedstock) comprising particles of one or more raw materials (a1) which may be in various embodiments one or more compounds selected from, for example, an alkali metal oxide, an alkali metal hydroxide, an alkaline earth metal oxide, and alkaline earth metal hydroxide, and combinations thereof, and raw material (a2) which may include one or more alkali metal silicate starting materials. In step (b), the mixture of step (a) can be contacted with water. In step (c), the feed mixture of step (b) can be subjected to a temperature and pressure for a time sufficient to form an hydrothermally modified material, in which the alkali metal silicate starting material (a2) is altered, for example by exchanging ions present in the (a1) component with ions present in the starting (a2) component. The resulting hydrothermally modified material can comprise, e.g., (c1) an altered and/or unaltered form of the alkali metal silicate of (a2) comprising up to about 15 wt. % of the alkali metal and/or alkaline earth metal of the one or more compounds of (a1), and (c2) one or more alkali metal and/or alkaline earth metal silicate phases substantially enriched with alkaline earth metal ions. In other various embodiments of the disclosure, the hydrothermally modified material comprises (c1) an altered and/or unaltered form of the alkali metal silicate of (a2) comprising up to about 1 wt. %, up to about 2 wt. %, up to about 3 wt. %, up to about 4 wt. %, up to about 5 wt. %, up to about 6 wt. %, up to about 7 wt. %, up to about 8 wt. %, up to about 9 wt. %, up to about 10 wt. %, up to about 11 wt. %, up to about 12 wt. %, up to about 13 wt. %, up to about 14 wt. %, up to about 15 wt. % of the alkali metal and/or alkaline earth metal of the one or more compounds of (a1), including all ranges of values therebetween. In step (d), the hydrothermally modified material is dried to form a dried hydrothermally modified material which more readily releases ionic species such as, for example, alkali metal ions ($K^+$, $Na^+$, etc.) or other ionic species such as silicates, including silicate salts, $Mg^{2+}$, $Ca^{2+}$, etc.

In some embodiments, the present disclosure provides a method of preparing a dried hydrothermally modified material which has improved release of alkali metal (or other) ions compared to the alkali metal silicate starting material(s) (e.g., comprising potassium aluminosilicates) from which it was prepared.

In various embodiments of the present disclosure, a hydrothermally modified material, and/or a dried hydrothermally modified material, is an ion releasing material, such as, for example, an alkali metal ion releasing material (e.g., $K^+$ ion releasing material and/or a $Na^+$ ion releasing material). In certain embodiments, a dried hydrothermally modified material is an alkaline earth metal ion releasing material (e.g., a $Ca^{2+}$ ion releasing material and/or a $Mg^{2+}$ ion releasing material). In some embodiments, a dried hydrothermally modified material is an aluminum ion (e.g., $Al^{3+}$) releasing material. In certain embodiments, a dried hydrothermally modified material releases Si, for example in the form of a silicate salt.

In various embodiments, as described above, the feedstock mixture comprises one or more compounds from (a1) and one or more compounds from (a2). In some embodiments, the mixture comprises a calcium-bearing compound and a silicon-bearing compound. In various embodiments of the present disclosure, the ratio of the calcium containing component (i.e. CaO, $Ca(OH)_2$, $CaCO_3$) to the silicon bearing material (i.e., alkali aluminosilicates such as potassium aluminosilicates) can be used to modulate the mineralogy, leaching, buffering capacity, as well as other properties of the dried hydrothermally modified material.

Without wishing to be bound by theory, it is believed that in certain embodiments, increasing the Ca/Si ratio in the feedstock drives product formation towards the formation of dicalcium silicate hydrate and/or amorphous phase. In certain embodiments, increasing the Ca/Si ratio in the feedstock has the concurrent effect of diminishing the tobermorite phase. In some embodiments, the dicalcium silicate hydrate phase can be obtained at higher levels than the tobermorite phase by increasing the Ca/Si ratio in the feed mixture. In various embodiments, the Ca/Si ratio is about 0.025 to about 0.9. In certain embodiments, the Ca/Si ratio is about 0.025, about 0.05, about 0.075, about 0.1, about 0.125, about 0.150, about 0.175, about 0.2, about 0.225, about 0.250, about 0.275, about 0.3, about 0.325, about 0.350, about 0.375, about 0.4, about 0.425, about 0.450, about 0.475, about 0.5, about 0.525, about 0.550, about 0.575, about 0.6, about 0.625, about 0.650, about 0.675, about 0.7, about 0.725, about 0.750, about 0.775, about 0.8, about 0.825, about 0.850, about 0.875, about 0.90, including all ranges between any of these values.

In some disclosures, the dried hydrothermally modified material comprises about 15-65 wt. % of a K-feldspar phase, about 0-5 wt. % of a tobermorite phase, about 0-20 wt. % of a hydrogarnet phase, about 5-30 wt. % of a dicalcium silicate hydrate phase, about 15-35 wt. % of an amorphous phase. In certain embodiments, the dried hydrothermally modified material comprises about 15 wt. % of a K-feldspar phase, about 18 wt. % of a hydrogarnet phase, about 30 wt. % of a dicalcium silicate hydrate phase, and about 35 wt. % of an amorphous phase.

In various embodiments, the hydrothermally modified or dried hydrothermally modified material of the present disclosure comprises about 45-65 wt. % of a K-feldspar phase, about 1-10 wt. % of a tobermorite phase, about 1-10 wt. % of a hydrogarnet phase, about 1-10 wt. % of a dicalcium silicate hydrate phase, and about 20-40 wt. % of an amorphous phase.

In certain embodiments, the hydrothermally modified material or dried hydrothermally modified material comprises about 35 wt. %, about 36 wt. %, about 37 wt. %, about 38 wt. %, about 39 wt. %, about 40 wt. %, about 41 wt. %, about 42 wt. %, about 43 wt. %, about 44 wt. %, about 45 wt. % of a K-feldspar phase, about 46 wt. %, about 47 wt. %, about 48 wt. %, about 49 wt. %, about 50 wt. %, about 51 wt. %, about 52 wt. %, about 53 wt. %, about 54 wt. %, about 55 wt. %, about 56 wt. %, about 57 wt. %, about 58 wt. %, about 59 wt. %, about 60 wt. %, about 61 wt. %, about 62 wt. %, about 63 wt. %, about 64 wt. %, about 65 wt. %, about 66 wt. %, about 67 wt. %, about 68 wt. %, about 69 wt. %, about 70 wt. %, about 71 wt. %, about 72 wt. %, about 73 wt. %, about 74 wt. %, about 75 wt. % of a K-feldspar altered phase (i.e., altered compared to the K-feldspar phases present in the feedstock), including all ranges and values there between.

In other embodiments, the hydrothermally modified or dried hydrothermally modified material comprises about 1 wt. %, about 2 wt. %, about 3 wt. %, about 4 wt. %, about 5 wt. %, about 6 wt. %, about 7 wt. %, about 8 wt. %, about 9 wt. %, about 10 wt. %, about 11 wt. %, about 12 wt. %, about 13 wt. % about 14 wt. %, about 15 wt. % about 16 wt. %, about 17 wt. %, about 18 wt. %, about 19 wt. % about 20 wt. % of a tobermorite phase, including all ranges between any of these values.

In various other embodiments, the hydrothermally modified or dried hydrothermally modified material comprises about 1 wt. %, about 2 wt. %, about 3 wt. %, about 4 wt. %, about 5 wt. %, about 6 wt. %, about 7 wt. %, about 8 wt. %, about 9 wt. %, about 10 wt. %, 11 wt. about 12 wt. % about 13 wt. %, about 14 wt. %, about 15 wt. %, about 16 wt. %, about 17 wt. about 18 wt. % about 19 wt. %, about 20 wt. % of a hydrogarnet phase, including all ranges between any of these values.

In some embodiments, the hydrothermally modified or dried hydrothermally modified material comprises about 1 wt. %, about 2 wt. %, about 3 wt. %, about 4 wt. %, about 5 wt. %, about 6 wt. %, about 7 wt. %, about 8 wt. %, about 9 wt. % about 10 wt. % about 11 wt. %, about 12 wt. %, about 13 wt. % about 14 wt. %, about 15 wt. % about 16 wt. %, about 17 wt. %, about 18 wt. % about 19 wt. % about 20 wt. % of a dicalcium silicate hydrate phase, including all ranges between any of these values.

In certain other embodiments, the hydrothermally modified or dried hydrothermally modified material comprises about 10 wt. %, about 12 wt. %, about 14 wt. % about 16 wt. about 18 wt. % about 20 wt. % about 22 wt. % about 24 wt. % about 26 wt. % about 28 wt. about 30 wt. % about 32 wt. % about 34 wt. % about 36 wt. % about 38 wt. % about 40 wt. about 42 wt. % about 44 wt. % about 46 wt. % about 48 wt. % about 50 wt. % of an amorphous phase, including all ranges between any of these values.

In some embodiments, the hydrothermally modified or dried hydrothermally modified material further comprises carbonaceous species. In certain embodiments, the hydrothermally modified or dried hydrothermally modified material comprises about 0-20 wt. % of a carbonaceous species. In some embodiments, the hydrothermally modified or dried hydrothermally modified material comprises about 0% wt. %, about 1% wt. %, about 2% wt. %, about 3 wt. %, about 4 wt. %, about 5 wt. %, about 6 wt. %, about 7 wt. %, about 8 wt. %, about 9 wt. %, about 10 wt. %, about 11 wt. %, about 12 wt. %, about 13 wt. %, about 14 wt. %, about 15 wt. %, about 16 wt. %, about 17 wt. %, about 18 wt. %, about 19 wt. %, or about 20 wt. % of carbonaceous species, including all ranges and values between any of these values. The carbonaceous species can include, for example, $K_2CO_3$, $Na_2CO_3$, $MgCO_3$, and/or $CaCO_3$. In some embodiments, the hydrothermally modified or dried hydrothermally modified material further comprises potassium carbonates, calcium carbonates, sodium carbonates, and any combinations thereof. In various embodiments, the hydrothermally modified or dried hydrothermally modified material further comprises potassium carbonates, calcium carbonates, and combinations thereof. In some embodiments, the combinations of potassium carbonates and calcium carbonates thereof include bütschiilite and/or fairchildite. Without wishing to be bound by theory, it is believed that carbonates can contribute to the regulation of the pH properties of the material and can be used to capture atmospheric $CO_2$. In various embodiments, the carbonaceous species is a calcite phase. In some embodiments, the calcite phase is present in about 0% wt. % (e.g., is present in at most only a trace amount), about 1% wt. %, about 2% wt. %, about 3 wt. %, about 4 wt. %, about 5 wt. %, about 6 wt. %, about 7 wt. %, about 8 wt. %, about 9 wt. %, about 10 wt. %, about 11 wt. %, about 12 wt. %, about 13 wt. %, about 14 wt. %, about 15 wt. %, about 16 wt. %, about 17 wt. %, about 18 wt. %, about 19 wt. %, about 20 wt. %, including all ranges between any of these values. In certain embodiments, the hydrothermally modified or dried hydrothermally modified material elevates the pH of an aqueous solution to a range from about 10 to about 12. This feature of the hydrothermally modified or dried hydrothermally modified materials can improve soil health and/or reduce levels of acidity which can be deleterious in agriculture. Thus, the hydrothermally modified or dried hydrothermally modified materials of the present disclosure can replace or reduce the need for lime or other pH modifying soil conditioners.

Without wishing to be bound by theory, it is believed that, using a gas comprising $CO_2$ during the drying step (d) can facilitate a decalcification reaction that occurs when calcium silicate hydrate (C-S-H) phases are exposed to $CO_2$. In some embodiments, the decalcification that occurs under an atmosphere comprising $CO_2$ results in the production of a calcite (i.e. the stable polymorph form of $CaCO_3$) phase provided by decalcification of the calcium in the C-S-H phase. In certain embodiments, it is believed that the calcite phase is responsible for trapping potassium, resulting a dried hydrothermally modified material that exhibits a relatively (slow or continuous release of potassium. In some embodiments, the modified potassium-release is slower than the release of potassium compared to otherwise identical material not exposed to $CO_2$ during drying, and extends over a longer period of time. In some embodiments, it is believed that the decalcification of C-S-H leads to the production of silicon dioxide ($SiO_2$). In certain embodiments, it is believed that decalcification of the C-S-H phase is accompanied by the decalcification of hydrogarnet in the dried hydrothermally modified material, leading to the additional production of aluminum oxide ($Al_2O_3$).

The disclosed methods can be carried out in batch processes or under continuous conditions. In some embodiments, the alkali metal and/or alkaline earth metal silicate phase of (c2) comprises up to about 23 wt. % alkaline earth metal ions. In certain embodiments, the alkali metal and/or alkaline earth metal silicate phase of (c2) comprises up to about 1 wt. %, up to about 2 wt. %, up to about 3 wt. %, up to about 4 wt. %, up to about 5 wt. %, up to about 6 wt. %, up to about 7 wt. %, up to about 8 wt. %, up to about 9 wt. %, up to about 10 wt. %, up to about 11 wt. %, up to about 12 wt. %, up to about 13 wt. %, up to about 14 wt. %, up to about 15 wt. %, up to about 16 wt. %, up to about 17 wt. %, up to about 18 wt. %, up to about 19 wt. %, up to about 20 wt. %, up to about 21 wt. %, up to about 22 wt. %, up to about 23%, of alkaline earth metal ions, including all ranges between any of these values.

In some embodiments, the alkali metal and/or alkaline earth metal silicate phase of (c2) comprises an average of about 1 wt. %, about 2 wt. %, about 3 wt. %, about 4 wt. %, about 5 wt. % of alkaline earth metal ions, including all ranges of values therebetween. In certain embodiments, the alkali metal and/or alkaline earth metal silicate phase of (c2) comprises an average of about 3 wt. % alkaline earth metal ions.

Many of the materials disclosed herein have been characterized by X-Ray Powder Diffraction (XRPD), Scanning Electron Microscopy (SEM), Electron Probe Micro-Analyzer (EPMA), Particle Size Distribution (PSD), Specific Surface Area (according to the BET method; BET-SSA), and batch leaching tests (as well as other techniques known to the skilled artisan) does in fact possess the above-mentioned desirable properties. An understanding of the mineralogy of the inventive materials has been gained from XRPD results (e.g., FIGS. 4E and 4F) and imaging (e.g., FIGS. 14 and 15), such that the mineral phases composing the hydrothermally modified or dried hydrothermally modified material can be identified and quantified, as well as their degree of elemental inclusions with respect to stoichiometric chemical formulae. It has been observed that the feldspar framework, as an exemplary alkali metal silicate starting material, undergoes structural and chemical changes, a phenomenon termed alteration or altered herein.

From the characterization, it was found that the material exhibits complex mineralogy and chemical properties. In some embodiments, the particle size distribution spans particles diameters from ~0.1 µm to ~100 µm. In other embodiments, the constituent mineral phases are altered K-feldspar, hydrogarnet, α-dicalcium silicate hydrate, 11 Å tobermorite, and amorphous calcium-alumino-silicate-hydrate compounds. In certain embodiments, the phases nucleated in situ exhibit non-stoichiometric content of Ca, Al and Si; other than hydrogarnet, extensive degree of K-inclusion in all mineral structures is observed. In certain embodiments, traces of carbonaceous species with variable levels of K and Ca are also constituents of the material. In various embodiments, altered K-feldspar is Ca-substituted. In some embodiments, upon leaching, the availability of K, Si, Al and Ca in the dried hydrothermally modified material is enhanced with respect to the parent ultrapotassic syenite raw material, where the potassium released from the dried hydrothermally modified material after 24 h is shown to be two orders of magnitude higher than in the corresponding ultrapotassic syenite raw material.

In some embodiments of the present disclosure, the hydrothermally modified or dried hydrothermally modified material provided by the methods described herein comprises a multimodal particle size distribution comprising particles ranging in diameter from about 5-1000 µm. In still another embodiment of the present disclosure, the hydrothermally modified or dried hydrothermally modified material of the present disclosure comprises aggregated particles ranging in size from about 100-1000 µm. In some embodiments, the specific surface area according to the BET method (BET-SSA) was 15.1 $m^2$ $g^{-1}$ for the dried hydrothermally modified material and 46.9 $m^2$ $g^{-1}$ for the feed mixture In various embodiments, the disclosed hydrothermally modified or dried hydrothermally modified materials have mean particle size range from about 0.5 µm to about 250 µm. In certain embodiments, the mean particle size is about 0.5 µm, about 1 µm, about 1.5 µm, about 2 µm, about 2.5 µm, about 3 µm, about 3.5 µm, about 4 µm, about 4.5 µm, about 5 µm, about 5.5 µm, about 6 µm, about 6.5 µm, about 7 µm, about 7.5 µm, about 8 µm, about 8.5 µm, about 9 µm, about 9.5 µm, about 10 µm, about 20 µm, about 30 µm, about 40 µm, about 50 µm, about 60 µm, about 70 µm, about 80 µm, about 90 µm, about 100 µm, about 110 µm, about 120 µm, about 130 µm, about 140 µm, about 150 µm, about 160 µm, about 170 µm, about 180 µm, about 190 µm, about 200 µm, about 210 µm, about 220 µm, about 230 µm, about 240 µm, about 250 µm, about 260 µm, about 270 µm, about 280 µm, about 290 µm, about 330 µm, including all ranges between any of these values.

It is herein recognized that the complex mineralogy, in addition to other newly understood features can be used to tune the leaching abilities of the dried hydrothermally modified material. In particular, leaching experiments (e.g., FIGS. 24A-24F, FIGS. 9D-9H) have been used to assess the chemical stability of the mineral phases upon contact with water. Chemical stability in this area is understood in relation to the ability to release plant nutrients, and needs to be contextualized in the agronomic context. With such an understanding, dried hydrothermally modified materials can be designed and prepared to meet an even wider variety of soil needs, with applications available in other industries as well.

As described in detail throughout this disclosure and in the Examples that follow, a prominent feature of the dried hydrothermally modified material is the availability of potassium ($K^+$), as evidenced by leaching tests (see FIGS. 24A-24F for a representative example).

Without wishing to be bound by theory, the evidence presented herein indicates that the mechanism for such an enhanced K availability is the Ca-mediated hydrothermal alteration of K-feldspar, i.e. the hydrolytic dissolution of K-feldspar framework coupled with the inclusion of $Ca^{2+}$ in place of K⁺. In some embodiments, a hydrothermally modified or dried hydrothermally modified material releases metal ions, such as, for example, K⁺.

As used herein, "the 24-hour potassium release test" is performed as follows. An amount of a material is exposed to 10-fold excess of $10^5$ M $HNO_3$ for 24 hour. The amount of potassium ion released from the material during the 24 hour period is the potassium release of the material according to the 24-hour potassium release test. When comparing the amount of potassium release according to the 24-hour potassium release test, the amount of material tested for each of the different materials is the same.

In some embodiments, according to the 24-hour potassium release test, the amount of K⁺ released from the dried hydrothermally modified material is at least 2-fold higher than the amount of K⁺ released by the one or more alkali metal silicate starting materials of (a2). In various embodiments, according to the 24-hour potassium release test, the amount of K⁺ released from the dried hydrothermally modified material relative to the amount of K⁺ released by the one or more alkali metal silicate starting materials of (a2) was 2-fold higher, 3-fold higher, 4-fold higher, 5-fold higher, 6-fold higher, 7-fold higher, 8-fold higher, 9-fold higher, 10-fold higher, 15-fold higher, 20-fold higher, 25-fold higher, 30-fold higher, 35-fold higher, 40-fold higher, 45-fold higher, 50-fold higher, 55-fold higher, 60-fold higher, 65-fold higher, 70-fold higher, 75-fold higher, 80-fold higher, 85-fold higher, 90-fold higher, 95-fold higher, 100-fold higher, 150-fold higher, 200-fold higher, 250-fold higher, 300-fold higher, 350-fold higher, 400-fold higher, 450-fold higher, or 500-fold higher, including all values therebetween.

In some embodiments, the amount of K⁺ released from the dried hydrothermally modified material according to the 24-hour potassium release test ranges from about 5 to about 25 g K⁺/kg dried hydrothermally modified material. In certain embodiments, the amount of K⁺ released according to the 24-hour potassium release test is about 5 g K⁺/kg dried hydrothermally modified material, about 6 g K⁺/kg dried hydrothermally modified material, about 7 g K⁺/kg dried hydrothermally modified material, about 8 g K⁺/kg dried hydrothermally modified material, about 9 g K⁺/kg dried hydrothermally modified material, about 10 g K⁺/kg dried hydrothermally modified material, about 11 g K⁺/kg dried hydrothermally modified material, about 12 g K⁺/kg dried hydrothermally modified material, about 13 g K⁺/kg dried hydrothermally modified material, about 14 g K⁺/kg dried hydrothermally modified material, about 15 g K⁺/kg dried hydrothermally modified material, about 14 g K⁺/kg dried hydrothermally modified material, about 16 g K⁺/kg dried hydrothermally modified material, about 14 g K⁺/kg dried hydrothermally modified material, about 17 g K⁺/kg dried hydrothermally modified material, about 18 g K⁺/kg dried hydrothermally modified material, about 19 g K⁺/kg dried hydrothermally modified material, about 20 g K⁺/kg dried hydrothermally modified material, about 21 g K⁺/kg dried hydrothermally modified material, about 22 g K⁺/kg dried hydrothermally modified material, about 23 g K⁺/kg dried hydrothermally modified material, about 24 g K⁺/kg dried hydrothermally modified material, or about 25 g K⁺/kg dried hydrothermally modified material, including all values and ranges therebetween.

In certain embodiments, K-release from a dried hydrothermally modified material is enhanced by utilizing a solution of pH 5 $CsNO_3/HNO_3$. In various embodiments, K-release from a dried hydrothermally modified material after 24 h exposure to a 10-fold excess of $10^5$ M $CsNO_3/HNO_3$ is about 1.1-fold to about 2-fold higher than K-release of the same material in a pH 5 leaching solution of $HNO_3$. In some embodiments, leaching is about 1.1-fold higher, about 1.2-fold higher, about 1.3-fold higher, about 1.4-fold higher, about 1.5-fold higher, about 1.6-fold higher, about 1.7-fold higher, about 1.8-fold higher, about 1.9-fold higher, about 2-fold higher, including all ranges and values therebetween. Without being bound by any particular theory, it is believed that components of the solid favor uptake of Cs⁺ and release of K⁺.

As used herein, "the one-minute potassium release test" is performed as follows. An amount of a material is exposed to 10-fold excess of $10^{-5}$ M $HNO_3$ for one minute. The amount of potassium ion released from the material during the one minute period is the potassium release of the material according to the one-minute potassium release test. In some embodiments, according to the one-minute potassium release test, a dried hydrothermally modified material releases at least 5,000 mg (e.g., at least 6,000 mg, at least 7,000 mg, at least 8,000 mg, at least 9,000 mg, at least 10,000 mg, at least 11,000 mg) of potassium per kilogram of the dried hydrothermally modified material.

In some embodiments, a relatively large amount the potassium is initially released from a dried hydrothermally modified material, followed by a relatively small amount of potassium released over an extended period of time. This can be quantified, for example, by measuring the "relative potassium" release, which is defined as X/Y, where X is the amount of potassium released by a material according to the one-minute potassium release test, and Y is the amount of potassium released by the material according to the 24-hour potassium release test less the amount of potassium released by the material according to the one-minute potassium release test. In some embodiments, a dried hydrothermally modified material has a relative potassium release of from about five to about 20 (e.g., from about seven to about 15, from about nine to about 12). In certain embodiments, a dried hydrothermally modified material has a relative potassium release of at least about five (e.g., at least about six, at least about seven, at least about eight, at least about nine, at least about 10, at least about 11, at least about 12, at least about 13) and/or at most about 20 (e.g., at most about 19, at most about 18, at most about 17, at most about 16, at most about 15, at most about 14).

In some embodiments, the dried hydrothermally modified material is capable of releasing other elements in addition to K. In various embodiments, the additional elements capable of release from the material include Al, Si, Ca, Na. and Mg (e.g., in the form of soluble salts, which can contain the noted elements in ionic form).

As used herein, "the 24-hour calcium release test" is performed as follows. An amount of a material is exposed to 10-fold excess of $10^{-5}$ M $HNO_3$ for 24 hour. The amount of calcium ion released from the material during the 24 hour period is the calcium release of the material according to the 24-hour calcium release test. When comparing the amount of calcium release according to the 24-hour calcium release test, the amount of material tested for each of the different materials is the same.

In certain embodiments of the present disclosure, according to the 24-hour calcium release test, the amount of $Ca^{2+}$ released from the hydrothermally modified or dried hydrothermally modified material ranges from about 0.01 to about 0.35 g $Ca^{2+}$/kg dried hydrothermally modified material. In some embodiments, the amount of $Ca^{2+}$ released according to the 24-hour calcium release test was about 0.01 g $Ca^{2+}$/kg dried hydrothermally modified material, about 0.025 g $Ca^{2+}$/ kg dried hydrothermally modified material, about 0.05 g Ca$^{2+}$/kg dried hydrothermally modified material, about 0.075 g Ca$^{2+}$/kg dried hydrothermally modified material, about 0.1 g Ca$^{2+}$/kg dried hydrothermally modified material, about 0.125 g Ca$^{2+}$/kg dried hydrothermally modified material, about 0.15 g Ca$^{2+}$/kg dried hydrothermally modified material, about 0.175 g Ca$^{2+}$/kg dried hydrothermally modified material, about 0.2 g Ca$^{2+}$/kg dried hydrothermally modified material, about 0.225 g Ca$^{2+}$/kg dried hydrothermally modified material, about 0.25 g Ca$^{2+}$/kg dried hydrothermally modified material, about 0.275 g Ca$^{2+}$/kg dried hydrothermally modified material, about 0.3 g Ca$^{2+}$/kg dried hydrothermally modified material, about 0.325 g Ca$^{2+}$/kg dried hydrothermally modified material, about 0.35 g Ca$^{2+}$/kg dried hydrothermally modified material, including all values and ranges therebetween.

As used herein, "the 24-hour aluminum release test" is performed as follows. An amount of a material is exposed to 10-fold excess of $10^5$ M HNO$_3$ for 24 hour. The amount of aluminum ion released from the material during the 24 hour period is the aluminum release of the material according to the 24-hour aluminum release test. When comparing the amount of aluminum release according to the 24-hour aluminum release test, the amount of material tested for each of the different materials is the same.

In some embodiments of the present disclosure, according to the 24-hour aluminum release test, the amount of Al$^{3+}$ released from the hydrothermally modified or dried hydrothermally modified material ranges from about 0.02 to about 0.35 g Al3+/kg dried hydrothermally modified material. In some embodiments, the amount of Al$^{3+}$ released according to the 24-hour aluminum release test was about 0.02 g Al3+/kg dried hydrothermally modified material, about 0.05 g Al3+/kg dried hydrothermally modified material, about 0.075 g Al3+/kg dried hydrothermally modified material, about 0.1 g Al3+/kg dried hydrothermally modified material, about 0.125 g Al3+/kg dried hydrothermally modified material, about 0.15 g Al3+/kg dried hydrothermally modified material, about 0.175 g Al3+/kg dried hydrothermally modified material, about 0.2 g Al3+/kg dried hydrothermally modified material, about 0.225 g Al3+/kg dried hydrothermally modified material, about 0.25 g Al3+/kg dried hydrothermally modified material, about 0.275 g Al3+/kg dried hydrothermally modified material, about 0.3 g Al3+/kg dried hydrothermally modified material, about 0.325 g Al3+/kg dried hydrothermally modified material, about 0.35 g Al3+/kg dried hydrothermally modified material, including all values and ranges therebetween.

As used herein, "the 24-hour silicon release test" is performed as follows. An amount of a material is exposed to 10-fold excess of $10^{-5}$ M HNO$_3$ for 24 hour. The amount of silicon released from the material during the 24 hour period is the silicon release (e.g., in the form of soluble silicates, including orthosilicic acid and oligomeric or polymeric forms thereof) of the material according to the 24-hour silicon release test. When comparing the amount of silicon release according to the 24-hour silicon release test, the amount of material tested for each of the different materials is the same.

In some embodiments, according to the 24-hour silicon release test, the amount of silicon released from the hydrothermally modified or dried hydrothermally modified material ranges from about 0.1 to about 1.5 g silicon/kg dried hydrothermally modified material. In certain embodiments, the amount of silicon released according to the 24-hour silicon release test was about 0.1 g silicon/kg dried hydrothermally modified material, about 0.2 g silicon/kg dried hydrothermally modified material, about 0.3 g silicon/kg dried hydrothermally modified material, about 0.4 g silicon/kg dried hydrothermally modified material, about 0.5 g silicon/kg dried hydrothermally modified material, about 0.6 g silicon/kg dried hydrothermally modified material, about 0.7 g silicon/kg dried hydrothermally modified material, about 0.8 g silicon/kg dried hydrothermally modified material, about 0.9 g silicon/kg dried hydrothermally modified material, about 1 g silicon/kg dried hydrothermally modified material, about 1.1 g silicon/kg dried hydrothermally modified material, about 1.2 g silicon/kg dried hydrothermally modified material, about 1.3 g silicon/kg dried hydrothermally modified material, about 1.4 g silicon/kg dried hydrothermally modified material, about 1.5 g silicon/kg dried hydrothermally modified material, including all values and ranges therebetween.

As used herein, "the 24-hour sodium release test" is performed as follows. An amount of a hydrothermally modified material or dried hydrothermally modified material is exposed to 10-fold excess of $10^{-5}$ M HNO$_3$ for 24 hour. The amount of sodium released from the material during the 24 hour period is the sodium release of the material according to the 24-hour sodium release test. When comparing the amount of sodium release according to the 24-hour sodium release test, the amount of material tested for each of the different materials is the same.

In yet another embodiment of the present disclosure, according to the 24-hour sodium release test, the amount of Na$^+$ released from the hydrothermally modified or dried hydrothermally modified material ranges from about 0.01 to about 0.1 g Na$^+$/kg dried hydrothermally modified material. In yet another, the amount of Na$^+$ released according to the 24-hour sodium release test was about 0.01 g Na$^+$/kg dried hydrothermally modified material, about 0.015 g Na$^+$/kg dried hydrothermally modified material, about 0.02 g Na$^+$/kg dried hydrothermally modified material, about 0.025 g Na$^+$/kg dried hydrothermally modified material, about 0.03 g Na$^+$/kg dried hydrothermally modified material, about 0.035 g Na$^+$/kg dried hydrothermally modified material, about 0.04 g Na$^+$/kg dried hydrothermally modified material, about 0.045 g Na$^+$/kg dried hydrothermally modified material, about 0.05 g Na$^+$/kg dried hydrothermally modified material, about 0.055 g Na$^+$/kg dried hydrothermally modified material, about 0.06 g Na$^+$/kg alkali metal ion-releasing material, about 0.065 g Na$^+$/kg dried hydrothermally modified material, about 0.07 g Na$^+$/kg dried hydrothermally modified material, about 0.075 g Na$^+$/kg dried hydrothermally modified material, about 0.08 g Na$^+$/kg dried hydrothermally modified material, about 0.085 g Na$^+$/kg dried hydrothermally modified material, about 0.09 g Na$^+$/kg dried hydrothermally modified material, about 0.095 g Na$^+$/kg dried hydrothermally modified material, about 0.1 g Na$^+$/kg dried hydrothermally modified material, including all values and ranges therebetween.

As used herein, "the 24-hour magnesium release test" is performed as follows. An amount of a hydrothermally modified material or a dried hydrothermally modified material is exposed to 10-fold excess of $10^5$ M HNO$_3$ for 24 hour. The amount of magnesium ion released from the material during the 24 hour period is the magnesium release of the material according to the 24-hour magnesium release test. When comparing the amount of magnesium release according to the 24-hour magnesium release test, the amount of material tested for each of the different materials is the same.

In some embodiments of the present disclosure, according to the 24-hour magnesium release test, the amount of magnesium released from the hydrothermally modified or dried hydrothermally modified material ranges from about 0.01 to about 0.1 g $Mg^{2+}$/kg dried hydrothermally modified material. In some embodiments, the amount of $Mg^{2+}$ released according to the 24-hour magnesium release test was about 0.01 g $Mg^{2+}$/kg dried hydrothermally modified material, about 0.015 g $Mg^{2+}$/kg dried hydrothermally modified material, about 0.02 g $Mg^{2+}$/kg dried hydrothermally modified material, about 0.025 g $Mg^{2+}$/kg dried hydrothermally modified material, about 0.03 g $Mg^{2+}$/kg dried hydrothermally modified material, about 0.035 g $Mg^{2+}$/kg dried hydrothermally modified material, about 0.04 g $Mg^{2+}$/kg dried hydrothermally modified material, about 0.045 g $Mg^{2+}$/kg dried hydrothermally modified material, about 0.05 g $Mg^{2+}$/kg dried hydrothermally modified material, about 0.055 g $Mg^{2+}$/kg dried hydrothermally modified material, about 0.06 g $Mg^{2+}$/kg alkali metal ion-releasing material, about 0.065 g $Mg^{2+}$/kg dried hydrothermally modified material, about 0.07 g $Mg^{2+}$/kg dried hydrothermally modified material, about 0.075 g $Mg^{2+}$/kg dried hydrothermally modified material, about 0.08 g $Mg^{2+}$/kg dried hydrothermally modified material, about 0.085 g $Mg^{2+}$/kg dried hydrothermally modified material, about 0.09 g $Mg^{2+}$/kg dried hydrothermally modified material, about 0.095 g $Mg^{2+}$/kg dried hydrothermally modified material, about 0.1 g $Mg^{2+}$/kg dried hydrothermally modified material, including all values and ranges therebetween.

Based on the foregoing, and without wishing to be bound by theory, it is believed that the mineralogy of the hydrothermally modified or dried hydrothermally modified material suits tropical soils. In various embodiments, altered K-feldspar as described herein is a potential nutrient reservoir and contributes positively to soil mechanics. It is believed that hydrogarnet stabilizes effectively Al, whereas α-dicalcium silicate hydrate, 11 Å tobermorite and the amorphous calcium-silicate-hydrate are a source of K, Si, Ca, and alkalinity. With higher alkalinity, a substitute for liming can be available. Tobermorite can act as an ion exchanger especially if isomorphic inclusions such as those confirmed in this study occur (Table 1; ESI-EPMA). Furthermore, Al-substituted tobermorites can show a higher selectivity for Cs, and possibly other heavy metals, which may be particularly useful to remediate contaminated soils. The charge of such mineral phases is envisaged to further benefit soils. At lower pH, soil colloids are positively charged, holding anions such as nitrates and phosphates, whereas at higher pH negative charges hold the cations. The major mineral phases of the dried hydrothermally modified material are expected to have a negative surface charge, unless at extremely low pH. Feldspar itself has a negative surface charge above pH-2. Although such value is influenced by the ionic strength of the soil solution, the altered feldspar fraction alone may aid limiting losses of immediately available $K^+$, contributing to an active sequestration of $Al^{3+}$ and $Fe^{2+/3+}$ as well.

In some embodiments, the dried hydrothermally modified material as described herein possesses the capability to release a first portion of the element(s) (e.g., K, Ca, Mg, Na, Al, and/or Si) relatively quickly (e.g., is readily water soluble and dissolves within minutes or hours of contact with water), while one or more additional portions are released in a relatively delayed and/or continuous fashion over an extended period of time (e.g., is in a less soluble form and releases more slowly, over a period of days to weeks to months). Therefore, in some embodiments, the dried hydrothermally modified materials disclosed herein possess the desirable property of having both relatively fast-release K and relatively slow-release K, as noted above.

In some embodiments, dried hydrothermally modified materials having predominantly relatively slow-release K can be prepared by rinsing dried material with inert-gas purged water. It is believed that such treatment removes the soluble K, leaving behind the potassium capable of delayed and continuous release. In certain embodiments, the rinsed materials release about 1% to about 20% of the potassium available in an unrinsed material. In some embodiments, the rinsed materials release about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20% of the potassium available in an unrinsed material, including all values and ranges therebetween.

In some embodiments, it is believed that the dried hydrothermally modified material possesses an immediately soluble carbonaceous or hydroxide component (e.g., potassium hydroxide) that can, for example, provide crops an immediate source of chlorine-free K. However, it is believed that, in some embodiments, the relatively small relatively extended release portion of K released from the dried hydrothermally modified material is redistributed among several phases, and thus is likely to be available at a slower rate.

In various embodiments, the dried hydrothermally modified material is a fertilizer. In some embodiments, the fertilizer is a $K^+$ fertilizer. In certain embodiments, the fertilizer is a $Ca^{2+}$ fertilizer. In some embodiments, the fertilizer is a $Na^+$ fertilizer. In certain embodiments, the fertilizer is a $Mg^{2+}$ fertilizer. In some embodiments, the fertilizer is a silicon fertilizer. In certain embodiments, the fertilizer is a multi-nutrient fertilizer (e.g., by releasing one or more of the species noted in this paragraph).

It has also been shown in various embodiments of the present disclosure that the cationic element available for release can be exchanged in one or more steps e.g., during drying in step (d) or during step (c). These ion-exchange characteristics can be useful in tailoring the metal ion-releasing material to particular applications including, but not limited to, soil remediation ($Cs^+$ or $Cd^{2+}$) and slow N-release fertilizers ($NH_4^+$). In some embodiments, dried hydrothermally modified materials that are slow release fertilizers can respond to plant signals (e.g., excretion of exudates) resulting in the release of specific nutrients via mineral exchange. In various embodiments, the beneficial and surprising moderate metal ion release is in part due to the aforementioned ion-exchange properties of the dried hydrothermally modified material.

The tunable nature of the process described herein enables the formation of any number of distinct compositions with various ranges of the mineralogical phases described throughout the disclosure, via modification of reaction, processing, and drying conditions.

In various embodiments, the hydrothermally modified or dried hydrothermally modified materials comprise: altered potassium aluminosilicate (e.g., a potassium aluminosilicate in which at least about 5%, about 10%, about 15%, about 20%, about 25%, or about 30% of the potassium originally present in the aluminosilicate lattice of the raw material is replaced with another cation such as $Ca^{2+}$); calcium aluminosilicate; and calcium silicate hydrate; wherein the amount of available potassium in the hydrothermally modified or dried hydrothermally modified material is at least about 10% by weight of the total potassium content of the material, wherein available potassium is the amount of potassium dissolved when the material is subjected to leaching conditions comprising stirring 1 part by weight of the powdered material in 10 parts by weight of $HNO_3$ having an initial pH of 5 for 24 hours. In some embodiments, the amount of available potassium is at least about 1%, at least about 2%, at least about 3%, at least about 4%, at least about 5%, at least about 6%, at least about 7%, at least about 8%, at least about 9%, at least about 10%, at least about 11%, at least about 12%, at least about 13%, at least about 14%, at least about 15%, at least about 16%, at least about 17%, at least about 18%, at least about 19%, or at least about 20% by weight of the total potassium content of the material. In certain embodiments, the hydrothermally modified or dried hydrothermally modified material comprises ultrapotassic syenite having at least about 1-10 wt. % of the potassium of the lattice replaced with calcium. In some embodiments, the hydrothermally modified or dried hydrothermally modified material comprises ultrapotassic syenite having at least about 1%, about 2%, about 3%, about 4%, about 5%, about 6%, about 7%, about 8%, about 9%, or about 10%, including all ranges and values therebetween In some embodiments, dried hydrothermally modified materials are provided that comprise about 45-65% by weight of an altered potassium-feldspar phase, about 1-10 wt. % of a tobermorite phase, about 1-10 wt. % of a hydrogarnet phase, about 1-10 wt. % of a dicalcium silicate hydrate phase, and about 20-40 wt. % of an amorphous phase. In certain embodiments, the dried hydrothermally modified material comprises about 45 wt. % of a K-feldspar phase, about 46 wt. %, about 47 wt. %, about 48 wt. %, about 49 wt. %, about 50 wt. %, about 51 wt. %, about 52 wt. %, about 53 wt. %, about 54 wt. %, about 55 wt. %, about 56 wt. %, about 57 wt. %, about 58 wt. %, about 59 wt. %, about 60 wt. %, about 61 wt. %, about 62 wt. %, about 63 wt. %, about 64 wt. %, about 65 wt. %, including all ranges and values therebetween. In other embodiments, the dried hydrothermally modified material comprises about 1 wt. % of a tobermorite phase, about 2 wt. %, about 3 wt. %, about 4 wt. %, about 5 wt. %, about 6 wt. %, about 7 wt. %, about 8 wt. %, about 9 wt. %, about 10 wt. %, including all ranges and values therebetween. In certain embodiments, the dried hydrothermally modified material comprises about 1 wt. % of a hydrogarnet phase, about 2 wt. %, about 3 wt. %, about 4 wt. %, about 5 wt. %, about 6 wt. %, about 7 wt. %, about 8 wt. %, about 9 wt. %, about 10 wt. %, including all ranges and values therebetween. In some embodiments, the dried hydrothermally modified material comprises about 1 wt. % of a dicalcium silicate hydrate phase, about 2 wt. %, about 3 wt. %, about 4 wt. %, about 5 wt. %, about 6 wt. %, about 7 wt. %, about 8 wt. %, about 9 wt. %, about 10 wt. %, including all ranges and values therebetween. In certain other embodiments, the dried hydrothermally modified material comprises about 20 wt. % of an amorphous phase, about 22 wt. %, about 24 wt. %, about 26 wt. %, about 28 wt. %, about 30 wt. %, about 32 wt. %, about 34 wt. %, about 36 wt. %, about 38 wt. %, about 40 wt. %, including all ranges and values therebetween.

In some embodiments, the hydrothermally modified or dried hydrothermally modified materials disclosed herein further comprises one or more carbonates, e.g., $K_2CO_3$, $Na_2CO_3$, $MgCO_3$, $CaCO_3$, and combinations thereof. In some embodiments, the hydrothermally modified or dried hydrothermally modified materials further comprise potassium carbonates, calcium carbonates, sodium carbonates, and any combinations thereof. In certain embodiments, the hydrothermally modified or dried hydrothermally modified materials further comprise potassium carbonates, calcium carbonates, and combinations thereof. In some embodiments, the combinations of potassium carbonates and calcium carbonates thereof include bütschiilite and/or fairchildite.

In some embodiments, hydrothermally modified or dried hydrothermally modified materials are provided, wherein one or more of the following elements are dissolved when the materials are subjected to said leaching conditions: at least about 1000 ppm Si; at least about 200 ppm Al; at least about 200 ppm Ca, about 5 ppm Na, and at least about 5 ppm Mg. In some embodiments, at least about 50 ppm Si, at least about 100 ppm Si, at least about 150 ppm Si, at least about 200 ppm Si, at least about 250 ppm Si, at least about 300 ppm Si, at least about 350 ppm Si, at least about 400 ppm Si, at least about 450 ppm Si, at least about 500 ppm Si, at least about 550 ppm Si, at least about 600 ppm Si, at least about 650 ppm Si, at least about 700 ppm Si, at least about 750 ppm Si, at least about 800 ppm Si, at least about 850 ppm Si, at least about 900 ppm Si, at least about 950 ppm Si, at least about 1000 ppm Si, at least about 1050 ppm Si, at least about 1100 ppm Si, at least about 1150 ppm Si, at least about 1200 ppm Si, at least about 1250 ppm Si, at least about 1300 ppm Si, at least about 1350 ppm Si, at least about 1400 ppm Si, at least about 1450 ppm Si, at least about 1500 ppm Si, at least about 1550 ppm Si, including all values therebetween, is dissolved when the materials are subjected to said conditions. In various embodiments, at least about 10 ppm Al, at least about 20 ppm Al, at least about 30 ppm Al, at least about 40 ppm Al, at least about 50 ppm Al, at least about 60 ppm Al, at least about 70 ppm Al, at least about 80 ppm Al, at least about 90 ppm Al, at least about 100 ppm Al, at least about 110 ppm Al, at least about 120 ppm Al, at least about 130 ppm Al, at least about 140 ppm Al, at least about 150 ppm Al, at least about 160 ppm Al, at least about 170 ppm Al, at least about 180 ppm Al, at least about 190 ppm Al, at least about 200 ppm Al, at least about 210 ppm Al, at least about 220 ppm Al, at least about 230 ppm Al, at least about 240 ppm Al, at least about 250 ppm Al, at least about 260 ppm Al, at least about 270 ppm Al, at least about 280 ppm Al, at least about 290 ppm Al, or at least about 300 ppm Al, including all values therebetween, is dissolved when the composition materials are subjected to said conditions. In certain embodiments, at least about 10 ppm Ca, at least about 20 ppm Ca, at least about 30 ppm Ca, at least about 40 ppm Ca, at least about 50 ppm Ca, at least about 60 ppm Ca, at least about 70 ppm Ca, at least about 80 ppm Ca, at least about 90 ppm Ca, at least about 100 ppm Ca, at least about 110 ppm Ca, at least about 120 ppm Ca, at least about 130 ppm Ca, at least about 140 ppm Ca, at least about 150 ppm Ca, at least about 160 ppm Ca, at least about 170 ppm Ca, at least about 180 ppm Ca, at least about 190 ppm Ca, at least about 200 ppm Ca, at least about 210 ppm Ca, at least about 220 ppm Ca, at least about 230 ppm Ca, at least about 240 ppm Ca, at least about 250 ppm Ca, at least about 260 ppm Ca, at least about 270 ppm Ca, at least about 280 ppm Ca, at least about 290 ppm Ca, at least about 300 ppm Ca, at least about 310 ppm Ca, at least about 320 ppm Ca, at least about 330 ppm Ca, at least about 340 ppm Ca, at least about 350 ppm Ca, at least about 360 ppm Ca, at least about 370 ppm Ca, at least about 380 ppm Ca, at least about 390 ppm Ca, or at least about 400 ppm Ca, including all values therebetween, is dissolved when the materials are subjected to said conditions. In some embodiments, at least about 0.25 ppm Mg, at least about 0.5 ppm Mg, at least about 0.75 ppm Mg, at least about 1 ppm Mg, at least about 1.25 ppm Mg, at least about 1.5 ppm Mg, at least about 1.75 ppm Mg, at least about 2 ppm Mg, at least about 2.25 ppm Mg, at least about 2.50 ppm Mg, at least about 2.75 ppm Mg, at least about 3 ppm Mg, at least about 3.25 ppm Mg, at least about 3.5 ppm Mg, at least about 3.75 ppm Mg, at least about 4 ppm Mg, at least about 4.25 ppm Mg, at least about 4.50 ppm Mg, at least about 4.75 ppm Mg, at least about 5 ppm Mg, at least about 5.25 ppm Mg, at least about 5.50 ppm Mg, at least about 5.75 ppm Mg, at least about 6 ppm Mg, at least about 6.75 ppm Mg, at least about 7 ppm Mg, at least about 7.25 ppm Mg, at least about 7.5 ppm Mg, at least about 7.75 ppm Mg, or at least about 8 ppm Mg, including all values therebetween, is dissolved when the materials are subjected to said conditions. In some other embodiments, at least about 0.25 ppm Na, at least about 0.5 ppm Na, at least about 0.75 ppm Na, at least about 1 ppm Na, at least about 1.25 ppm Na, at least about 1.5 ppm Na, at least about 1.75 ppm Na, at least about 2 ppm Na, at least about 2.25 ppm Na, at least about 2.50 ppm Na, at least about 2.75 ppm Na, at least about 3 ppm Na, at least about 3.25 ppm Na, at least about 3.5 ppm Na, at least about 3.75 ppm Na, at least about 4 ppm Na, at least about 4.25 ppm Na, at least about 4.50 ppm Na, at least about 4.75 ppm Na, at least about 5 ppm Na, at least about 5.25 ppm Na, at least about 5.50 ppm Na, at least about 5.75 ppm Na, at least about 6 ppm Na, at least about 6.75 ppm Na, at least about 7 ppm Na, at least about 7.25 ppm Na, at least about 7.5 ppm Na, at least about 7.75 ppm Na, or at least about 8 ppm Na, including all values therebetween, is dissolved when the materials are subjected to said conditions.

In various embodiments, the hydrothermally modified or dried hydrothermally modified materials can be useful as (tropical) fertilizers for reasons that include, but are not limited to: i) continuous potassium release to satisfy the needs of crops at different stages of growth, and avoids both sudden saturation of the soil and excessive leaching; ii) high residual effect (e.g., by providing a reservoir of available potassium) which improves plant nutrition over multiple agronomic cycles; iii) the ability to buffer soil pH at optimal levels for a given crop and microbiome; iv) synergistic supplies of micronutrients (e.g., magnesium); vi) supporting and improving soil mechanical strength and porosity; vii) improved cation exchange capacity (CEC); viii) low salinity index; ix) enhancement of Water Holding Capacity (WHC) and carbon storage capacity; x) relatively low cost; xi) minimum hurdle for adoption by farmers; and/or xii) environmentally friendly manufacturing process implementable at industrial scale, and with local resources.

In various embodiments, the hydrothermally modified or dried hydrothermally modified materials may have value in improving the soil pore space. In oxidic soil, both macropores (>75 µm; cannot hold water that is lost by gravity) and micropores (5-30 µm; hold water too strongly due to capillary forces) exist, but there are no intermediate mesopores (30-75 µm), which are those able to store water for long-term release. Therefore, water holding capacity is low. In some embodiments, the volume occupied by mineral particles is in a suitable range to improve mesopores population and reduce infiltration rates (e.g., FIG. 18). This would also reduce (e.g., prevent) dispersion of soil colloids and other fertilizers. In certain embodiments, it has been shown that solidified pastes of fine hydrogarnet and calcium silicate hydrates such as those composing the dried hydrothermally modified material have good flexural strength of 20 mPa. This characteristic could mitigate erosion and promote soil strength, without resulting in too large micro aggregate (>1 mm) that would yield undesired infiltration rates. It is highly unlikely that any potassium salt ($KCl$ or $K_2SO_4$) can be expected to offer similar improvement to soil mechanics.

Figure 38:
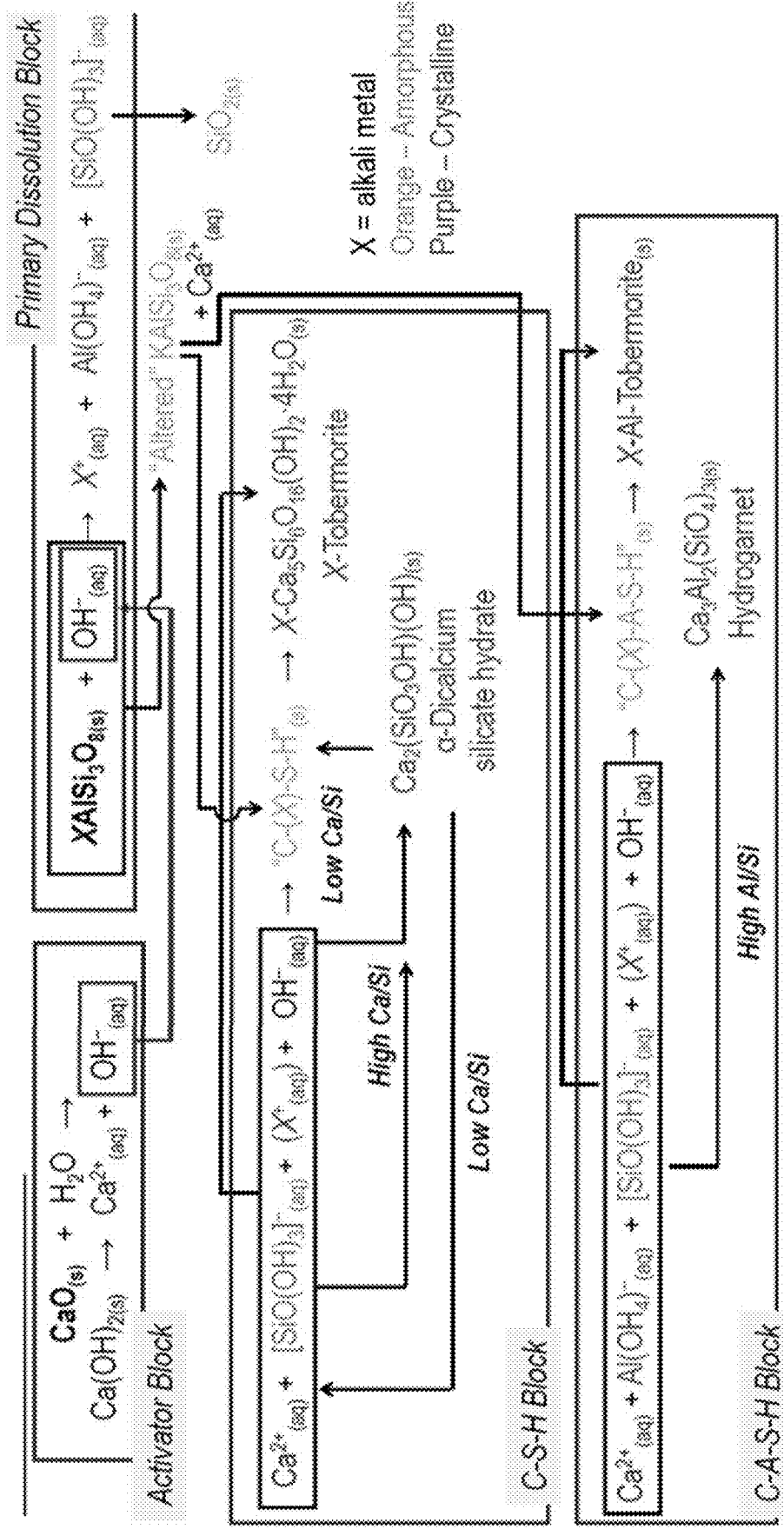

While the characteristics of the dried hydrothermally modified material can make it a high quality tropical soil fertilizer, the ability to tune the properties by modification of various processing parameters enable the production of new materials to be used additionally or alternatively in soil remediation, waterglass applications, geopolymer applications, cement applications, and colloidal silica applications. Without being bound to any particular theory, the utility of these new materials can be better understood by any number of distinct mineralogical compositions, possibly obtained via the reaction pathways of FIG. 38. In some embodiments, the processing parameters can be tuned according to pathways illustrated by the alternative processes shown in FIGS. 33L and 33M. For instance, from the process encompassed by FIG. 33M, a variety of differentiated products can be obtained by passing an alkaline solution through a stationary mineral bed (e.g. K-feldspar), and further processing the resulting dissolution products in separate streams of varying composition.

The analysis of the dried hydrothermally modified material that follows provides new insights on the process described herein, filling a knowledge gap between materials science, processing technology and their application in agriculture. In general, the overall discussion is framed according to the overarching goal of engineering an environmentally friendly chemistry process scalable to industrial outputs that can truly benefit nutrient-poor and scarcely productive soils. It has been unexpectedly recognized that the composition (i.e., mineralogy) and leaching properties of the dried hydrothermally modified material as disclosed herein can be tuned through alterations of the processing conditions. The examples that follow offer support for this finding while emphasizing that the hydrothermally modified or dried hydrothermally modified materials disclosed herein are adaptable to a number of important applications.

EXAMPLES

A flow chart of a general processing route used to prepare dried hydrothermally modified materials is provided in FIG. 3. In the examples below, except where noted, dried hydrothermally modified materials were processed at 200° C. and dried under the specified conditions at 90° C.

Figure 4A:
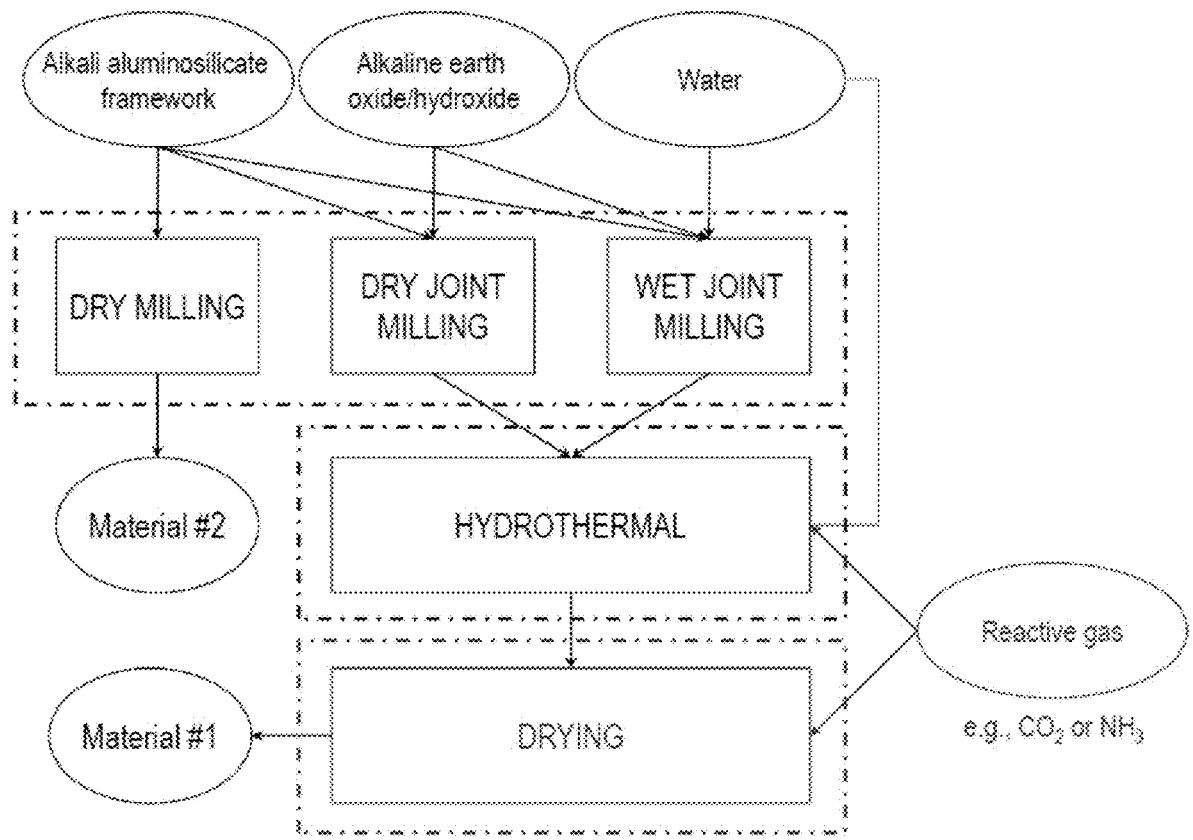
FIG. 4A shows a modified drying stage that uses a reactive gas, according to some embodiments.
Figure 4B:
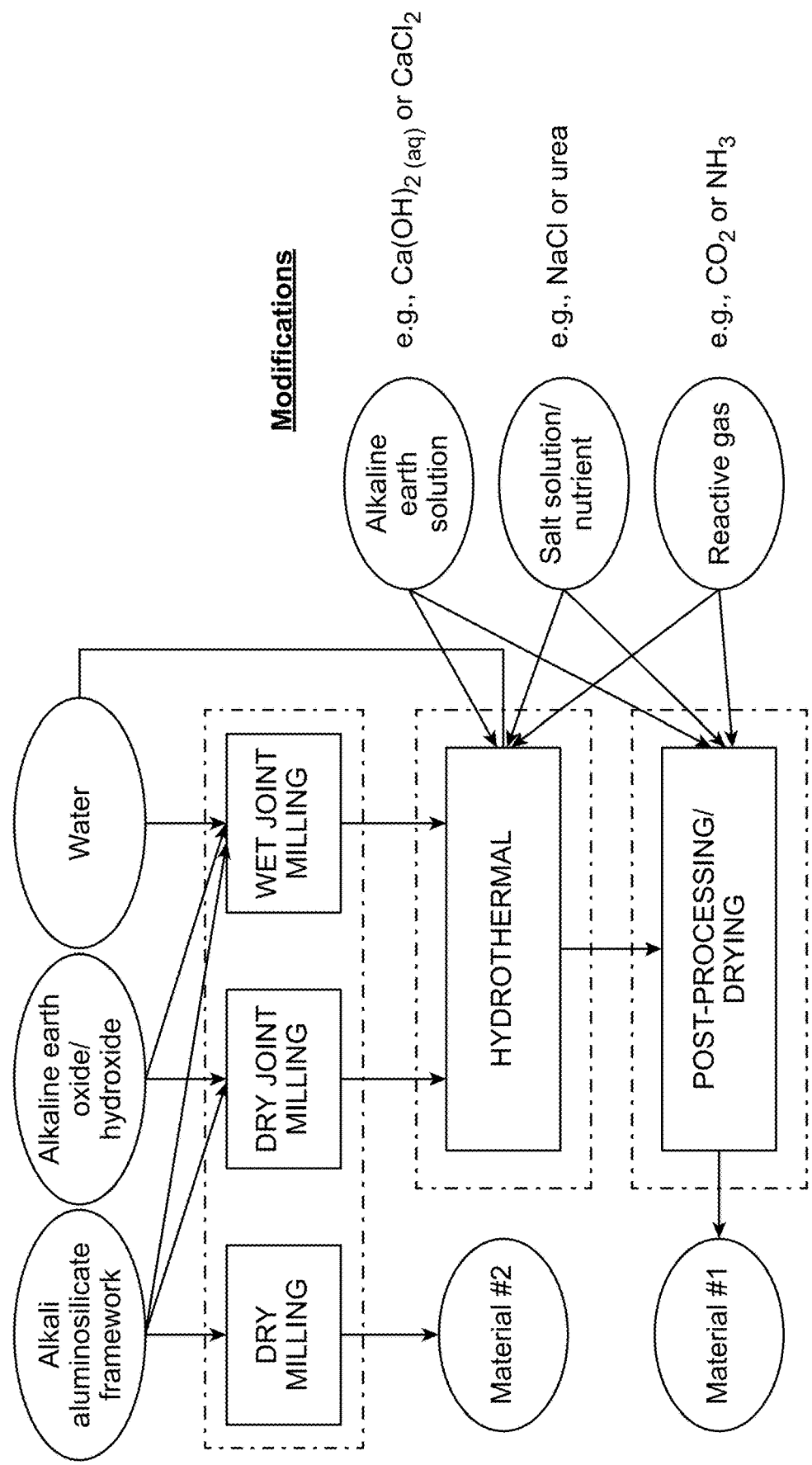
FIG. 4B shows a process where various solutions can be introduced at the hydrothermal stage in addition to post-processing, according to some embodiments.
Figure 4C:
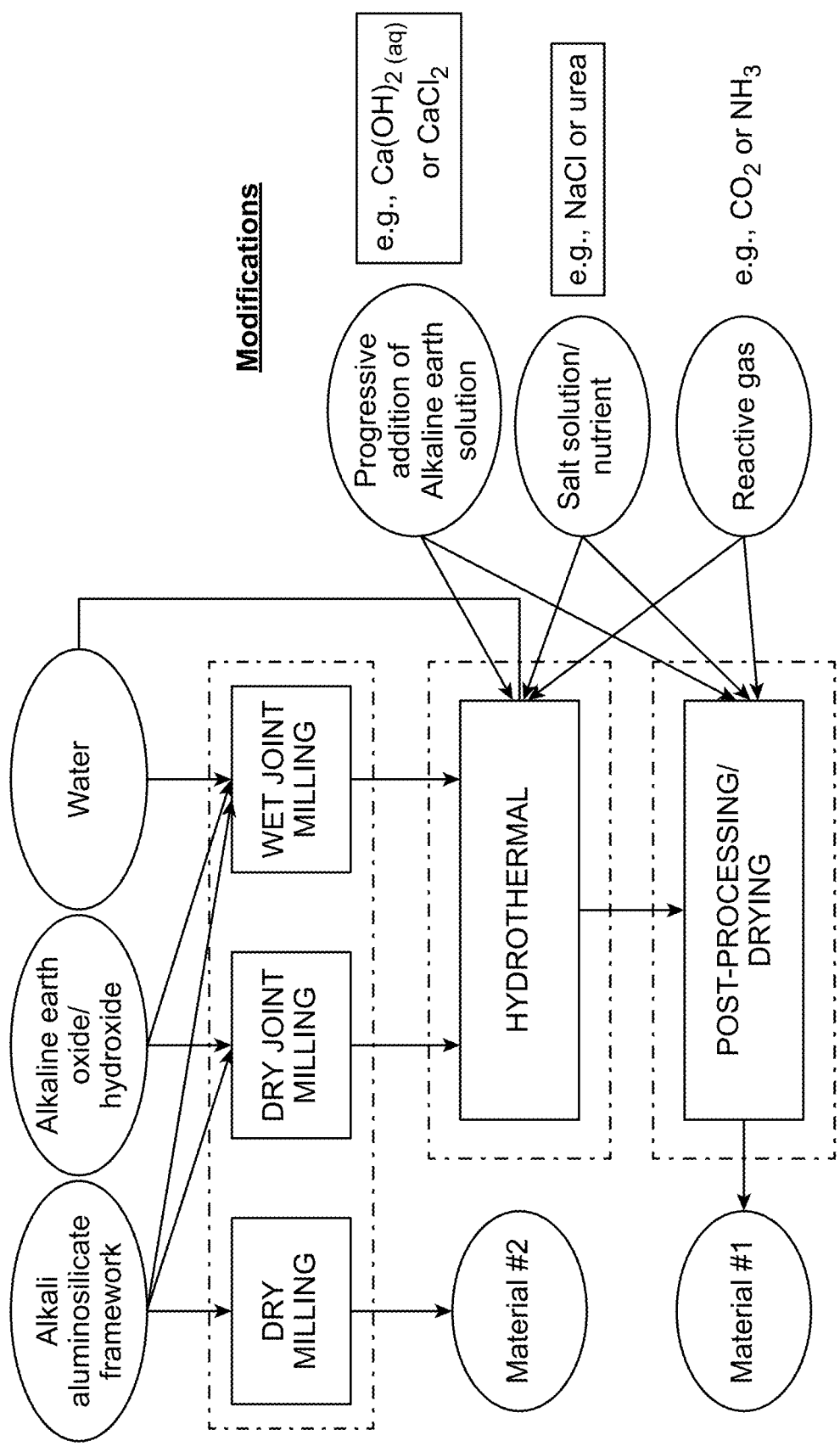
FIG. 4C shows a process with progressive addition of alkaline earth solution at the hydrothermal stage in addition to post-processing, according to some embodiments.

An additional "post-processing" block following the hydrothermal (heating in the presence of water) block, but before or concurrent with drying, and three additional components, which include 1) soluble alkaline solutions; 2) additives or salt solutions; and 3) reactive gases are incorporated in the overall process flow diagram. These modifications affect the 1) ion-exchange capacity; 2) sensitivity to decalcification; and 3) pH dependent leaching and dissolution of the ultimate product. Process parameters such as the relative amount of CaO in the feed mixture and the surface area of the raw material influence these properties (e.g., as demonstrated from leached material) of the dried hydrothermally modified material. The modifications represent methods that enhance the modularity of the dried hydrothermally modified material (FIGS. 4A-C). For example, the particle size reduction step (e.g., "milling") can be carried out under wet or dry conditions. In the hydrothermal processing or drying steps, a solution of an alkaline earth ion (e.g., $Ca^{2+}$) can be added progressively (e.g., to change the $Ca^{2+}$/Si ratio in the hydrothermal processing), or salt or other nutrient solutions can be added.

Example 1: Synthesis and Characterization of the Dried Hydrothermally Modified Material (HT-1)

The ultrapotassic syenite used herein was obtained from the Triunfo batholith, located in Pernambuco State, Brazil.

The K-feldspar content was 94.5 wt. %. The $SiO_2$, $Al_2O_3$ and $K_2O$ content were 62.4 wt. %, 17.0 wt. % and 14.3 wt. %, respectively. Hand-sized field samples were comminuted in a jaw crusher, and sieved to obtain particles with size <2 mm. CaO (reagent grade, Alfa Aesar) was used as received. Due to storage, at the time of the experiments it was hydrated in $Ca(OH)_2$. An XRPD scan showed that the actual composition at the time of the experiments was the following: CaO: 5.5 wt. %; $Ca(OH)_2$: 93.7 wt. %; $CaCO_3$: 0.8 wt. %. According to the manufacturer, the level of impurities in the material received is as follows: 0.005% Cl max; 0.05% $NO_3$ max; 0.1% Fe max; 0.1% $SO_4$ max; insoluble material: 1.5% max is acetic acid and ammonium hydroxide.

Joint Dry Milling

The feed mixture for hydrothermal processing was obtained by milling jointly in dry conditions 21.28 g of ultrapotassic syenite (<2 mm) and 3.72 g of $Ca(OH)_2$, i.e. the hydrated form of the purchased CaO. The nominal Ca/Si molar ratio was 0.23, based on the assumption of both 100% $Ca(OH)_2$ and 0 wt. % Ca in the ultrapotassic syenite. Milling was performed in a 50 mL alumina grinding jar pre-filled with Ar (Airgas, pre-purified grade 4.8). The jar was loaded with stainless-steel balls and evacuated. The ball mill (VQ-N high-energy vibrator ball mill, Across International) was run for 1 min. The milled powder (feed mixture) was subsequently transferred in a plastics container, and temporarily stored under Ar. Processing occurred within 20 min of milling operations.

Water (Ricca Chemical Company®, ACS reagent grade) was boiled and cooled down to room temperature in a stream of bubbling Ar. A stock amount was stored under Ar. Loading of the hydrothermal vessel could not avoid completely the contact of both the feed mixture and water with air.

Hydrothermal Processing and Isolation

Figure 4D:
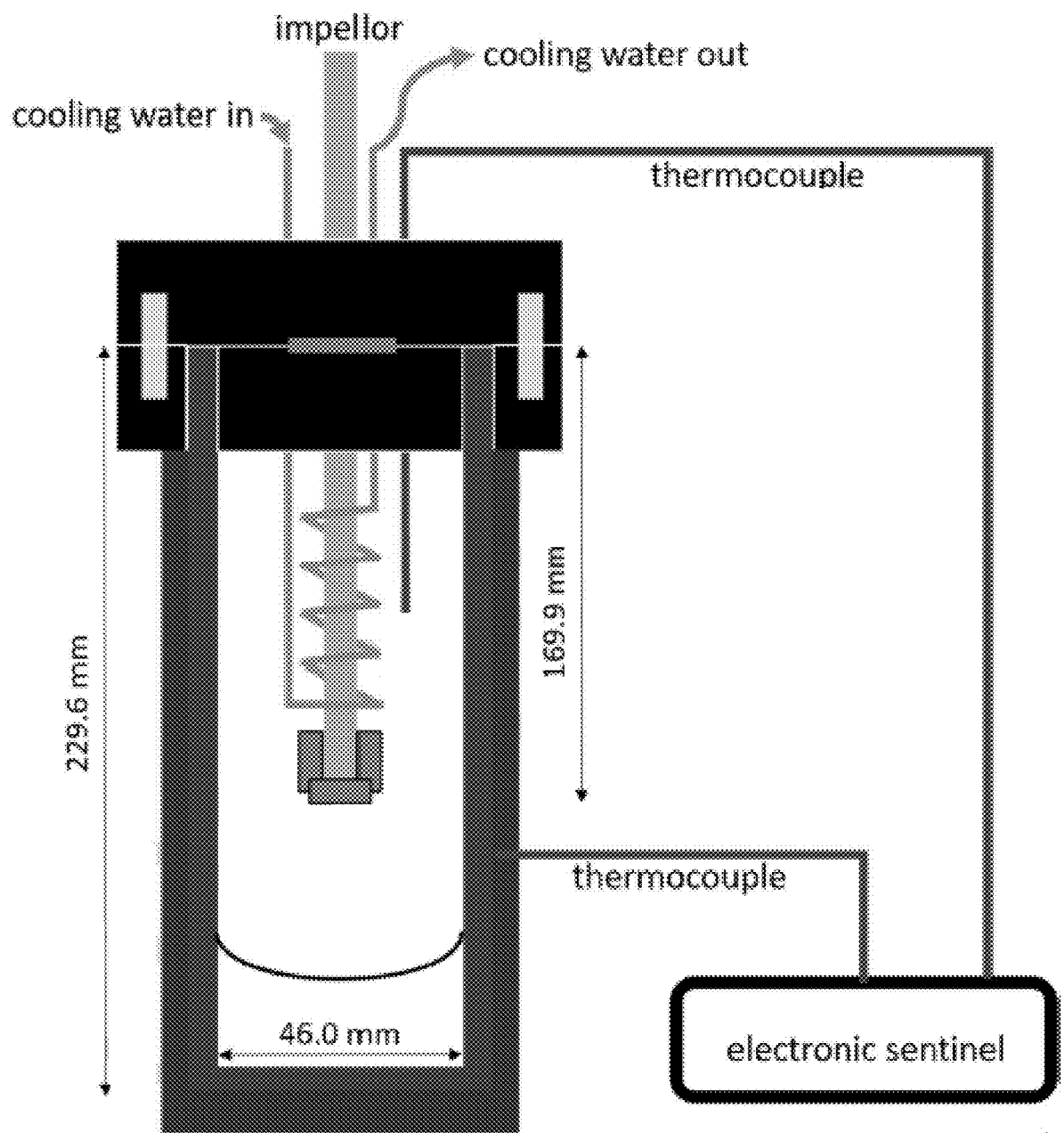
FIG. 4D is a schematic representation of a hydrothermal reactor used in the preparation of dried hydrothermally modified material, according to some embodiments.
Figure 17:
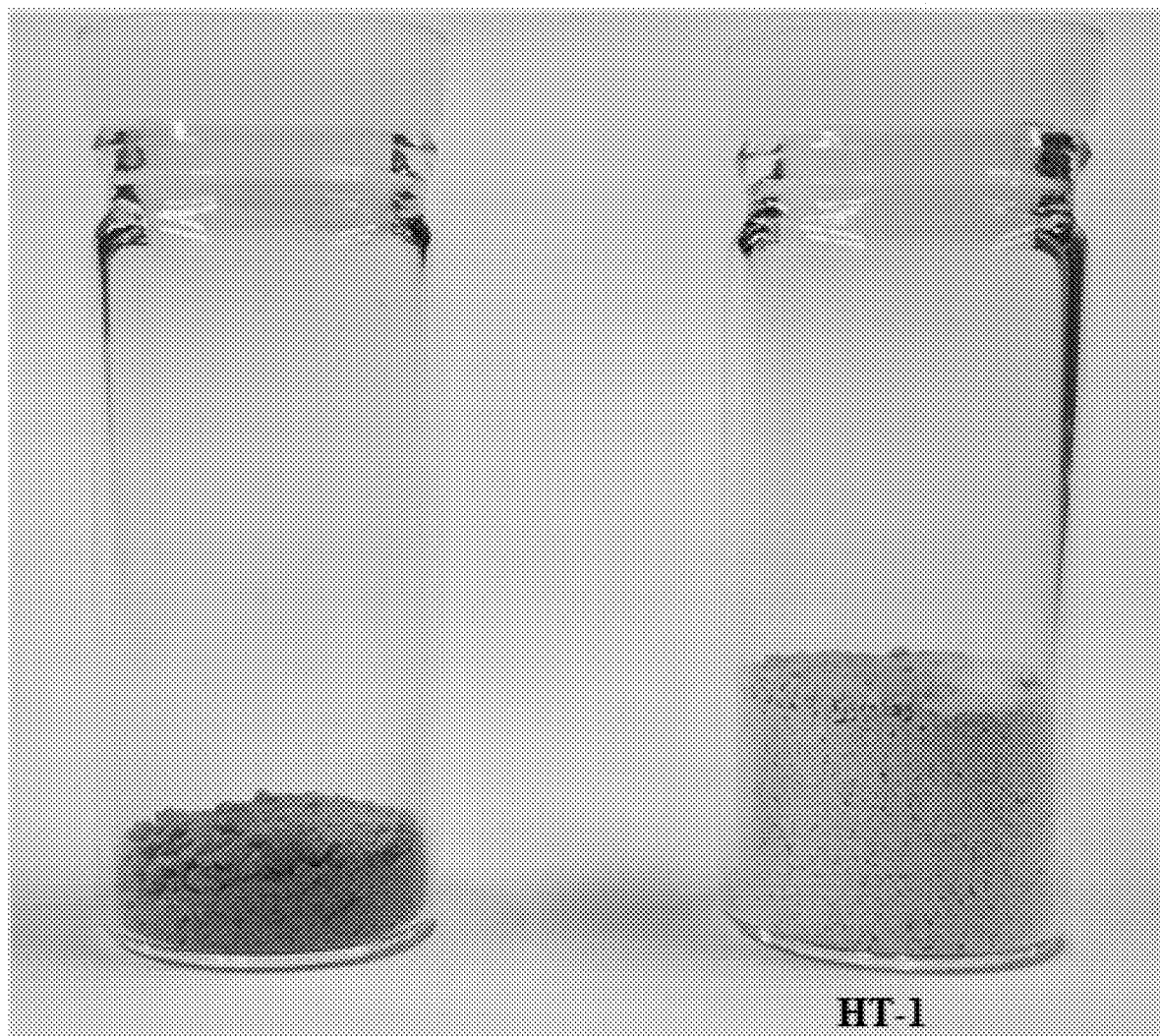
FIG. 17 is a photograph illustrating the physical appearance of ultrapotassic syenite rock powder (left) and a dried hydrothermally modified material, HT-1 (right), according to some embodiments.
Figure 28:
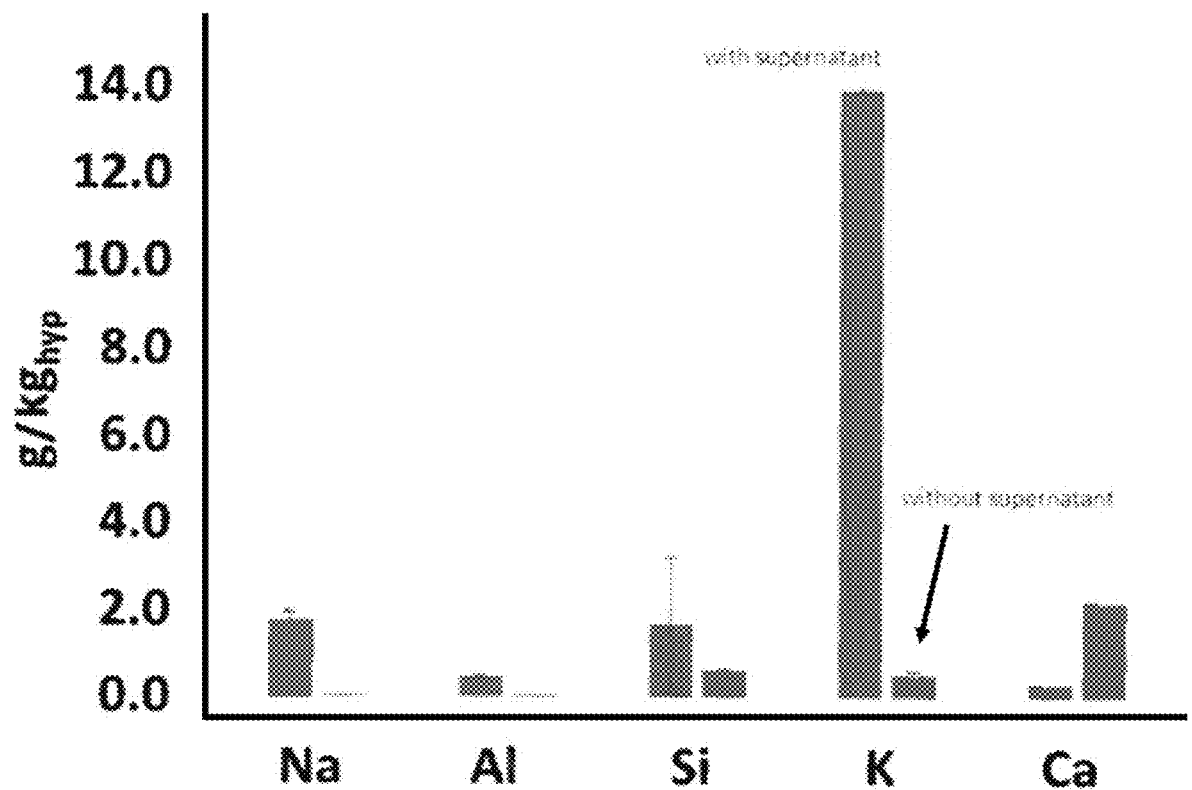
FIG. 28 is a graph showing the concentration (g/kg) of various elements removed from the hydrothermally modified material processed with and without supernatant water, according to some embodiments.
Figure 29:
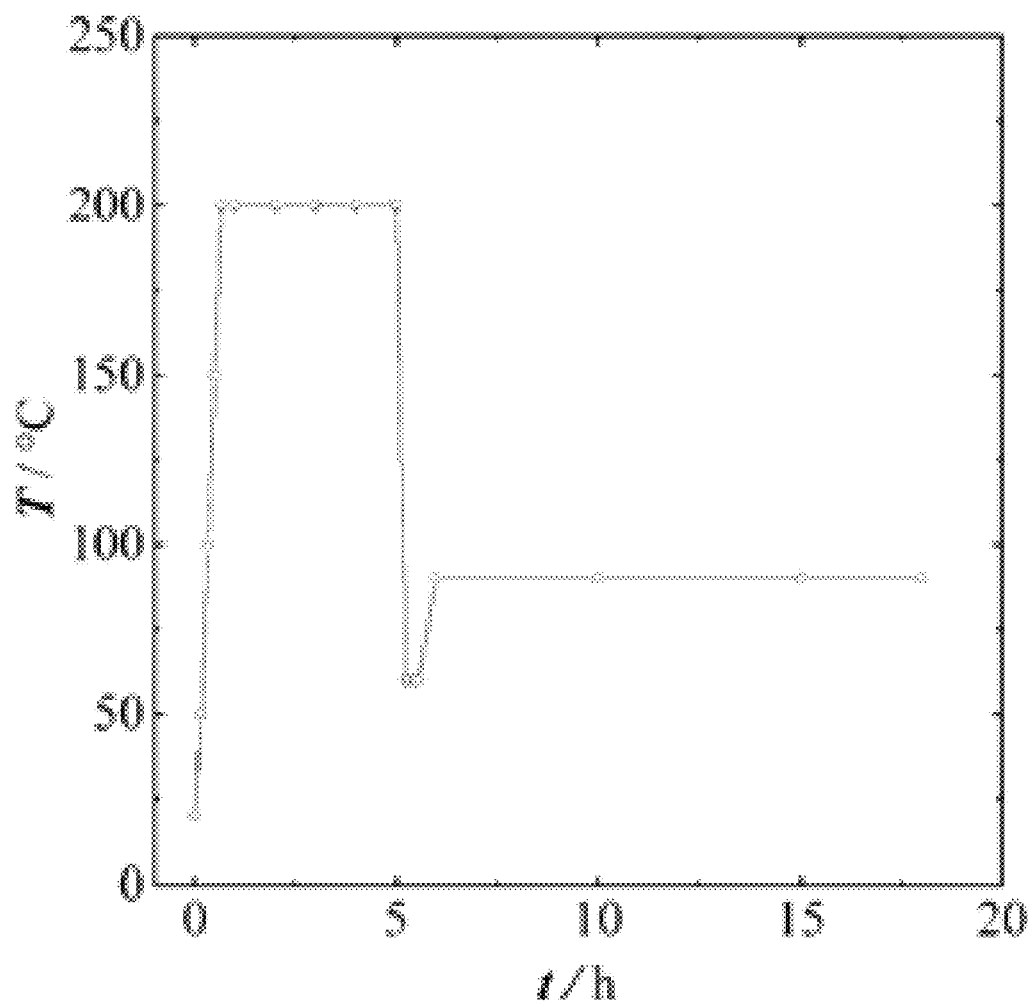
FIG. 29 is a graph of the temperature profile during the hydrothermal processing steps that lead to hydrothermally modified material, according to some embodiments.

A schematic of the hydrothermal reactor used in this study (Parker, EZE-Seal®, 300 mL) is given in FIG. 4D. The reactor was loaded with 25 g of feed mixture and 100 mL of water. The reactor was sealed and the rotation of the impellor set at 400 rpm. The temperature set point of 200° C. was reached in ~40 min, and hold for 5 h. The internal pressure of the reactor was ~14 atm (Table 1). An overall temperature profile for the hydrothermal process is given in FIG. 29. Subsequently, the reactor was cooled down with a water recirculating system, until the internal T reached ~60° C. (~15 min). The reactor was opened quickly, and the slurry (i.e., the mixture of the hydrothermally modified material suspended in the supernatant) transferred quantitatively in a glass beaker (SA~44 $cm^{-2}$). The solid component settled at the bottom of the beaker, and the excess solution (supernatant) separated on top of it. The supernatant, enriched in leachable potassium (FIG. 28) was dried on top of the solid phase overnight (18 h) in a laboratory oven set at 90±5° C. The dried hydrothermally modified material was ground homogeneously in an agate mortar to obtain a powder that was labeled as the HT-1 (FIG. 17). The mass of dried hydrothermally modified material was not measured. However, Loss of Ignition (LOI) experiments at 1000° C. for 1 h (three replicates), showed a loss of 4.4±0.5 wt. %, most likely due to water and/or carbonaceous content. Accordingly, the re-calculated mass of dried hydrothermally modified material was 26.1 g. The long-term storage of the material occurred under Ar.

TABLE 1

Temperature (T) and pressure (P) variation during hydrothermal processing of the feed mixture.

| t (h) | T (° C.) | P (atm) |
|---|---|---|
| 0.0 | 200 | 14.0 |
| 0.1 | 200 | 14.0 |
| 0.3 | 199 | 13.8 |
| 1.0 | 200 | 13.9 |
| 1.2 | 200 | 14.0 |
| 1.7 | 200 | 14.0 |
| 3.0 | 200 | 13.8 |
| 4.0 | 200 | 14.0 |
| 5.0 | 200 | 14.0 |

Determination of the HT-1 Mineralogy

X-Ray Powder Diffraction (XRPD)

Figure 4E:
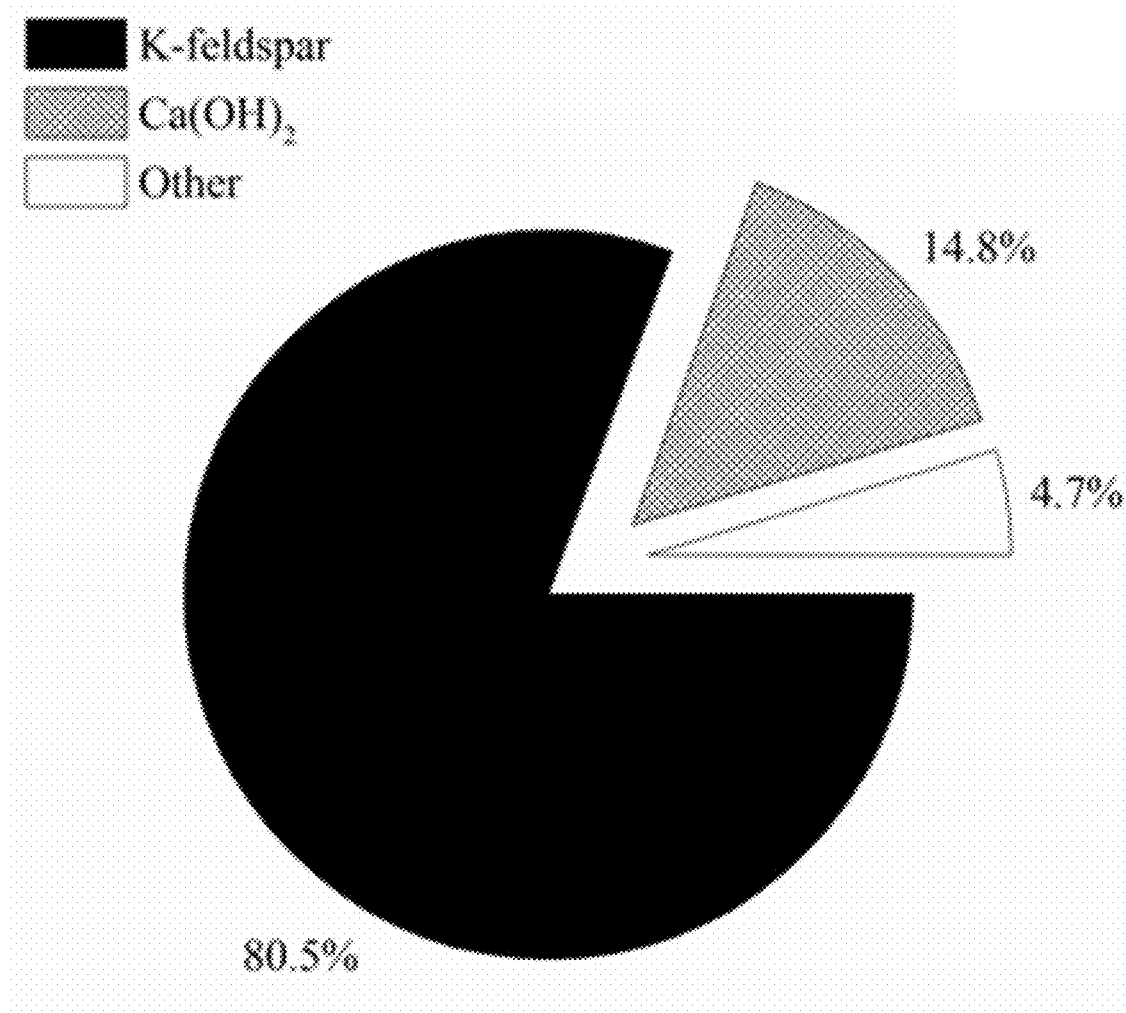
FIG. 4E shows the mineralogical composition of feed mixture calculated from data reported for ultrapotassic syenite MCA41 assuming 100 wt. % $Ca(OH)_2$ as the Ca source, according to some embodiments.
Figure 4F:
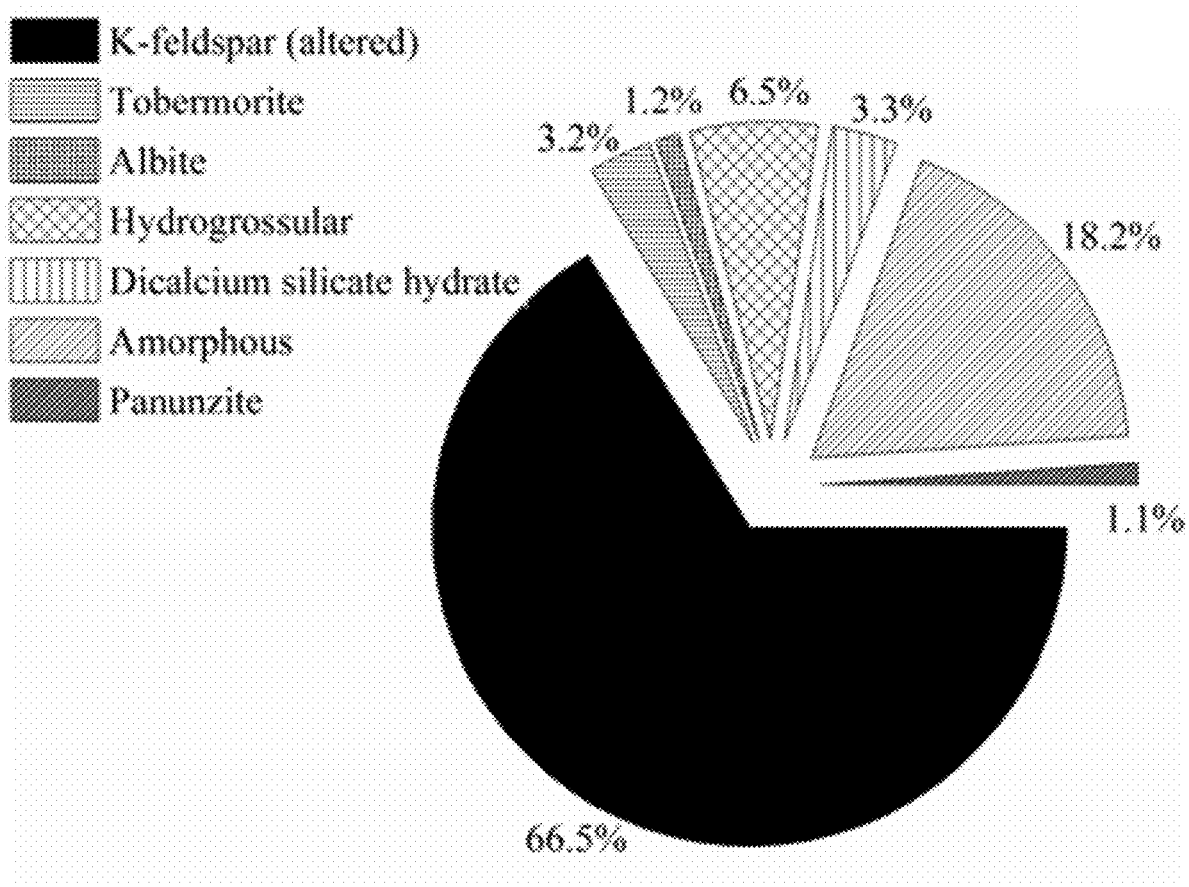
FIG. 4F shows the mineralogical composition of dried hydrothermally modified material, where $K_2O$ was re-calculated to be 11.7 wt. %, according to some embodiments.

FIGS. 4E and 4F describes the mineralogical composition of a feed mixture and a dried hydrothermally modified material, respectively. The mineralogy of the dried hydrothermally modified material in FIGS. 4E and 4F was determined by X-Ray Powder Diffraction (XRPD). The sample was micronized, loaded into a cup and put into a diffractometer (Panalytical X'Pert MPD) that used as X-Ray source the $Cu_{K\alpha}$ radiation at 45 kV and 40 mA. Scans were run in the 2θ range 6°-90°, with a step size of 0.0131° and a counting time of 250 s $step^{-1}$. Once identified, mineral phases were quantified via Rietveld refinement. A few small peaks (1% of the overall diffraction patterns) could not be positively identified and were ignored. An additional 1.1 wt. % was attributed to panunzite, but this phase was not confirmed independently. The amorphous content was determined quantitatively by adding and thoroughly mixing to the sample an equivalent weight fraction of Si powder (NIST SRM 640). A second XRPD scan was run under the same conditions as the initial scan. A new Rietveld refinement was performed, permitting a comparison, adjusted for differences in scattering power, between the integrated intensity of the Si peaks and the integrated intensity of the known crystalline phases determined in the initial analysis. The difference between these values as a portion of the total was assumed to be due to the amorphous content of the sample. The final amount of each crystalline component is the result of the initial Rietveld refinement normalized to take into account the estimated amorphous content.

Figure 12A:
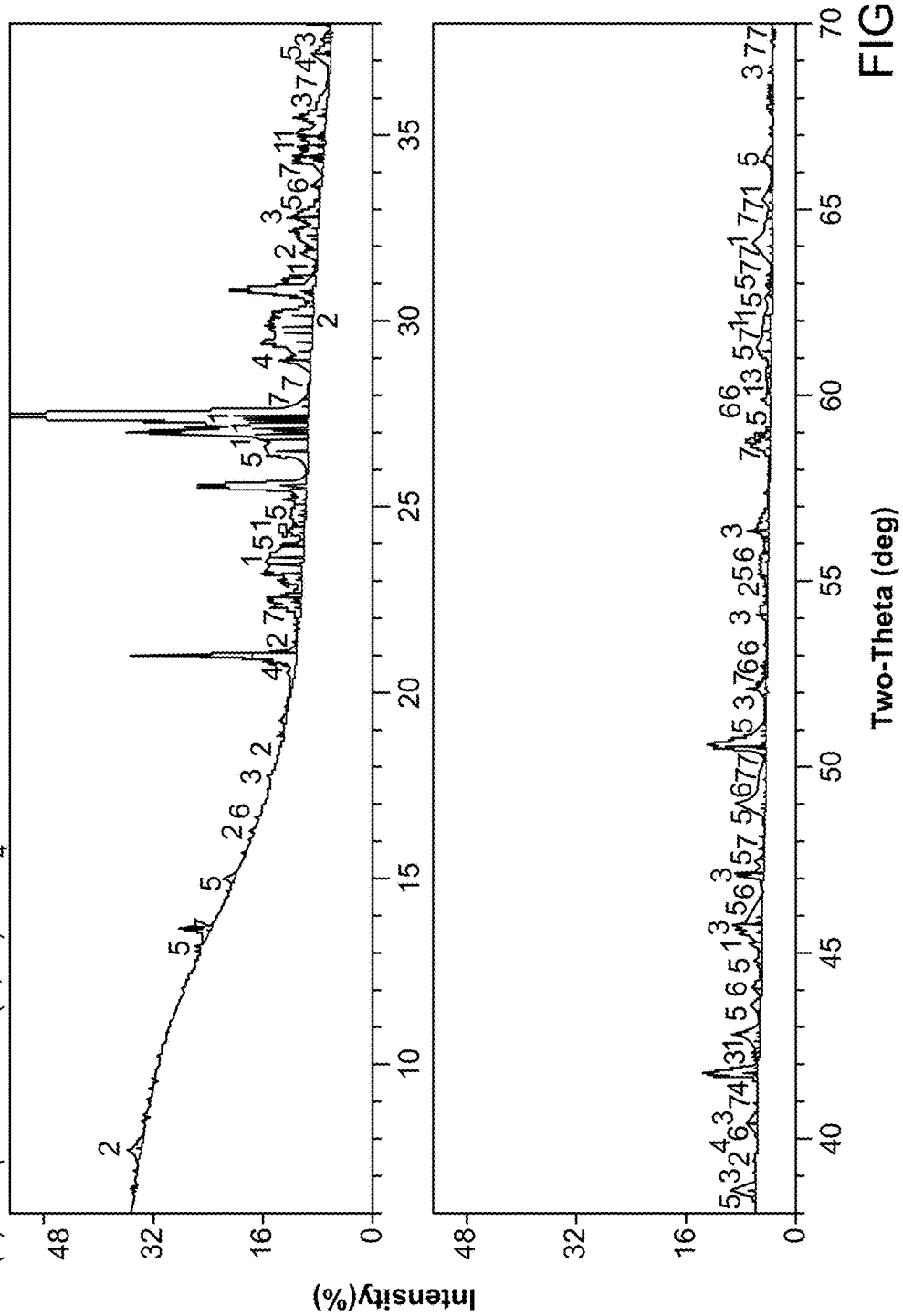
FIG. 12A shows the XRPD pattern of a sample of a dried hydrothermally modified material, according to some embodiments.
Figure 12B:
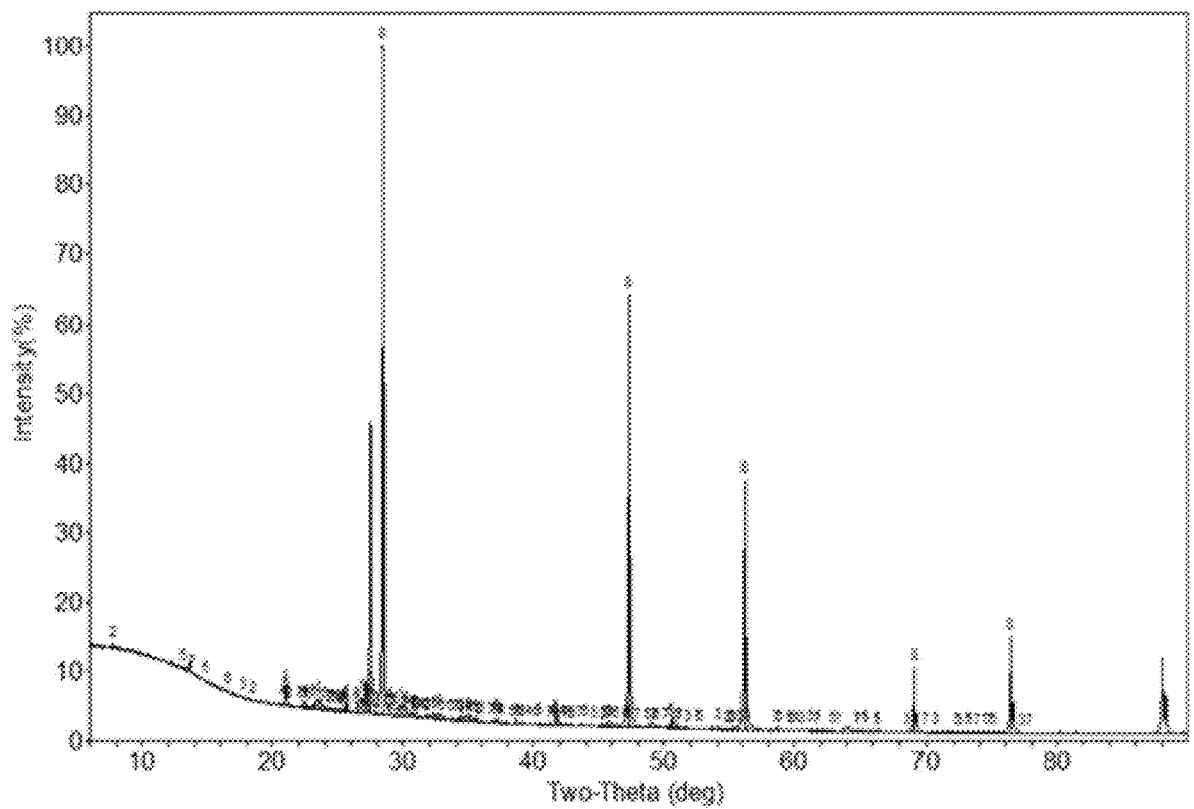
FIG. 12B shows the XRPD pattern of a sample spiked with 50 wt. % of Si (NIST SRM 640) to determine the amorphous component, according to some embodiments.
Figure 13A:
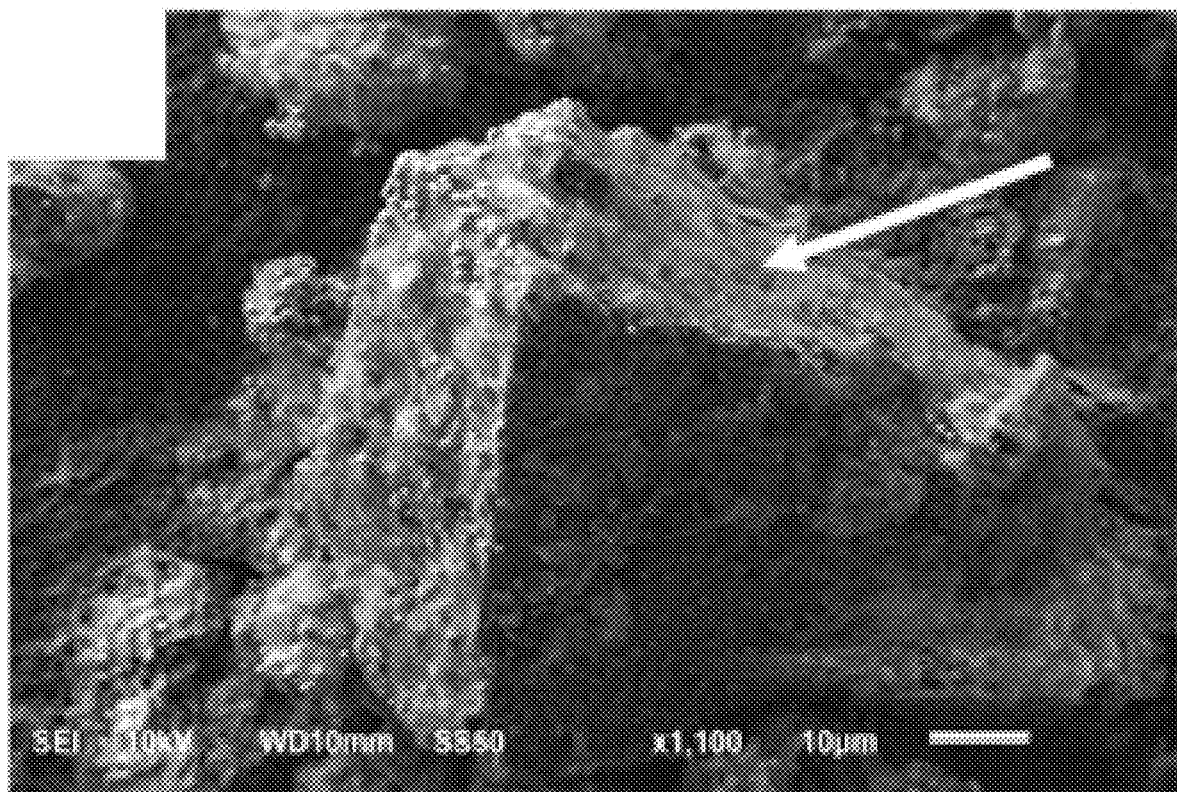
FIG. 13A is an image of an altered K-feldspar, a dried hydrothermally modified material, with round particles of hydrogarnet and fine needles of calcium silicate phases as a moss-like coating (indicated by white arrow), according to some embodiments.
Figure 13B:
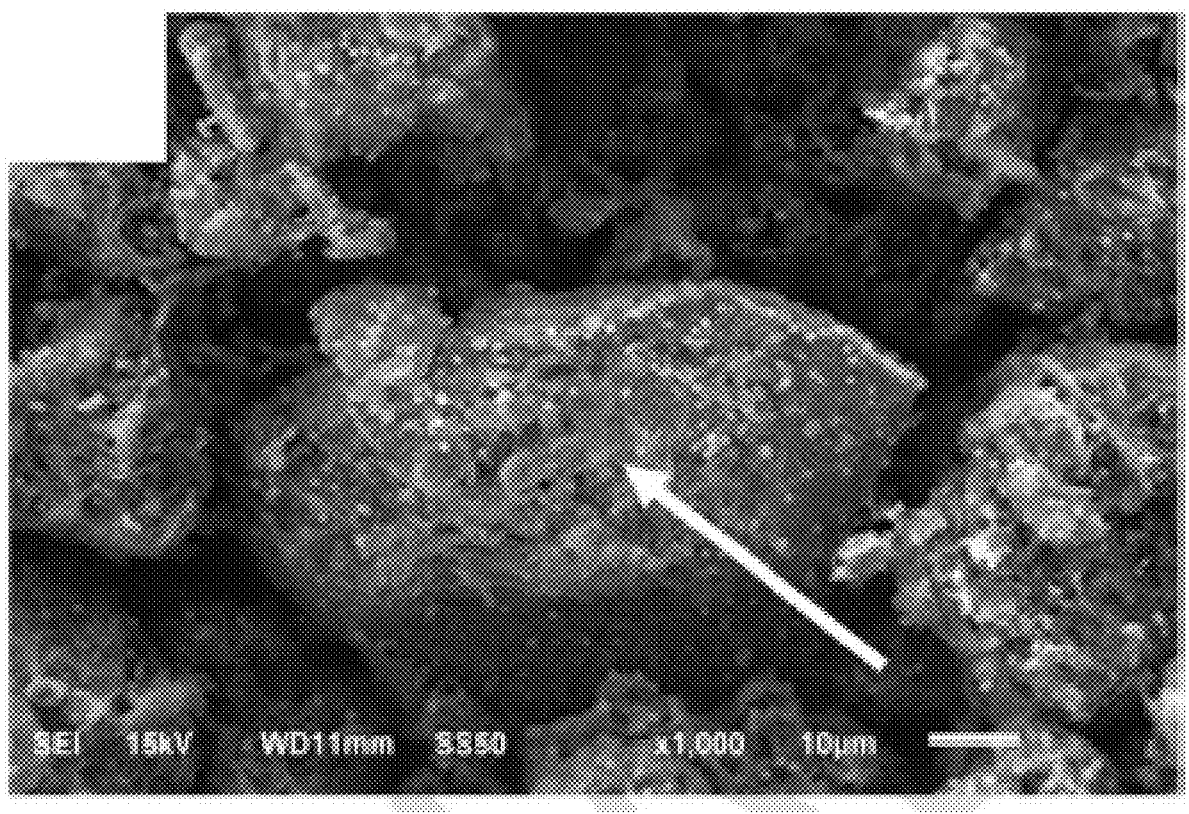
FIG. 13B is an image of the altered K-feldspar shown in FIG. 13A with round particles of hydrogarnet and fine needles of calcium silicate phases as a moss-like coating (indicated by white arrow).
Figure 13C:
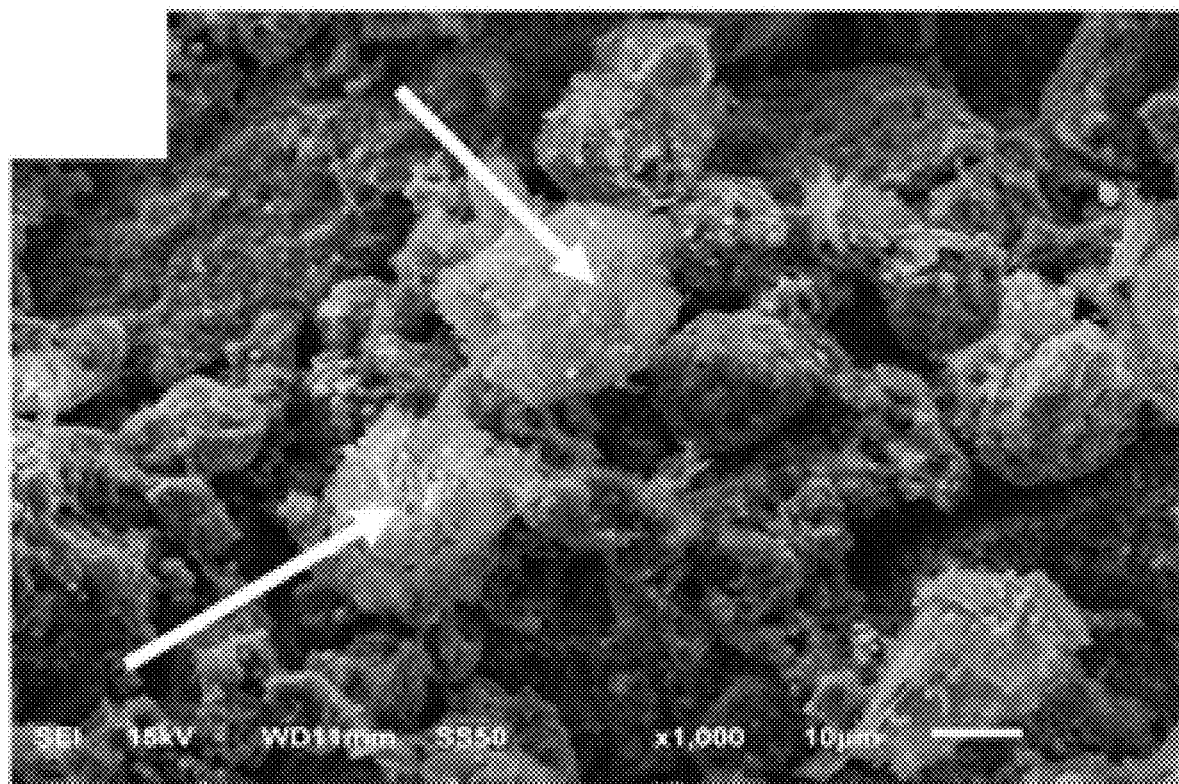
FIG. 13C is an image of the altered K-feldspar shown in FIG. 13A with round agglomerates.
Figure 13D:
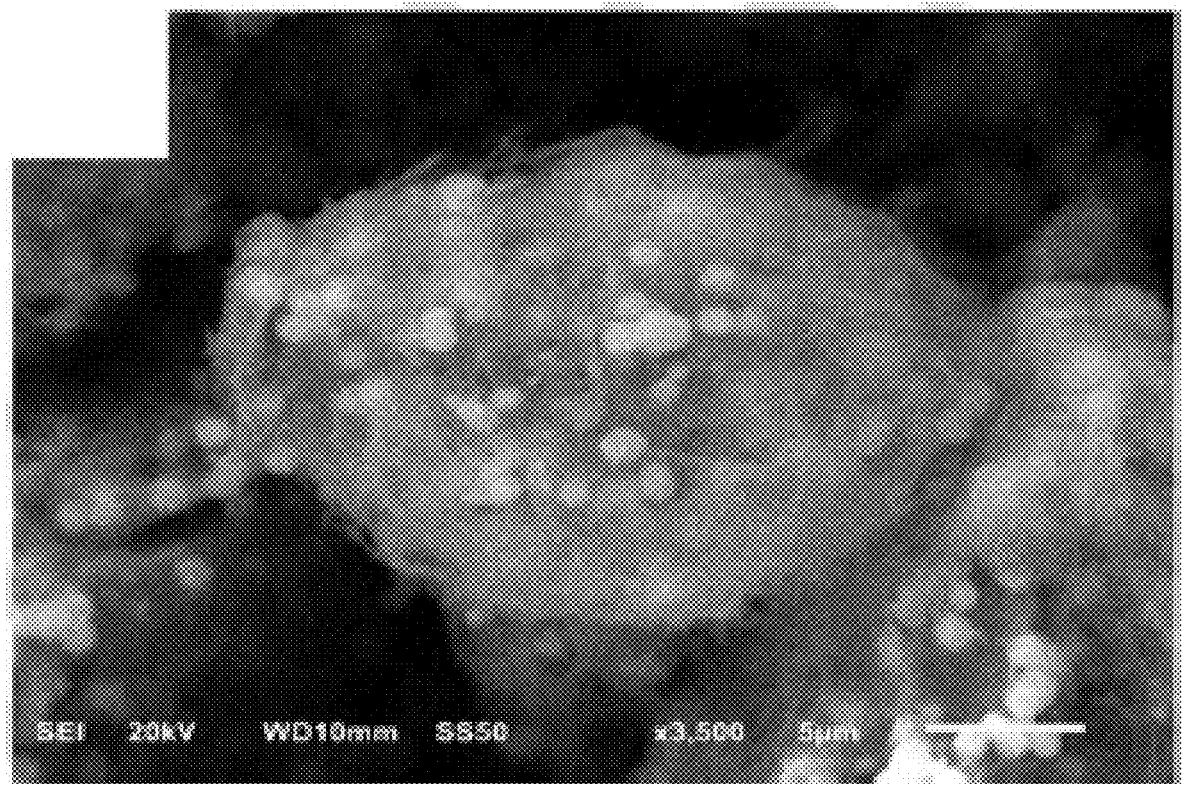
FIG. 13D is a magnified image of the altered K-feldspar shown in FIG. 13C with round agglomerates and round particles of hydrogarnet.

The diffraction pattern of the dried hydrothermally modified material is given in FIGS. 12A and 12B. XRPD analysis detected K-feldspar ($KAlSi_3O_8$) and new mineral phases formed in situ during hydrothermal processing and/or drying, namely hydrogarnet ($Ca_3Al_2(SiO_4)_{3-x}(OH)_{4x}$), α-dicalcium silicate hydrate ($Ca_2SiO_3(OH)_2$), 11 Å tobermorite ($Ca_5Si_6O_{16}(OH)_2·4H_2O$) and amorphous material(s). Some of such mineral phases have been observed previously in literature studies on $CaO-Al_2O_3-SiO_2-H_2O$ hydrothermal systems (Table 2).

TABLE 2

Overview of hydrothermal reactivity of CaO—Al$_2$O$_3$—SiO$_2$—H$_2$O systems.

| | molar ratios | | T | t | solvent | S:L | stirring | phases observed[B] | reference |
|---|---|---|---|---|---|---|---|---|---|
| Reagents | Al/(Si + Al) | Ca/(Si + Al) | ° C. | h | — | Weight ratio[A] | — | — | — |
| Ca(OH)$_2$<br>SiO$_2$ gel<br>γ-Al$_2$O$_3$ (amorphous) | 0.67 | 1.00 | 150 | 6 | water + KOH | 1:10 | n/a | Ca(OH)$_2$<br>hydrogrossular<br>CaCO$_3$ | 46 |
| CaO<br>SiO$_2$ (amorphous)<br>Al$_2$O$_3$ (amorphous) | 0.15 | 0.83 | 150 | 0-190 | water + NaOH | 1:10; 1:5 | N | C-S-H<br>11 Å tobermorite | 47 |
| CaO<br>coal ash<br>Al(OH)$_3$ or Al$_2$O$_3$ (sol) | 0.57 | 0.86 | 100-180 | 15 | water | 1:6 | Y | hydrogrossular<br>11 Å tobermorite<br>CaCO$_3$ | 48 |
| CaO<br>(meta)kaolinite<br>SiO$_2$ (precipitated)<br>Al$_2$O$_3$ | 0.10-0.13 | 6.50-1.00 | 175 | 0.5-24 | water | 2:1 | N | quartz<br>Ca(OH)$_2$<br>C-S-H; α-C$_2$SH<br>11 Å tobermorite<br>CaCO$_3$ | 38 |
| K-feldspar | 0.25 | 0.22 | 190-220 | 20 | water + NaOH<br>water + KOH<br>water + Ca(OH)$_2$ | 1:6 | N | altered K-feldspar<br>hydrogrossular<br>C-S-H; C-A-S-H;<br>α-C$_2$SH<br>tobermorite<br>CaCO$_3$; K$_2$CO$_3$;<br>K$_2$Ca(CO$_3$)$_2$ | 30 |
| Ca(OH)$_2$<br>Ultrapotassic syenite | 0.24 | 0.17 | 200 | 5 | water | 1:4 | Y | altered K-feldspar<br>hydrogrossular<br>C-A-S-H; α-C$_2$SH<br>11 Å tobermorite<br>unidentified<br>carbonates | This study |

K-feldspar is the main mineral component of the ultrapotassic syenite used in the feed mixture. In the dried hydrothermally modified material, residual K-feldspar still detected by XRPD accounted for 66.5 wt. %, indicating a conversion of 17.4 wt. % of the original mineral. Herein, it is demonstrated that after hydrothermal processing the remaining portion of K-feldspar has undergone modifications, i.e. is altered. Hydrogarnet was 6.5 wt. %, and based on molecular formula is possibly the only calcium aluminum silicate hydrate. It was determined as plazolite (x=1.47) in the Rietveld refinement (FIGS. 12A and 12B), but most likely it was a solid solution of phases with variable levels of hydroxyl ions replacement (0<x<3) as shown later with EPMA analysis. α-Dicalcium silicate hydrate and 11 Å tobermorite are 3.3 wt. % and 3.2 wt. %, respectively, and based on molecular formula are calcium silicate hydrate phases. Lastly, an amorphous component corresponding to 18.2 wt. % was also detected in the dried hydrothermally modified material. Further to such main components, 1.2 wt. % of albite and 1.1 wt. % of panunzite were also detected by XRPD.

Determination of the Structure and Chemical Composition of HT-1

The dried hydrothermally modified material mounted in thin sections (27 mm×46 mm, 30 μm thick, two-sided polish 0.5 μm diamond, borosilicate glass, acrylic resin; Spectrum Petrographics Inc.) was observed with a Scanning Electron Microscope (JEOL 6610 LV) operated in high vacuum mode (<10$^{-3}$ Pa). The accelerating voltage was 10-20 kV, the spot size 45-60, and the working distance 9-10 mm. Before observation, sections were carbon coated (Quorum, EMS 150T ES). Over the long term, thin sections were stored under vacuum.

The chemical composition of the dried hydrothermally modified material mounted in thin section was determined with an Electron Probe Micro-Analyzer (EPMA) (JEOL JXA-8200), using an accelerating voltage of 15 kV, beam current of 10 nA and beam diameter of 1 m. The mineral phases were analyzed with counting times of 20-40 s. From counting statistics, 1a standard deviations on concentration values were 0.3-1.0% for major elements and 1.0-5.0% for minor elements. Back-scattered electron (BSE) images and X-Ray elemental maps (4.5 cm×2.7 cm) were obtained using a voltage of 15 kV, a beam current of 1 nA and a resolution of 10 m. The use of such settings as well as operations in stage-rastered mode with a stationary beam avoided signal loss and defocusing of X-Ray. Due to possible damage to the mounting epoxy of the thin sections, EPMA analysis were carried out after SEM imaging. The thin section was accommodated in a custom-made holder, which permitted to locate any particle and analyze it with multiple techniques.

Preliminary SEM observations of the dried hydrothermally modified material were made on the powder as such (FIGS. 13A-13D). Subsequently, it was mounted in thin section, for detailed exploration of morphological features (SEM) and chemical analysis (EPMA). Results (FIGS. 14A-14H, FIGS. 15A-15B, Table 3, ESI-EPMA) confirm XRPD findings, although a high degree of heterogeneity was evidenced.

TABLE 3

Median oxide and elemental (F and Cl) concentration per mineral phase in the dried hydrothermally modified material.

| Mineral Phase | K$_2$O | Al$_2$O$_3$ | SiO$_2$ | Na$_2$O | CaO | MgO | P$_2$O$_5$ | TiO$_2$ | MnO | FeO | SO$_3$ | F | Cl | Total |
|---|---|---|---|---|---|---|---|---|---|---|---|---|---|---|
| Altered K-feldspar (<50 μm) | 13.4 | 17.1 | 59.8 | 0.5 | 0.3 | 0.0 | 0.0 | 0.1 | 0.0 | 0.4 | 0.0 | 0.0 | 0.1 | 92.8 |
| Altered K-feldspar (50 μm < x < 100 μm) | 14.6 | 18.4 | 64.3 | 0.6 | 0.1 | 0.0 | 0.0 | 0.1 | 0.0 | 0.4 | 0.0 | 0.0 | 0.0 | 98.5 |
| Altered K-feldspar (>100 μm) | 15.0 | 18.3 | 64.1 | 0.6 | 0.1 | 0.0 | 0.0 | 0.1 | 0.0 | 0.5 | 0.0 | 0.0 | 0.0 | 98.6 |
| Hydrogrossular | 0.6 | 13.4 | 17.2 | 0.0 | 27.4 | 0.3 | 0.0 | 0.0 | 0.0 | 0.6 | 0.1 | 0.2 | 0.6 | 66.1 |
| Dicalcium silicate hydrate | 1.1 | 1.0 | 12.8 | 0.2 | 20.0 | 0.1 | 0.0 | 0.0 | 0.0 | 0.1 | 0.0 | 0.0 | 0.7 | 40.5 |
| 11 Å Tobermorite | 1.2 | 2.9 | 16.4 | 0.2 | 17.1 | 0.1 | 0.0 | 0.0 | 0.0 | 0.3 | 0.0 | 0.0 | 0.7 | 41.2 |
| Amorphous | 6.7 | 9.9 | 30.2 | 0.3 | 6.1 | 0.0 | 0.0 | 0.0 | 0.0 | 0.2 | 0.0 | 0.1 | 0.8 | 59.9 |

All numbers are wt. %. Data are obtained by EPMA analysis on a large number of observations (ESI-EPMA). Balance to 100 wt. % is likely due to water content.

Figure 14A:
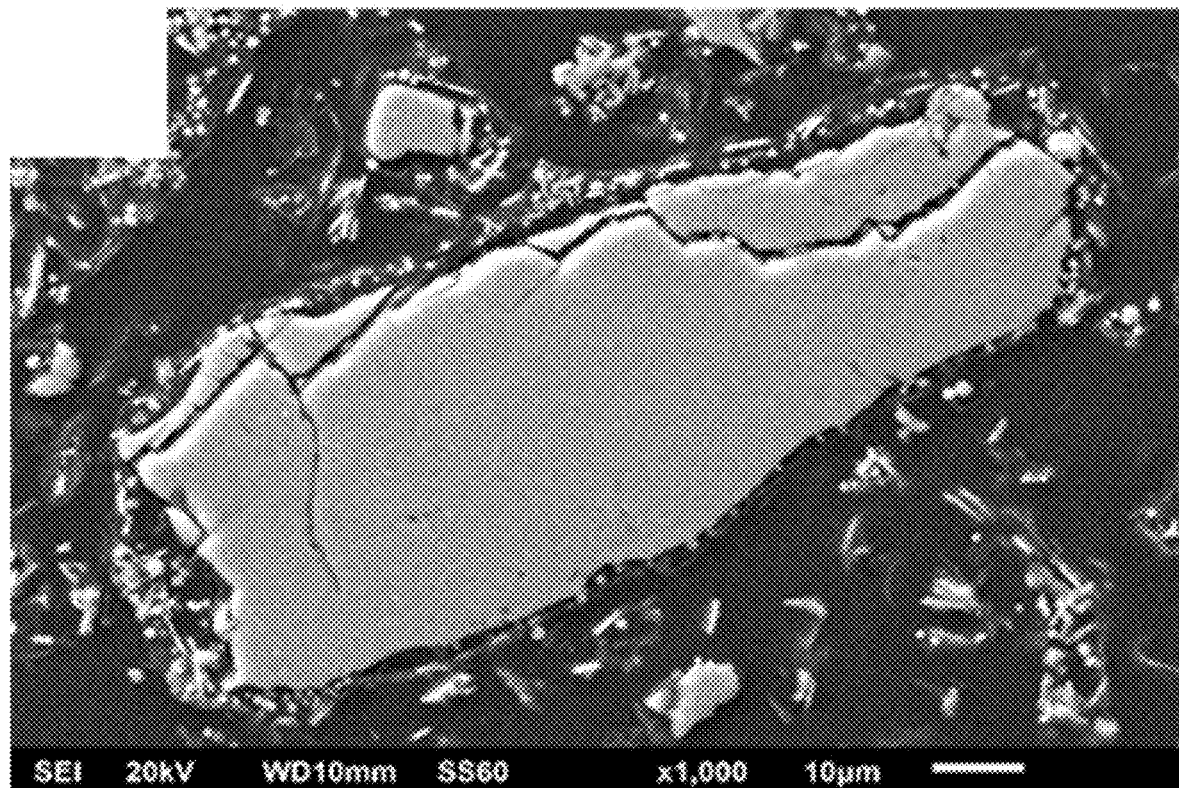
FIG. 14A is an image of a dried hydrothermally modified material mounted in thin section, specifically showing particles of altered K-feldspar, small round particles (hydrogarnet), and elongated crystals (α-dicalcium silicate hydrate and tobermorite), according to some embodiments.
Figure 14B:
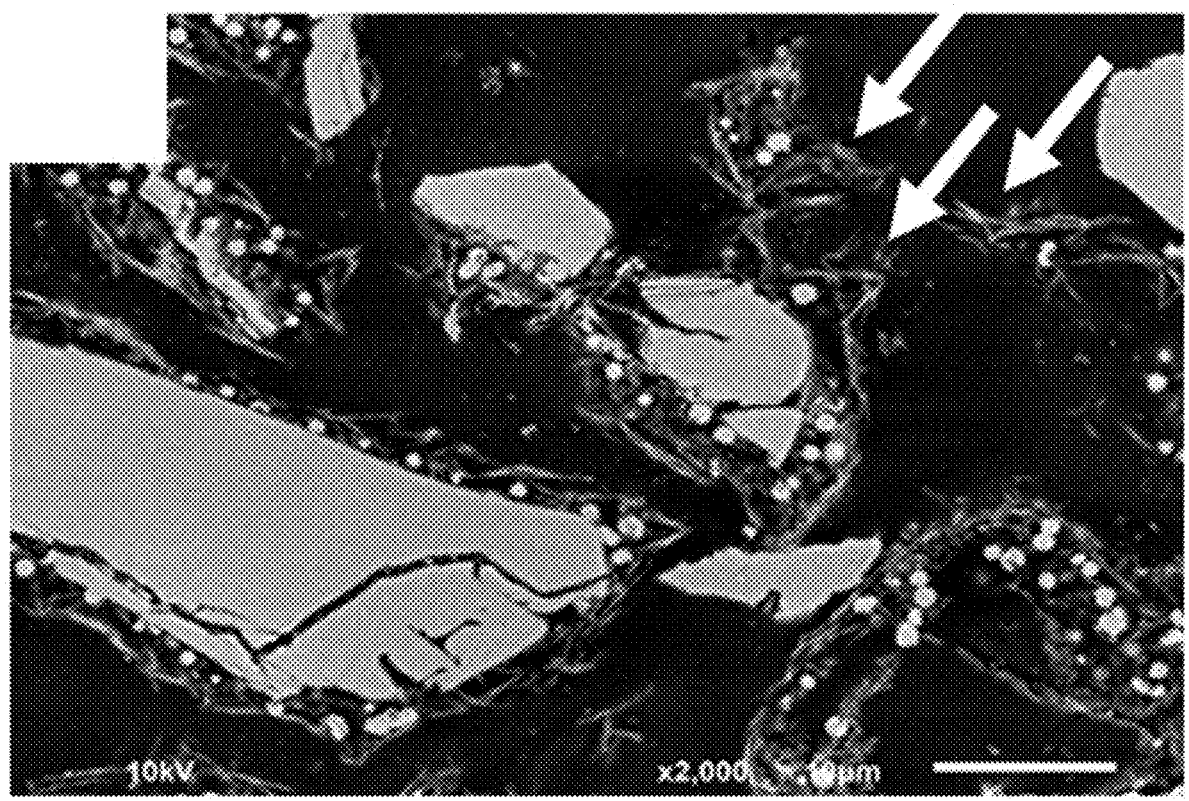
FIG. 14B is an image of the dried hydrothermally modified material shown in FIG. 14A with elongated particles of tobermorite located outside the rim of calcium minerals (indicated by white arrows).
Figure 14C:
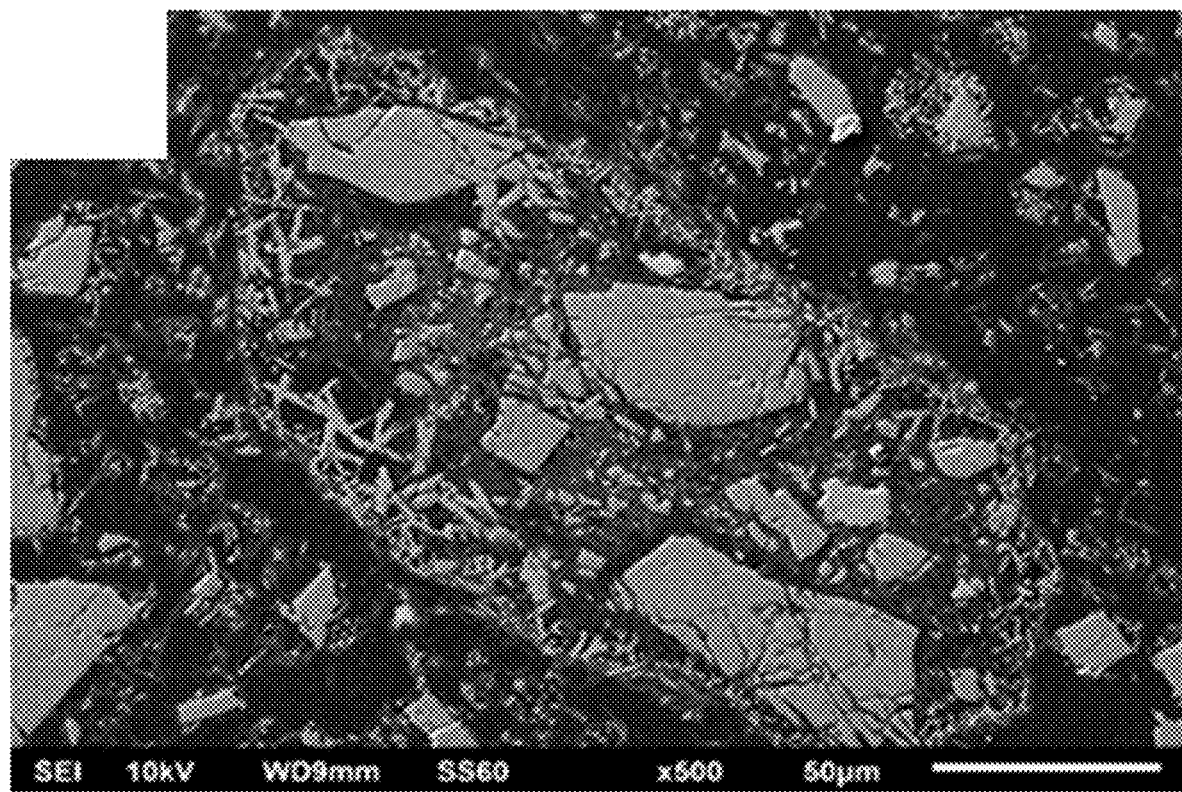
FIG. 14C is an image of heterogeneous clump-like formations from the dried hydrothermally modified material shown in FIG. 14A.
Figure 14D:
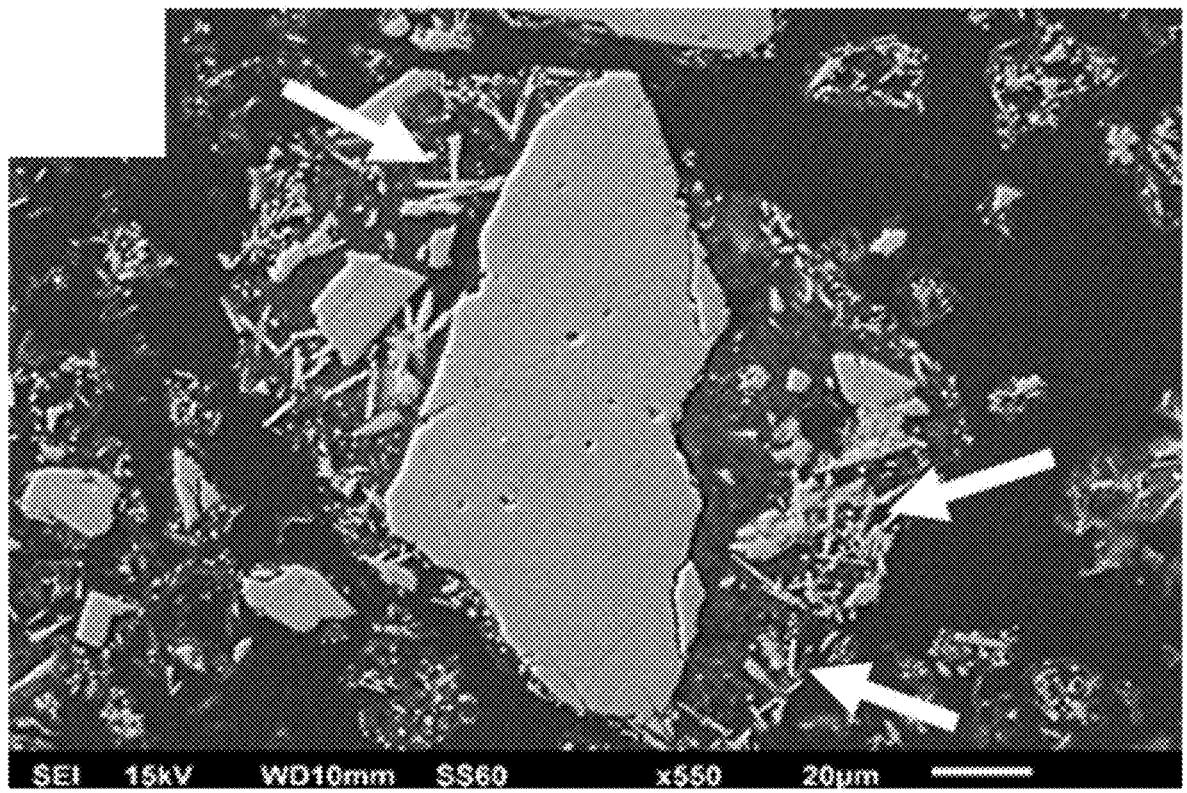
FIG. 14D is an image of heterogeneous clump-like formations with elongated crystals of α-dicalcium silicate hydrate (indicated by white arrows) from the dried hydrothermally modified material shown in FIG. 14A.

In the thin section, K-feldspar crystals could be clearly distinguished (FIGS. 14a-b, FIGS. 15A-15B) and showed clear alterations with respect to the rock powder. Such alterations were evidenced by heterogeneous formations (FIG. 14a-d) and EPMA chemical analysis (FIGS. 16A-16F, Table 3, ESI-EPMA). Chemical composition changed across feldspar size classes (d<50 μm; 50 μm<d<100 μm; d>100 μm), with the smaller crystals being richer in Ca and poorer in K, Si and Al (Table 3, ESI-EPMA). Note that solid-state mechano-activation could replace Ca with both surface and framework K at the milling stage, and such possibility could not be ruled out completely, especially for the smallest grains (FIGS. 16A-16F; ESI-EPMA). However, in the dried hydrothermally modified material, a distinct characteristic was that certain medium sized K-feldspar grains (50 μm<d<100 μm) were unusually enriched in Ca (FIGS. 16A-16F; ESI-EPMA), which was not the case for crystals with equivalent size in the feed mixture. This was an evidence of insertion of Ca atoms in the feldspar framework during hydrothermal processing. Note that such conclusions are not immediately evident from median concentration values (Table 3), highlighting that high degree of compositional heterogeneity. K-feldspar crystals were often surrounded by hydrothermal phases such as hydrogarnet, α-dicalcium silicate hydrate and 11 Å tobermorite (FIG. 14a-d). Cracking and fracturing were additional common features of K-feldspar and there was evidence of pitting (FIG. 14a-b).

Figure 14E:
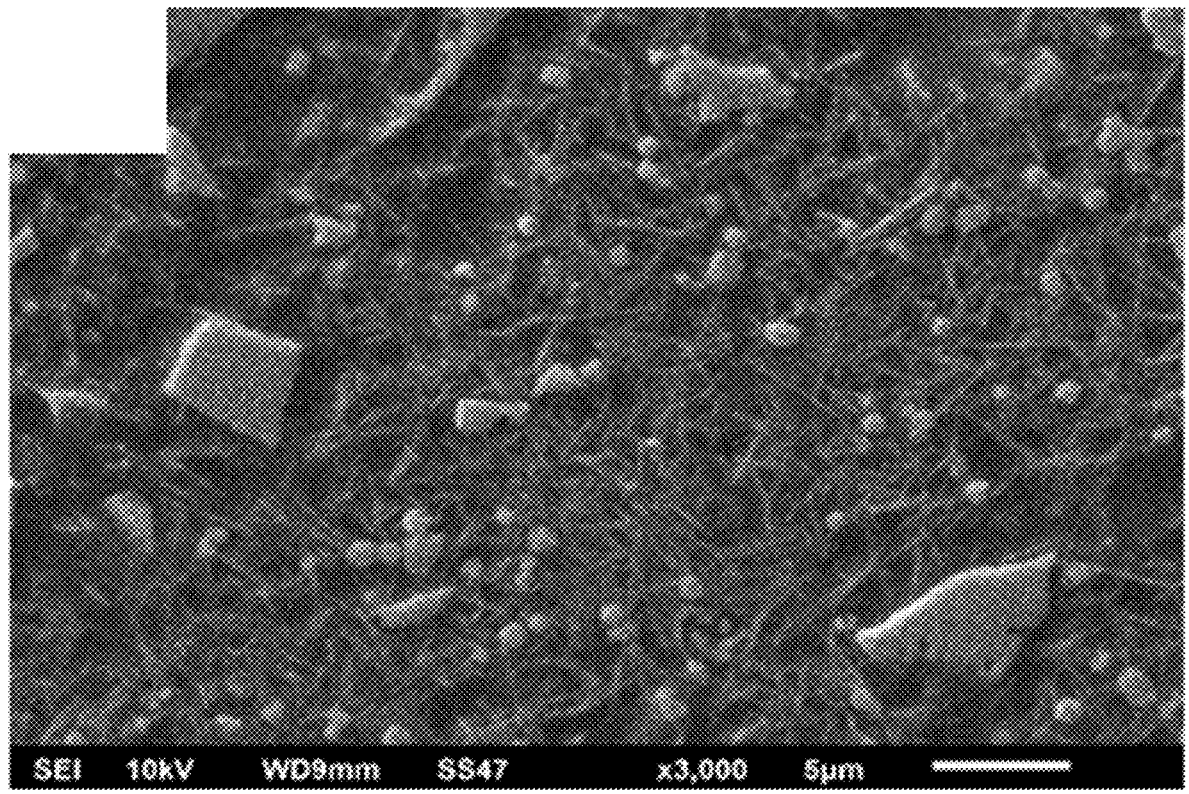
FIG. 14E is an image of elongated and fibrous tobermorite crystals from the dried hydrothermally modified material shown in FIG. 14A.
Figure 14F:
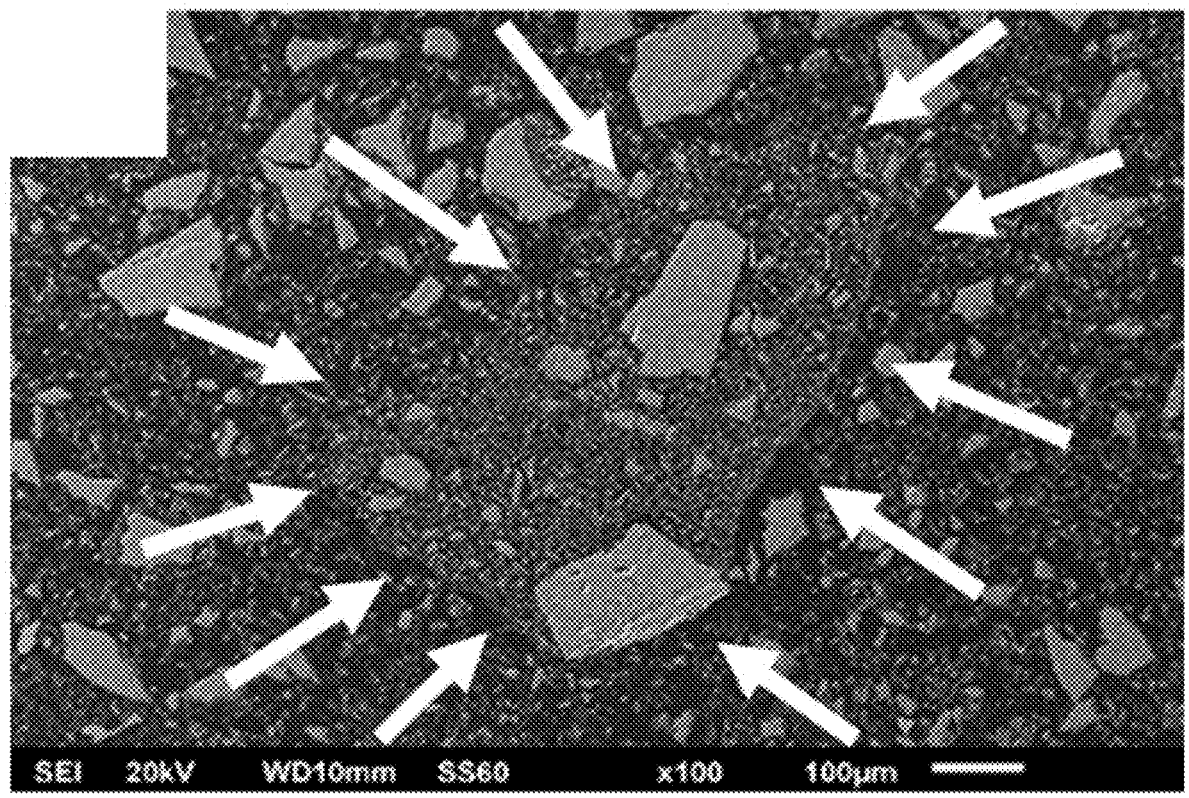
FIG. 14F is an image of a heterogenous clump-like formation (indicated by white arrows) from the dried hydrothermally modified material shown in FIG. 14A.
Figure 14G:
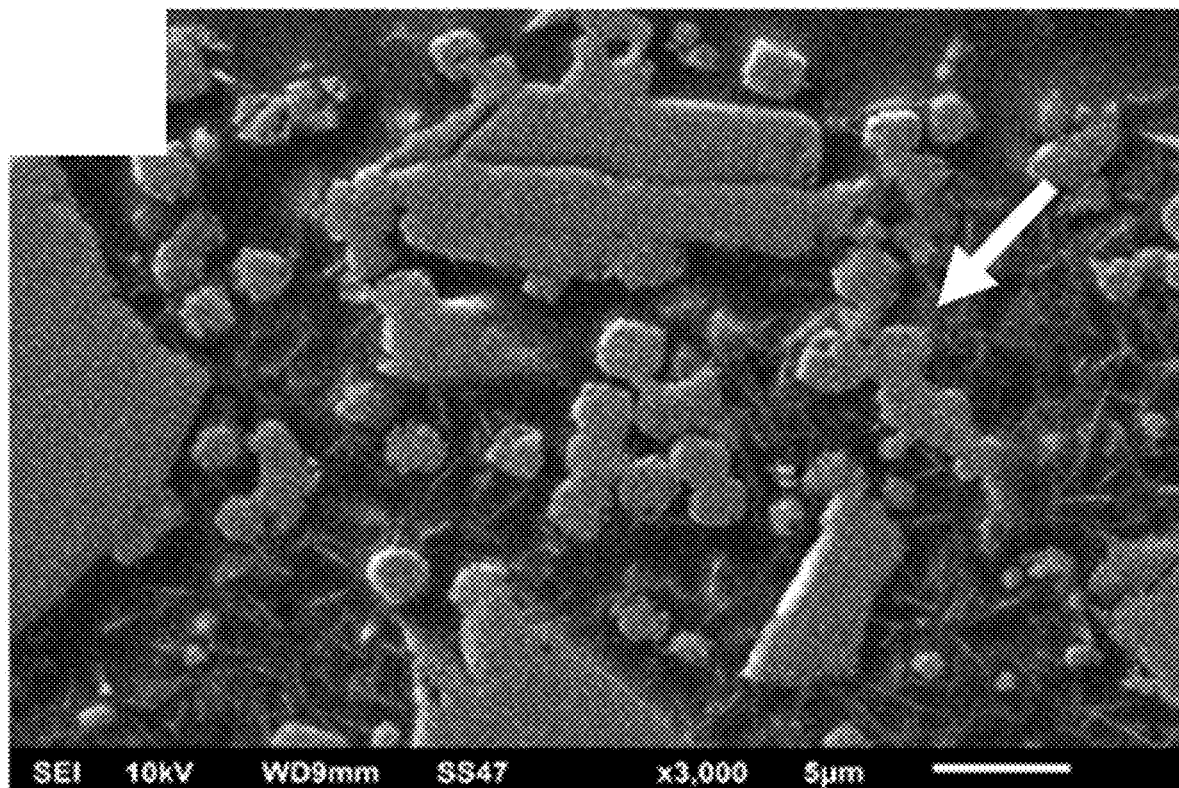
FIG. 14G is an image of round particles of hydrogarnet with crystals intergrown together from the dried hydrothermally modified material shown in FIG. 14A.
Figure 14H:
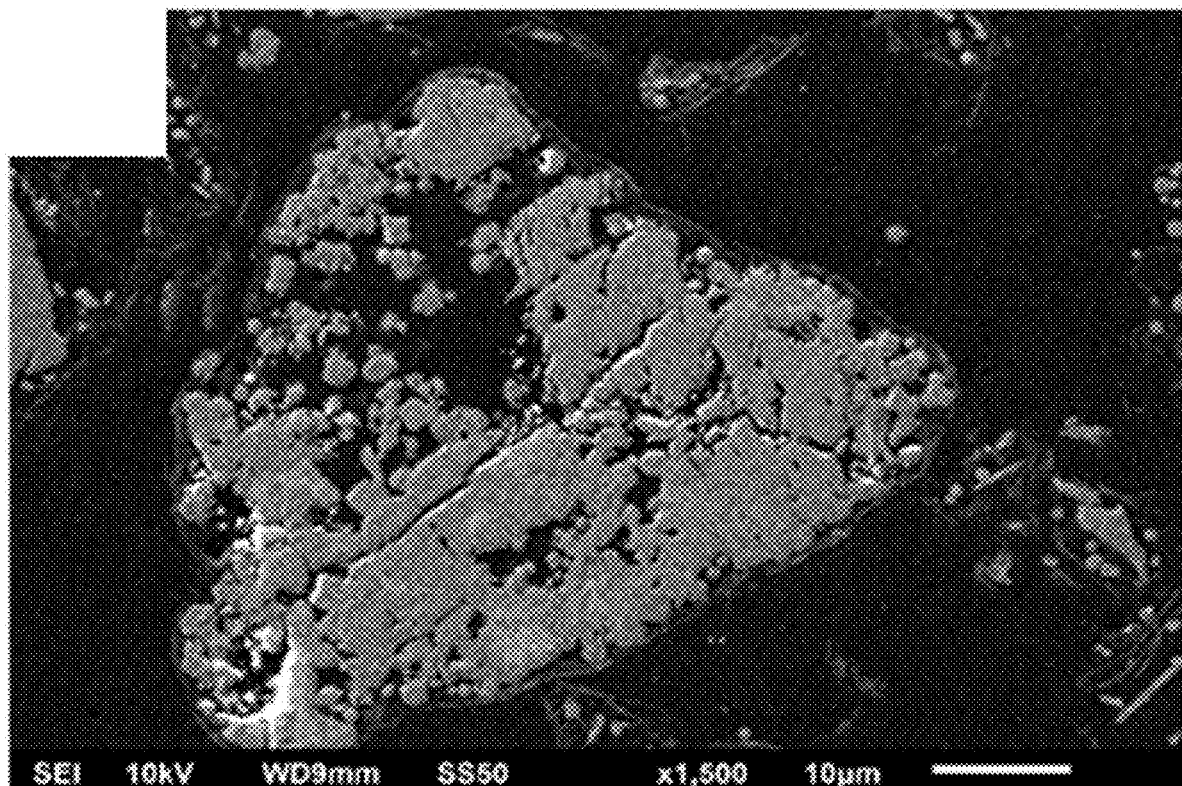
FIG. 14H is an image of a relatively large mass of intergrown hydrogarnet from the dried hydrothermally modified material shown in FIG. 14A.

Hydrogarnet crystals had a predominantly spherical shape ~1 μm in diameter, although some crystals were ~5 μm in diameter (FIG. 14g). Hydrogarnet was found either surrounding K-feldspar or scattered across the material. More rarely, it occurred as larger masses aggregates up to ~30 μm and with a colloidal appearance (FIG. 14h; FIGS. 16A-16F). It was difficult to distinguish 11 Å tobermorite from α-dicalcium silicate hydrate based only on morphology and textural characteristics. Tobermorite occurred in two main forms: i) as numerous individual crystals, more developed, up to 20 μm long and 1 μm wide (FIG. 14b) or ii) as an aggregate within clump-like formations and clusters with each composing crystal again <1 μm (FIG. 14c-f). In both occurrences, tobermorite had a fibrous texture, appearing commonly as fine needles. The texture of α-dicalcium silicate hydrate was similar to the first type of tobermorite occurrence, but it was more developed and well-formed. Additionally, a distinction between the two minerals was that for tobermorite some point analysis showed a K-enrichment as high as 5.3 wt. %, and for α-dicalcium silicate hydrate the total oxide content tended to be lower (ESI-EPMA).

An additional morphological feature of the dried hydrothermally modified material was given by some large structures in the order of 2 mm. Such structures are referred to as clusters (FIG. 14f). They were often round, and richer in Ca- and K-substituted alumino silicate hydrates than the rest of the dried hydrothermally modified material. Occasionally, they exhibited outer rims enriched in α-dicalcium silicate hydrate and tobermorite. It is likely that such formations are due to the binding nature of calcium silicate hydrates. Indeed, C$_2$S phases are often observed as agglomerated phenocryst in concrete. A rigorous quantitation of the density of the dried hydrothermally modified material was not performed. However, visual observations of the clusters (FIG. 14f) show a high fraction of empty space, and suggest low density for such formations. This may explain, at least partially, the macroscopic appearance of the dried hydrothermally modified material when compared with that of the rock powders (FIG. 17).

Figure 18:
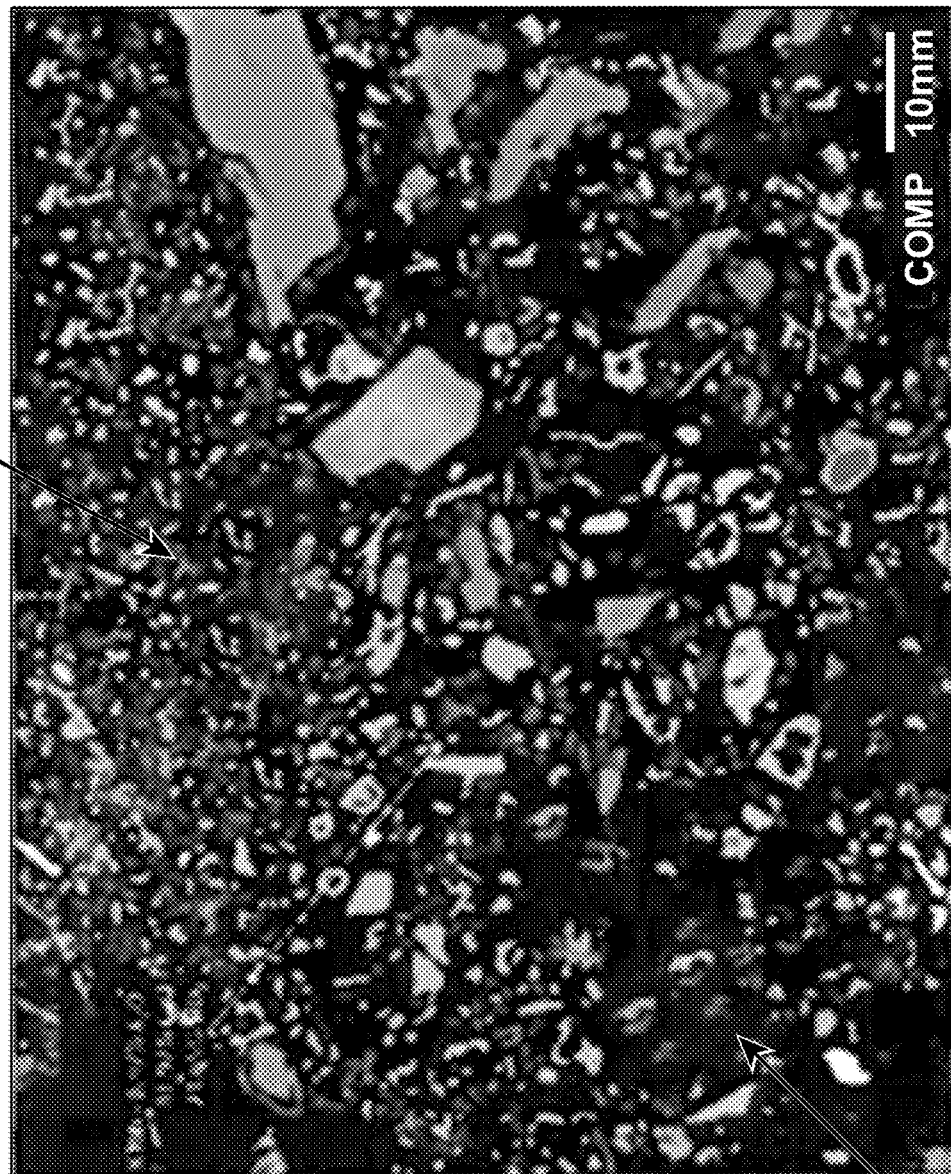
FIG. 18 is an electron microprobe view of zeolites that formed in a dried hydrothermally modified material, according to some embodiments.

Electron microprobe analysis also reveals small amounts of zeolites that are present in the dried hydrothermally modified material (FIG. 18). Formation was found to occur at all hydrothermal processing times, but only at a temperature above 220° C.

Figure 19A:
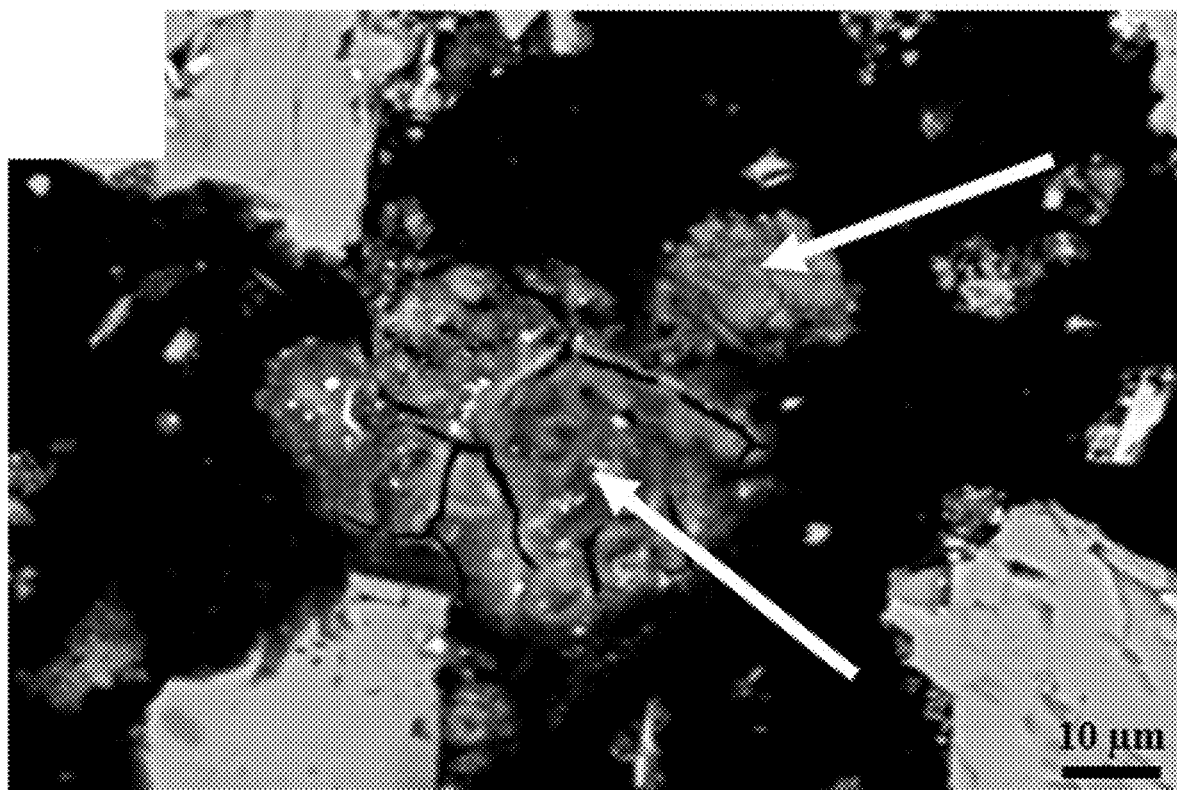
FIG. 19A is an image of an amorphous compound obtained with the Electron Probe Micro-Analyzer, according to some embodiments.
Figure 19B:
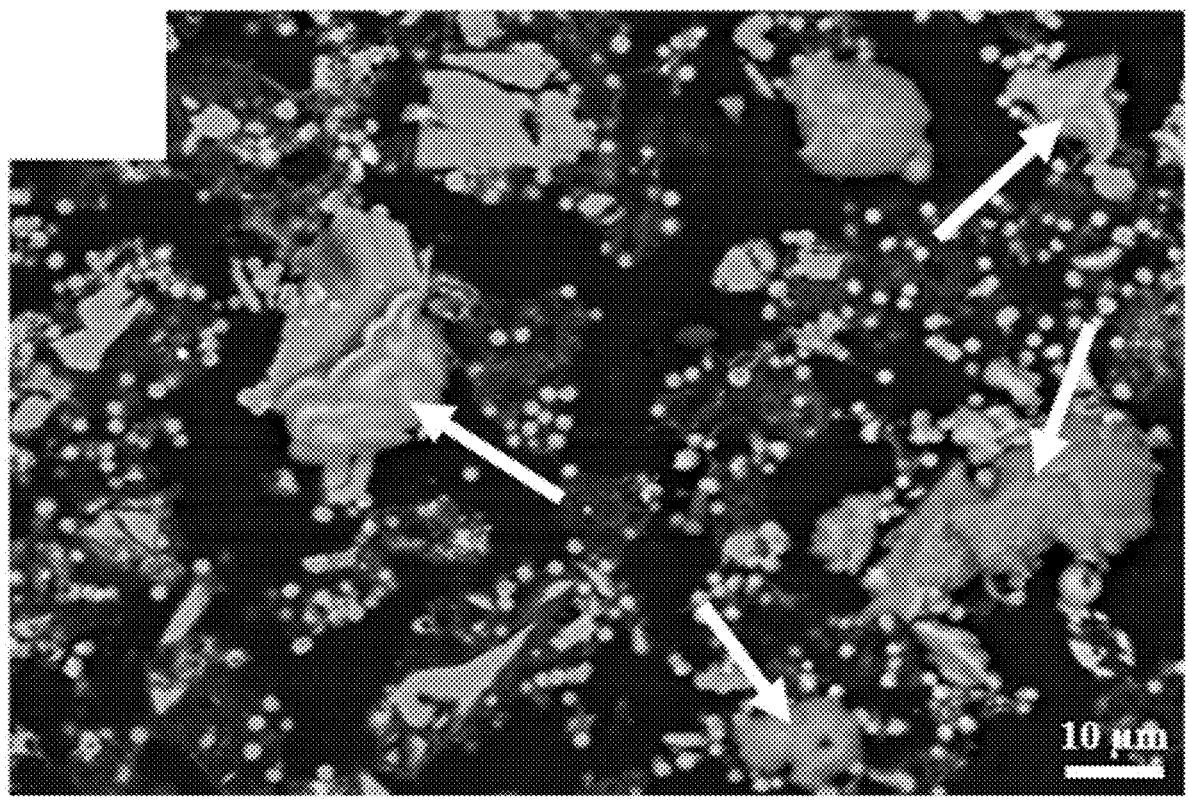
FIG. 19B is an image of carbonaceous species obtained with the Electron Probe Micro-Analyzer, according to some embodiments.

Lastly, various mineral phases could contribute to what is detected as amorphous by XRPD such as i) severely altered K-feldspar ii) crystalline, but very small particles iii) truly amorphous compounds, for example poorly crystallized non-stoichiometric calcium-silicate-hydrate (C-S-H). However, exploration of the sample with EPMA showed that the amorphous phase occurred in two main forms: i) as material originating from the raw K-feldspar, from which it maintained similar weight proportions of K, Al and Si, but that has been so severely altered that the total oxides content is much lower; such a material presents expressive Ca content ii) as completely anhedral forms, with no evidence of crystallinity or stoichiometric proportions of oxides attributable to known silicates, oxides, chlorides, carbonates or sulfides (ESI-EPMA). A detailed observation of thin sections revealed also the presence in the dried hydrothermally modified material of carbonaceous phases that are not detected by XRPD (FIG. 19b) and that are not attributable to impurities in the CaO reagent. This is likely due to concentrations below the detection limit. Such carbonates occurred subordinately and were mainly non-stoichiometric K-Ca-carbonates (Ca/K atomic ratio between 7 and 28; ESI-EPMA), in crystalline aggregates 5-10 μm in diameter (FIG. 19b). The crystals presented two main habits, tabular forms or prisms. Carbonates were confirmed independently by an acid-base titration (FIG. 20) as well as a qualitative carbonate spot test (FIG. 21).

HT-1 Particle Characteristics

Particle Size Distribution (PSD) of powder samples was determined with a laser-diffraction particle size analyzer (Beckman Coulter Inc., LS 13 320) equipped with a custom-made module for sample introduction. Samples were suspended in water during the analysis and were not sonicated.

Specific Surface Area according to Brunauer, Emmet and Teller (BET-SSA) was determined with a Micromeritics ASAP 2020 surface area and porosity analyzer. The gas used for adsorption was $N_2$. Samples (~0.5 g) were degassed at 200° C. until a constant degassing rate of $10^{-5}$ mmHg min$^{-1}$ was reached in the sample tube (12 h). SSA was determined on the adsorption branch of the isotherm with the multi-points method in the $p/p_0$ range 0.08-0.35. However, the complete adsorption (up to $p/p_0=0.99$) and desorption isotherms were recorded.

Figure 22:
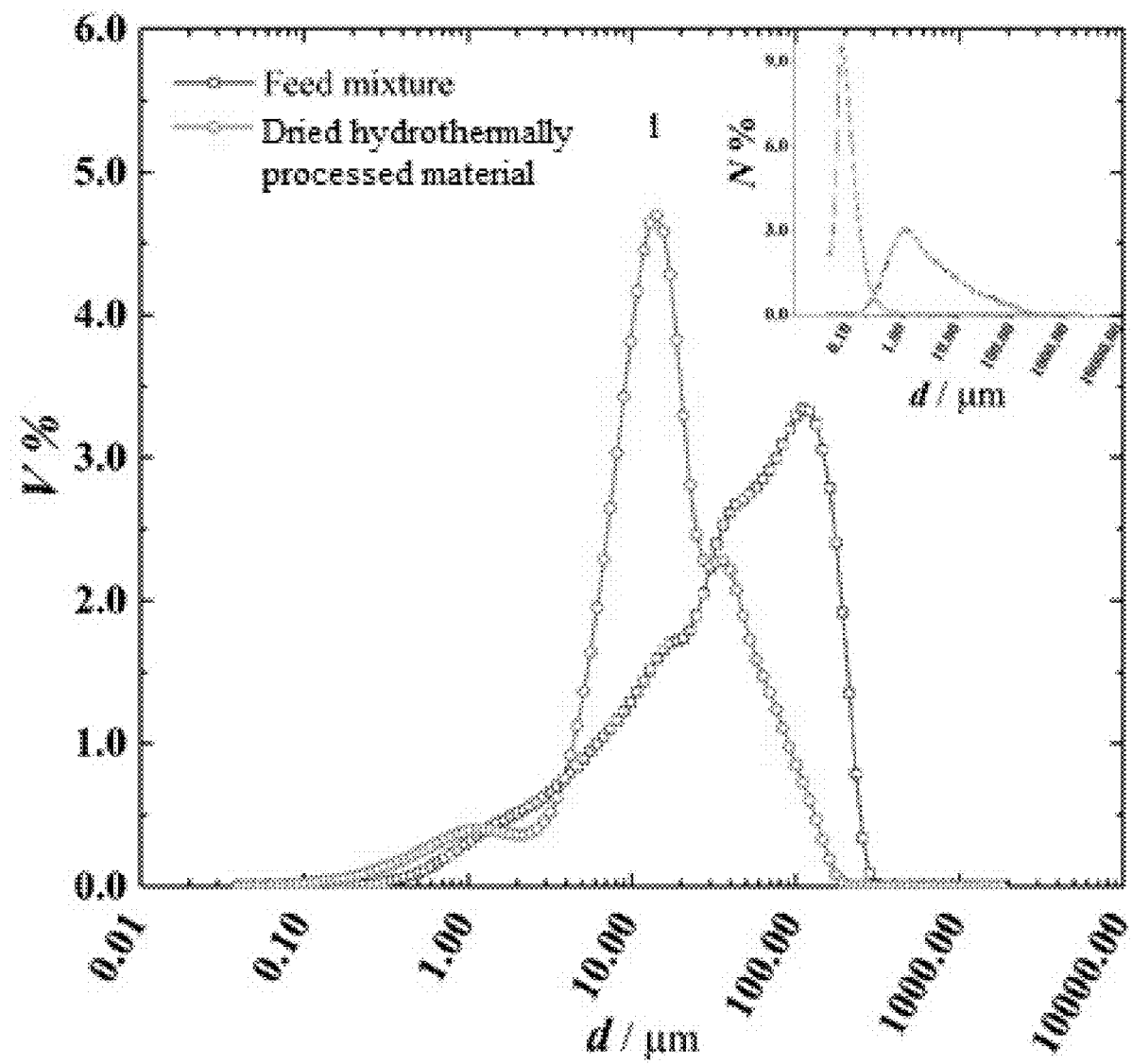
FIG. 22 shows particle size distribution (PSD) based on both volume percentage (V %, main) and the number of particles percentage (N %, inset) for HT-1, a dried hydrothermally modified material, according to some embodiments.

The Particle Size Distribution (PSD) of the feed mixture ($Ca(OH)_2$+ultrapotassic syenite) is compared with that of the dried hydrothermally modified material in FIG. 22. It is shown that after hydrothermal processing and drying particles are smaller. Based on volume, three main populations are observed at ~30 μm, ~10 μm and ~1 μm, respectively. Therefore, processing shifts the major population peak of one order of magnitude, from ~100 μm in the feed mixture to ~10 μm in the dried hydrothermally modified material. The same shift is observed based on number of particles, from ~1 μm in the feed mixture to ~0.1 μm in the dried hydrothermally modified material. These observations are consistent with the size of the particles observed with the SEM (FIG. 14). Overall, PSD can be used as a quick, efficient and inexpensive way to assess the efficiency of the process since the main size population in the rock powder and in the dried hydrothermally modified material shrink and grow, respectively, with the progressive conversion of K-feldspar.

Figure 23:
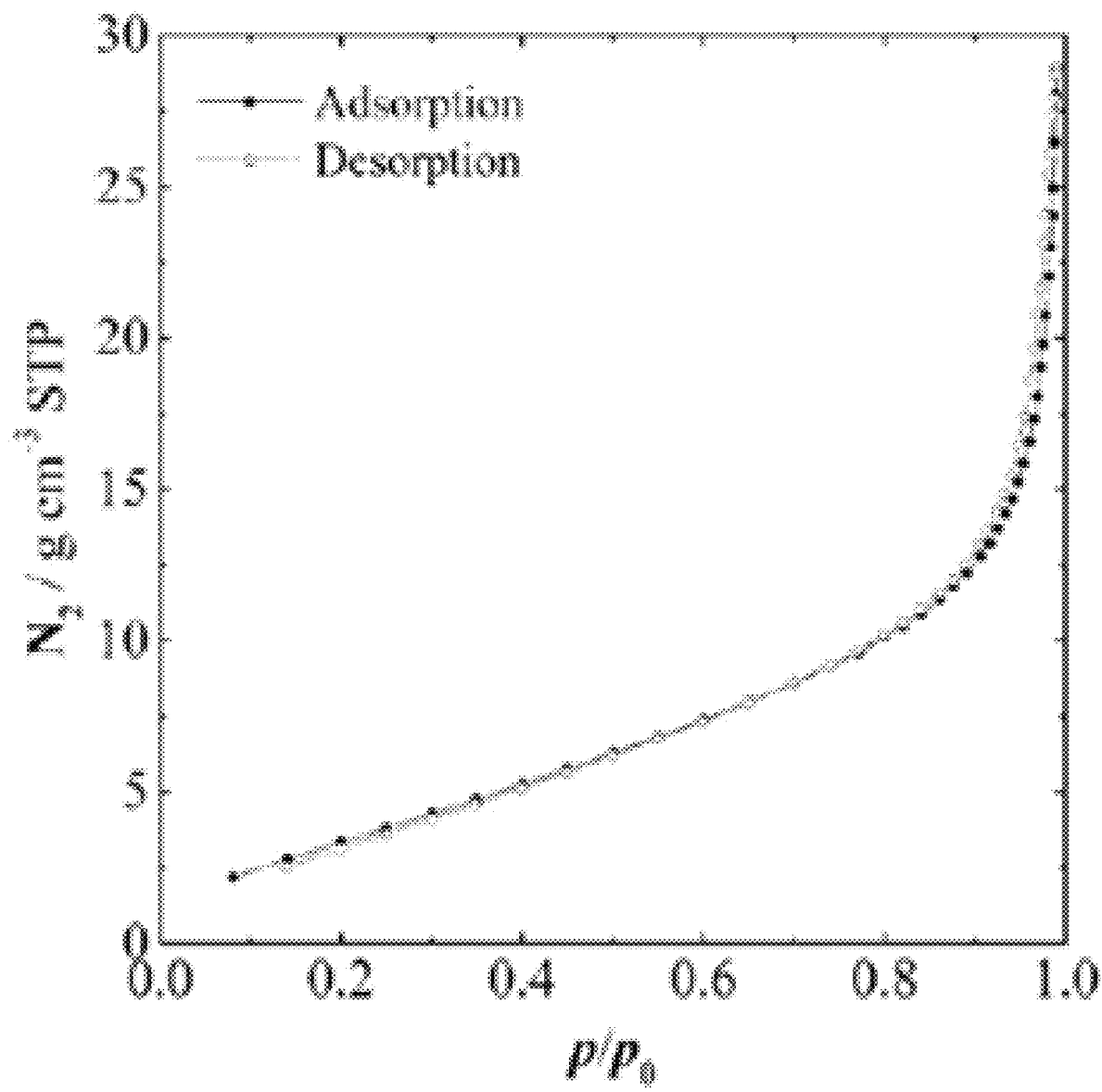
FIG. 23 shows the adsorption and desorption isotherms (−196° C.) of $N_2$ gas at the surface of the dried hydrothermally modified material, according to some embodiments.
Figure 24A:
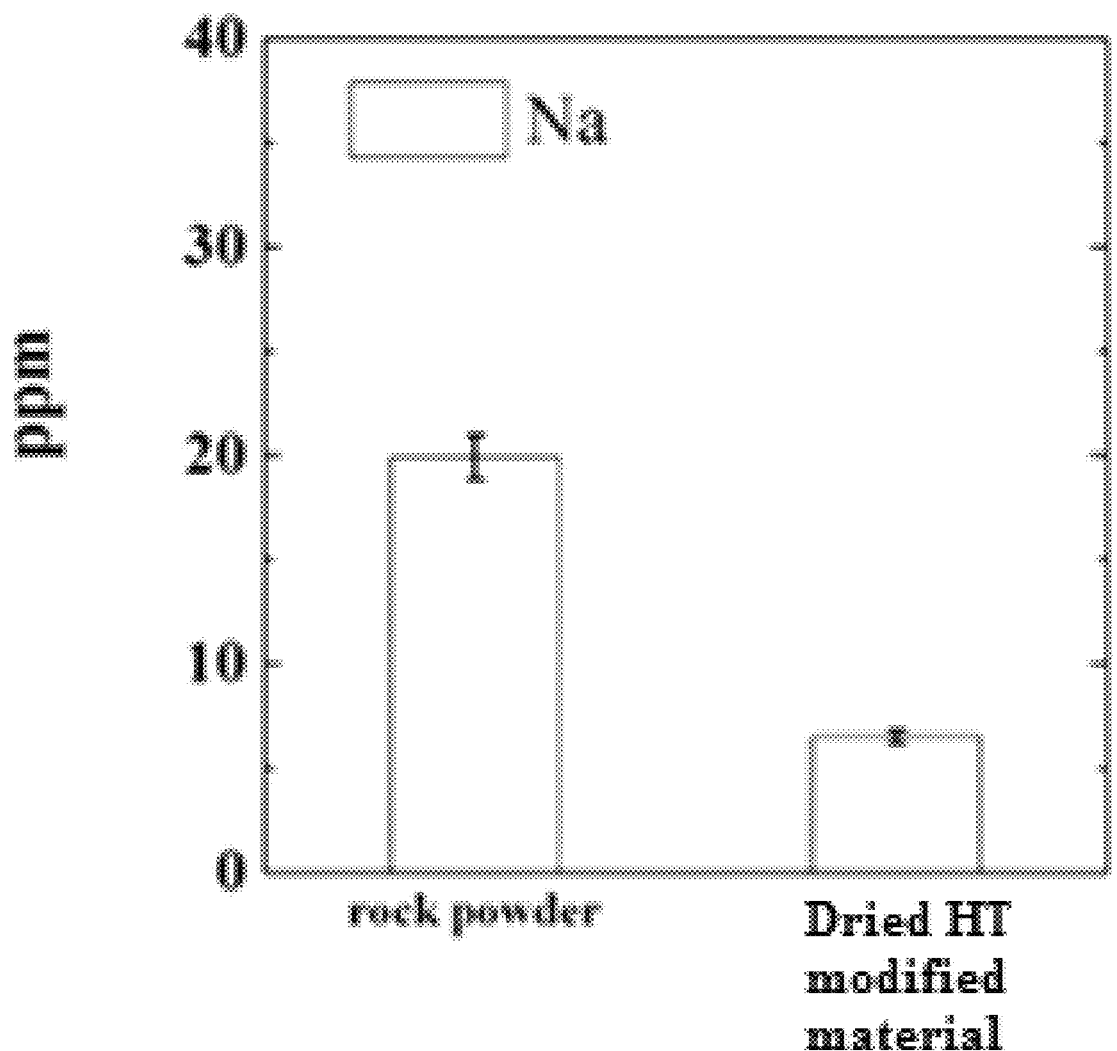
FIG. 24A is a bar graph showing the release of sodium (Na) from rock powder (ultrapotassic syenite) and dried hydrothermally modified material, according to some embodiments.
Figure 24B:
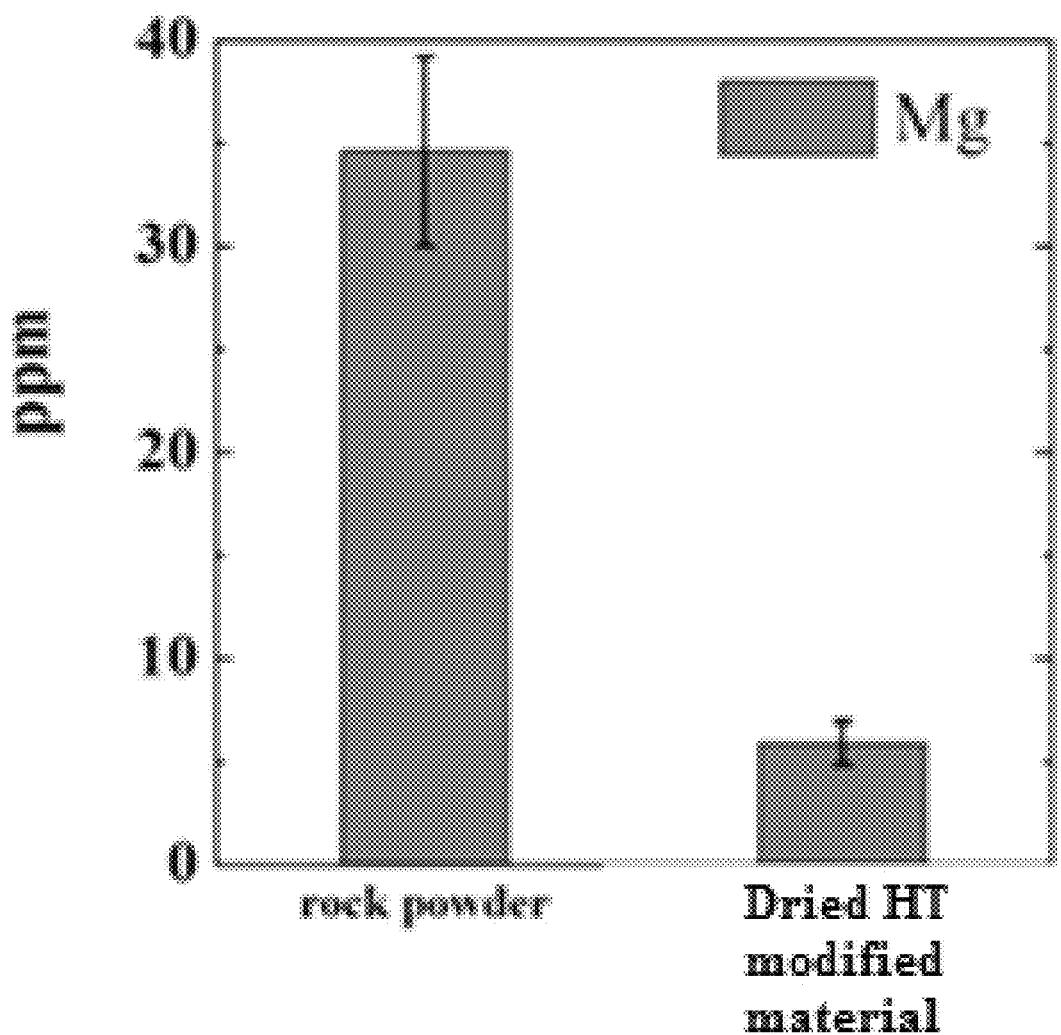
FIG. 24B is a bar graph showing the release of magnesium (Mg) from the rock powder (ultrapotassic syenite) and dried hydrothermally modified material used in FIG. 24A.
Figure 24C:
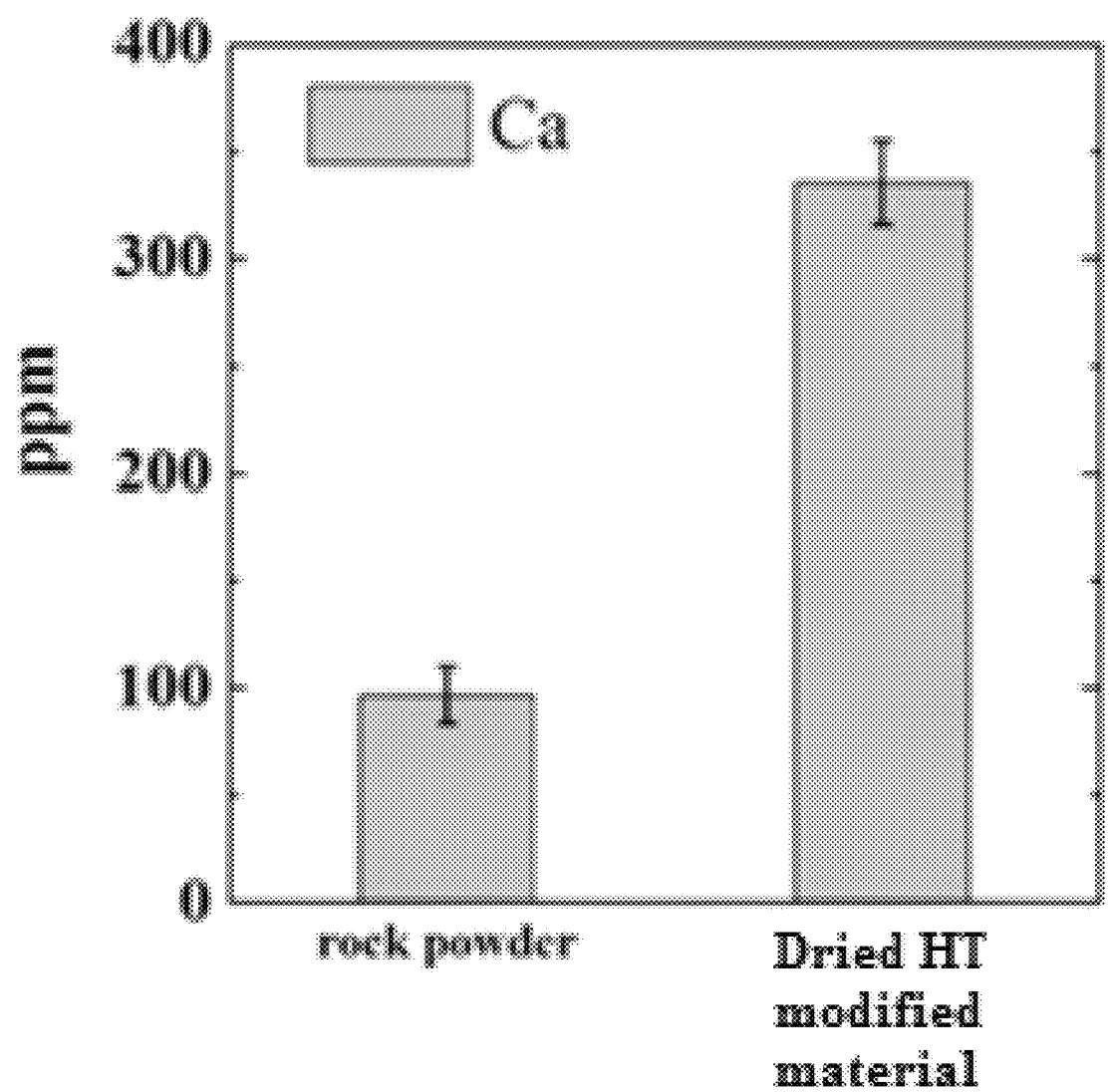
FIG. 24C is a bar graph showing the release of calcium (Ca) from the rock powder (ultrapotassic syenite) and dried hydrothermally modified material used in FIG. 24A.
Figure 24D:
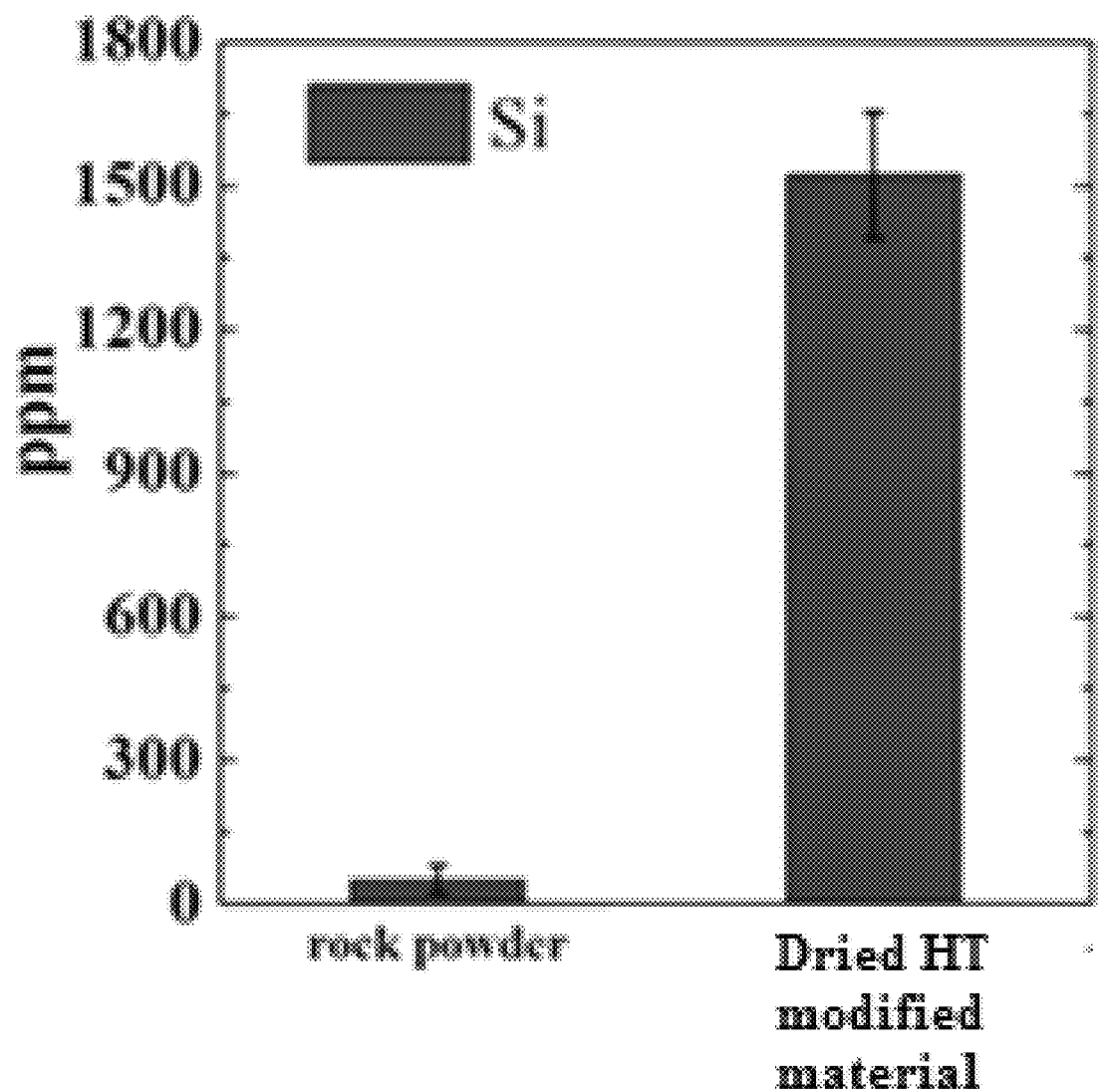
FIG. 24D is a bar graph showing the release of silicon (Si) from the rock powder (ultrapotassic syenite) and dried hydrothermally modified material used in FIG. 24A.
Figure 24E:
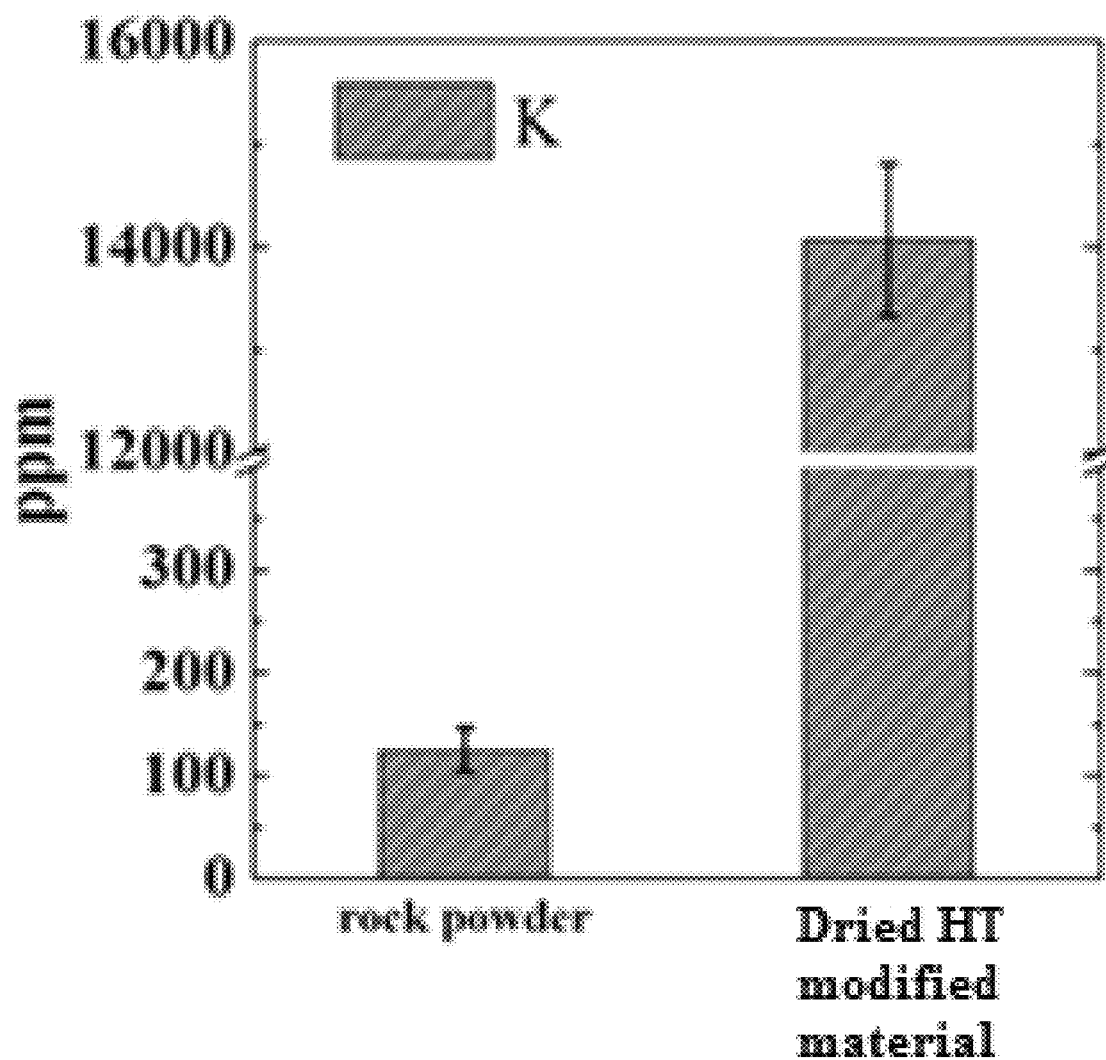
FIG. 24E is a bar graph showing the release of potassium (K) from the rock powder (ultrapotassic syenite) and dried hydrothermally modified material used in FIG. 24A.
Figure 24F:
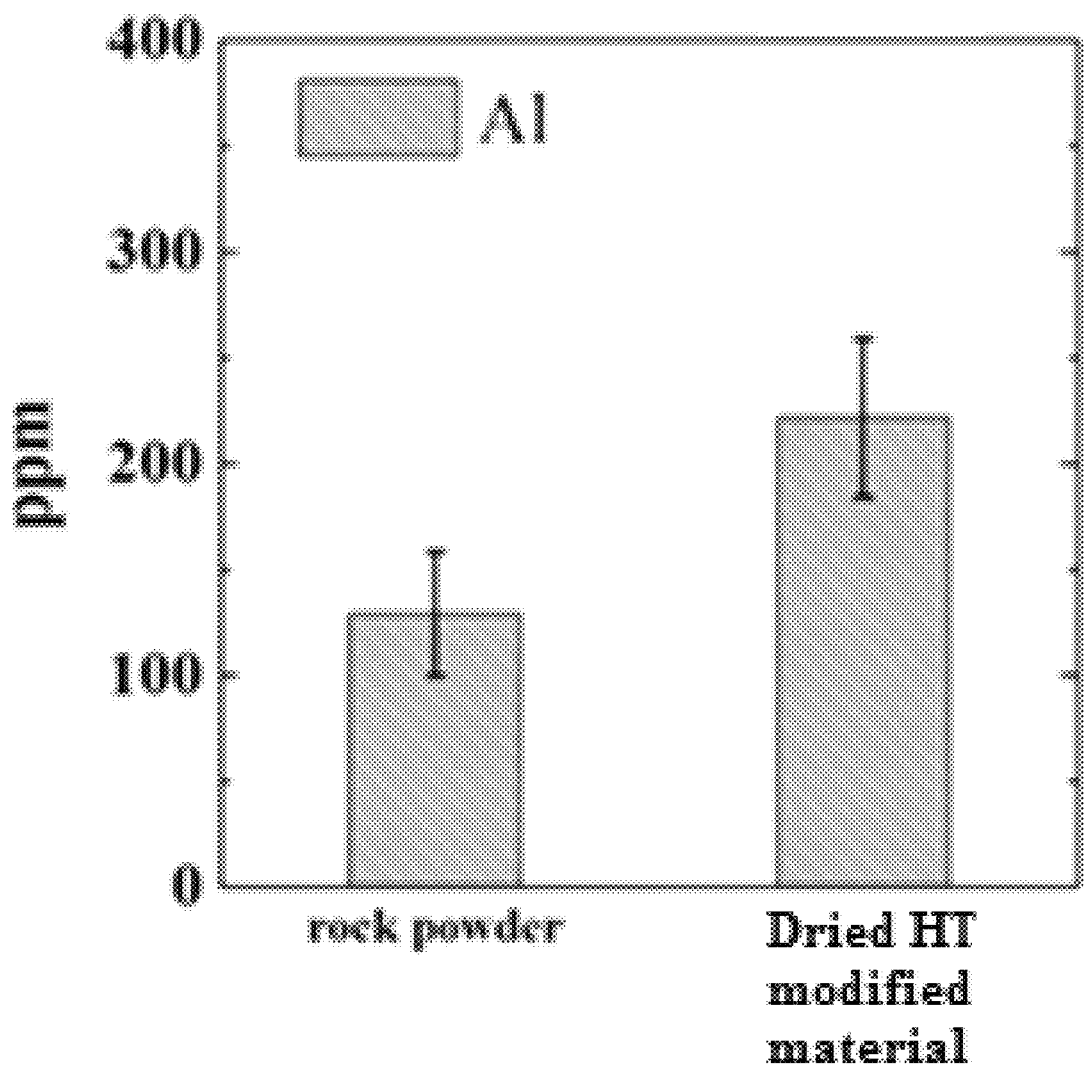
FIG. 24F is a bar graph showing the release of aluminum (Al) from the rock powder (ultrapotassic syenite) and dried hydrothermally modified material used in FIG. 24A.

The Specific Surface Area according to the BET method (BET-SSA) was 15.1 m$^2$ g$^{-1}$ for the dried hydrothermally modified material and 46.9 m$^2$ g$^{-1}$ for the feed mixture, which was a particularly high value due to the fine fraction of $Ca(OH)_2$. Such value is only partially relevant, because upon contact with water the feed mixture reacts immediately, changing its surface area over time. The BET-SSA due to the rock fraction in the feed mixture is not known, but can be reasonably considered ~1 m$^2$ g$^{-1}$ as reported by Ciceri et al. (D. Ciceri, M. de Oliveira, R. M. Stokes, T. Skorina and A. Allanore, Miner. Eng., 2017, 102, 42-57 incorporated herein by reference in its entirety for all purposes). A comparison between surface areas of the dried hydrothermally modified material and the rock fraction is then consistent with a population of smaller particles in the processed material. The $N_2$ adsorption isotherm of the dried hydrothermally modified material (Type III according to BET classification) does not show any appreciable hysteresis (FIG. 23).

Leaching Experiments and Inductively Coupled Plasma Mass Spectroscopy (ICP-MS)

Leaching experiments for both the ultrapotassic syenite and the dried hydrothermally modified material were run in batch mode, meaning that 0.3 g of solid material were contacted with 3 mL of leaching solution (ms:mL=0.1), and rotated continuously for 24 h in a closed vial. Before starting the rotation, vials were pre-filled with Ar. Mass-transfer limitations are considered negligible under the given stirred conditions. HNO$_3$ at initial pH=5 was used as the leaching solution, and mimicked an acidic soil solution. The stock leaching solution was prepared by appropriate dilution of standardized HNO$_3$ 0.1M (Alfa Aesar) in boiled water, followed by vigorous Ar bubbling for ~15 min. At the end of the experiment, the suspension was filtered (Whatman 13 mm GD/X, 0.45 μm), and diluted 1:100 in standardized HNO$_3$ 0.1 M. Filtering occurred within 15 min of stopping the rotator. Each of the leaching experiments was repeated in three replicates. Error bars represent the scattering of experimental data over the three replicates (FIGS. 24, 9D-9H). Experiments were conducted at room temperature (20±3° C.). The temperature of the leaching solution remained constant upon contact with the dried hydrothermally modified material as demonstrated by an independent test (not shown).

Inductively Coupled Plasma Mass Spectroscopy (ICP-MS) determined the concentration of K, Al, Si, Na, Ca, and Mg in the diluted leachate (ICP MS, Agilent Technologies 7700 Series). The instrument used an Octopole Reaction System (ORS) that was run in "He mode" (He=4.0 mL min$^{-1}$) except for Ca, which was determined in "no-gas mode". A solution at 1 ppm of In was used as the internal standard.

Results from leaching tests for both the ultrapotassic syenite and the dried hydrothermally modified material are reported in FIGS. 24A-24F (Leaching conditions: batch test under rotation, 24 h, ms:mL=1:10. HNO$_3$ at nominal initial pH=5 as the leaching solution. All values (ppm), refer to the mg of element analyzed in solution by ICP-MS per kg of solid material. Note that the initial BET-SSA and PSD were different for the two materials: rock powder (initial pH=5, BET-SSA=17.3 m$^2$ g$^{-1}$, powder obtained from ball milling 1 min the fraction <2 mm described in the Reagents section); dried hydrothermally modified material (initial pH=5, BET-SSA=15.1 m$^2$ g$^{-1}$, PSD reported in FIGS. 19A-19B). Since actual pH conditions, PSD and BET-SSA are different for the two solid materials, results are compared only for a qualitative visualization of the order of magnitude of the elemental availability. In the dried hydrothermally modified material, there are 14,065±744 ppm$_K$ available for dissolution which is equivalent to 14.5% of the total K content of the feed mixture. Therefore, at 24 h potassium is two orders of magnitude more available than in the original ultrapotassic syenite leached at the same initial pH. For Si, Al and Ca availability is 1,520±132 ppm$_{Si}$, 222+38 ppm$_{Al}$, and 335+20 ppm$_{Ca}$, respectively (FIGS. 24A-24F), corresponding to 0.6%, 0.3% and 0.2% of the total content of Si, Al and Ca, in the feed mixture, respectively. Ca leaching was monitored in part because of its role a plant macronutrient and because of its ability to correct soil pH. The Ca in the varietal composition of the ultrapotassic syenite is taken into account in this calculation. Na and Mg were also monitored because they are a major component of varietal composition and important elements for soil scientists. Na can lead to potential soil salinization and Mg is a plant micronutrient. In the dried hydrothermally modified material there are 6.5±0.3 ppm$_{Na}$ and 6±1 ppm$_{Mg}$ available for dissolution, equivalent to 0.2% of both the total Na and Mg content in the feed mixture. The overall availability of Na is low and decreased in the dried hydrothermally modified material with respect to the ultrapotassic syenite.

Figure 20:
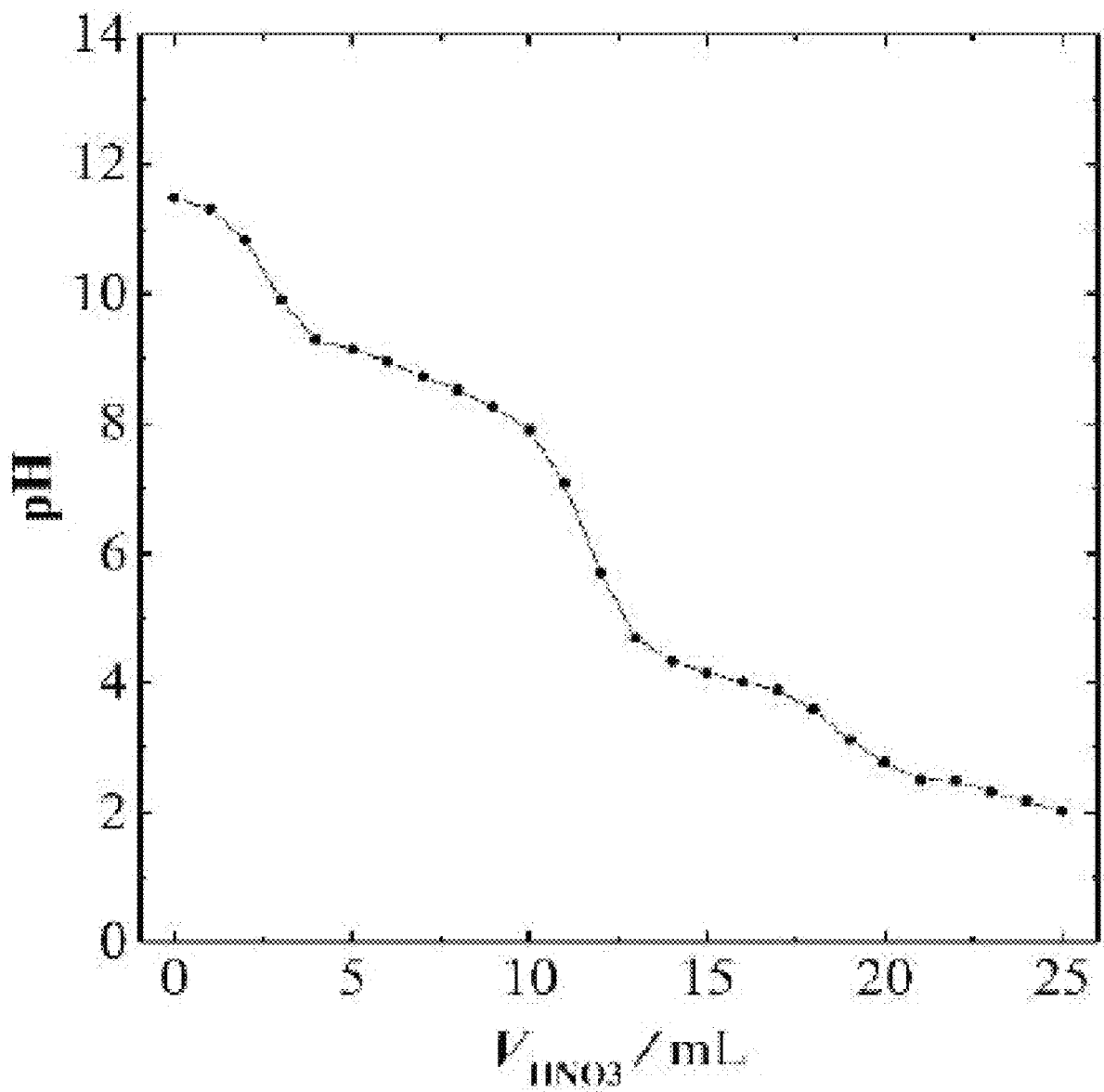
FIG. 20 is a titration curve of a dried hydrothermally modified material (0.3067 g) suspended in 25 mL of DI water with standardized $HNO_3$ 0.1 M, according to some embodiments.
Figure 21A:
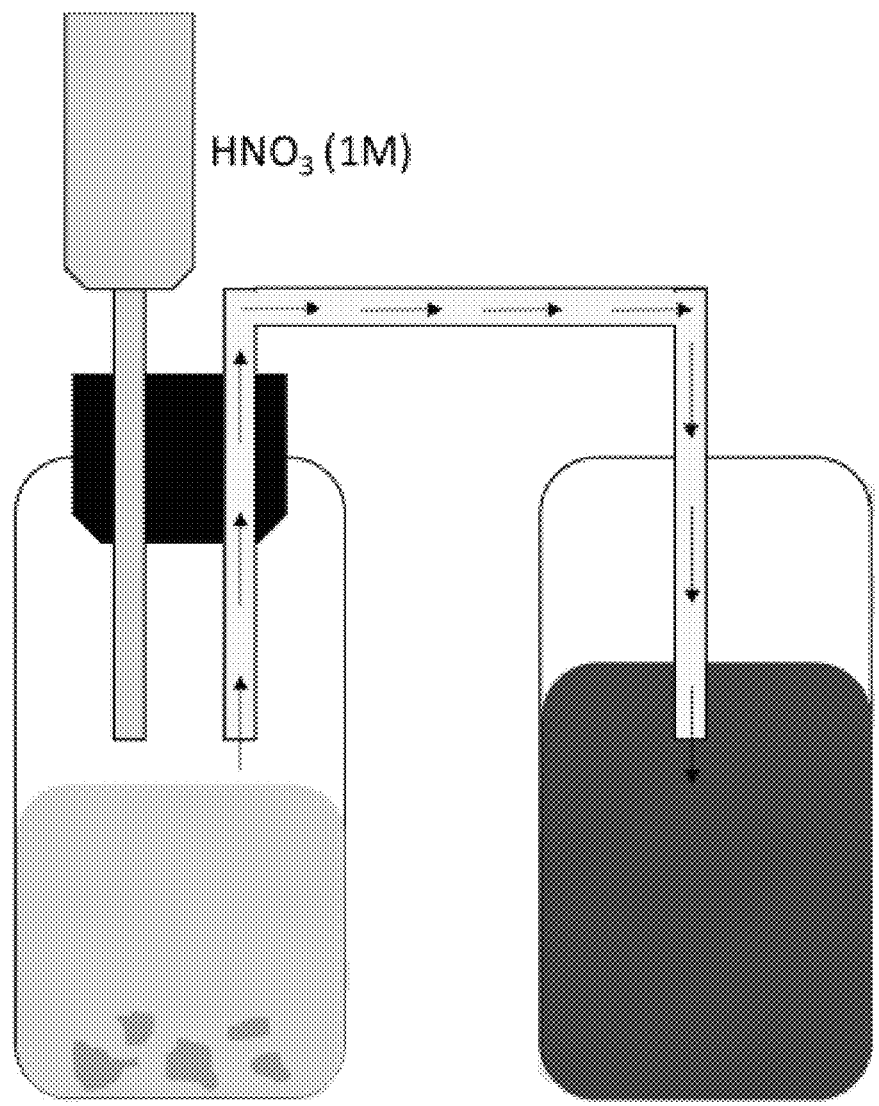
FIG. 21A is a schematic illustration of an experimental apparatus for the spot testing of carbonates, according to some embodiments.
Figure 21B:
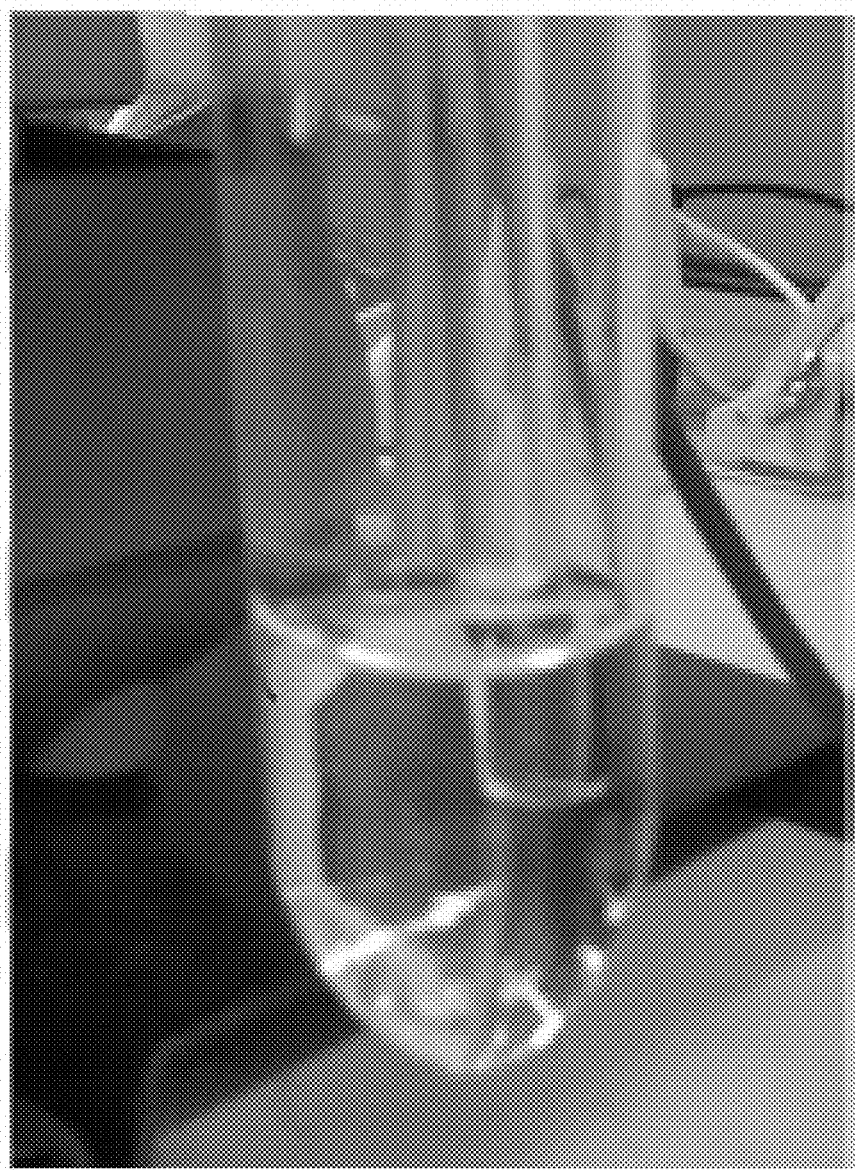
FIG. 21B is an image showing the solution resulting from the experimental apparatus in FIG. 21A for a blank test.
Figure 21C:
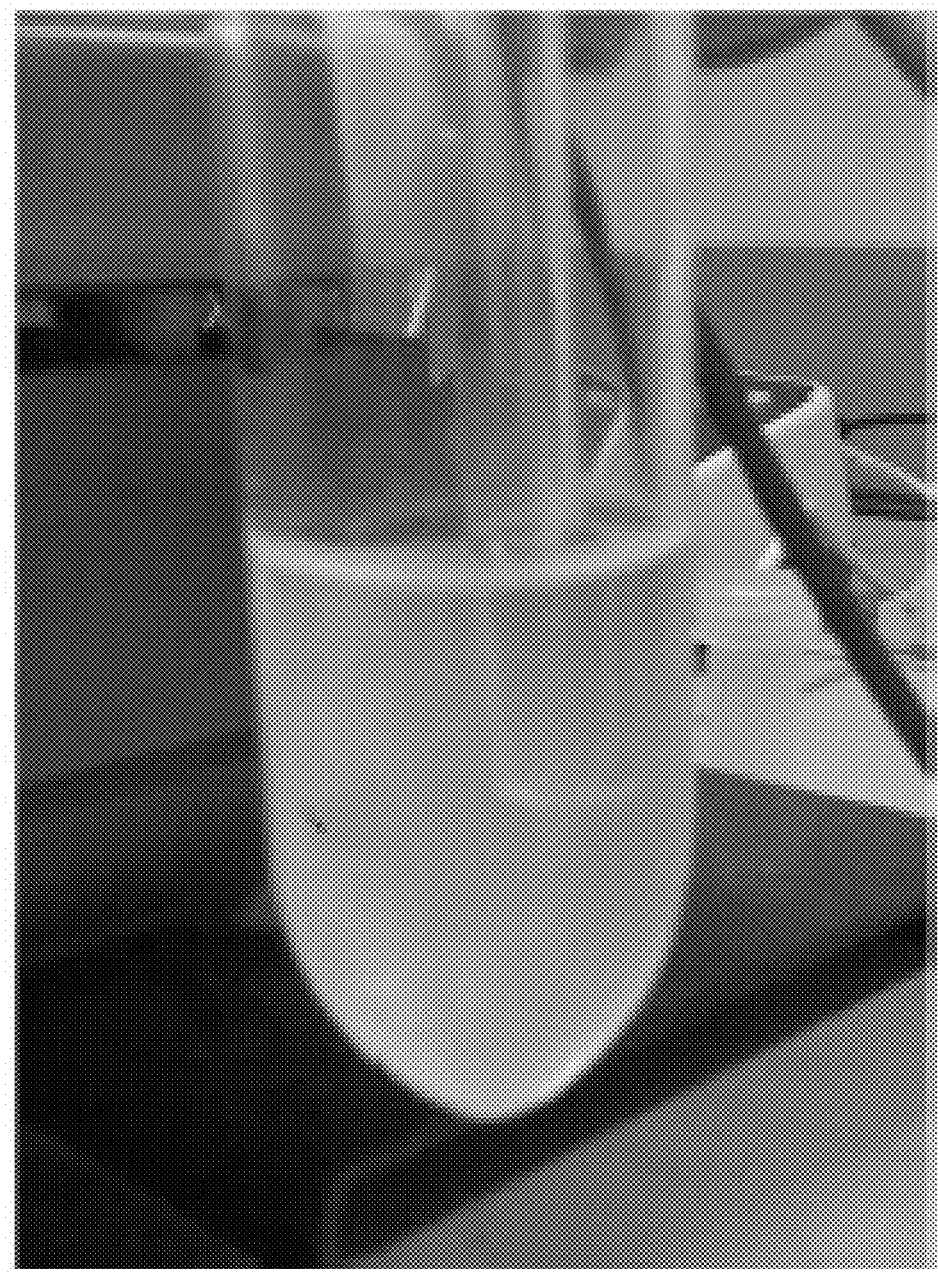
FIG. 21C is an image showing the solution resulting from the experimental apparatus in FIG. 21A for a dried hydrothermally modified material.

That the fraction of available Si, Al, and Ca nutrients in the dried hydrothermally modified material was in absolute terms very little, is evidence of the chemical stability of all the calcium silicate phases under the given leaching conditions. Nevertheless, the absolute amount of nutrients available may be significant for plants. For reference, in the soil solution, Si concentrations are in the order of 0.09-23.4 mg$_{Si}$ $L^{-1}$, to be compared with the value of 152 $mg_{Si}$ $L^{-1}$ in the leaching solution reported herein. Note also that in the leaching experiment the Si concentration corresponds to the solubility limit of amorphous $SiO_2$ at very low pH. This is because the actual leaching solution was diluted in concentrated $HNO_3$ before ICP-MS analysis. It is therefore possible that Si in the actual leaching vial is even higher than what has been measured. Acid-base Titration of Dried Hydrothermally Modified Material An acid-base titration of the dried hydrothermally modified material was carried out as follows:

(a) First, 0.3 g of dried hydrothermally modified material were suspended in 10 mL of DI water under agitation
(b) Second, standardized 0.1 M $HNO_3$ (Alfa Aesar) was added to the beaker. After each acid addition (2.5 mL), the system was let to stabilize for 15 min, before the reading was taken. Note that the pH did not stabilize due to surface reactivity of the dried hydrothermally modified material.
(c) Third, the titration curve is plotted as shown in FIG. 20, and equivalent points used for back calculations of the base content in the dried hydrothermally modified material.

Two distinct equivalent points are observed, at pH=10.0 (3.0 mL) and pH=5.8 (12.0 mL). The first equivalent point can be reasonably attributed to carbonates since the tabulated pKa2 value for $H_2CO_3$ is 10.33 (25° C.). Differences between experimental and theoretical values may be explained by interferences caused by the surface reactivity of the other mineral phases such as K-feldspar, hydrogarnet and tobermorite. The second equivalent point seems farther from the tabulated $pKa_1$ value for $H_2CO_3$, which is 6.35 (25° C.). Assuming the first equivalent point is indeed due to carbonates, this would correspond to 0.3 mmol of $CO_3^{2-}$, equivalent to 4.3 wt. % of $CO_2$ in the dried hydrothermally modified material. Such an amount was not detected by XRPD, but is in excellent agreement with LOI data (see section on Hydrothermal Processing above). Carbonates were anhedral crystals, but were not amorphous, so that XRPD does not detect them most likely because they are present below the limit of detection. If all of the carbonate determined with the titration at the first equivalent point was $K_2CO_3$, then the expected K-leaching test would be 78,000 $ppm_K$, well-above the experimental data (FIGS. 19A-19B). Carbonates in the dried hydrothermally modified material are therefore an unidentified mixture, which is likely to comprise $K_2CO_3$, $Na_2CO_3$, $MgCO_3$, $CaCO_3$ but possibly also other double carbonate species such as $K_2Ca(CO_3)_2$ (bûtschiilite and/or fairchildite). The second equivalent point does not match the content of carbonate detected at the first equivalent point. Assuming that the second equivalent point is due to the equilibrium $HCO_3^- + H^+ \rightleftharpoons H_2CO_3$, then further to the 0.3 mmol of $CO_3^{2-}$ additional 0.6 mmol of bicarbonate species $HCO_{3-}$ is present in the dried hydrothermally modified material. Such an amount would correspond to an additional 8.6 wt. % of $CO_2$ content in the dried hydrothermally modified material, for a total of 12.9 wt. % of $CO_2$, which is unlikely to be undetected by XRPD. These data point to an effective presence of carbonates in the dried hydrothermally modified material. Such high pH values are important in materials used to improved soil quality and soil health, particularly where low pH soils are a problem.
Qualitative Spot Test for the Determination of Carbonates Concentrated nitric acid (15.6 M) is dropped on top of the material using the apparatus shown in FIG. 21(a)-(c). If carbonates are present, they generate $CO_2$, which is channeled into a second compartment of the apparatus and precipitated as $BaCO_3$ from a solution of $Ba(OH)_2$. Panel (b) provides the result from a blank test, where the material is ultrapotassic syenite (no $BaCO_3$ is formed). Panel (c) provides the result from a test with the dried hydrothermally modified material. A whitish cloud of $BaCO_3$ is formed, confirming the presence of carbonates.

Relationship Between Mineralogy Composition and Leaching

Figure 15A:
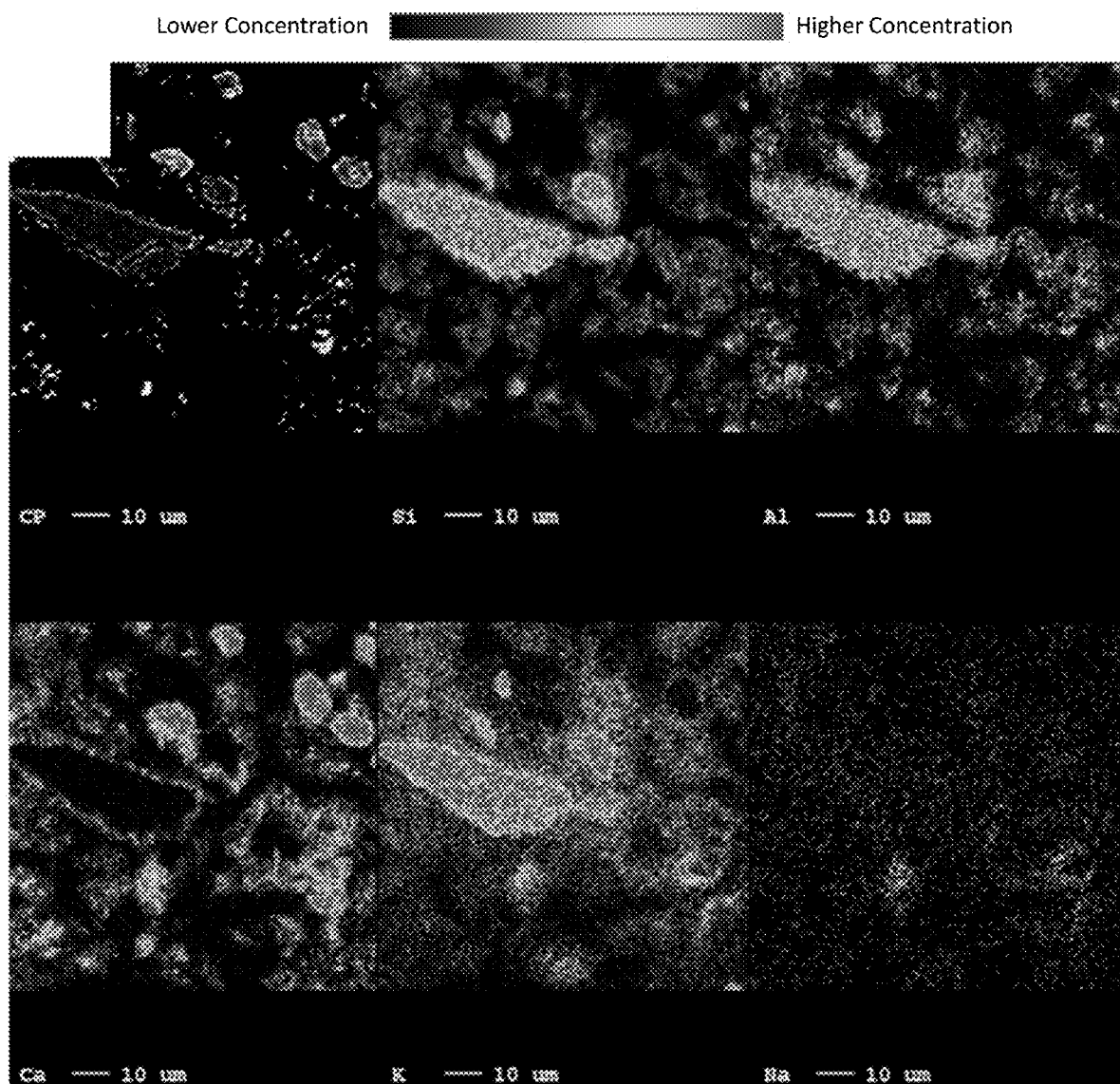
FIG. 15A shows electron probe micro-analyzer (EPMA) x-ray elemental maps of altered K-feldspar, according to some embodiments.
Figure 15B:
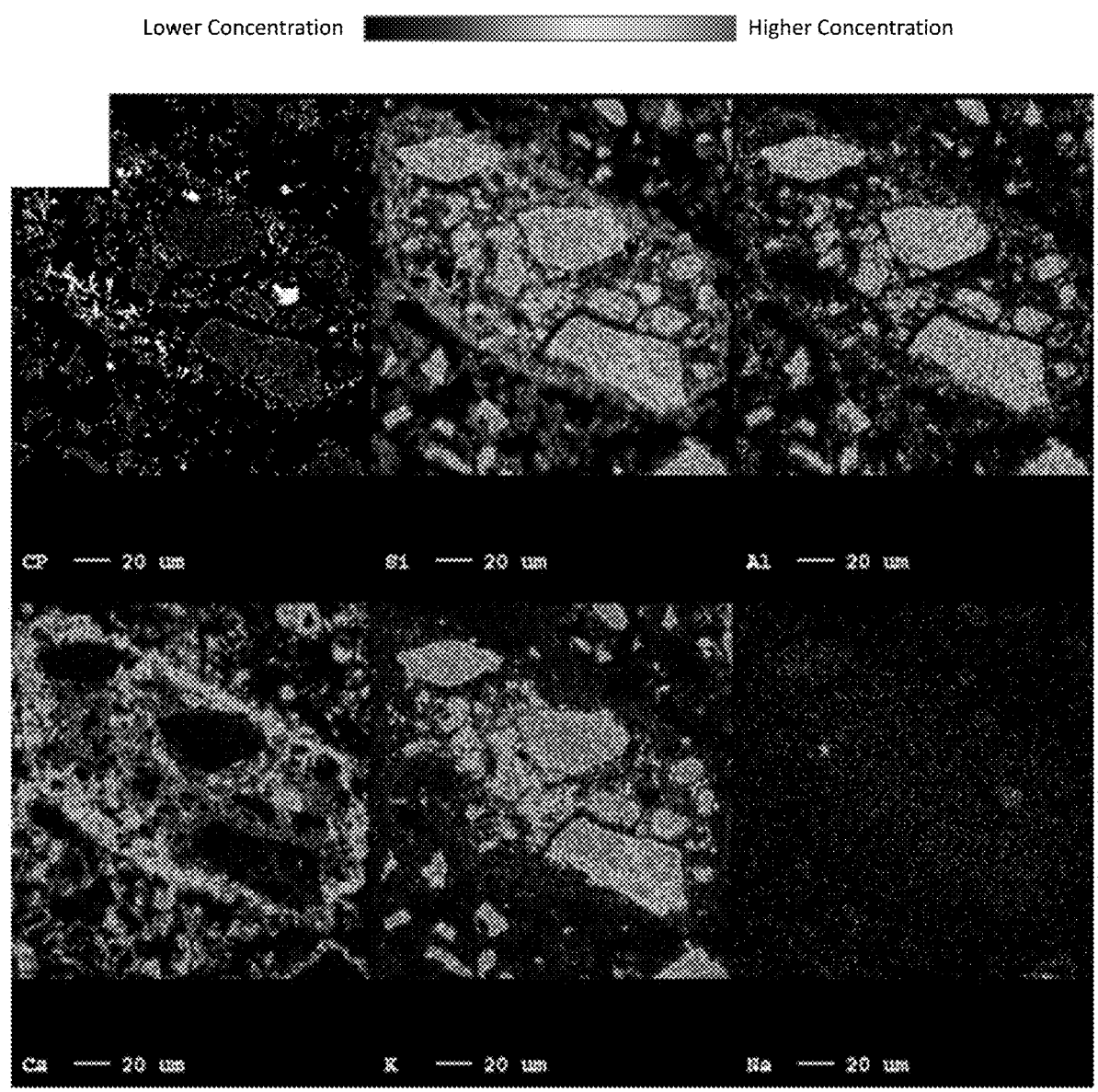
FIG. 15B shows electron probe micro-analyzer (EPMA) x-ray elemental maps of clump-like formations, according to some embodiments.
Figure 16A:
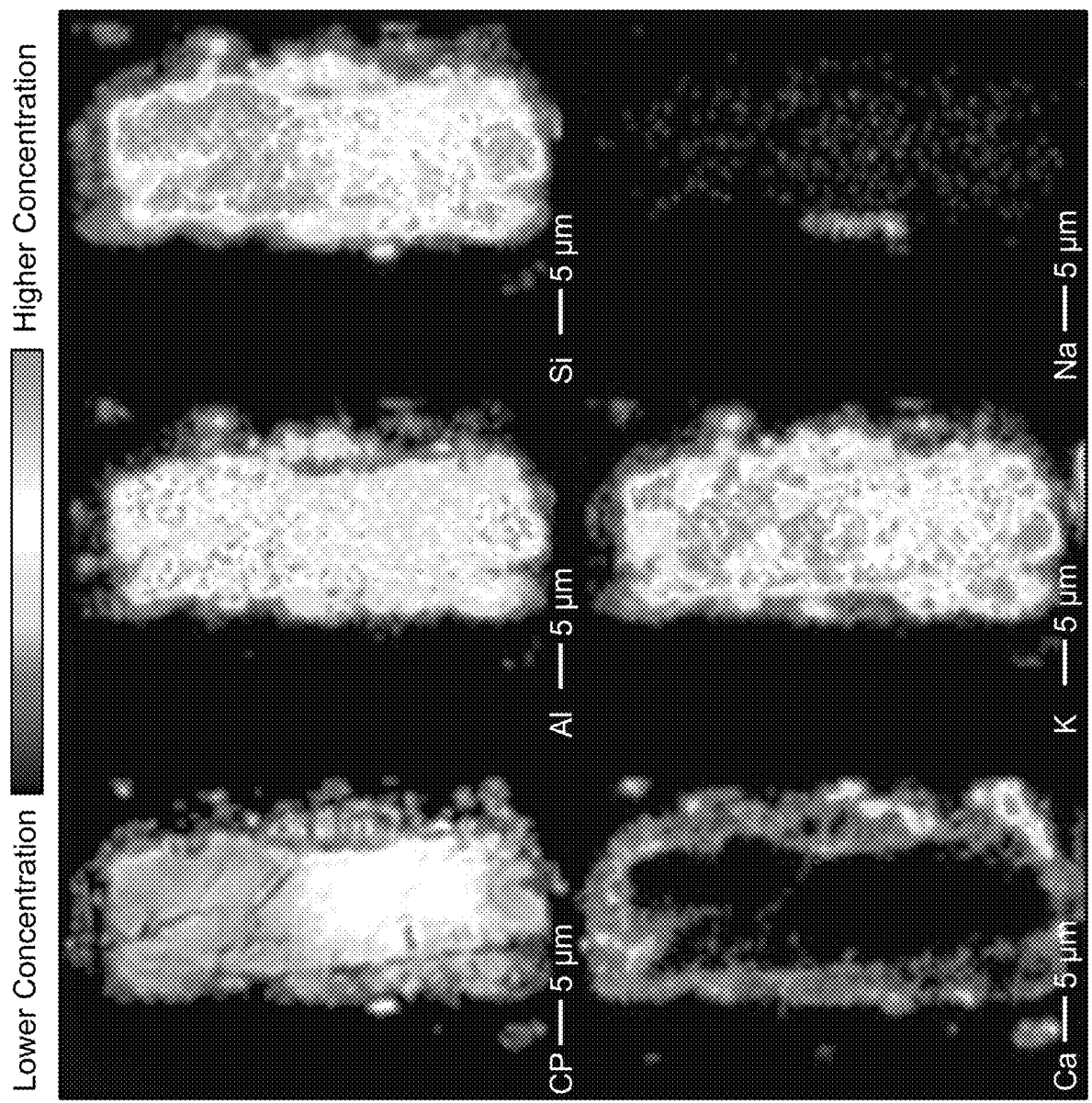
FIG. 16A shows Electron Probe Micro-Analyzer (EPMA) x-ray elemental maps of altered K-feldspar particles with a diameter d<50 m, according to some embodiments.
Figure 16B:
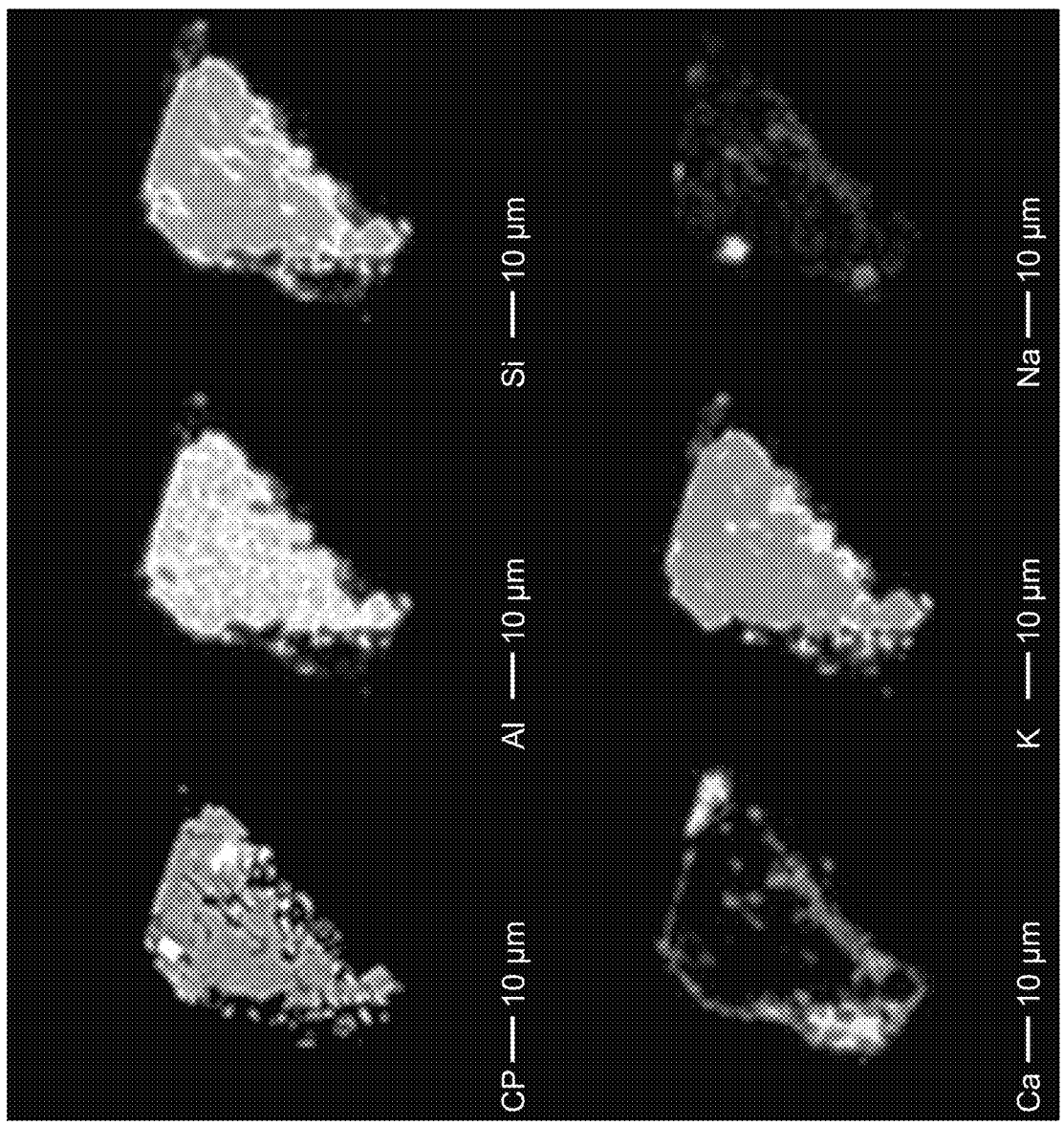
FIG. 16B shows Electron Probe Micro-Analyzer (EPMA) x-ray elemental maps of altered K-feldspar particles with a diameter 50<d<100 m, according to some embodiments.
Figure 16C:
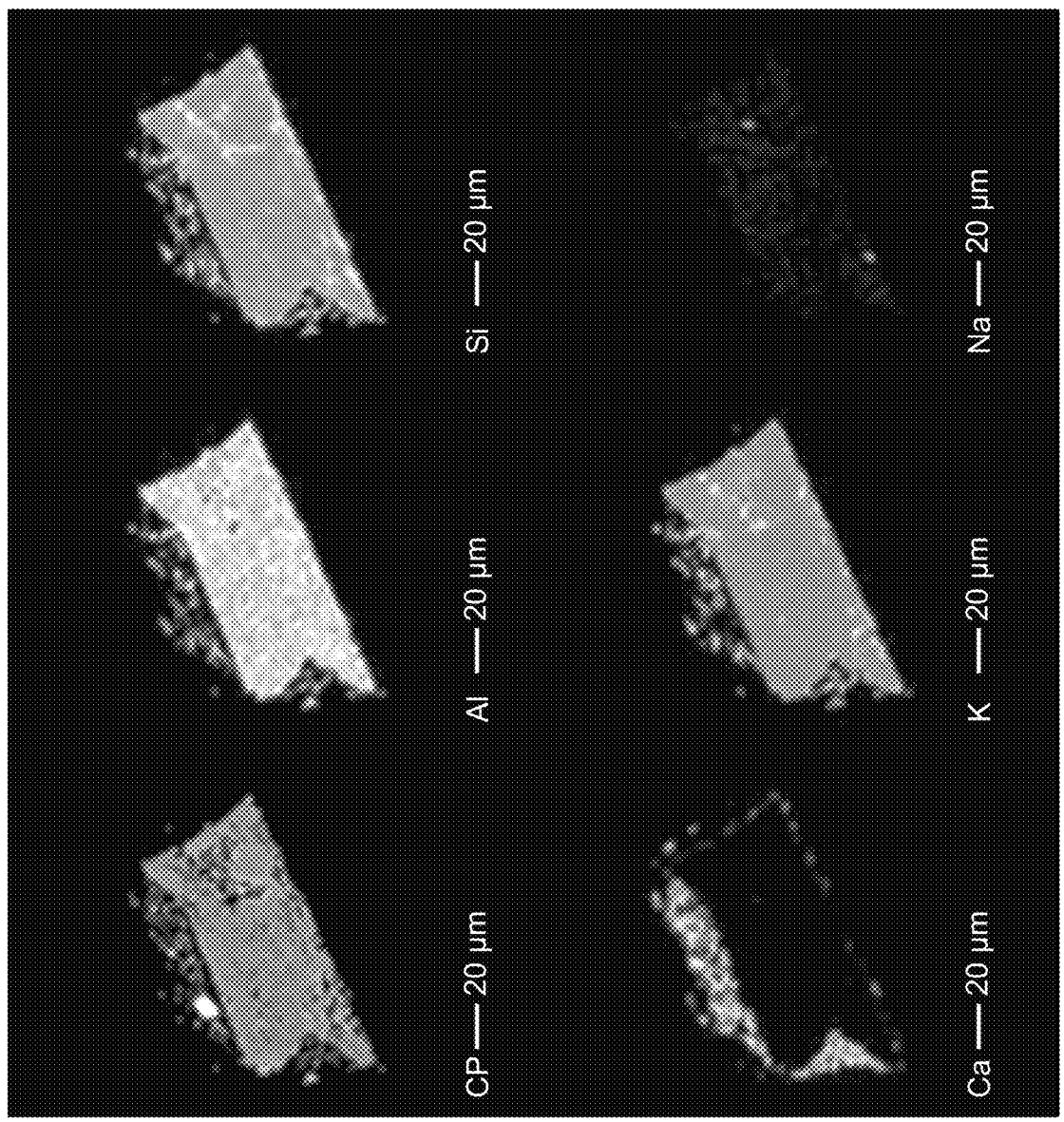
FIG. 16C shows Electron Probe Micro-Analyzer (EPMA) x-ray elemental maps of altered K-feldspar particles with a diameter d>100 m, according to some embodiments.
Figure 16D:
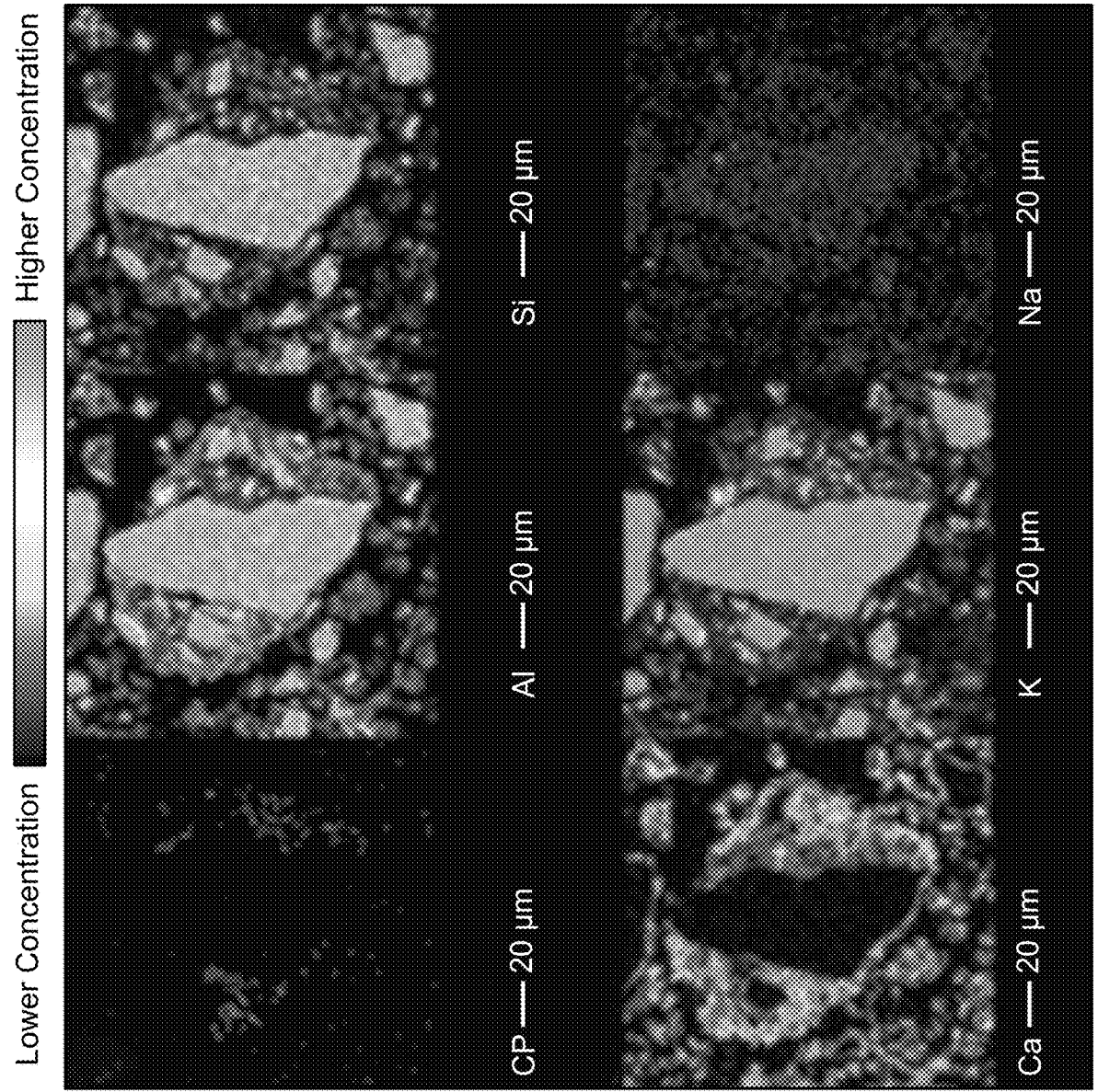
FIG. 16D shows Electron Probe Micro-Analyzer (EPMA) x-ray elemental maps of a clump-like formation in the dried hydrothermally modified material, according to some embodiments.
Figure 16E:
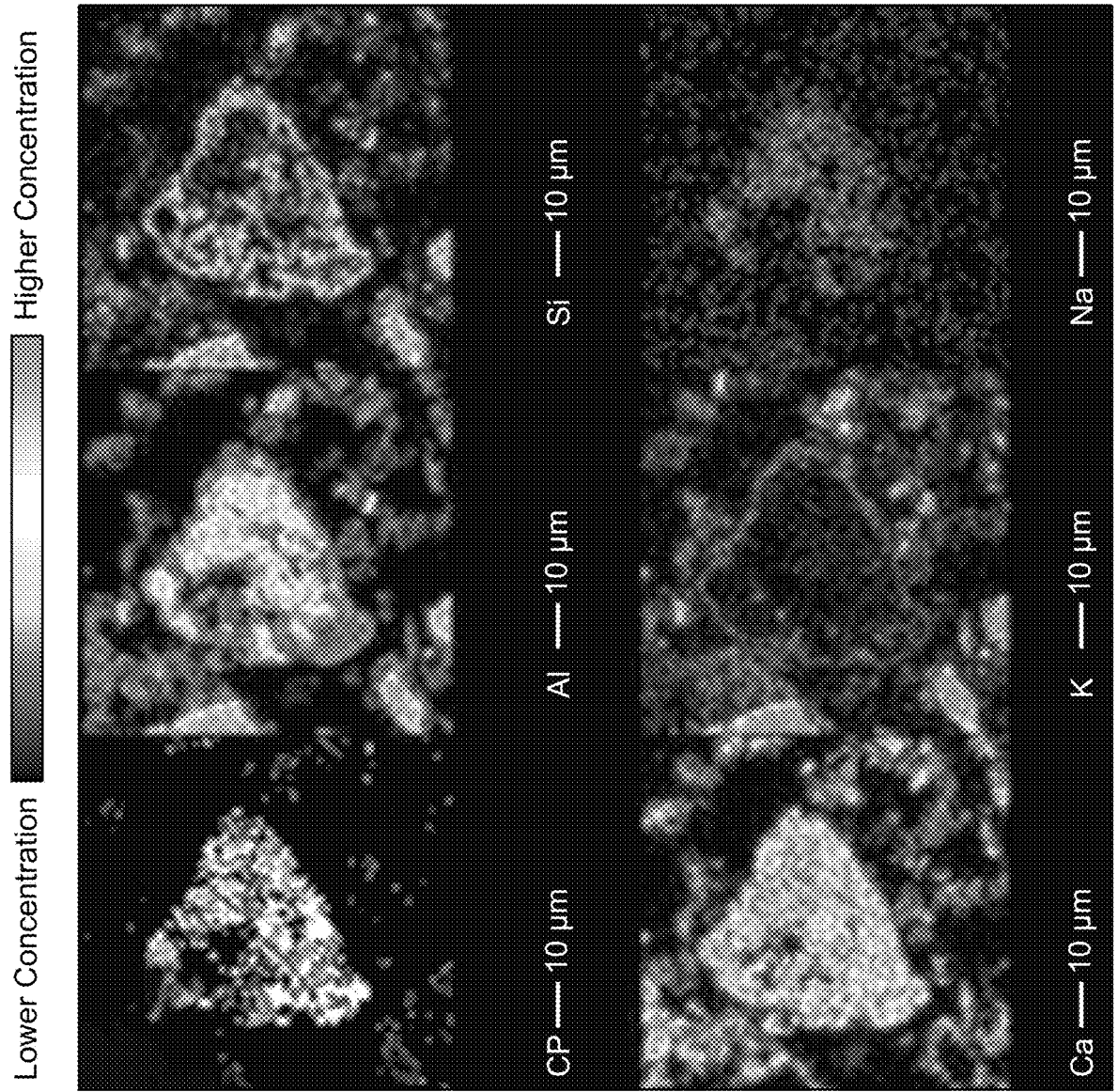
FIG. 16E shows Electron Probe Micro-Analyzer (EPMA) x-ray elemental maps of a large mass of hydrogarnet, according to some embodiments.
Figure 16F:
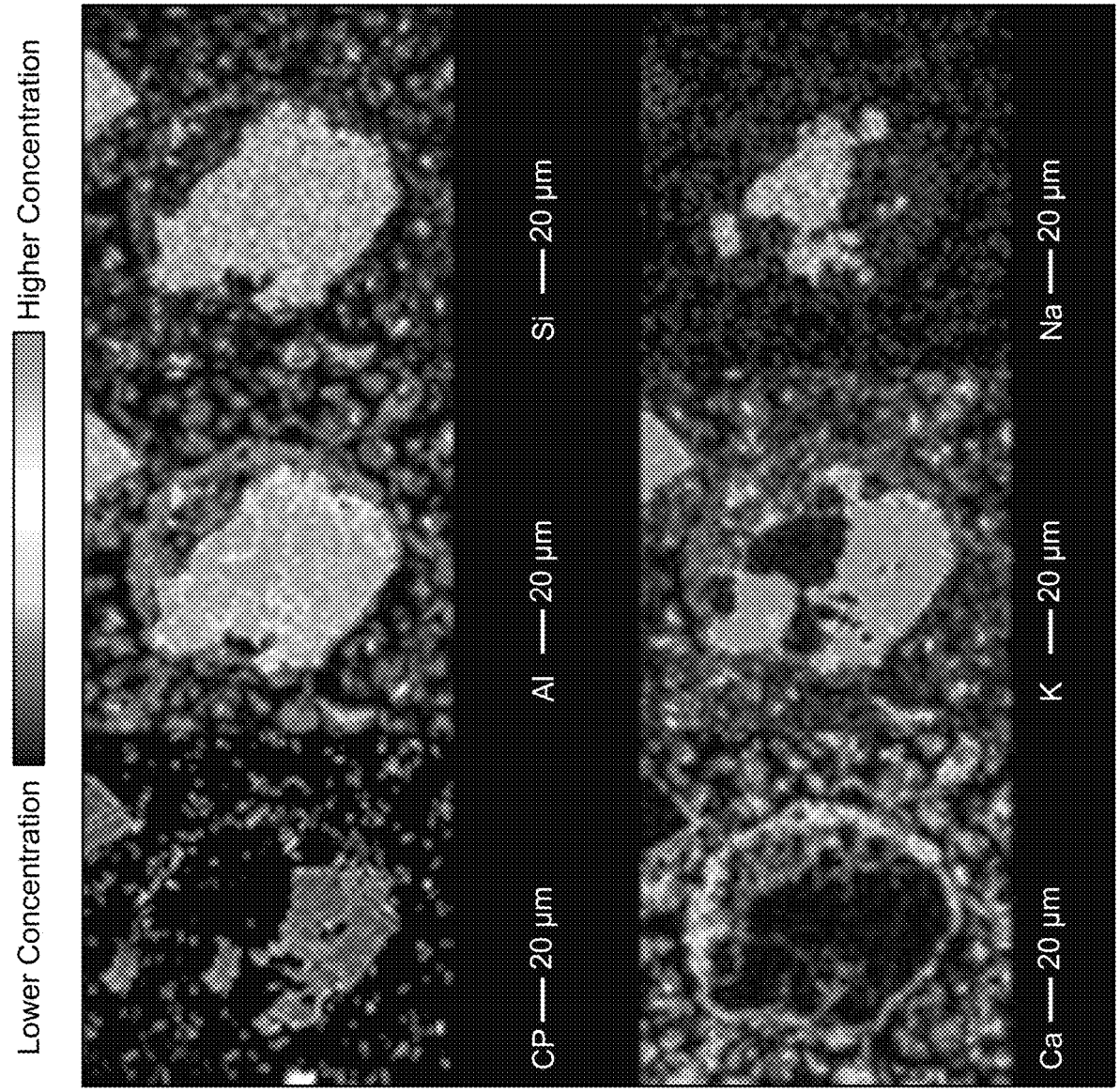
FIG. 16F shows Electron Probe Micro-Analyzer (EPMA) x-ray elemental maps of a clump-like formation with the central particle of altered K-feldspar containing a distinct inclusion of albite, according to some embodiments.

The major potassium alumino silicate (KAS) detected by XRPD in the dried hydrothermally modified material was K-feldspar ($KAlSi_3O_8$) (FIGS. 4E and 4F). XRPD showed that 14.0 g of K-feldspar were converted during hydrothermal processing (FIG. 14). PSD analysis confirmed that the size population attributable to K-feldspar was reduced in the dried hydrothermally modified material with respect to the feed mixture (FIG. 22). However, such a mineral phase remains the main component of the dried hydrothermally modified material (66.5 wt. %), and therefore also the main K-bearing phase. This is a carefully engineered and intended feature of the material. A complete transformation of K-feldspar would be cost prohibitive, and would generate a large amount of soluble K immediately available in the soil solution, in opposition with the desirable attributes of the dried hydrothermally modified materials disclosed herein, i.e. engineering a fertilizer for tropical soils with a K-release rate that fits crop needs. However, note that what is detected by XRPD as K-feldspar, is in fact an altered mineral phase. Structural alteration was evidenced by the imaging study (FIG. 14a-d). Furthermore, the $N_2$ adsorption isotherm lacked hysteresis (FIG. 23), which can be explained considering that cracks, fractures or other porous structures do not generate a hysteretic behavior if they are in the order of micrometers (FIG. 14a-b), although their contribution to surface area is still captured by the BET-SSA value. Chemical alteration was evidenced by elemental maps (FIGS. 15A-15B), point concentrations (Table 3, ESI-EPMA), as well as detailed exploration of the sample (FIGS. 13A-13D, FIGS. 16A-16F). Distortions in the unit cell of K-feldspar due to Ca insertion are a likely cause of the cracking effect mentioned above. Indeed, a feature of the dried hydrothermally modified material is that the smallest grains of altered K-feldspar particles showed a non-stoichiometric elemental content, highly deficient in K and enriched in Ca (FIGS. 15A-15B, FIGS. 16A-16F, ESI-EPMA). Regardless of size, no single grain of K-feldspar preserved its original composition, and calcium minerals were observed at the interface between K-feldspar grains and the hydrothermal solution. Without being bound by any particular theory, such phases may originate from the insertion of Ca in the feldspar or by re-precipitation from the solution due to local saturation. In the absence of an alkaline environment, much higher temperatures (600° C.) would be involved to observe a significant exchange between K in the feldspar and alkali ions from the hydrothermal solution. The data presented herein therefore provide evidence that high pH environments are necessary for successful transformation and an exchange of K ions for Ca ions. Assuming for both altered and unaltered K-feldspar the same dissolution rate, and an actual pH of leaching of 12 units (FIG. 27), then the amount of available K would be in the order of 10-200 $ppm_K$, depending on actual surface area of altered K-feldspar. Such an amount is negligible when compared with the data reported in FIGS. 24A-24F, and confirms that altered K-feldspar acts as a major nutrient reservoir for potential long-term release, but is not likely to be responsible for K short-term release. Conversely, mass balance calculations (e.g., based on the conversion shown in FIGS. 4E and 4F) show that the fraction of K in the K-feldspar that was completely converted could provide all the leaching-available K. Such a K is likely to be located in K-substituted phases other than altered K-feldspar, or in the soluble carbonate fraction (solubility of $K_2CO_3$ (25° C.) is 1,110 g $L^{-1}$) not detected by XRPD, but evidenced by EPMA analysis (FIGS. 15A-15B, ESI-EPMA).

Figure 27:
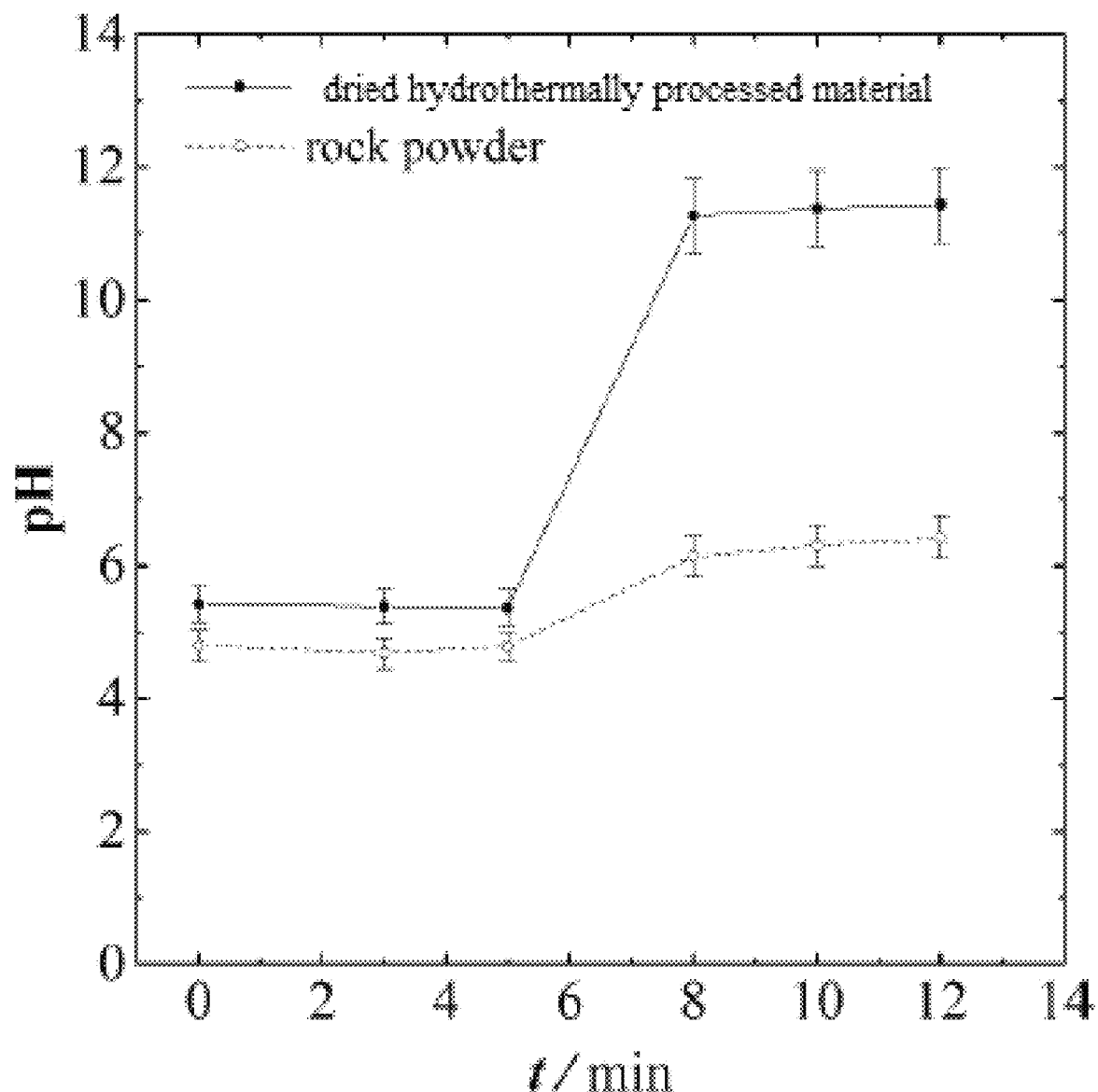
FIG. 27 is a graph of the spontaneous variation of the pH of a solution of $HNO_3$ at an initial nominal pH=5 contacted with either the rock powder (ultrapotassic syenite) or dried hydrothermally modified material at room temperature, according to some embodiments.

The major calcium aluminum-silicate hydrate (C-A-S-H) phase detected by XRPD in the dried hydrothermally modified material was hydrogarnet ($Ca_3Al_2(SiO_4)_{3-x}(OH)_{4x}$; $C_3A_2S_{3-x}H_x$). Within the broader hydrogarnet group, hydrogarnet defines a class of minerals where the inclusion of $4OH^-$ in place of a $SiO_4^{4-}$ tetrahedron occurs, generating grossular (x=0), hibschite (x=0.2-1.5), katoite (x=1.5-3) and their solid solutions. In artificial systems, hydrogarnet is observed in concrete as the only calcium aluminum silicate hydrate, and is often detected as the hydration product of autoclaved materials (Table 2). It appeared as small octahedral-to-round crystals (1.5-4 m). A comparison of micrographs of the dried hydrothermally modified material (FIGS. 14A-14H) with PSD data (FIG. 22) reveals that in these experiments the hydrogarnet phase was mainly in the form of small and round particles in the order of ~1 μm. EPMA analysis showed a content of ~30 wt. % of $SiO_2$ (Table 3; ESI-EPMA), suggesting hibschite rather than katoite, and in agreement with a prevalence of round crystals (FIG. 14g). Note that the $SiO_2$ content is also in relatively good agreement with the theoretical value of 22 wt. % in the plazolite phase used in the Rietveld refinement. Together with K-feldspar, hydrogarnet is the key Al-bearing mineral. In the leaching test, the availability of Al from the dried hydrothermally modified material increased with respect to that of ultrapotassic syenite, although it remained comparable. However, note that the actual leaching pH of the rock powder is ~6 and that of the dried hydrothermally modified material is ~12 (FIG. 27). In this latter case, the availability of Al is therefore maximum, indicating that in soils buffered at acidic pH, Al should be almost completely unavailable. The level of K inclusion in the hydrogarnet crystals was little (Table 3).

The calcium silicate hydrates (C-S-H) were α-dicalcium silicate hydrate (α-$Ca_2(SiO_3OH)(OH)$; α-$C_2SH$), and 11 Å tobermorite ($Ca_5Si_6O_{16}(OH)_2 \cdot 4H_2O$; $C_5S_6H_5$). Hydrothermal synthesis of α-dicalcium silicate hydrate has been reported previously. It usually appears as rectangular tablets, which form above ~150° C. The Ca/Si molar ratio of the feed mixture governs the formation of crystalline α-$C_2SH$ (Ca/Si=2) with respect to that of other poorly crystalline and non-stoichiometric calcium-silicate-hydrate (Ca/Si<1.75). Therefore, α-$C_2SH$ is likely to form in calcium-rich environments, at incipient reaction, whereas tobermorite would form later, as a phase evolving from metastable calcium-silicate-hydrates. Tobermorite has been observed in artificial $CaO$—$SiO_2$-$H_2O$ systems, in temperature ranges of ~80° C. to ~150° C., initial bulk molar composition at Ca/Si=0.8-1.0 and processing times in the order of days. The higher the solubility of the Si source, the lower the crystallinity of the forming tobermorite. Tobermorite can exist as a metastable mineral above 200° C., although xonolite ($Ca_6Si_6O_{17}(OH)_2$; $C_6S_6H_2$) becomes the phase thermodynamically favored. Al accelerates the transformation of calcium-silicate-hydrates into tobermorite, and prevents its conversion to xonolite. The inclusion of $Al^{3+}$ in place of $Si^{4+}$ involves introduction of interlayer ions to maintain electric neutrality, generally $Na^+$, $K^+$ or $Ca^{2+}$, yielding tobermorites with high CEC of ~70 meq/100 g. Several crystal shapes have been reported for tobermorites, including platy, lath-like and fibrous crystals. This latter type was confirmed in this study (FIG. 14b, FIG. 14e). However, K-substituted tobermorites (kalitobermorite) are extremely rare in nature. In the dried hydrothermally modified material tobermorite was 3 wt. % (FIGS. 4E and 4F) and it contained both K and Al (Table 3 ESI-EPMA). Overall, the absolute amount of potassium in tobermorite was small, and in the leaching experiment it was likely masked by the immediately available K component. Lastly, in the dried hydrothermally modified material an additional C-A-S-H phase was observed, likely a poor-to-no crystallinity compound detected as amorphous by XRPD. Such an amorphous phase was shown to have an extremely variable composition (ESI-EPMA). While the content of K and Al was found to be high, its ion-releasing capacity has presently not been established.

Further to XRPD phases, it has been demonstrated that the dried hydrothermally modified material contains carbonaceous species as well (FIGS. 19A-19B, ESI-EPMA). Carbonates are important, since they contribute to regulate the pH properties of the material and can be used to capture atmospheric $CO_2$. In the present work, there are only three possible sources of carbon: i) impurities in the raw material (0.8 wt. % of $CaCO_3$ in the $Ca(OH)_2$ reagent, which is equivalent to 0.12 wt. % in the feed mixture; see Experimental section) ii) atmospheric $CO_2$ in the hydrothermal reactor (negligible) iii) atmospheric $CO_2$ during the drying step (assumed to be 400 ppm throughout the duration of the drying step). It may be possible that carbonation of certain phases, for example KOH formed during drying of the supernatant after processing, occurs ex situ, during production and mounting of the powder in thin section. However, it is more likely that it is indeed the drying step that regulates the formation of carbonates. Given the mineralogical complexity of the material, it is unlikely that K available in solution originates from a single phase, such as soluble carbonates. However, the amount of $K_2CO_3$ that would justify the experimental value of FIGS. 24A-24F, is equivalent to 2.50 wt. % which is sufficiently low to be possibly undetected by XRPD. As demonstrated in ESI-EPMA carbonates formed during processing are actually complex species with a variable atomic ratio K/Ca, and with solubility values not immediately available in the literature. Overall, the leaching setup does not allow discriminating the origin of available K, although the data presented in this study suggest carbonaceous species as a likely responsible. Other nutrient reservoirs such as altered K-feldspar, tobermorite or the amorphous phases are presumed to release K at a slower and possibly a more controllable rate than a soluble ionic species.

Leaching data presented herein (FIGS. 24A-24F) underscore the importance to link nutrient availability to mineral phases, in order to forecast the agricultural performance of the material. Such data show that except for Na and Mg the leached availability from the dried hydrothermally modified material is higher than in the ultrapotassic syenite leached at the same initial pH. For Ca, the availability is not immediately comparable because in the raw material it was available from varietal minerals whereas in the dried hydrothermally modified material it was artificially introduced by addition of $Ca(OH)_2$ to the system. A holistic overview of the dried hydrothermally modified material reveals that K-feldspar exhibited pozzolanic activity, which is a behavior unique to the $[K_2O-Al_2O_3-SiO_2]_{K-feldspar}$-$CaO$-$H_2O$ system. Since such a system is far from thermodynamic equilibrium, it can be driven to intentionally redistribute framework elements into mineral phases that release beneficial nutrients to improve soil fertility.

Figure 34A:
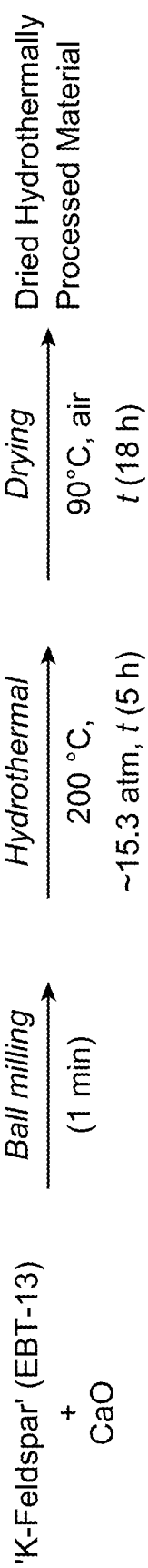
FIG. 34A is a schematic illustration of a process to prepare dried hydrothermally modified materials, according to some embodiments.
Figure 34B:
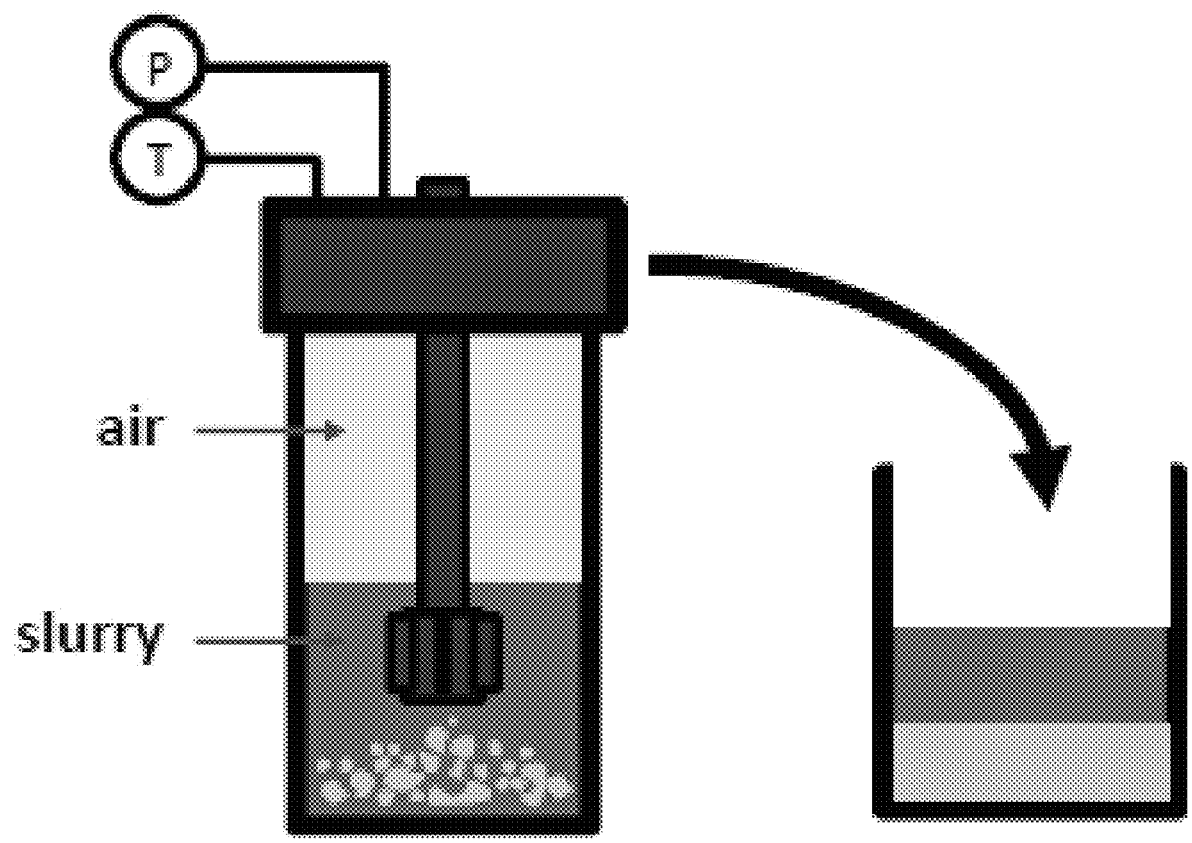
FIG. 34B shows an exemplary hydrothermal reactor used to prepare materials, according to some embodiments.
Figure 34C:
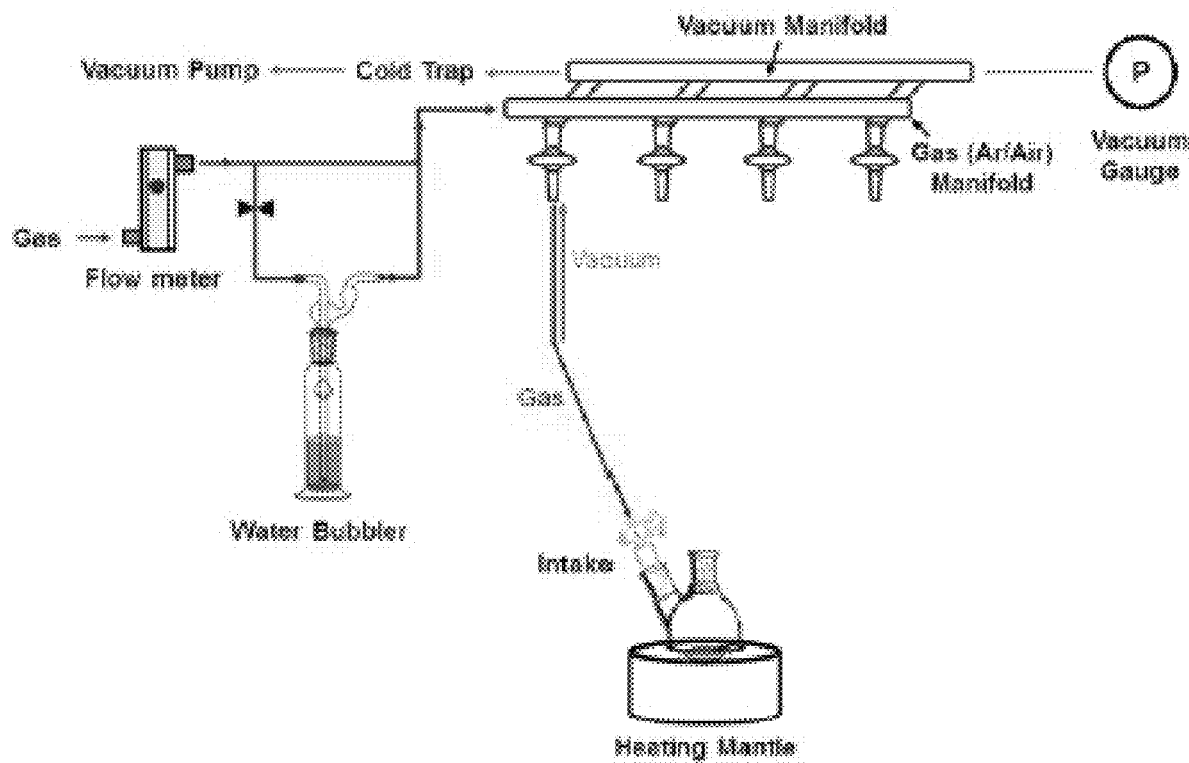
FIG. 34C shows an exemplary drying rig used to prepare materials, according to some embodiments.
Figure 35A:
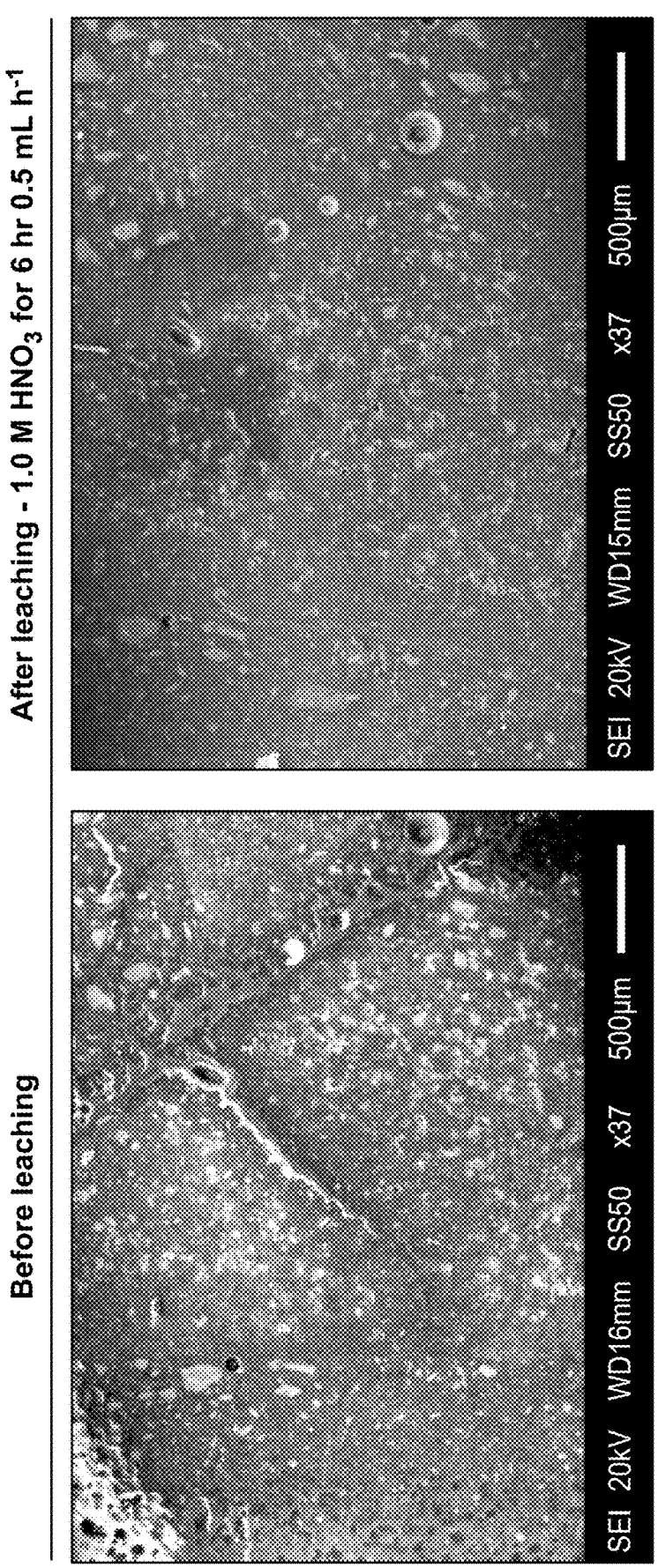
FIG. 35A shows images of a dried hydrothermally modified material before and after a flow leaching process under flow (microfluidic) conditions using 1.0 M $HNO_3$ at a rate of 0.5 mL per hour for 6 hours, according to some embodiments.
Figure 35B:
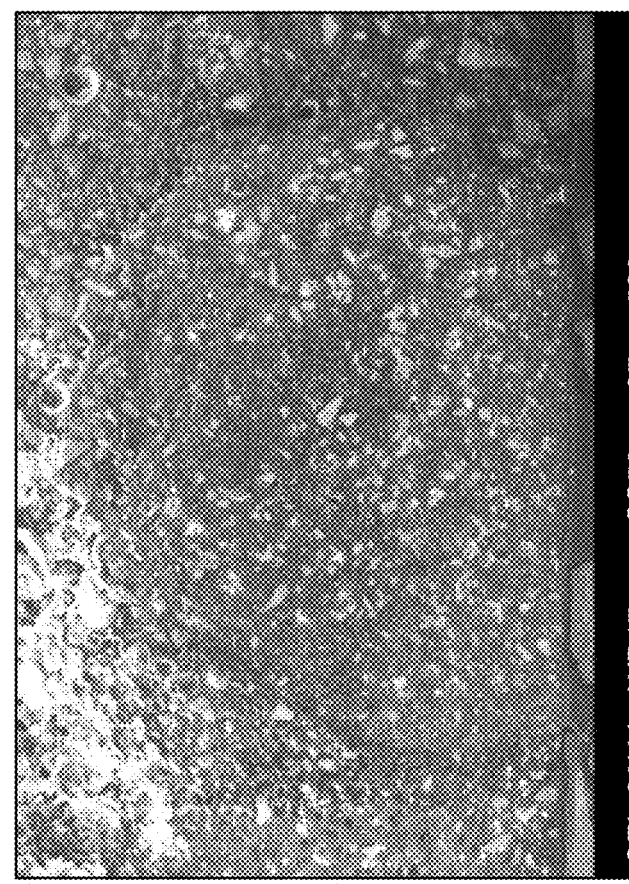
FIG. 35B shows images of a dried hydrothermally modified material before and after a flow leaching process under flow (microfluidic) conditions using pH 5 $HNO_3$ for 4 hours, according to some embodiments.
Figure 35B:
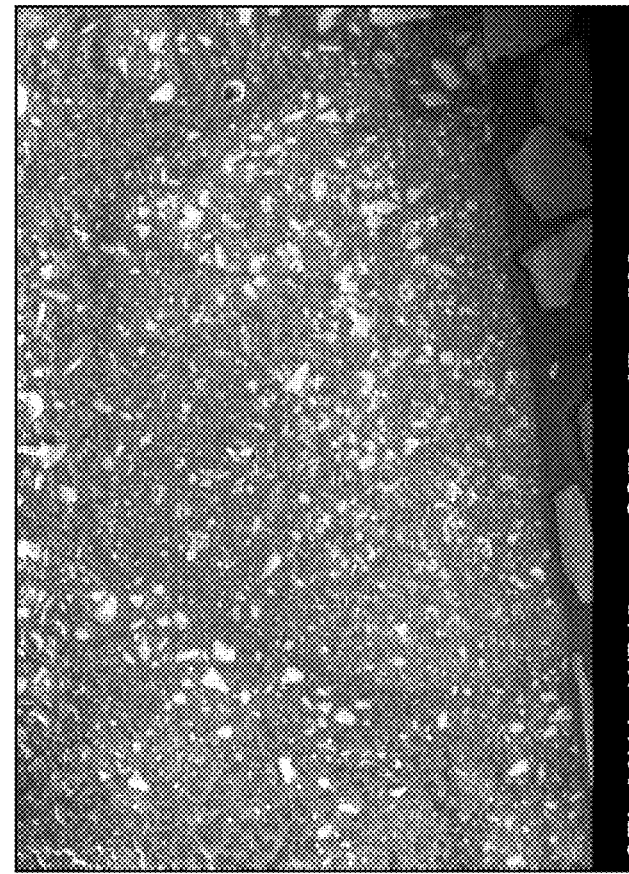
Figure 35C:
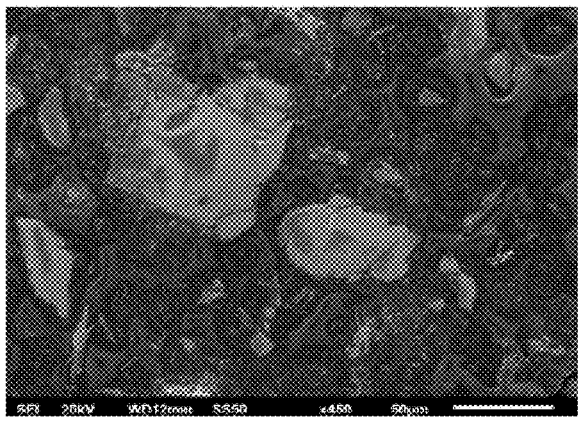
FIG. 35C shows another set of images of a dried hydrothermally modified material before and after the flow leaching process used in FIG. 35B.
Figure 35C:
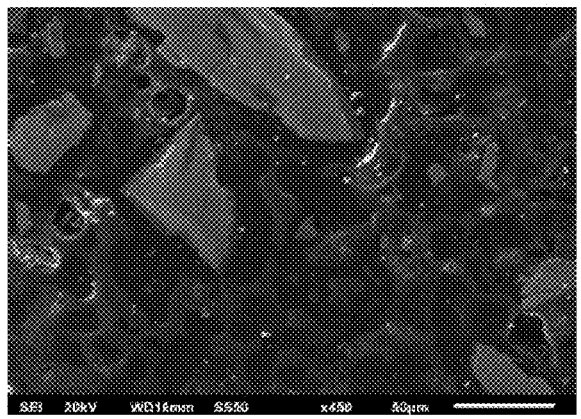
Figure 35C:
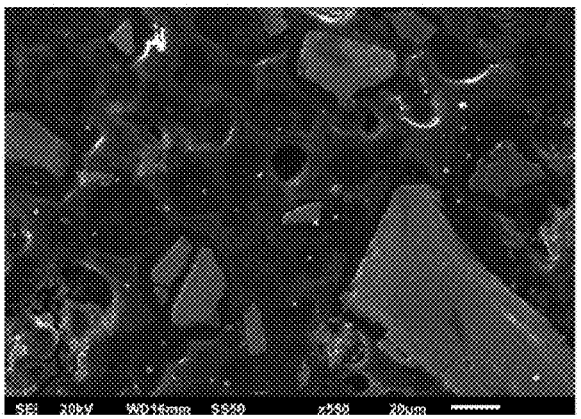
Figure 35D:
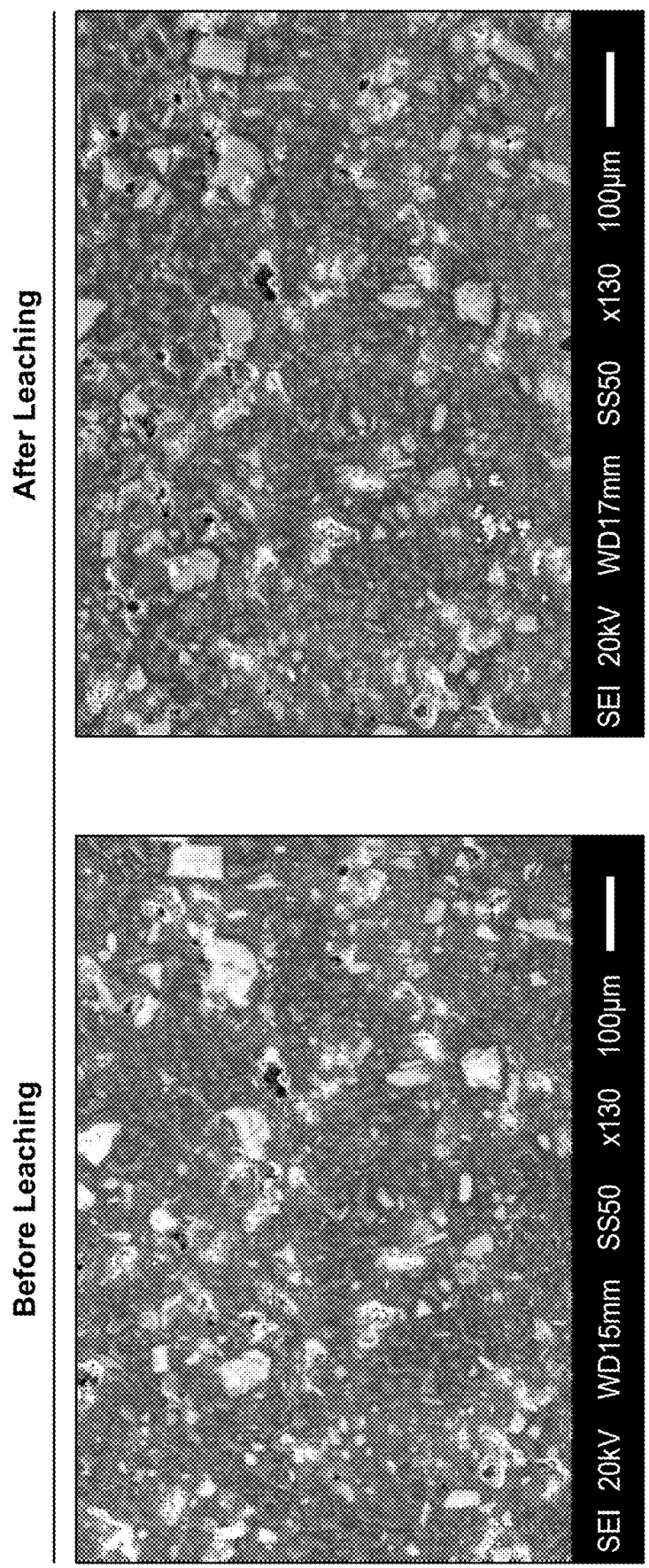
FIG. 35D shows images of a dried hydrothermally modified material before and after a flow leaching process, according to some embodiments.

The following examples (2-8) were carried out under microfluidic conditions according to the parameters and set-up highlighted in FIGS. 34A-C. Hydrothermal processing time (5 h, 16 h, or 24 h), drying conditions (Ar, air, $CO_2$, and vacuum), and Ca/Si feed ratios (0.075, 0.15, 0.3, 0.45, 0.6, and 0.9) were carefully studied for their effect on mineralogy, leaching, pH, and other important properties (i.e., particle size distribution) of the dried hydrothermally modified material. As specified, the hydrothermally modified material was dried with or without supernatant using the drying apparatus depicted in FIG. 34C.

Example 2: Dried Hydrothermally Modified Material Dissolution Under Flow (Microfluidic) Conditions FIGS. 35A-D show the dissolution behavior of the dried hydrothermally modified material under microfluidic conditions. Dried hydrothermally modified material was evaluated before and after leaching. The scanning electron microscope (SEM) images show the calcium-aluminum-silicate-hydrate (CASH) phases dissolve under flow, while the K-feldspar phase does not. Without being bound by any particular theory, it is postulated that this is due to buffered pH rather than the flow itself.

Bulk vs. Flow Leaching of Hydrothermal Powders

Figure 25:
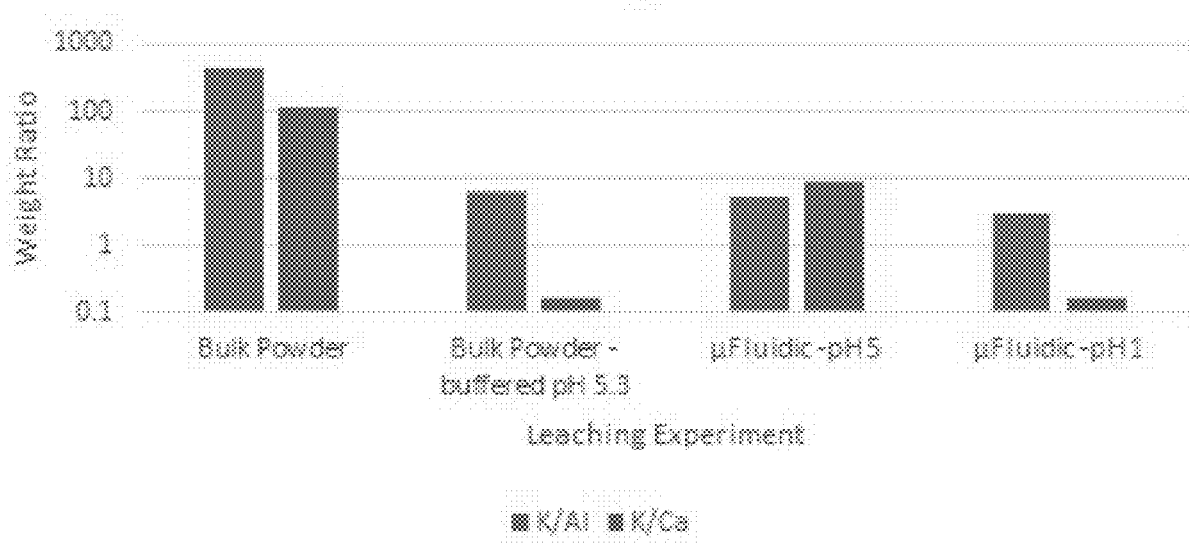
FIG. 25 shows differences in leaching ratios for bulk powder under standard conditions (pH 5 $HNO_3$), acetate buffered conditions (acetate/$HNO_3$, pH 5.3) and microfluidic conditions at pH 5 and pH 1, according to some embodiments.
Figure 26:
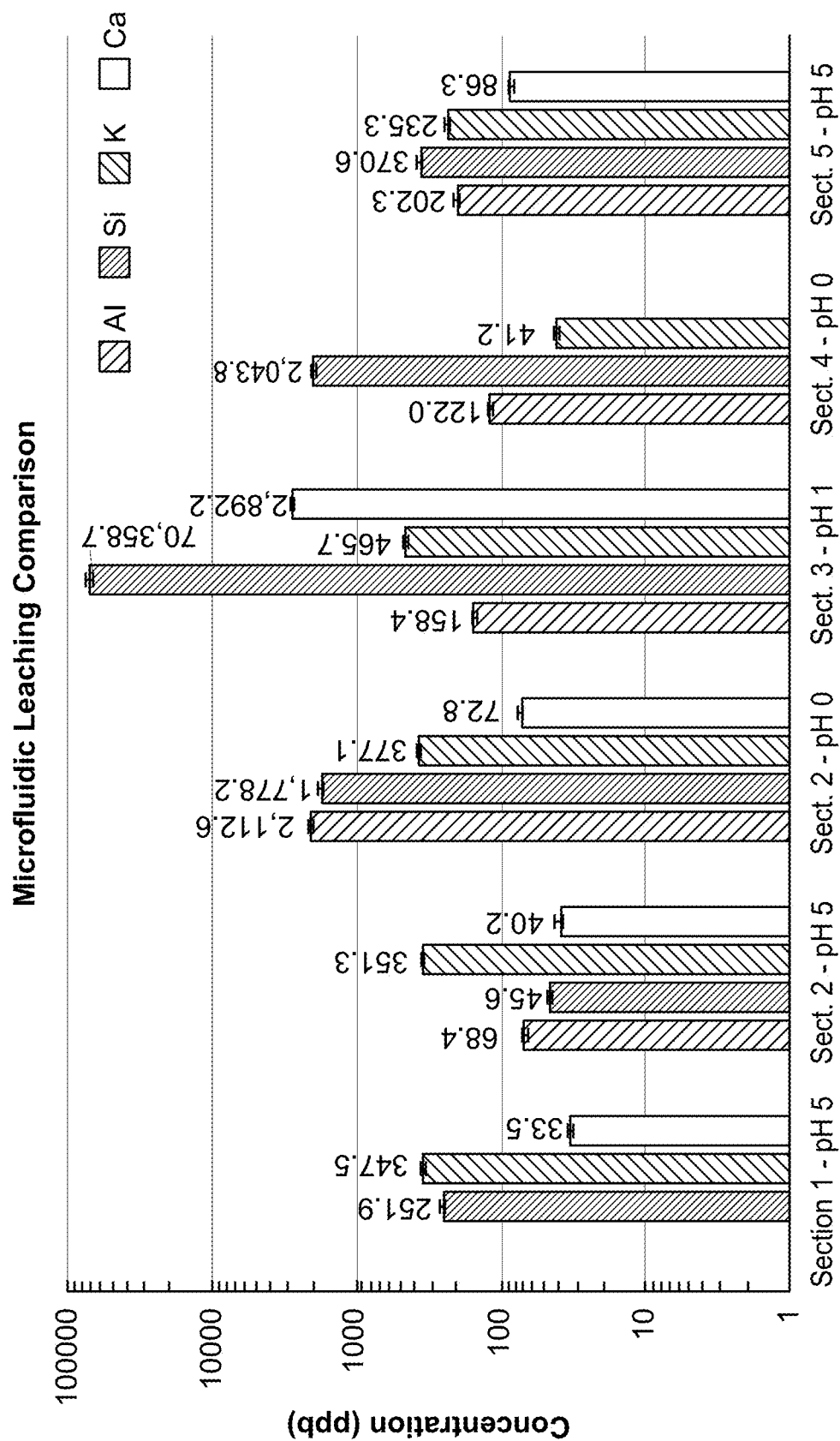
FIG. 26 is a graph comparing the leaching of $K^+$, $Ca^{2+}$, $Al^{3+}$, and Si under microfluidic conditions at different pH values for dried hydrothermally modified material prepared according to the parameters described in FIG. 34A.

FIG. 25 compares bulk leaching (pH 5 $HNO_3$) to leaching using a microfluidic setup, for dried hydrothermally modified materials. At pH 5, the K/Al and K/Ca ratios under flow conditions are significantly diminished compare to the leaching that occurs from the bulk powder under the standard leaching solution. The microfluidic setup also enables the release of the key elements (Al, Si, K, and Ca) to be examined in various sections and pH environments (FIG. 26). This data shows how the release of each element changes as a function of the leaching conditions and underlying mineralogy. In sum, it can be concluded that leaching under bulk conditions differs from leaching under flow conditions.

Example 3: Effect of Processing and Drying Conditions on the Dried Hydrothermally Modified Material K-Release from Dried Hydrothermally Modified Material Under Different Drying Conditions Leaching experiments were carried out as follows: 300 mg of hydrothermally modified material were suspended in 3 mL of pH 5 $HNO_3$ solution (done in triplicate). Samples were then agitated at ambient temperature for 24 h. Leaching of minerals was determined by ICP-MS under acidic conditions (0.1 N $HNO_3$). pH measurements were performed in triplicates in vials separate from the leaching samples, which were prepared under the same conditions as the aforementioned leaching experiment. The $pH_{t=0}$ was recorded within 3 minutes of when the liquid made contact with the material. The $pH_{t=24}$ was recorded subsequent to the 24 h agitation. Except where noted, hydrothermally modified materials were processed at 200° C. and dried under the specified conditions at 110-120° C.

A series of dried hydrothermally modified materials was produced using four distinct sets of atmospheric conditions (Ar-Ar, Ar-Air, Air-Air, and $CO_2$-$CO_2$) for reacting the feedstocks and subsequently drying the resulting products.

Figure 5:
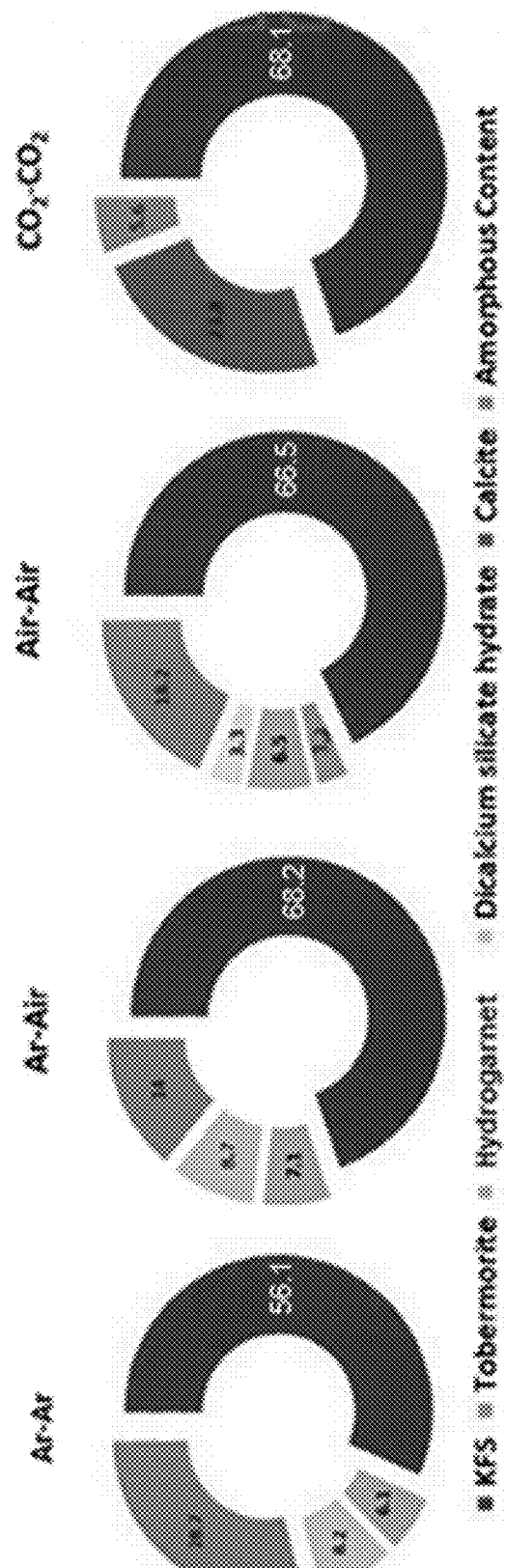
FIG. 5 shows the composition of dried hydrothermally modified materials including Ar-Ar, Ar-Air, Air-Air, and $CO_2$-$CO_2$, under different processing atmospheres for the hydrothermal step and drying step, according to some embodiments.
Figure 6A:
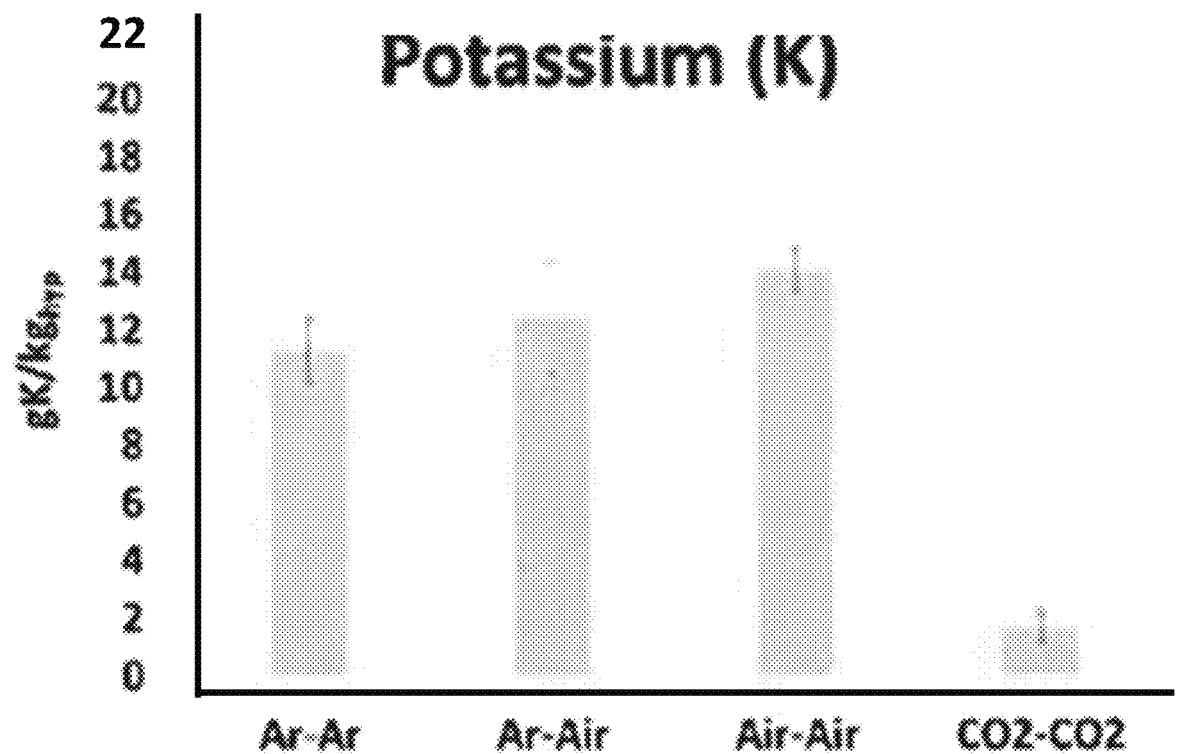
FIG. 6A shows a bar graph for potassium (K) demonstrating the effect of the processing atmosphere on leaching from a dried hydrothermally modified material when the hydrothermal step was carried out at 200° C. for 5 h, according to some embodiments.
Figure 6B:
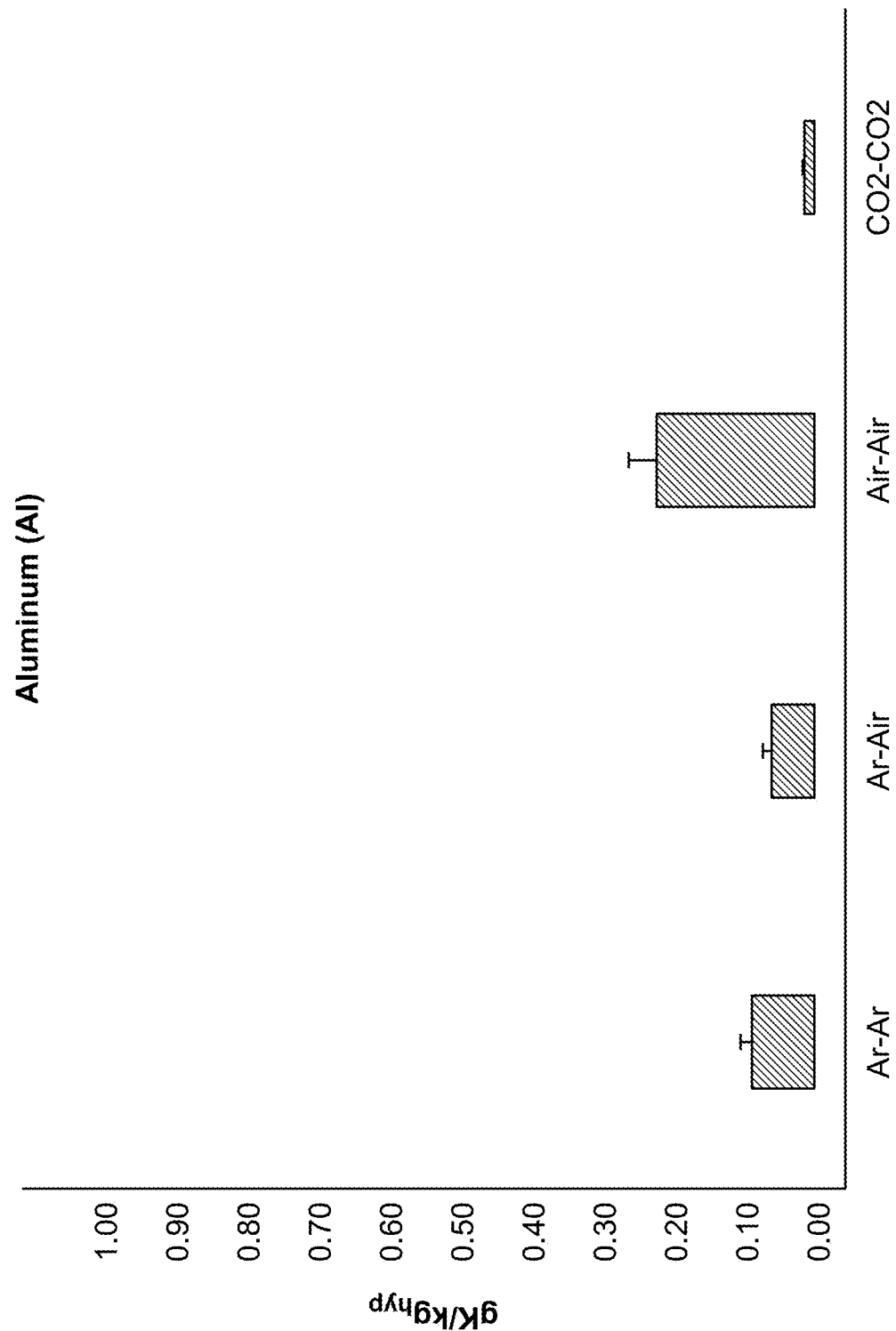
FIG. 6B shows a bar graph for aluminum (Al) demonstrating the effect of the processing atmosphere on leaching from a dried hydrothermally modified material when the hydrothermal step was carried out at 200° C. for 5 h, according to some embodiments.
Figure 6C:
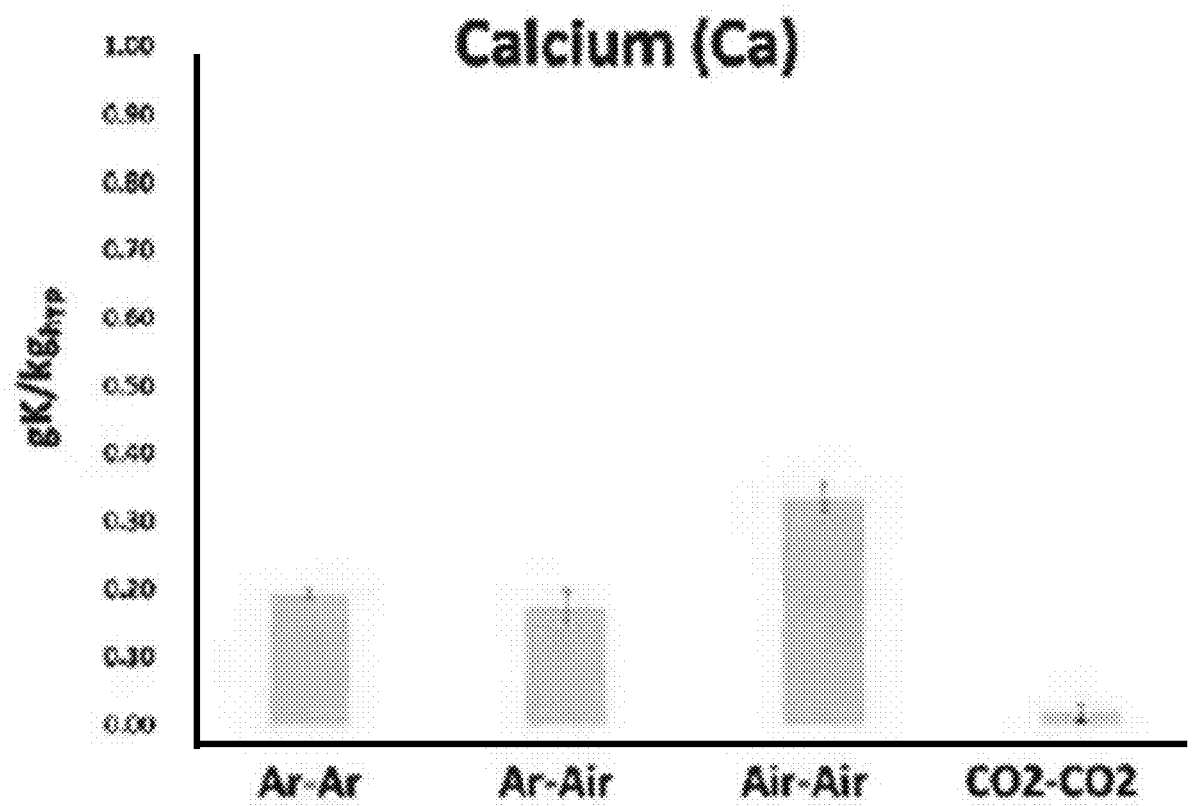
FIG. 6C shows a bar graph for calcium (Ca) demonstrating the effect of the processing atmosphere on leaching from a dried hydrothermally modified material when the hydrothermal step was carried out at 200° C. for 5 h, according to some embodiments.
Figure 6D:
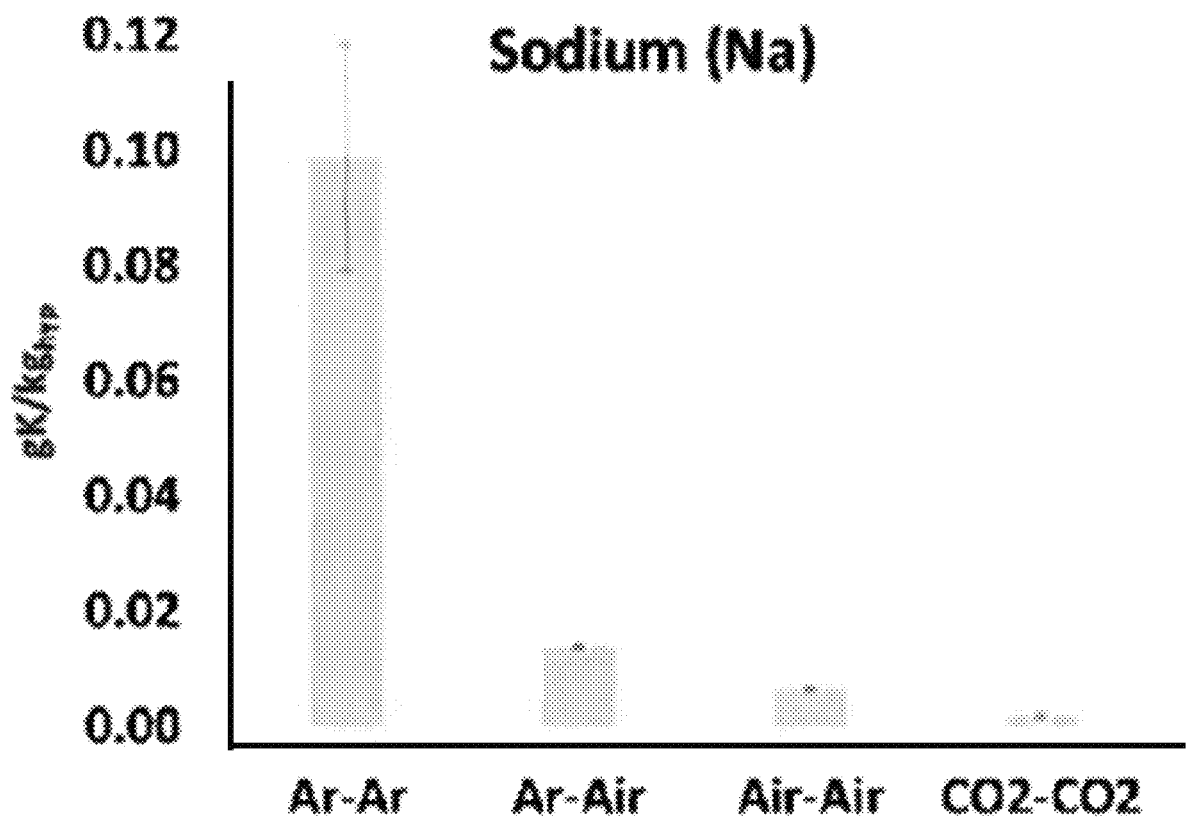
FIG. 6D shows a bar graph for sodium (Na) demonstrating the effect of the processing atmosphere on leaching from a dried hydrothermally modified material when the hydrothermal step was carried out at 200° C. for 5 h, according to some embodiments.
Figure 6E:
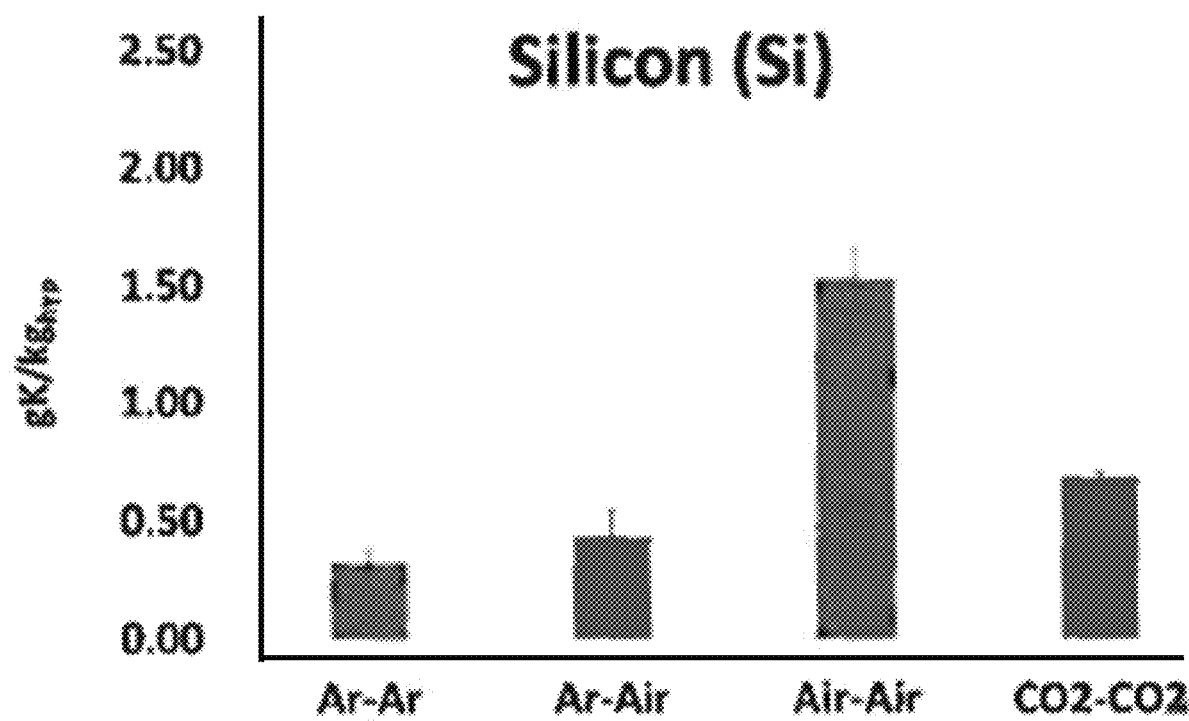
FIG. 6E shows a bar graph for silicon (Si) demonstrating the effect of the processing atmosphere on leaching from a dried hydrothermally modified material when the hydrothermal step was carried out at 200° C. for 5 h, according to some embodiments.

It is evident from FIG. 5 (and Table 4 below) that altering the processing and drying atmosphere markedly impacts the composition of the dried hydrothermally modified material produced. In particular, the amount of the amorphous phase, dicalcium silicate hydrate, hydrogarnet, tobermorite, and K-feldspar vary under each set of conditions. Under an Ar-Ar atmosphere, K-feldspar (Kfs) exhibits the highest conversion to products with only 56% of Kfs remaining after process completion. That leaves nearly 29% of the composition identified as an amorphous phase. Both Ar-Ar and Ar-Air also contain an 8-9% dicalcium silicate hydrate phase, a phase that is noticeably absent in the other two sets of conditions. $CO_2$-$CO_2$ results in the lowest conversion of Kfs and a dried hydrothermally modified material with substantially reduced amorphous content.

TABLE 4

Composition of Dried Hydrothermally Modified Materials Under Different Processing Atmospheres for the Hydrothermal Step and Drying Step

| Atmosphere | Ar-Ar | Ar-Air | Air-Air | $CO_2$-$CO_2$ |
|---|---|---|---|---|
| Kfs | 56.1 | 68.2 | 66.5 | 68.1 |
| Tobermorite |  |  | 7.2 |  |
| Hydrogarnet | 6.1 | 7.1 | 6.5 |  |
| Dicalcium silicate hydrate | 8.2 | 8.7 |  |  |
| Calcite |  |  |  | 23.8 |
| Amorphous content | 28.7 | 14 | 18.2 | 5.6 |

In addition, the hydrothermal processing and drying atmospheres alter the leaching properties of dried hydrothermally modified materials (FIGS. 6A-6E). At 200° C. for 5 h, Air-Air conditions provides a higher level of release of potassium, aluminum, silicon, and calcium. Only for sodium is the release diminished compared to the other options.

Further studies were conducted to isolate the effects of the drying conditions on leaching of potassium from two sets of dried hydrothermally modified materials. For the first set, the dried hydrothermally modified material was dried with the supernatant separately using air, Ar, $CO_2$, and vacuum. As shown in FIG. 7B, K-release is highest under Ar conditions and lowest when $CO_2$ is utilized. Application of vacuum between $10^{-2}$-$10^{-3}$ Torr also provides substantial release of $K^+$ from the dried hydrothermally modified material. Drying with air provides an intermediate value, clearly indicating that the small amount of $CO_2$ naturally present has little impact on leaching. In these experiments, K-release was found to be independent of drying temperature (<90° C.).

A similar trend was observed in solid samples dried after removal of the supernatant (FIG. 7B). Potassium leaching was again was lowest when $CO_2$ was used to dry the dried hydrothermally modified material. The aggregate data highlight that solid samples are sensitive to carbonation, such that $CO_2$/carbonate equilibria in the soil will likely be crucial to long-term operation of field samples.

Figure 7A:
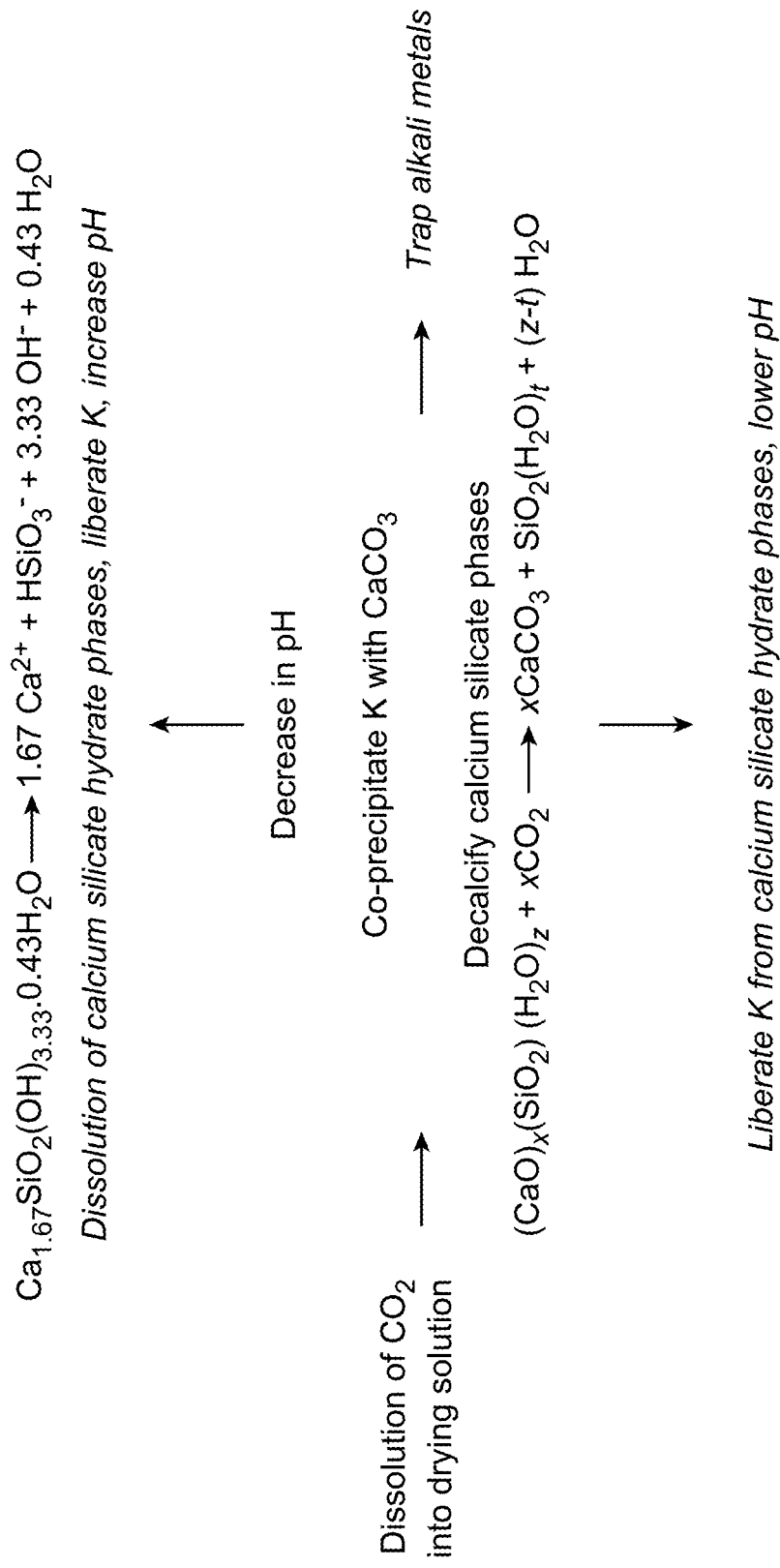
FIG. 7A is a schematic showing reaction pathways and implications for leaching mineralogy that result from drying hydrothermally modified materials under a carbon dioxide atmosphere, according to some embodiments.
Figure 7B:
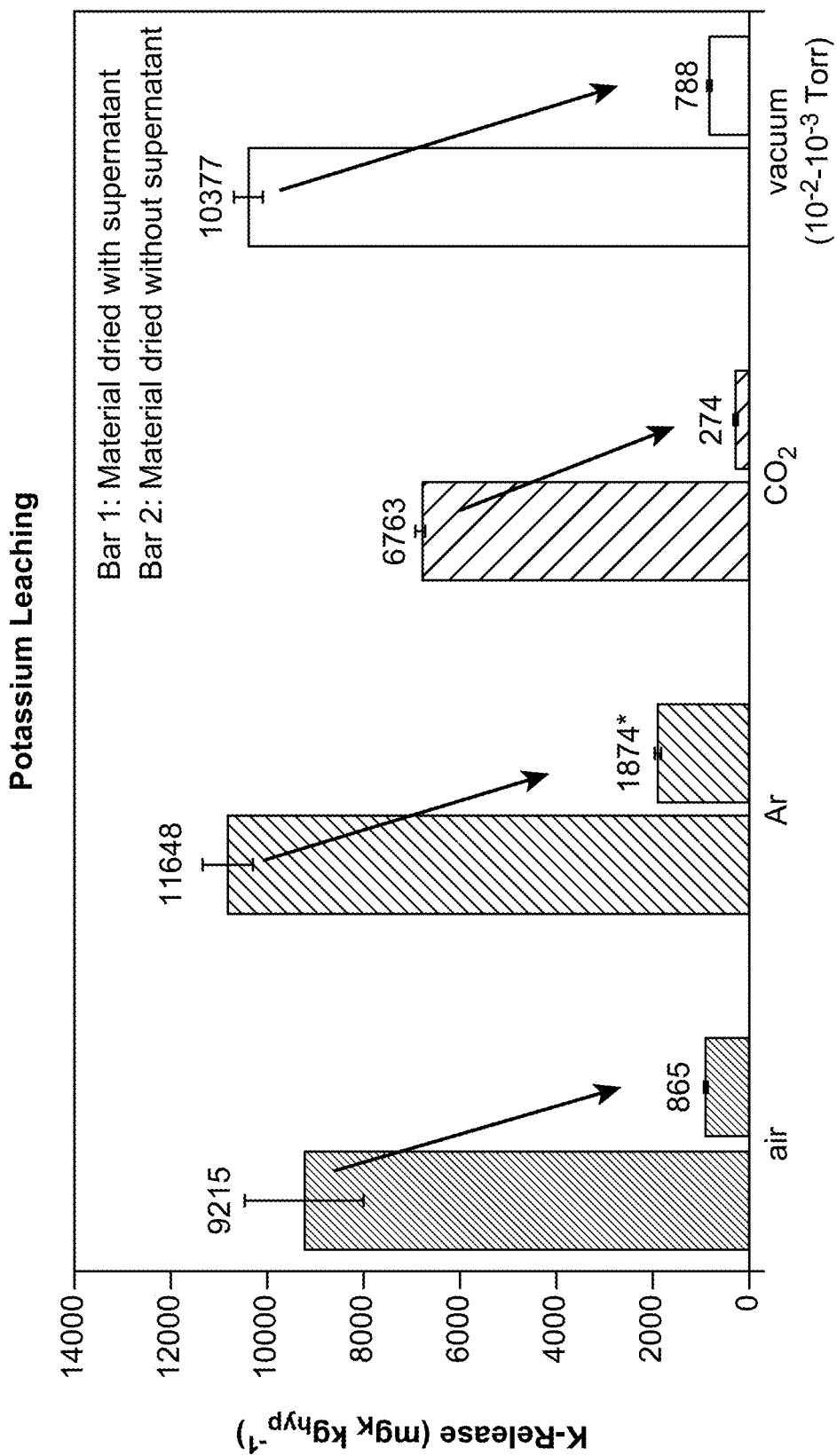
FIG. 7B show the leaching of potassium under either air, argon (Ar), carbon dioxide ($CO_2$), or vacuum drying and for which data has been provided to show the different between drying with supernatant phase versus drying after removing supernatant phase, according to some embodiments.

FIG. 7A provides a rationale for the above-noted behavior. Without being bound by any particular theory, dissolution of $CO_2$ into the drying solution can possibly lead to co-precipitation of potassium with $CaCO_3$ (presumably K-substituted $CaCO_3$). Sequestration of potassium in a mineral phases ultimately reduces the extent of leaching possible.

Support for possible K-trapping is provided by a study of the hydrothermally modified material dried under air, Ar, or $CO_2$ (Table 5). In contrast to the other atmosphere conditions, a significant calcite phase is precipitated (14% by wt.) when samples are dried with $CO_2$. Since the lattice parameters in the dried hydrothermally modified material are greater than the reference (ionic radius of $K^+>Ca^{2+}$) it is reasonable that the potassium is co-precipitated with $CaCO_3$ in a poorly soluble phase designated by $K_{2x}Ca_{(1-x)}CO_3$. In addition, the presence of a greater fraction of amorphous phase may indicate the occurrence of amorphous $CaCO_3$.

TABLE 5

Mineralogy of Dried hydrothermally modified Materials Produced via Different Drying Conditions.

| Phase | Phase weight fraction | | |
|---|---|---|---|
| | air | Ar | $CO_2$ |
| Alkali feldspar | 0.57 | 0.64 | 0.51 |
| Tobermorite | 0.06 | 0.03 | 0.03 |
| α-$C_2S$ | 0.00 | 0.06 | 0.00 |
| Hydrogrossular | 0.12 | 0.09 | 0.08 |
| Biotite + $CO_2$** | 0.07 | 0.07 | 0.00 |
| Calcite | 0.01 | 0.00 | 0.14 |
| Amorphous | 0.16 | 0.11 | 0.21* |

Figure 7C:
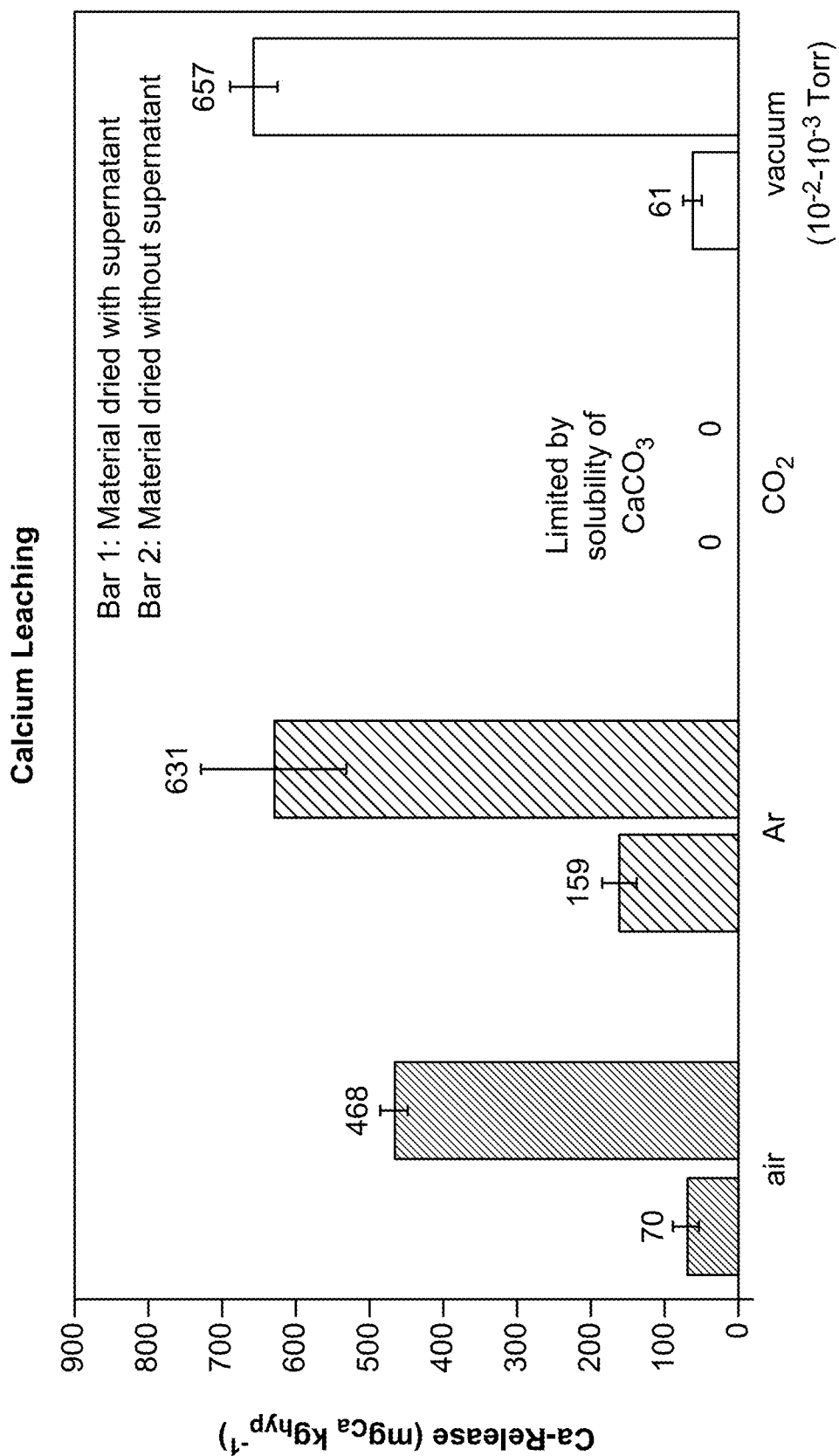
FIG. 7C show the leaching of calcium under either air, argon (Ar), carbon dioxide ($CO_2$), or vacuum drying and for which data has been provided to show the different between drying with supernatant phase versus drying after removing supernatant phase, according to some embodiments.

*Possible occurrence of amorphous $CaCO_3$
**Mass of $CO_2$ obtained from calcite in $CO_2$-dried sample In contrast to potassium, Ca-release increased substantially in hydrothermally modified materials dried without supernatant (FIG. 7C). The highest amount of leaching occurred using vacuum to dry the material, although similar levels were obtained with argon. No measurable leaching of calcium occurred from material dried with $CO_2$, possible due to the limited solubility of a $CaCO_3$-bearing phase.

Figure 7D:
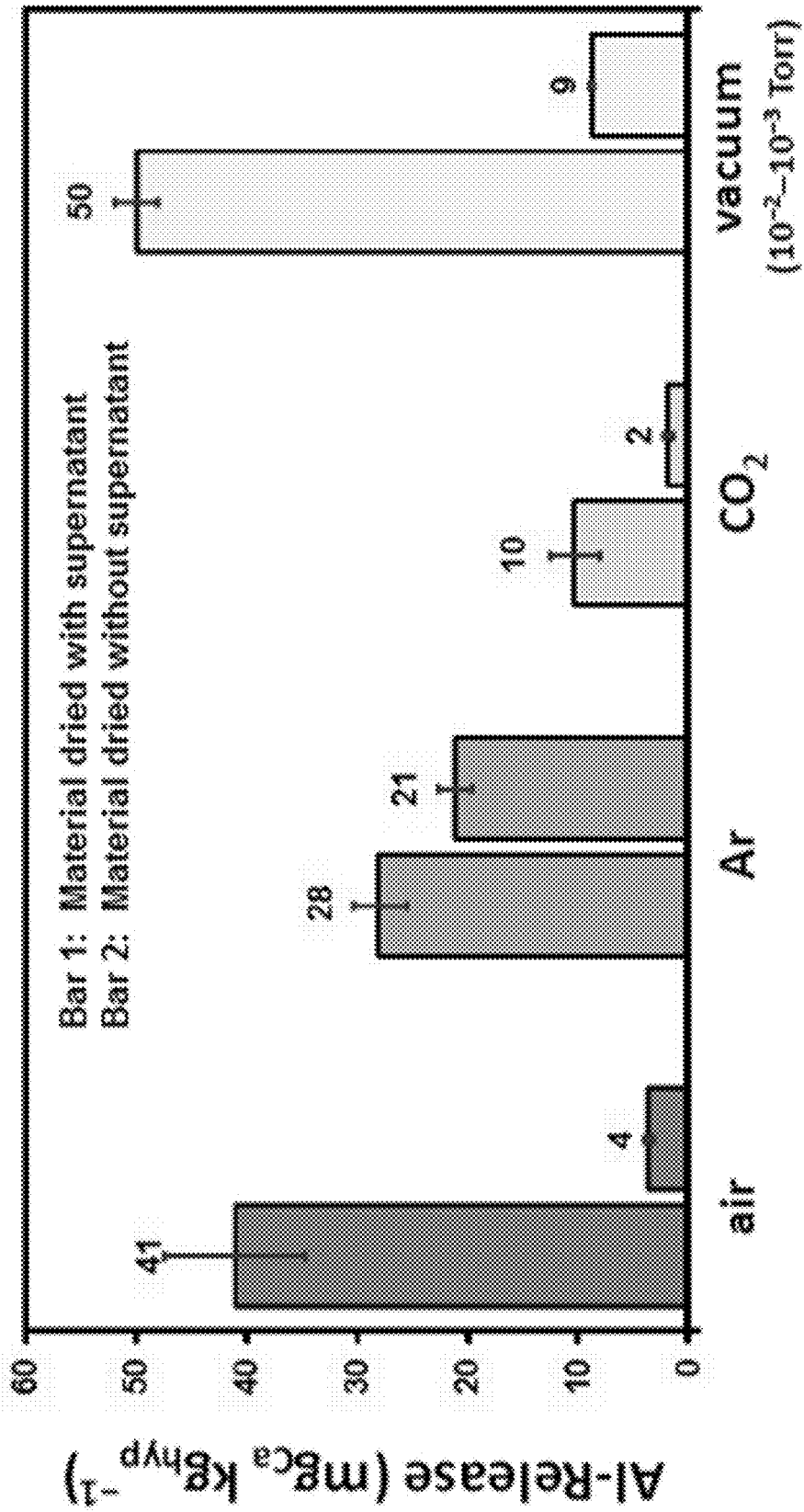
FIG. 7D show the leaching of aluminum under either air, argon (Ar), carbon dioxide ($CO_2$), or vacuum drying and for which data has been provided to show the different between drying with supernatant phase versus drying after removing supernatant phase, according to some embodiments.

The leaching of aluminum was also determined for hydrothermally modified material dried under different atmospheres (FIG. 7D). Across all the sets of conditions, leaching was highest for material dried with supernatant, although the difference in magnitude was variable. Vacuum drying provided the most Al-release, followed by air, argon, and $CO_2$. Effect of Drying Conditions on Sample pH.

Whereas the hydrothermally modified samples dried together with supernatant show no change in pH at the 24 h time point when dried with air, Ar, $CO_2$, or vacuum, changes in pH are observed with hydrothermally modified material samples dried after removal of the supernatant by vacuum filtration. Interestingly, basicity tends to increase with air, Ar, and vacuum, but tends to decrease when the hydrothermally modified material is dried with $CO_2$ (Table 6).

TABLE 6 pH of Samples Dried Under Different Conditions With and Without Supernatant.

| Samples dried w/supernatant | air | Ar | $CO_2$ | Vacuum |
|---|---|---|---|---|
| Leaching $pH_{t=0}$ | 12.2 | 12.3 | 12.3 | 12.3 |
| Leaching $pH_{t=24h}$ | 12.4 | 12.4 | 12.2 | 12.3 |

| Samples dried w/o supernatant | air-solid | Ar-solid | $CO_2$-solid | Vacuum-solid |
|---|---|---|---|---|
| Leaching $pH_{t=0}$ | 11.3 | 11.6 | 11.8 | 11.5 |
| Leaching $pH_{t=24h}$ | 11.9 | 12.3 | 10.8 | 12.1 |

These pH and potassium leaching results are consistent with the proposed calcium-silicate-hydrate (C-S-H) reaction shown in FIG. 7A (top reaction). Upon dissolution of $Ca_{1.67}SiO_2(OH)_{3.33}\cdot 43H_2O$ phase, hydroxide ions are produced that effectively increase the pH level. At the same time, potassium is liberated from the C-S-H phase leading to the observed levels of leaching. In contrast, in the presence of $CO_2$, a C-S-H carbonation reaction occurs (FIG. 7A, bottom reaction). Decalcification of the C-S-H phase provides a mechanism for potassium release, while also causing a tendency towards a reduction in basicity (pH 11.8→pH 10.8). Formation of $xCaCO_3$ also explains why calcium leaching is minimized or does not occur when solid samples are dried with $CO_2$ (FIG. 7C).

The leaching of other minerals is also impacted by pH. Aluminum-release, for example, tracks with pH in samples dried without supernatant. Ar with pH 12.3 provides for the highest release of Al, while $CO_2$ with pH 10.8 releases the lowest amount of Al (FIG. 7D).

In summary, the solid phase appears to be quite sensitive to carbonation. Carbonation has multiple effects on the dried hydrothermally modified material. Leaching is possibly reduced through trapping of K in $K_{2x}Ca_{(1-x)}CO_3$ phases. Drying with $CO_2$ also causes a decrease in alkalinity, possibly lowering the buffering capacity of the dried hydrothermally modified material. Under these conditions, calcium is released into solution through dissolution of minerals. When air, Ar, or vacuum is utilized for drying, the dried hydrothermally modified material has a pH buffering capacity. Compatibility with additives and composite materials is therefore be considered. However, the ability to tune pH as a function of drying atmosphere facilitates the use of these dried hydrothermally modified materials for soil remediation, or for the production of alkali solutions for several types of industries/applications, including but not limited to, geopolymer, waterglass, colloidal silica, and $KOH/K_2CO_3$ solutions.

Figure 8:
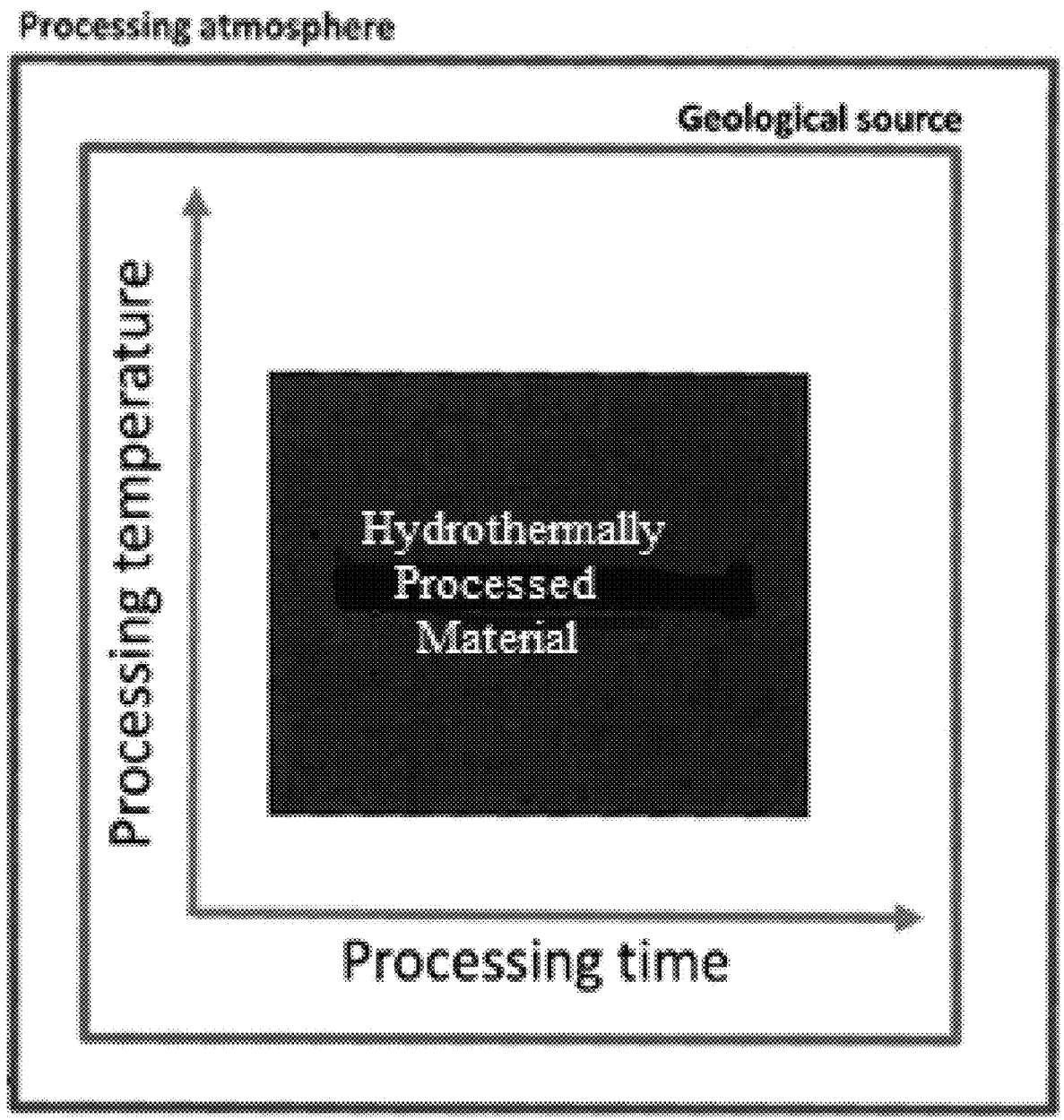
FIG. 8 depicts a schematic representation of the hydrothermal processing variables (atmosphere, time, and/or temperature) used to tune the mineralogy of the hydrothermally modified material, according to some embodiments.
Figure 9A:
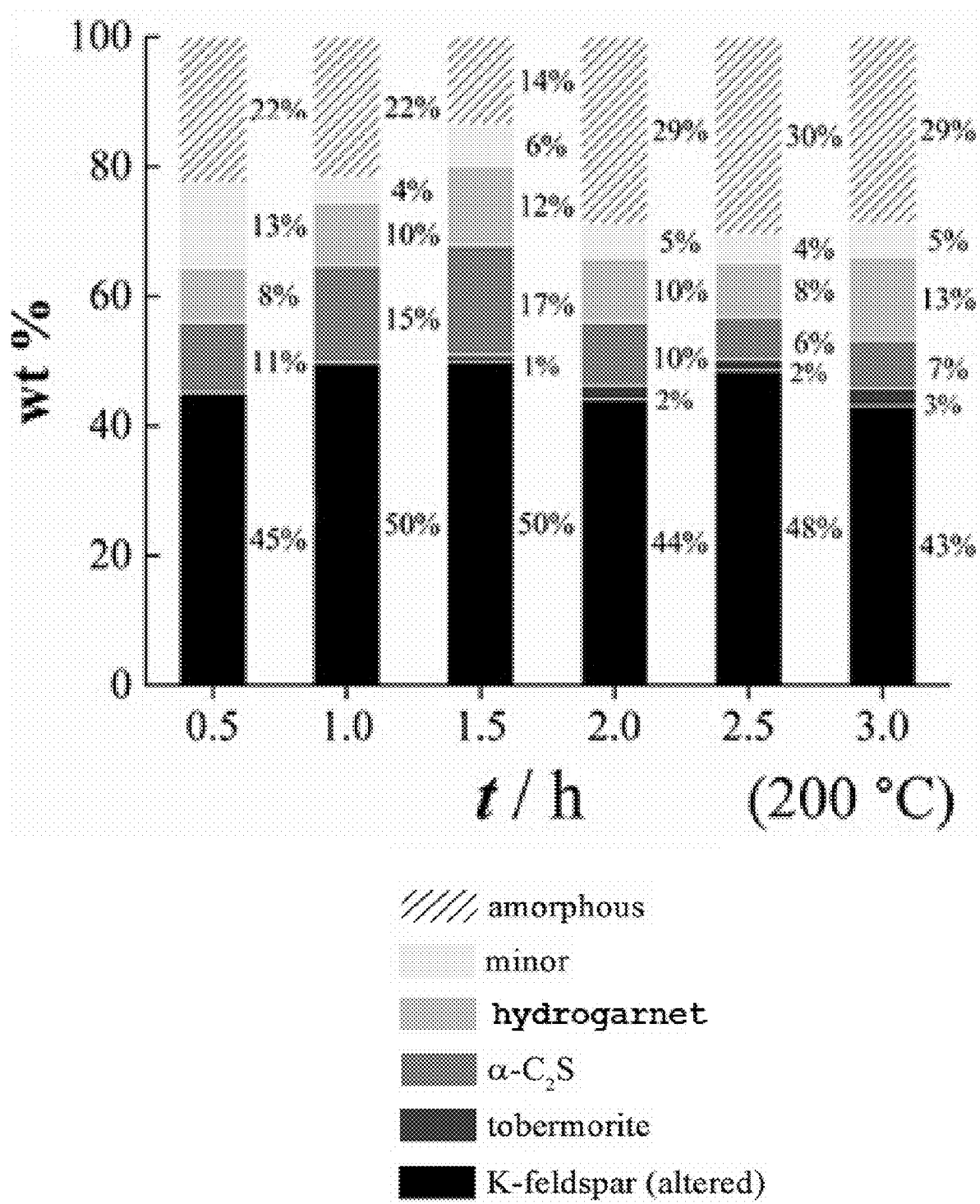
FIG. 9A shows a stacked bar chart of the mineral phases of the dried hydrothermally modified material according to XRD as a function of the hydrothermal processing time (t) at a temperature (T) of 200° C., according to some embodiments.
Figure 9B:
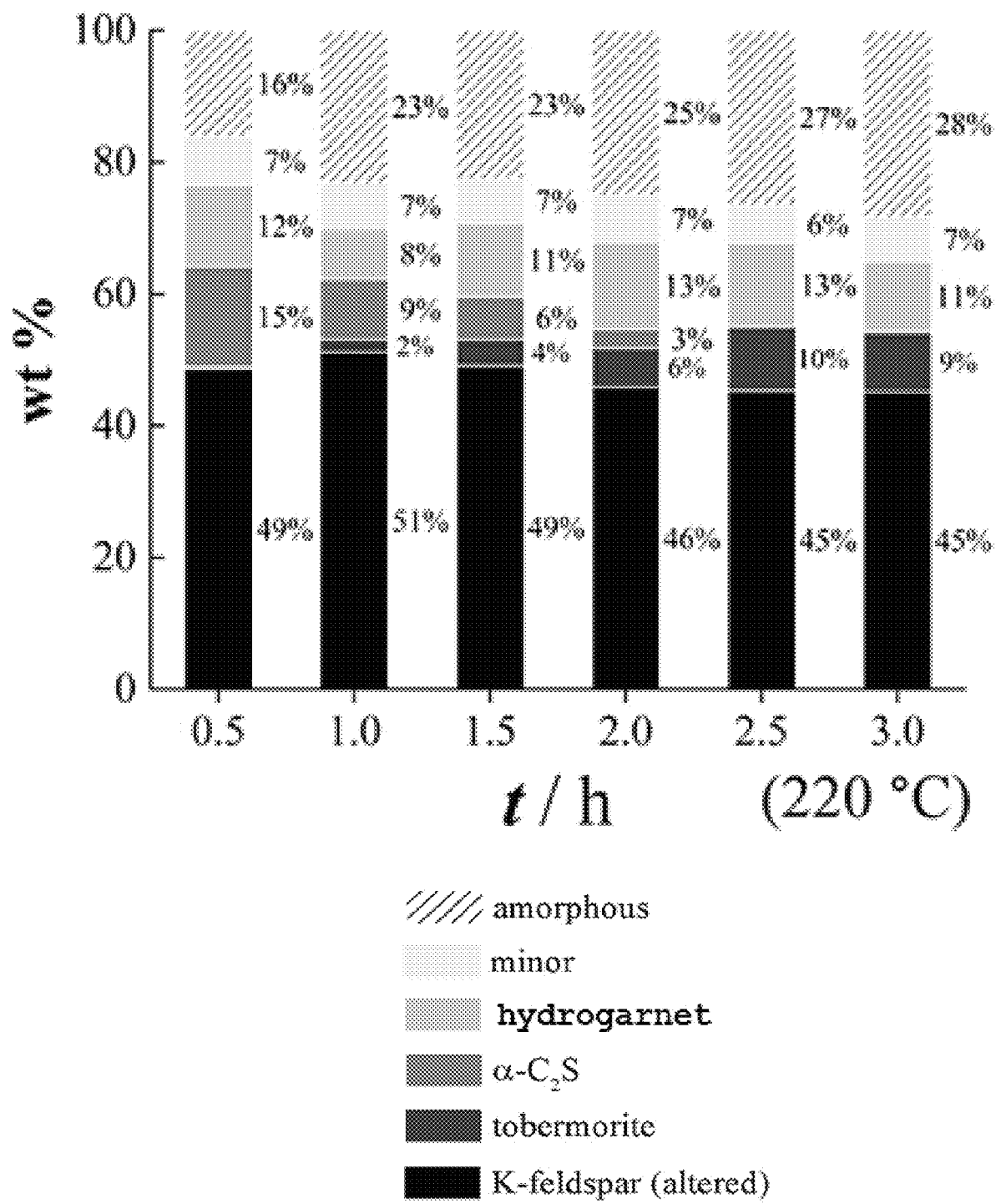
FIG. 9B shows a stacked bar chart of the mineral phases of the dried hydrothermally modified material according to XRD as a function of the hydrothermal processing time (t) at a temperature (T) of 220° C., according to some embodiments.
Figure 9C:
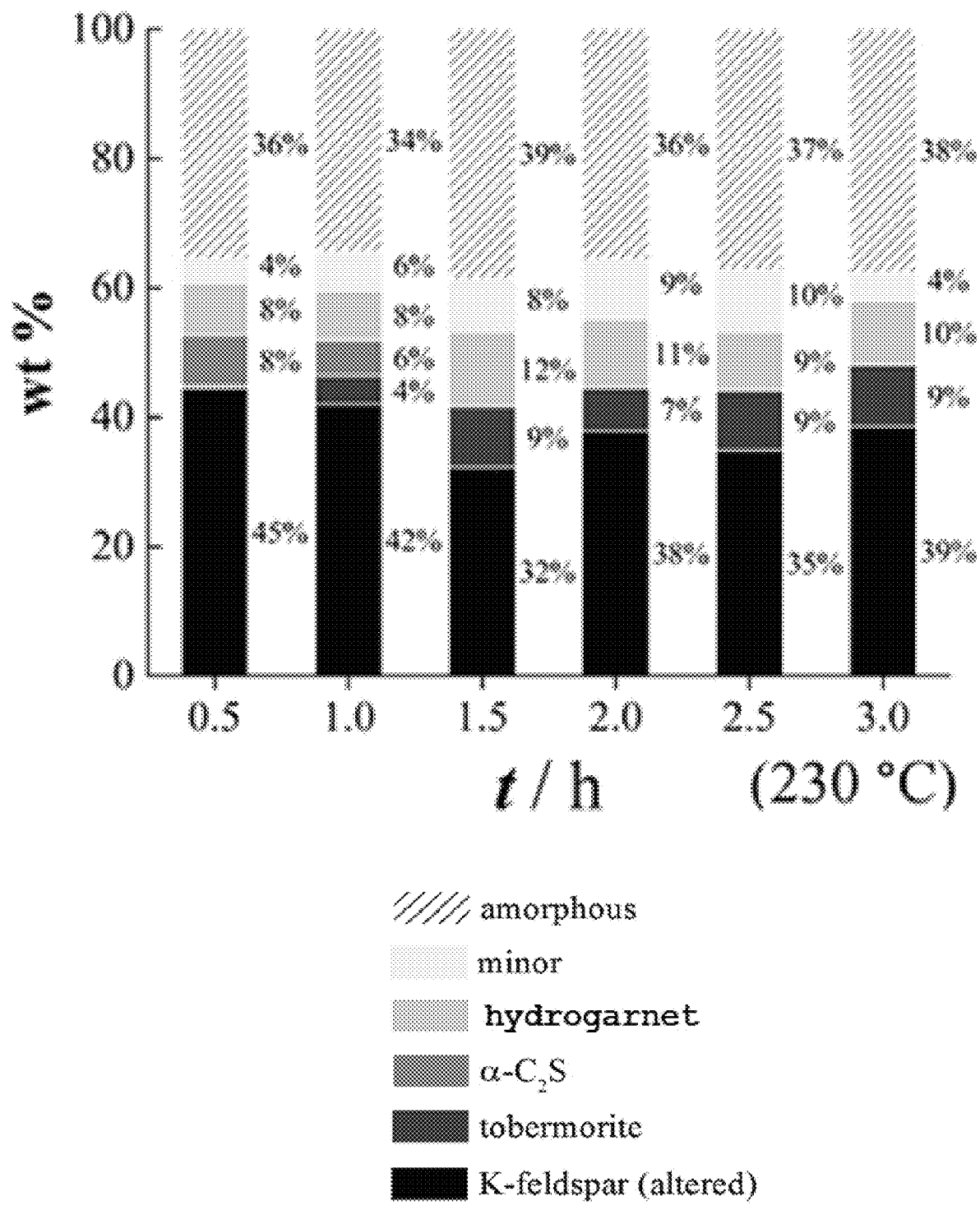
FIG. 9C shows a stacked bar chart of the mineral phases of the dried hydrothermally modified material according to XRD as a function of the hydrothermal processing time (t) at a temperature (T) of 230° C., according to some embodiments.

Example 4: Time and Temperature Dependence of the Dried Hydrothermally Modified Material Both time (t) and temperature (T) are hydrothermal processing variables found to impact the composition of the dried hydrothermally modified material (FIG. 8). For instance, raising the temperature from 200° C. to 230° C. for durations of 0.5 h, 1.0 h, 1.5 h, 2.0 h, 2.5 h, and 3.0 h, not only improves conversion of K-feldspar, but also increases the amount of amorphous phase that is present (FIGS. 9A-9C). Tobermorite, a calcium silicate that is K-substituted, was found to also increase as processing time increased. Hydrogarnet, on the other hand, remains constant regardless of the changes to the variables. A minor component that is the sum of minor phases, i.e., albite, biotite, panunzite, is typically present in less than 10%.

Figure 9D:
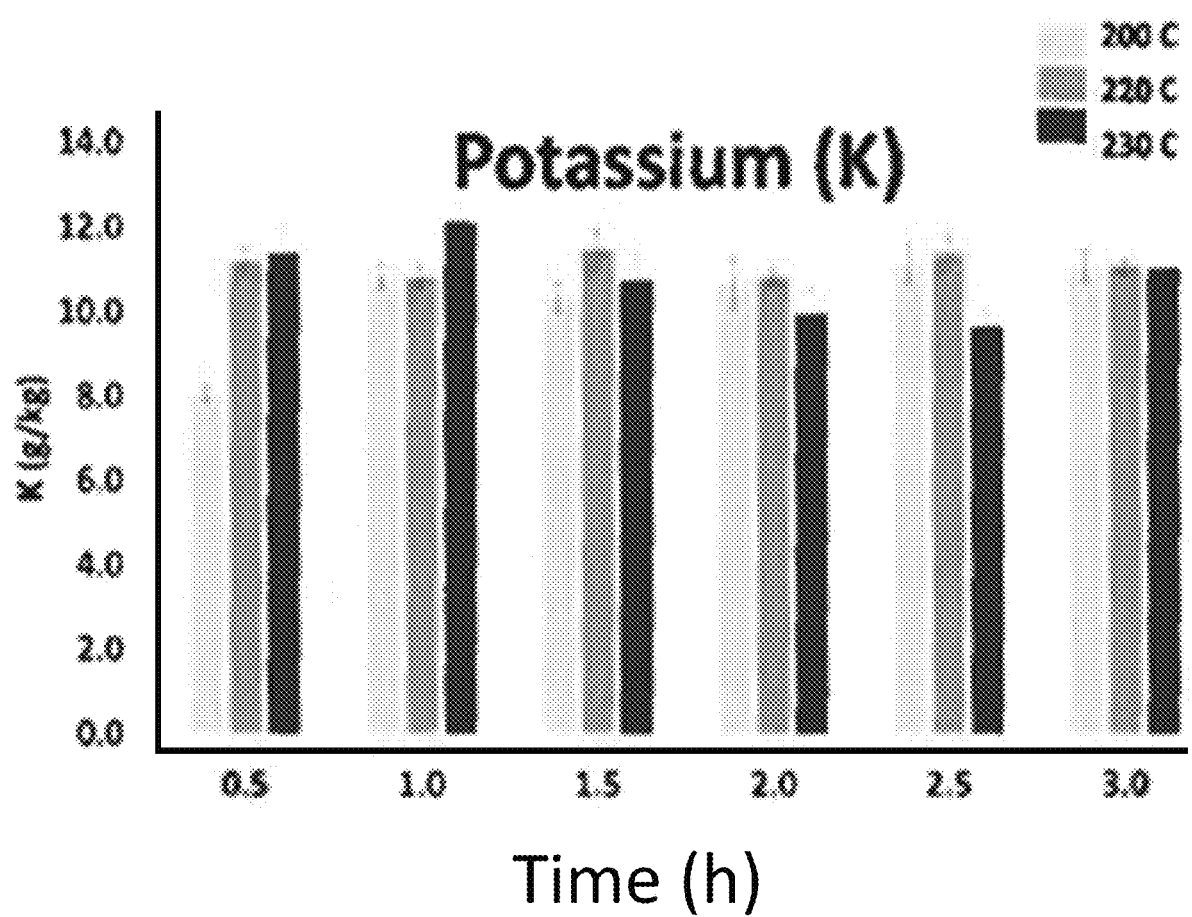
FIG. 9D shows a bar graph of potassium (K) leaching as a function of the hydrothermal processing time (t) and temperature (T), according to some embodiments.
Figure 9E:
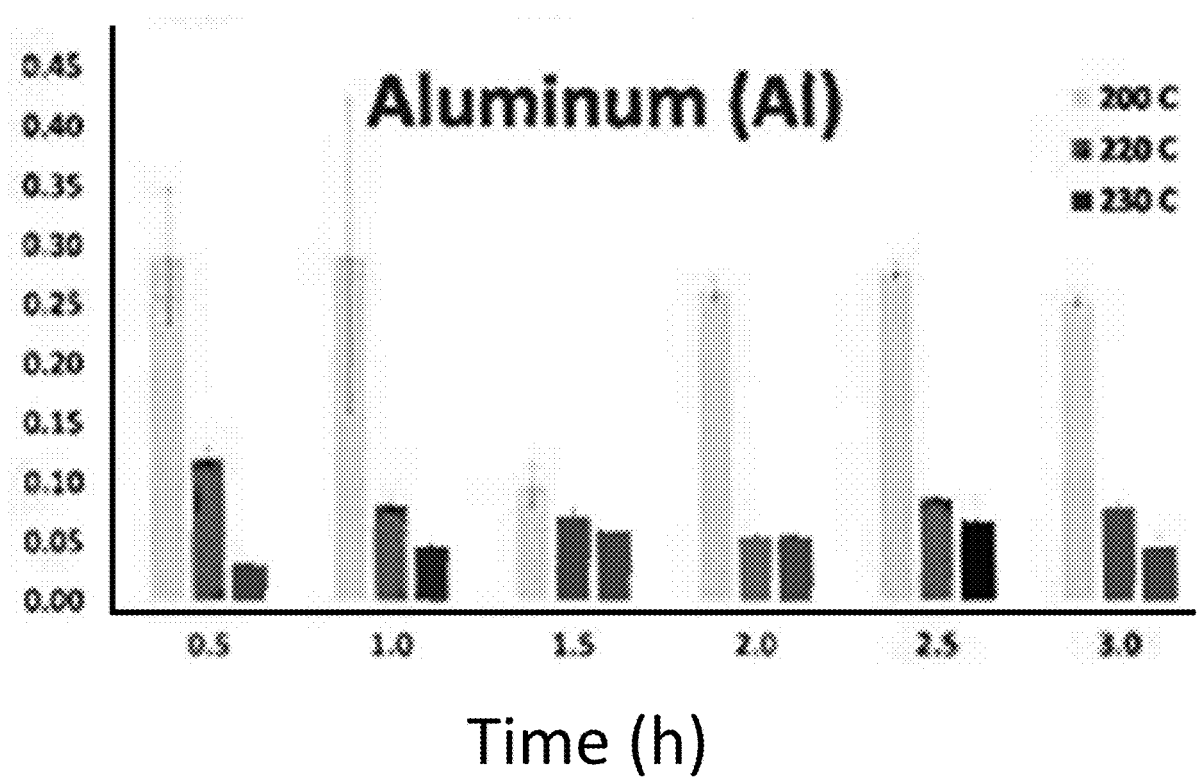
FIG. 9E shows a bar graph of aluminum (Al) leaching as a function of the hydrothermal processing time (t) and temperature (T), according to some embodiments.
Figure 9F:
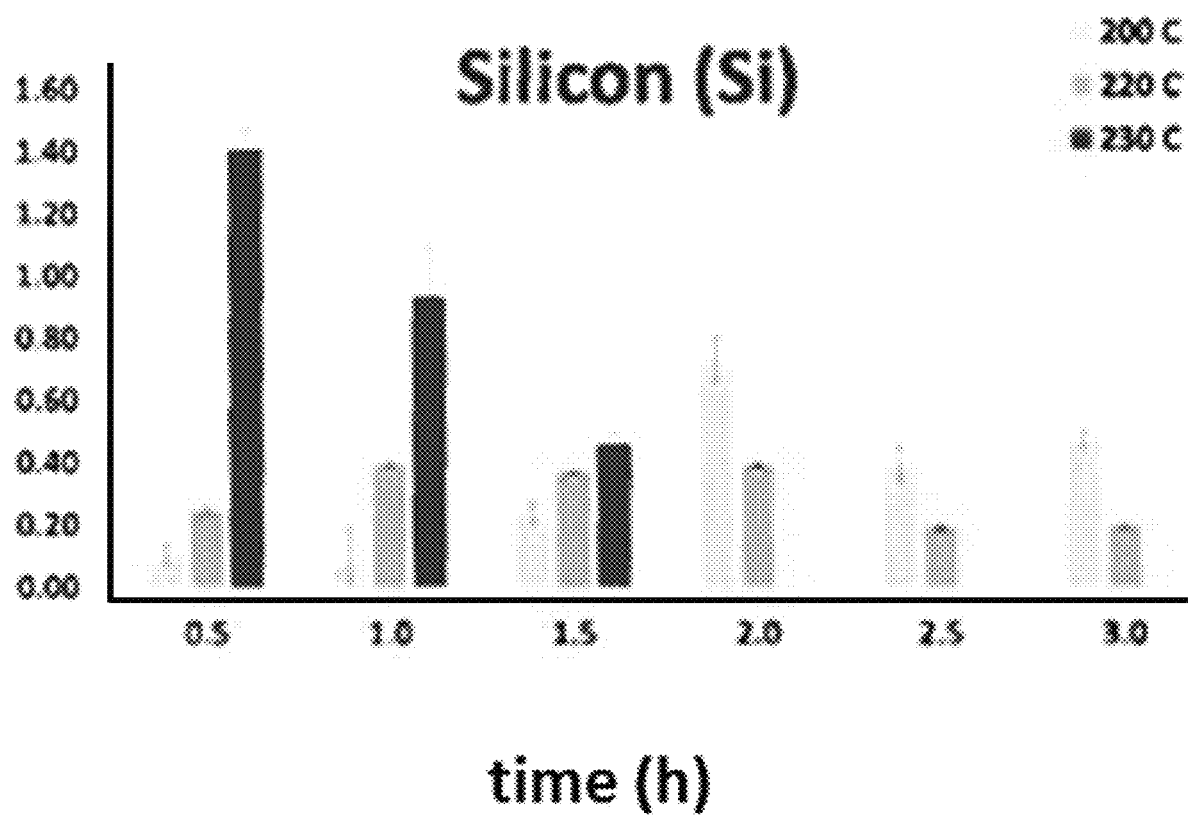
FIG. 9F shows a bar graph of silicon (Si) leaching as a function of the hydrothermal processing time (t) and temperature (T), according to some embodiments.
Figure 9G:
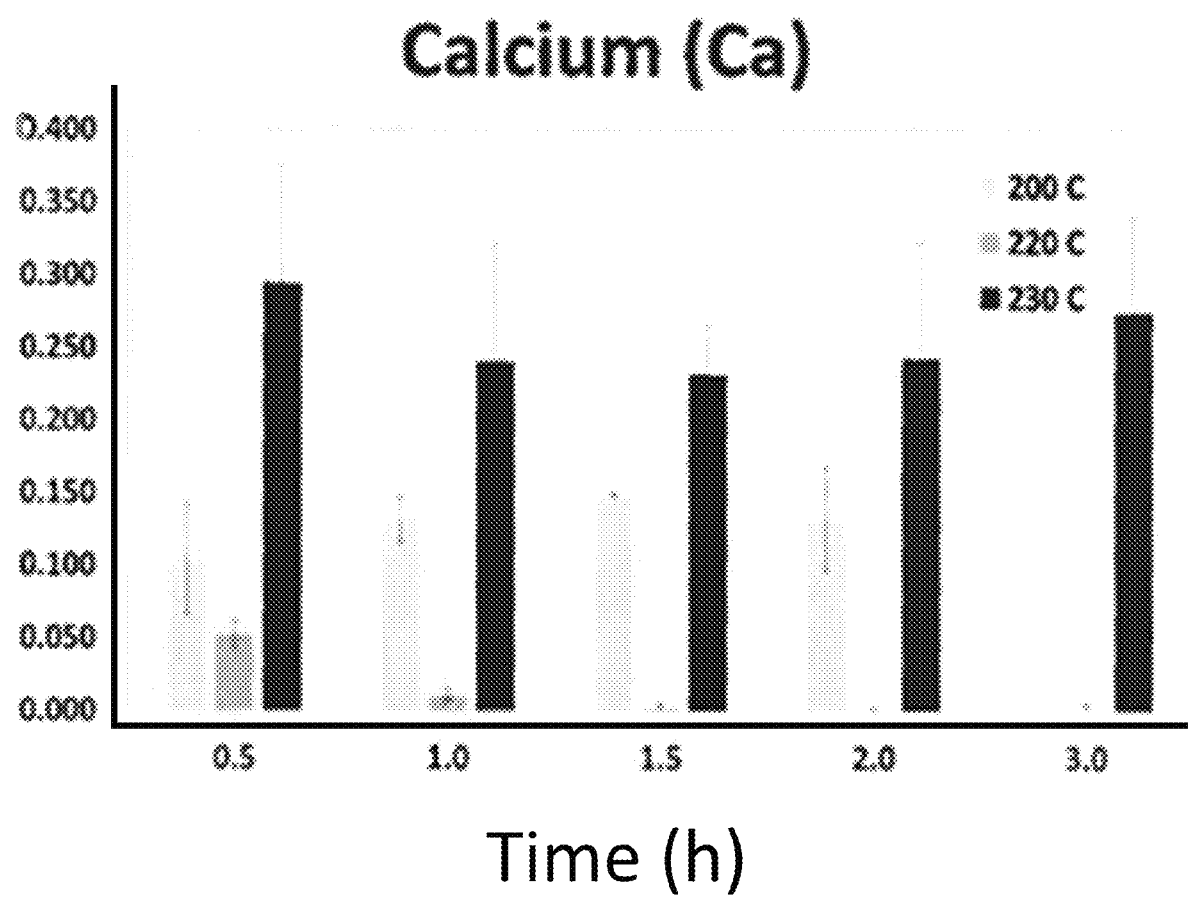
FIG. 9G shows a bar graph of calcium (Ca) leaching as a function of the hydrothermal processing time (t) and temperature (T), according to some embodiments.
Figure 9H:
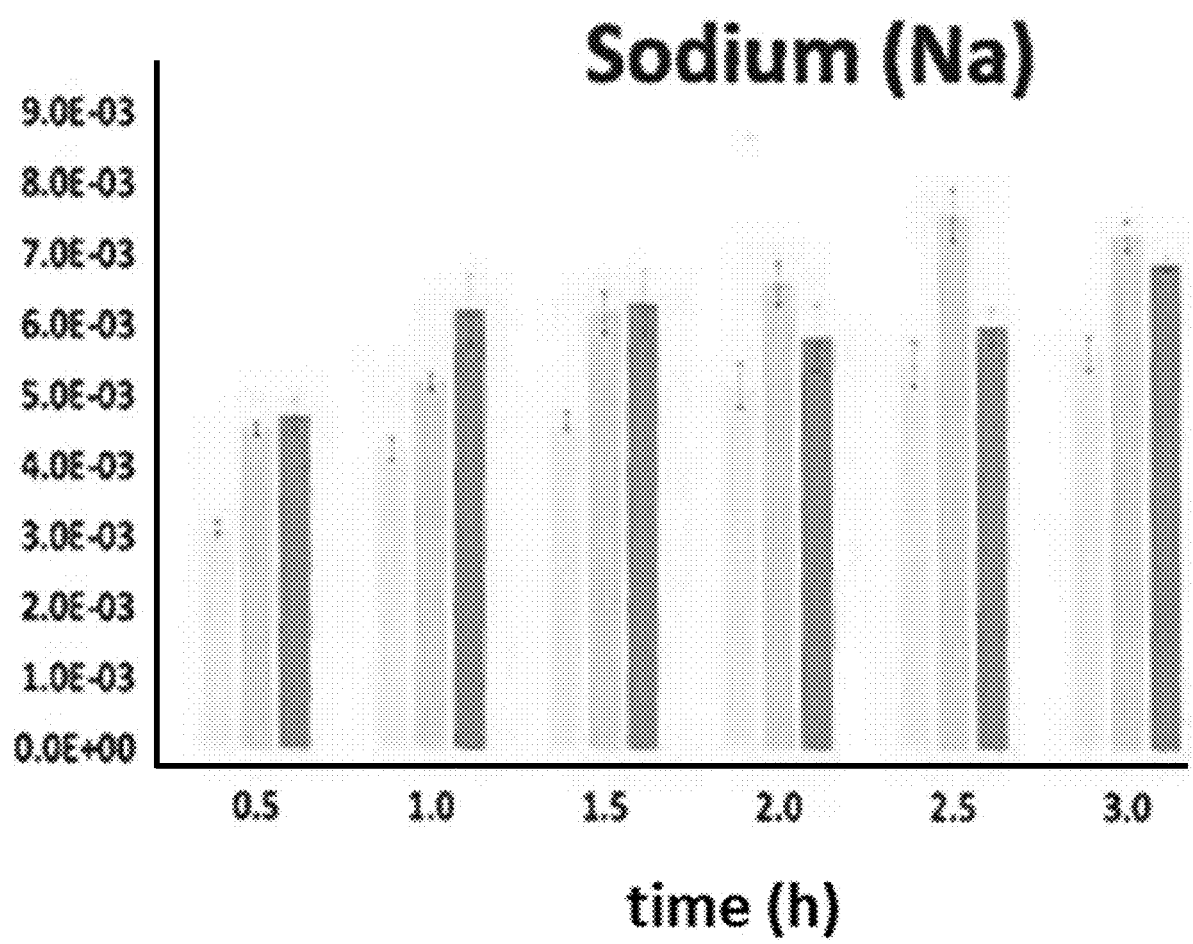
FIG. 9H shows a bar graph of sodium (Na) leaching as a function of the hydrothermal processing time (t) and temperature (T), according to some embodiments.

Mineral leaching was also evaluated as a function of time and temperature. Over times ranging from 0.5 h to 3.0 h and temperatures of 200° C., 220° C., and 230° C., K-leaching holds relatively constant. Thus, it has been concluded that the magnitude of potassium leaching is independent of processing time and temperature (FIG. 9D). On the other hand, Al leaching is relatively constant for any processing time, but is found to decrease significantly as the processing temperature is elevated (FIG. 9E). While Si (FIG. 9F) and Ca (FIG. 9G) leaching are not easily resolvable over the given ranges, Na release tracks with both increased processing time and temperature (FIG. 9H).

Figure 9I:
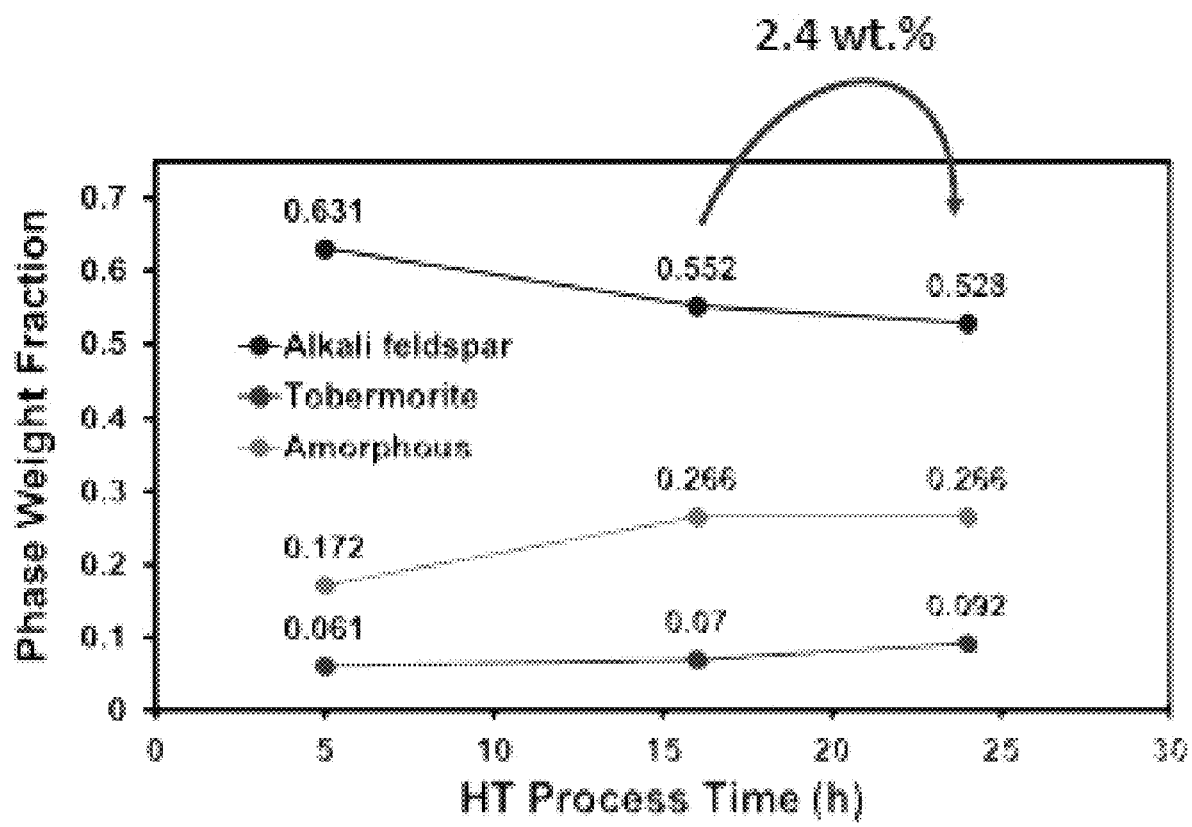
FIG. 9I shows the change in phase weight fraction of alkali feldspar, tobermorite, and amorphous phases in the dried hydrothermally modified material as processing time increases, according to some embodiments.

The question of whether K-feldspar conversion in the dried hydrothermally modified material can be increased over longer processing times has also been addressed (Table 7). Processing times of 5 h, 16 h, and 24 h were tested the temperature was maintained at 200° C. Of note, Kfs decreased by about 13.6% between 5 h and 16 h (FIG. 9I), showing that the conversion can indeed be pushed. The comparatively small 2.4% change observed over the final 8 hours (16 h to 24 h) may partially be accounted for by the increase of tobermorite over the same period (FIG. 9I). Tobermorite content remains essentially steady for the first 11 hours of process time, only to go from a 7% by wt. fraction to a 9.2% by wt. over the final 8 hours. Concerning the amorphous content, a substantial increase in this phase is readily apparent between 5 h and 16 h, hitting a plateau in the subsequent time until completion the 24 h time point. Based on the intended application of the dried hydrothermally modified material, minor fluctuations in mineralogy may be crucial and need to take into account composition. According to lattice parameters and chemical compositions obtained from XRPD and WDS, respectively, the crystalline phases exist as solid solutions. Such alterations can be of consequence in leaching. Such alterations can be of consequence in leaching. For example, in 1 g of dried hydrothermally modified material that typically releases 10 mg K/kg of material, there are $2.6 \times 10^{-7}$ moles of K and $2.3 \times 10^{-5}$ moles of tobermorite (based on 2.4 wt. % tobermorite). Only 1.1 mol % of the silicon in tobermorite needs to be co-substituted with Al and K to account for the mass of K observed during leaching, reinforcing that small changes in phase redistribution can have a significant impact on dried hydrothermally modified material properties.

TABLE 7

Effect of Extending Process Times on the Composition of the Dried hydrothermally modified Material.

| Phase | 5 h | 16 h | 24 h |
| --- | --- | --- | --- |
| Alkali feldspar | 0.631 | 0.552 | 0.528 |
| Tobermorite | 0.061 | 0.07 | 0.092 |
| α-C$_2$S | 0 | 0 | 0 |
| Hydrogrossular | 0.127 | 0.112 | 0.114 |
| Biotite | 0.002 | 0 | 0 |
| CaCO$_3$ | 0.007 | 0 | 0 |
| Amorphous | 0.172 | 0.266 | 0.266 |

Figure 9J:
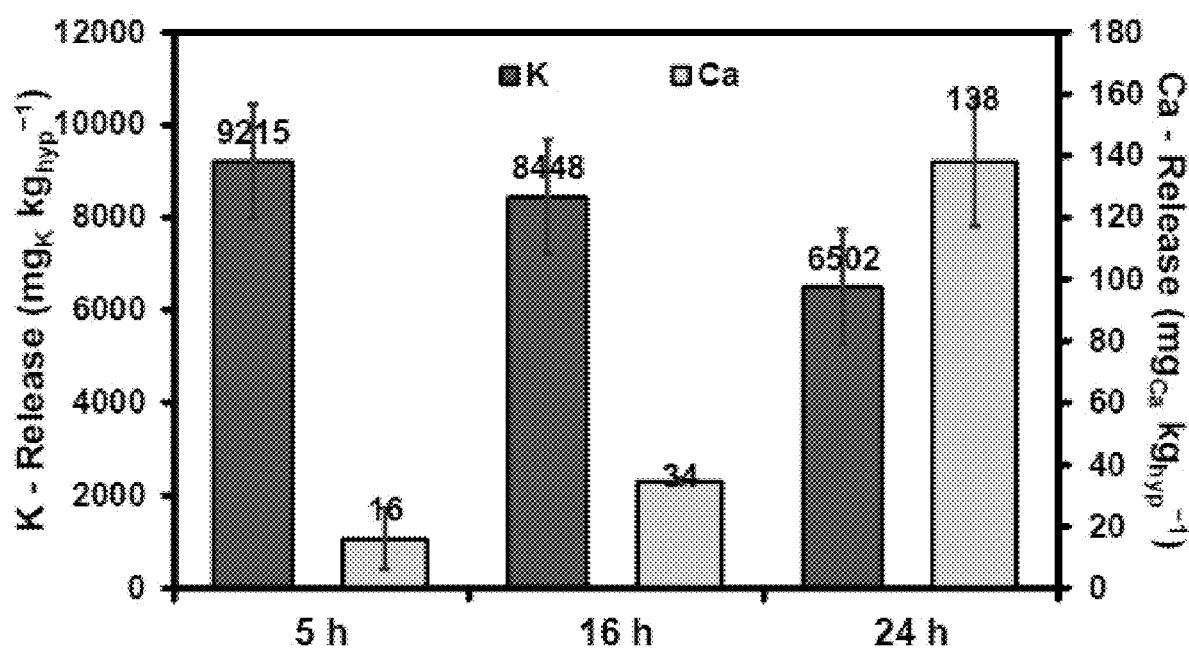
FIG. 9J shows a dependence of K-release and Ca-release when hydrothermal processing times ≥5 h are used, according to some embodiments.

Strikingly, K-release does not coincide with a decrease in Kfs weight fraction. In fact, prolonged hydrothermal processing time actually decreases K-leaching, possibly because K is being sequestered in one or more of the phases of the dried hydrothermally modified material (FIG. 9J) In contrast, Ca leaching is appreciably enhanced in dried hydrothermally modified material processed for 24 h at 200° C. compared to those processed for less amount of time (FIG. 9J). It turns out that the change in pH is proportional to Ca-release such that as the alkalinity decreases over time, Ca leaching substantially increases. Despite the changes in pH at each of the time points, the data supports the concept that the dried hydrothermally modified material possesses a useful buffering capacity as alkalinity in all cases is not only maintained, but actually tends towards slightly elevated basicity as leaching proceeds over the 24 h period (Table 8).

TABLE 8 pH of the Leachate Measured for Dried hydrothermally modified Materials Processed at 200° C. for Various Times.

| | 5 h | 16 h | 24 h |
| --- | --- | --- | --- |
| Leaching pH$_{t=0}$ | 12.2 | 11.6 | 11.2 |
| Leaching pH$_{t=24h}$ | 12.4 | 12.2 | 11.8 |

Example 5: The Effect of Ca/Si Feed Ratio on the Properties of the Dried Hydrothermally Modified Material Effect of Ca/Si on Transformation of Kfs.

A series of experiments has demonstrated that the Ca/Si feed ratio impacts Kfs conversion [(Kfs$_{initial}$−Kfs$_{final}$)/Kfs$_{initial}$], mineralogy, mineral release, particle size distribution (PSD), and buffering capacity. Consequently, modulation of this parameter can be beneficially utilized to align the properties of the dried hydrothermally modified material with a particular application.

To answer the question of whether a minimum CaO/Kfs can be identified that provides the desired dried hydrothermally modified material, studies were carried out with differing proportions of Ca/Si. From the initial data, it was clear that altering the Ca/Si feed ratio effects the weight fractions of various components in the dried hydrothermally modified material (Table 9). In particular as the Ca/Si ratio was increased, the Kfs remaining in the product composition became less and less. At the same time, both the hydrogarnet and amorphous phases are present in significantly higher weight fractions moving from Ca/Si=0.075 to the maximum tested value where Ca/Si=0.3. Tobermorite, in contrast, peaks at Ca/Si=0.15, while decreasing slightly at Ca/Si=0.3 (Table 9).

TABLE 9

Phase Weight Fractions of Various Components of the Dried hydrothermally modified Material at Different Ca/Si Feed Ratios.

| | Phase weight fraction | | |
| --- | --- | --- | --- |
| Phase | Ca/Si = 0.075 | Ca/Si = 0.15 | Ca/Si = 0.3 |
| Alkali Feldspar | 0.868 | 0.728 | 0.631 |
| Tobermorite | 0.024 | 0.075 | 0.061 |
| Hydrogrossular | 0.028 | 0.062 | 0.127 |
| Amorphous | 0.08 | 0.129 | 0.172 |

*Biotite omitted for clarity

Figure 10:
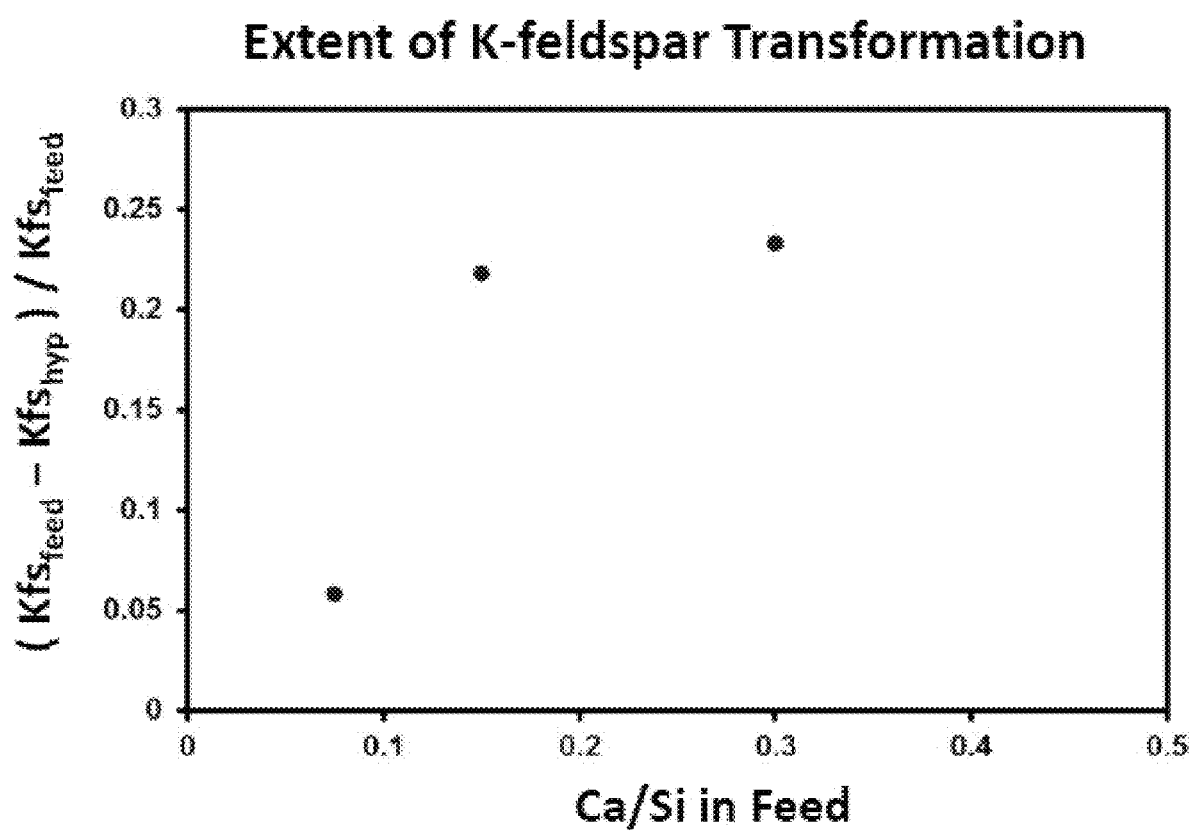
FIG. 10 is a graph of the relationship between the extent of K-feldspar (Kfs) transformation and the Ca/Si ratio in the feedstock, according to some embodiments.
Figure 11A:
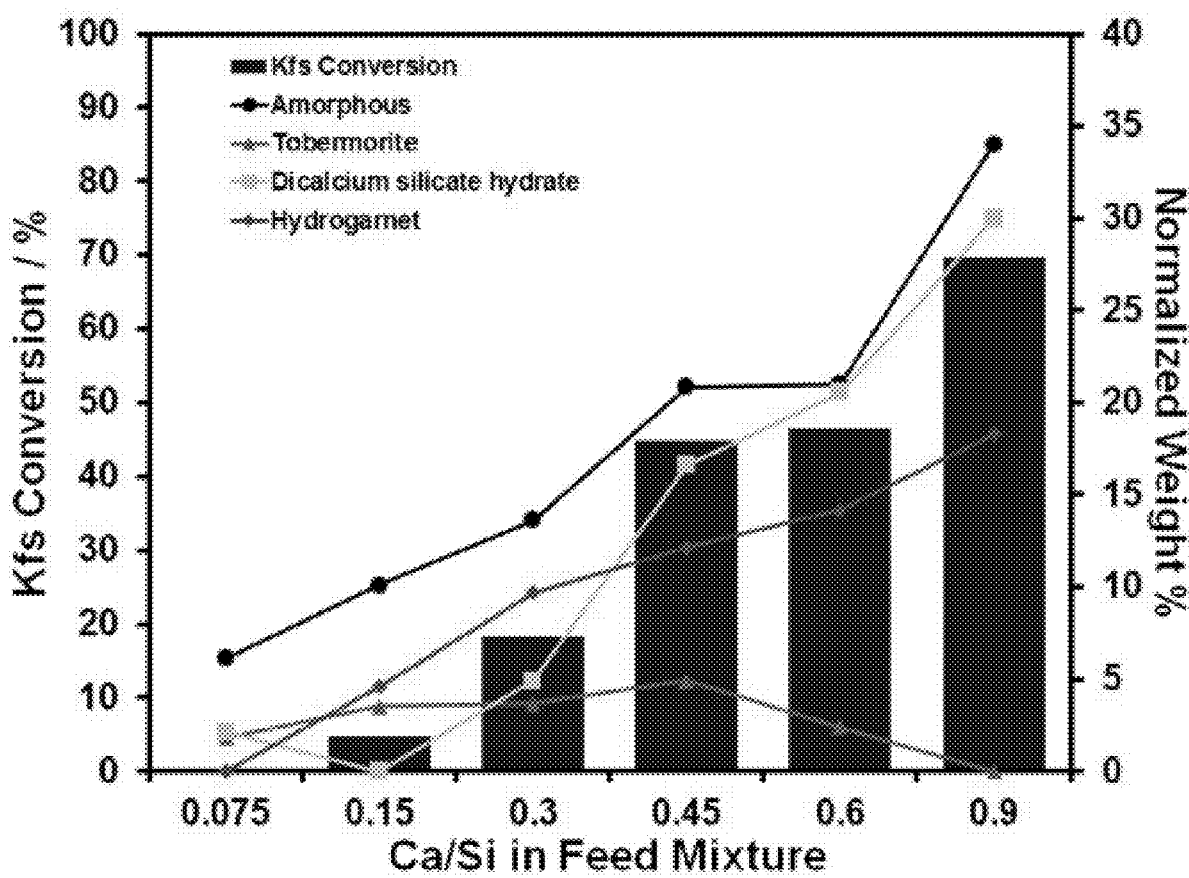
FIG. 11A is a graph illustrating the effect of K-feldspar (Kfs) conversion on mineralogy of the dried hydrothermally modified material as the Ca/Si ratio in the feedstock increases, according to some embodiments.

Graphical representation of the extent of K-feldspar transformation as a function of Ca/Si in the feed mixture ("driving force") highlights that there is a "sweet spot" that can be utilized (FIG. 10). While the extent of K-feldspar jumps dramatically for the first doubling of the Ca/Si feed ratio, a plateau is essentially reached upon increasing to Ca/Si=0.30. Thus, the impact on the extent of transformation beyond the intermediate ratio shown in FIG. 10 appears to be minimal. The Effect of Ca/Si on Mineralogy of the Dried Hydrothermally Modified Material FIG. 11A shows that Kfs conversion tracks with the Ca/Si in the feed mixture for weight fractions from 0.075 to 0.9 (bar graph). In this study, phase weight fraction is normalized to Ca/Si=0.9, i.e., an artificial phase fraction corresponding to the difference between the CaO in the Ca/Si=0.9 and the lower Ca/Si sample was added to the XRD results for samples with Ca/Si<0.9. The analytical error of phase quantification by XRD for the dried hydrothermally modified material typically ranges from 5-20% for a given phase. The computed conversion value for Ca/Si=0.075 was negative and considered non-physical. Thus, no value for the conversion of Kfs is reported for Ca/Si=0.075.

The amorphous, dicalcium silicate hydrate, and hydrogarnet phases track with % Kfs conversion such that wt. % of each increases as the Ca/Si in the feed mixture increases from 0.075 to 0.9. In contrast, tobermorite remains quite steady, actually beginning a descent in wt. % at Ca/Si=0.45. Therefore, from the data it appears that dicalcium silicate hydrate can be obtained over tobermorite by increasing the Ca/Si in the mixture. Overall, the alteration of K-feldspar to a substantial amorphous phase can also be promoted simply by increasing the Ca/Si in the feed mixture. The ability to drive the products towards the formation of dicalcium silicate hydrate and amorphous phases simply by modifying the Ca/Si ratio is expected to have beneficial impacts on cement chemistry and be relevant to a variety of cement applications in general.

Effect of Ca/Si on Mineral Release

Figure 11B:
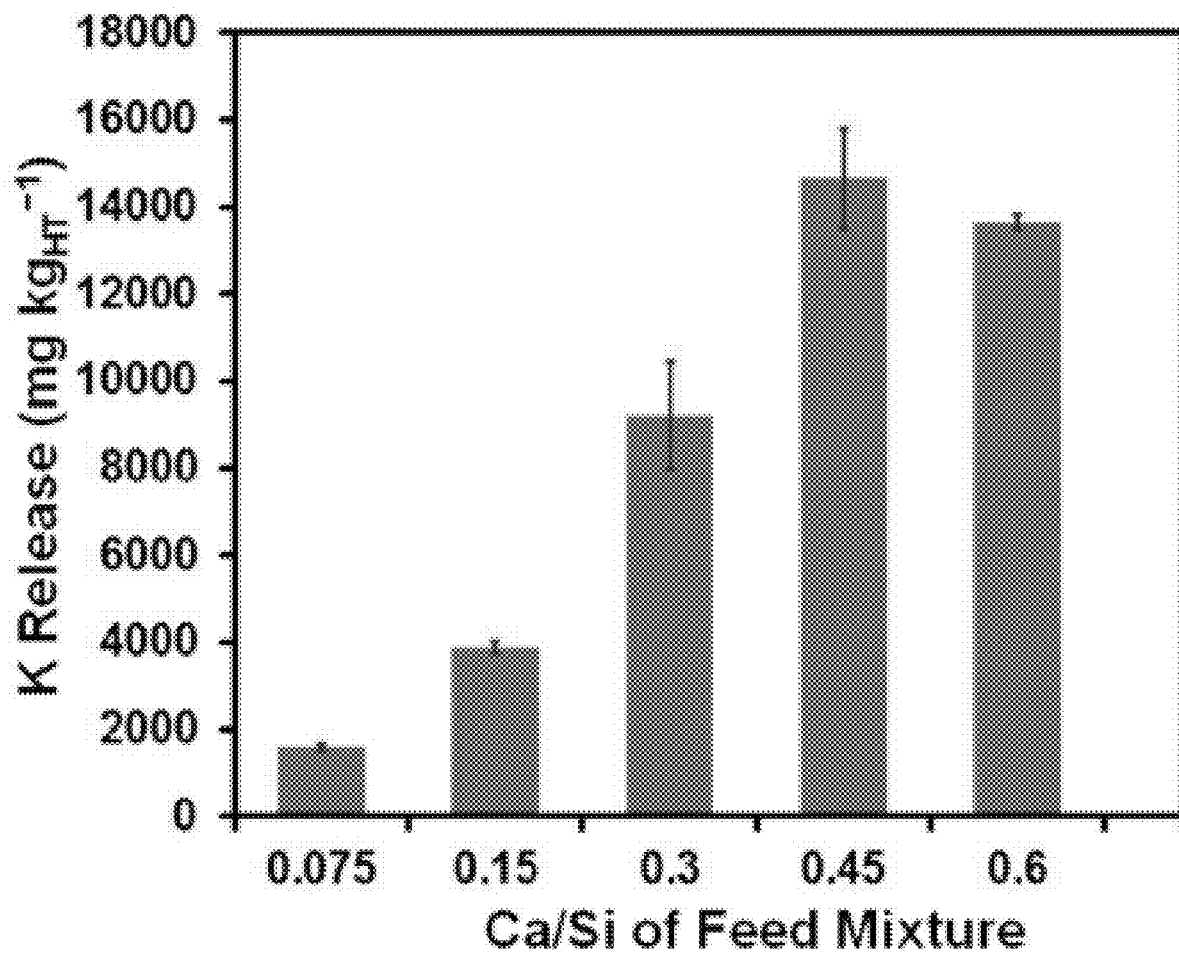
FIG. 11B shows a bar graph of the release of ionic K from dried hydrothermally modified material as the ratio of Ca/Si in the feedstock increases, according to some embodiments.

Release of K can be modulated by varying the Ca/Si in the feed mixture. Increasing the Ca/Si leads to more K being released by the dried hydrothermally modified material, where the maximum value is achieved when Ca/Si=0.45 (FIG. 11B). Thus, it has been found that K-release is proportional to Ca/Si.

Figure 11C:
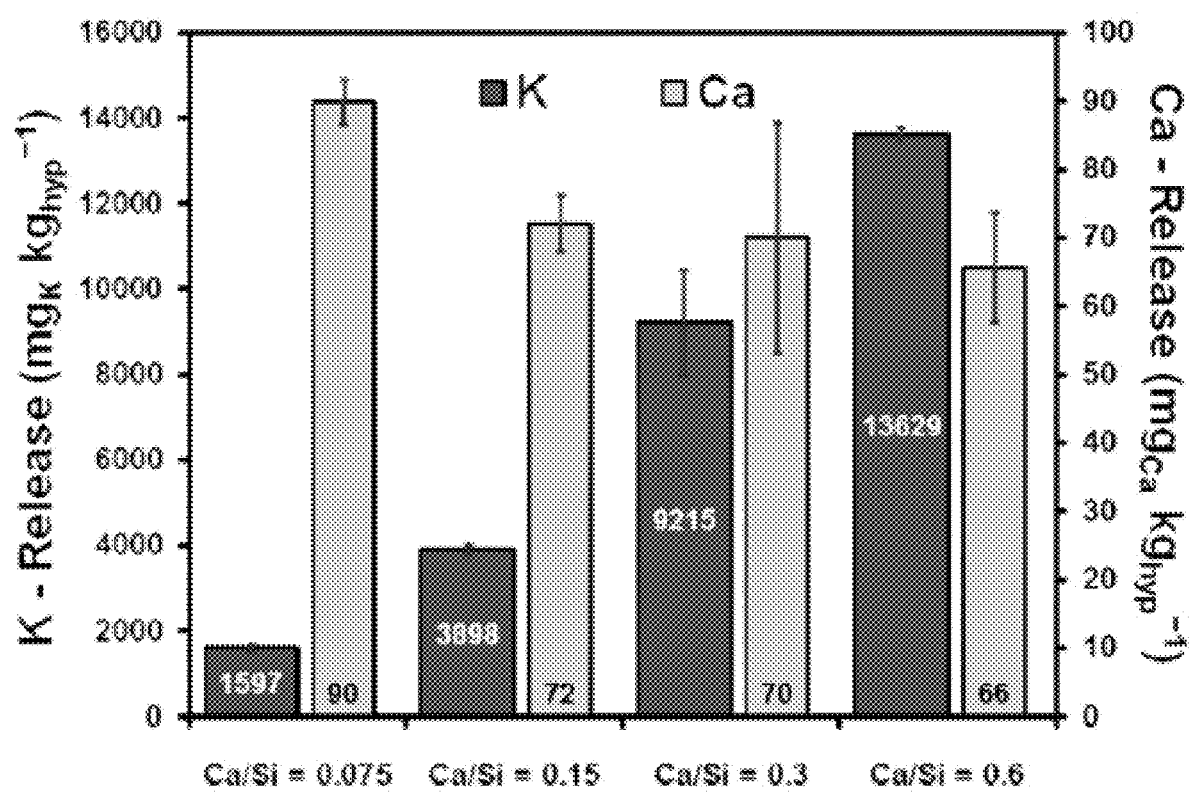
FIG. 11C shows a bar graph of the release of ionic K and $Ca^2$ from dried hydrothermally modified material as the ratio of Ca/Si in the feedstock increases, according to some embodiments.
Figure 11D:
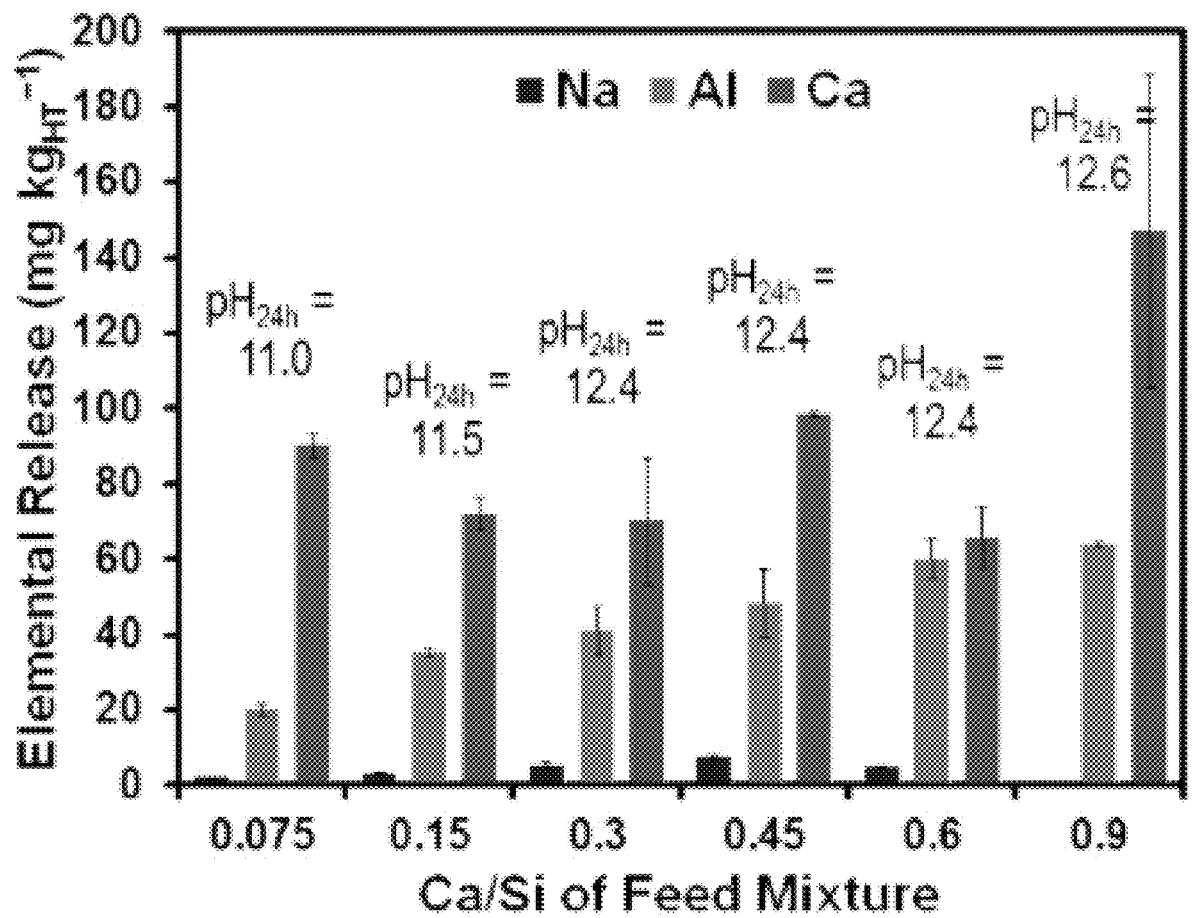
FIG. 11D shows a bar graph of the release of ionic Ca, Na, and Al from dried hydrothermally modified material as the ratio of Ca/Si in the feedstock increases, according to some embodiments.
Figure 11E:
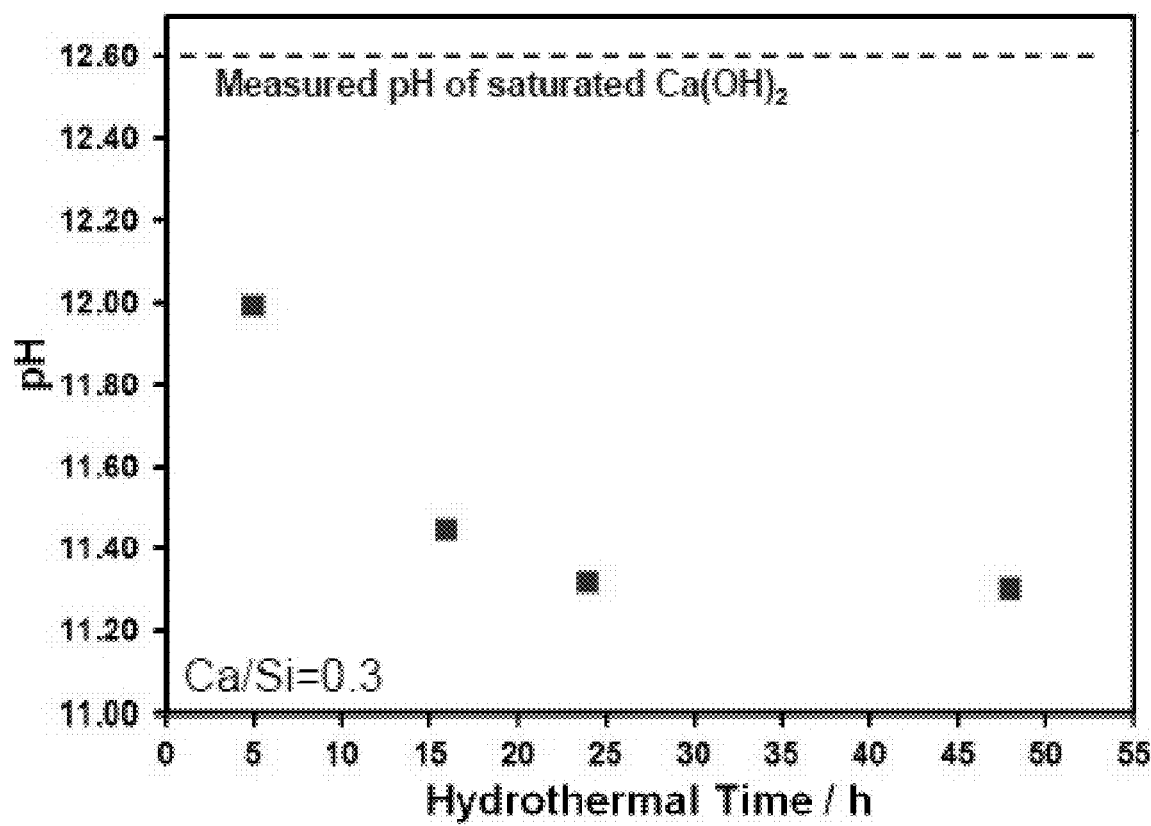
FIG. 11E is a graph showing the pH at 24 h for dried hydrothermally modified material obtained at different processing times using a feedstock with a Ca/Si ratio of 0.3, according to some embodiments.
Figure 11F:
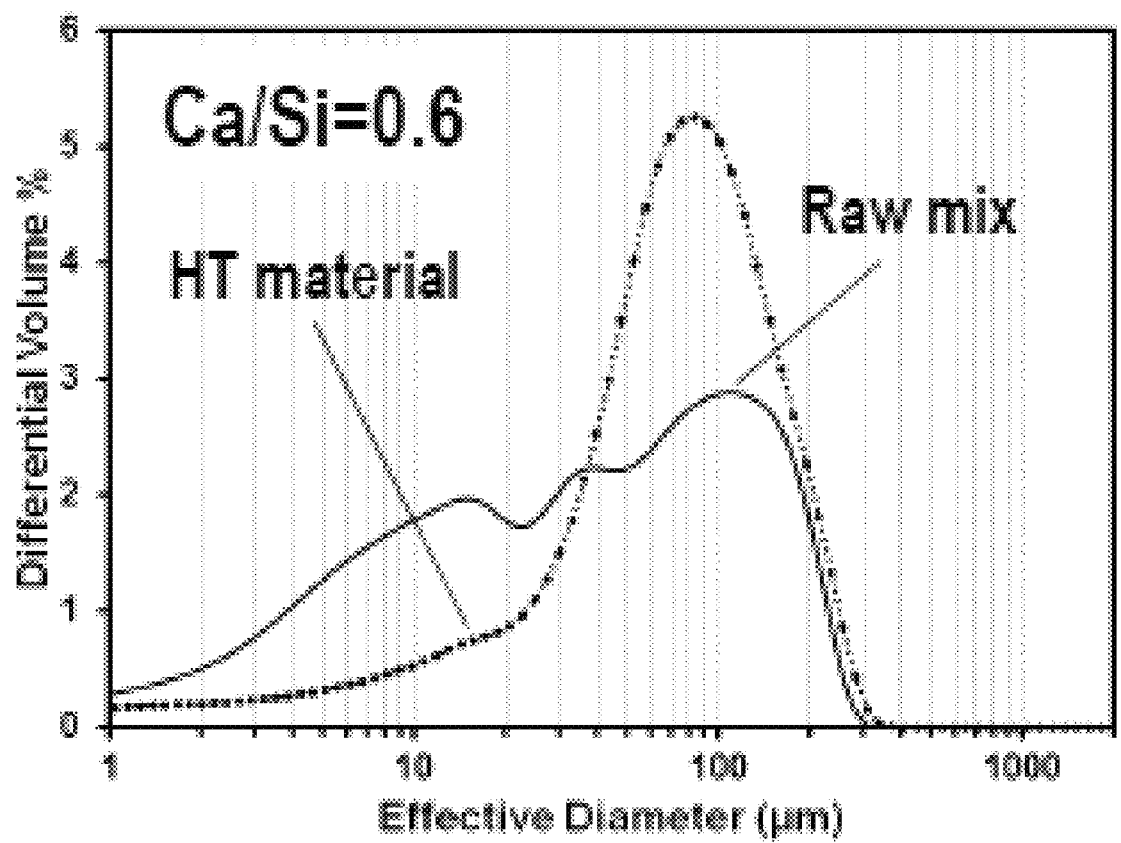
FIG. 11F shows a graph of the particle size distribution of the raw and hydrothermal material for forming a dried hydrothermally modified material at a Ca/Si ratio of 0.6, according to some embodiments.
Figure 11G:
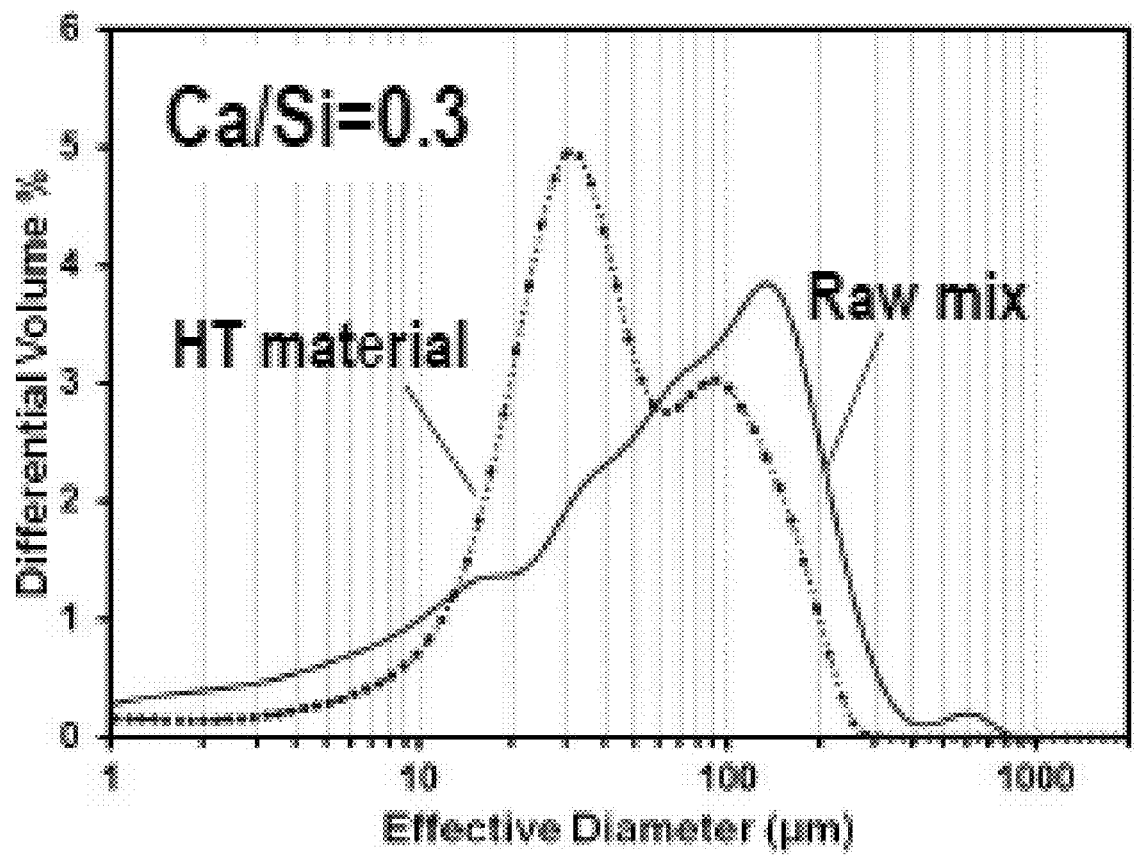
FIG. 11G shows a graph of the particle size distribution of the raw material mixture for forming a dried hydrothermally modified material at a Ca/Si ratio of 0.3, according to some embodiments.
Figure 11H:
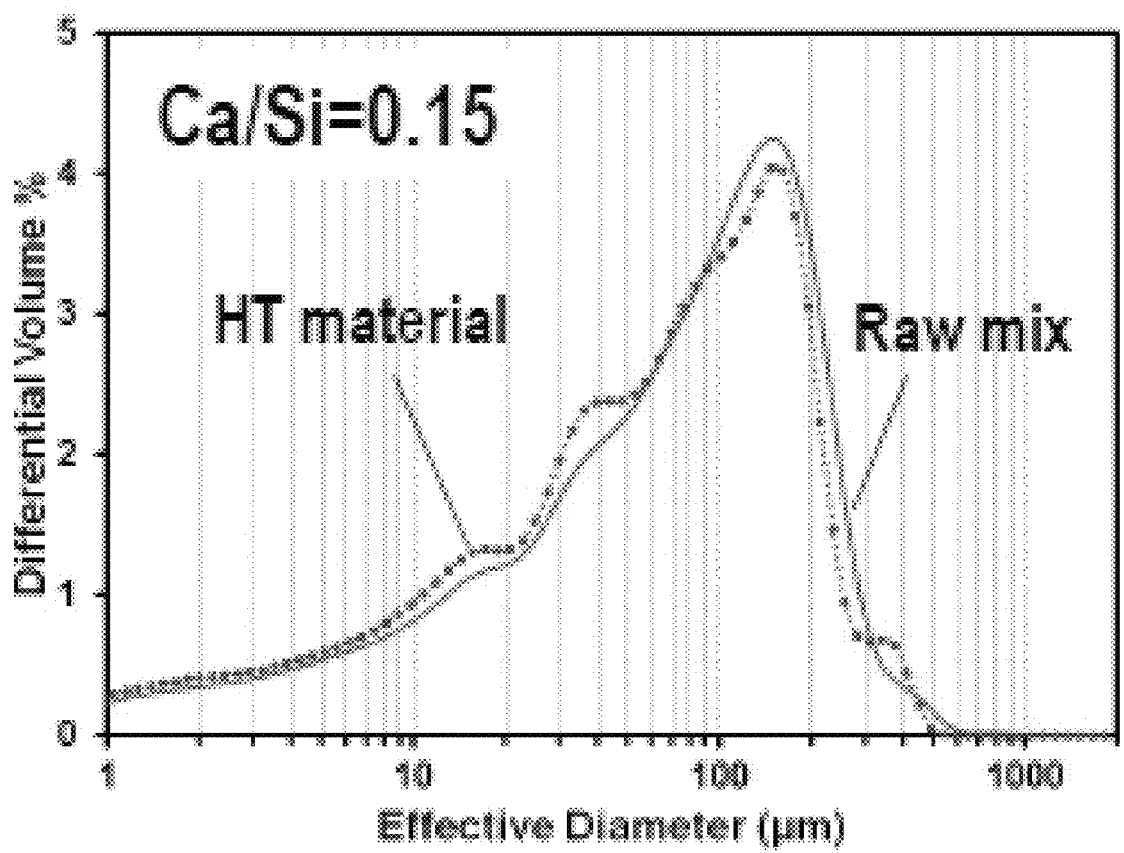
FIG. 11H shows a graph of the particle size distribution of the raw material mixture for forming a dried hydrothermally modified material at a Ca/Si ratio of 0.15, according to some embodiments.
Figure 11I:
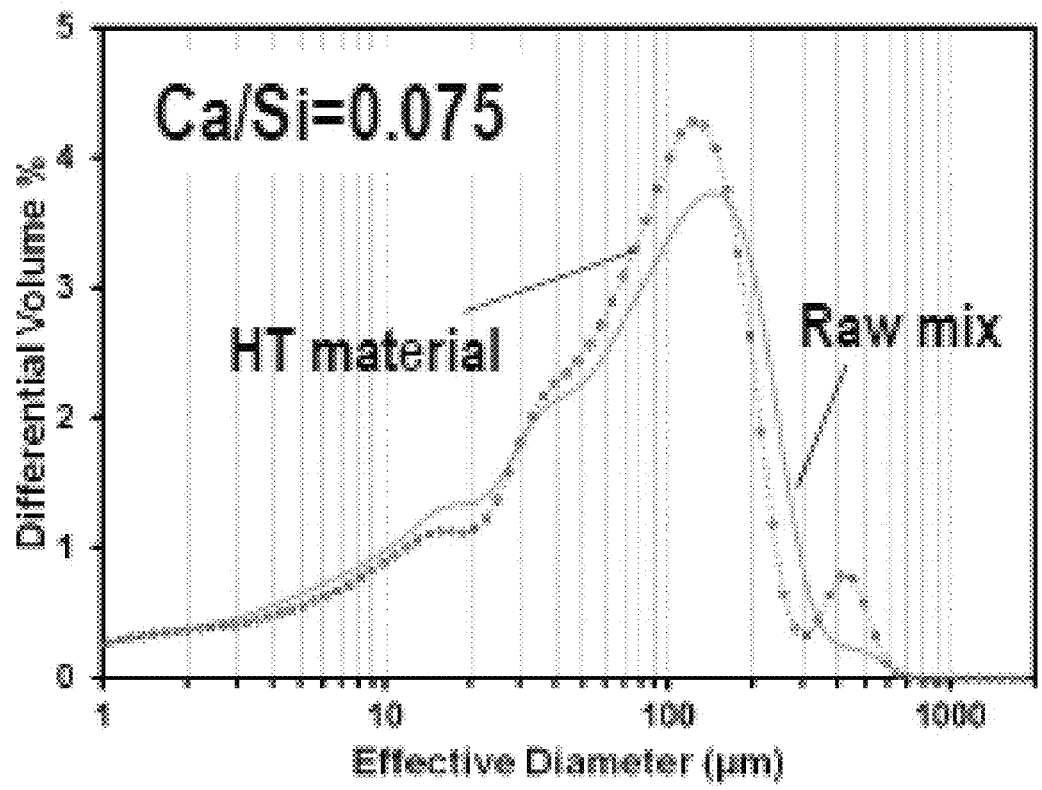
FIG. 11I shows a graph of the particle size distribution of the raw material mixture for forming a dried hydrothermally modified material at a Ca/Si ratio of 0.075, according to some embodiments.

Leaching for Ca is distinguished from K due to the lack of a linear trend, as well as the impact of changing pH. In fact, Ca-release levels are quite similar when Ca/Si is 0.15, 0.30, and 0.6 (FIG. 11C). This correlates with dried hydrothermally modified materials where the pH buffering capacity remains intact or mostly intact (Table 10). At the lowest feed ratio, the alkalinity drops to 11.0, and in this case the release of Ca is substantially higher (FIG. 11C). Based on the data, feed Ca/Si influences the alkalinity of the dried hydrothermally modified material (i.e., buffering capacity is diminished at low Ca/Si), which in turn can have an impact on the release of minerals such as Ca. Unexpectedly, a Ca leaching spike occurs when the Ca/Si feed mixture ratio=0.45, such that the value is comparable to that observed at low Ca/Si feed mixtures (FIG. 11D). An even greater spike is observed when Ca/Si=0.9, perhaps indicating unreacted $Ca(OH)_2$ from the hydrothermal process.

TABLE 10 pH of the Leachate Measured for Dried hydrothermally modified Materials Prepared Using Different Ca/Si Feed ratios.

|  | 0.075 | 0.15 | 0.3 | 0.6 |
|---|---|---|---|---|
| Leaching $pH_{t=0}$ | 10.9 | 11.2 | 12.2 | 12.3 |
| Leaching $pH_{t=24h}$ | 11.0 | 11.5 | 12.3 | 12.3 |

Release of sodium (Na) and aluminum (Al) can also be modulated by varying the Ca/Si in the feed mixture (FIG. 11D). Leaching of Al increases across the full range of Ca/Si values, appearing to possibly plateau at the maximum ratio tested (0.9). A similar observation applies to Na leaching, except that a slight reduction is noticed at 0.6, the highest Ca/Si feed mixture tested.

In summary, the Ca/Si ratio controls the extend of the hydrothermal reaction, and needs optimization for desired process time (t), temperature (T), feed composition, and desired mineralogy in the dried hydrothermally modified material. Of note, a low Ca/Si depletes buffering capacity of the material, which in turn can impact mineral leaching. As previously discussed, the ability to tune pH as a function of drying atmosphere facilitates the use of these dried hydrothermally modified materials for soil remediation, or for the production of alkali solutions for several types of industries/applications, including but not limited to, geopolymer, waterglass, colloidal silica, and $KOH/K_2CO_3$ solutions.

Effect of Ca/Si on Particle Size Distribution (PSD) for Dried Hydrothermally Modified Materials.

PSD was evaluated for each of the Ca/Si ratios utilized in the study with comparisons made between the raw mix and the dried hydrothermally modified material. The particle size analysis was conducted with water as the dispersive medium in the absence of ultrasonication. For the lower Ca/Si feed mixtures, the graph of effective diameter vs. differential volume shows little deviation between pre- and post-processed materials. Only at Ca/Si=0.3 and 0.6 are significant changes observed (FIGS. 11F-11I). For raw mixtures with Ca/Si=0.6, it's possible that particle agglomeration produces the shoulder <20 um. It was found that K-feldspar conversion was enhanced as the Ca/Si ratio increased. In addition, increased K-feldspar conversion is also reflected in the increase in the small particle population.

In summary, the Ca/Si ratio plays a significant role in processing. The alkaline earth component in the feed mixture controls the alkalinity/pH of the hydrothermal process, which in turn dictates the dissolution kinetics of the alkali framework aluminosilicate and potentially the progress of the overall reaction. The phase distribution is sensitive to the aqueous Ca/Si concentration e.g., Ca-rich media preferentially promotes the growth of dicalcium silicate hydrate, a compound with a Ca-rich stoichiometry. Alkali cation uptake by newly formed calcium silicate phases depends on the Ca/Si in the solution, e.g., low Ca/Si solutions increase the partitioning of the alkali framework into the solid phase as a part of calcium silicate phases. These observations show that the chemistry and phase distribution of the dried hydrothermally modified material can be tailored by controlling the alkaline earth/Si and/or the alkaline earth/alkali in the solution of the hydrothermal process.

Example 6: Understanding the Role of Raw-Mix PSD in the Processing

Figure 30:
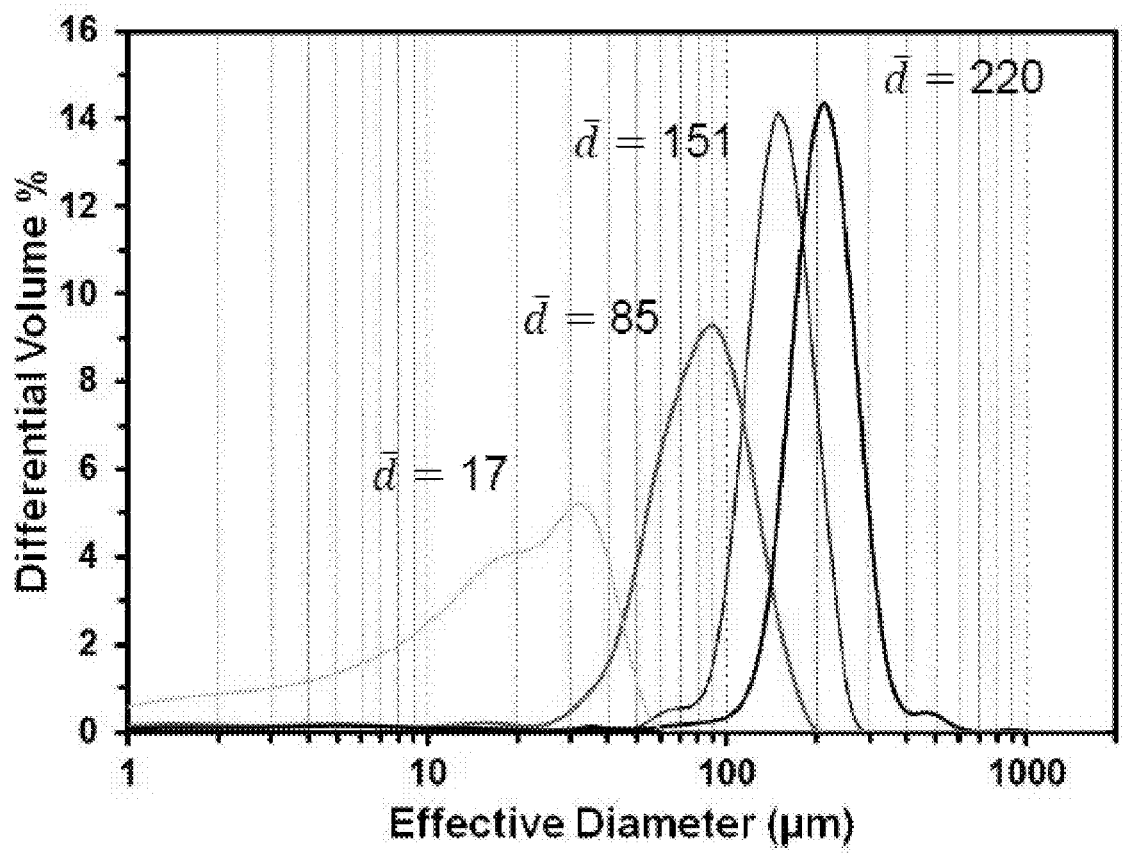
FIG. 30 is a graph showing the particle size distributions (PSD) of a milled raw K-feldspar material that is then dry sieved to separate particles into various size ranges based on a mean diameter, $\bar{d}$, according to some embodiments.

Raw material containing K-feldspar (<2 mm) was milled (50 g/run) for 1 min. The milled material was then dry sieved using ASTM E11 sieve no. 70 (212 µm), 100 (150 µm), 140 (106 µm), and 325 (45 µm) to obtain the four fractions shown in the PSD (FIG. 30).

Figure 31A:
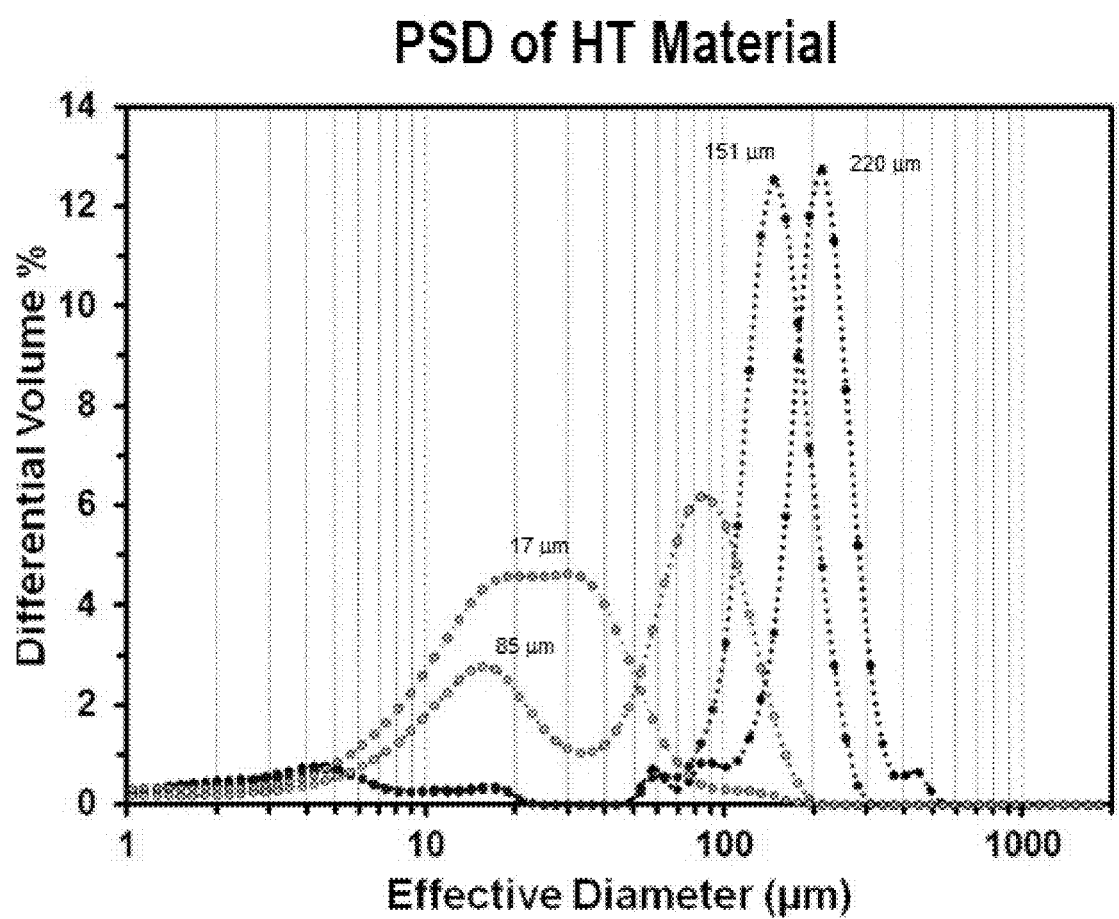
FIG. 31A is a graph showing the PSDs of dried hydrothermally modified materials prepared using the milled raw K-feldspar material with mean diameters, $\bar{d}$, shown in FIG. 30.
Figure 31B:
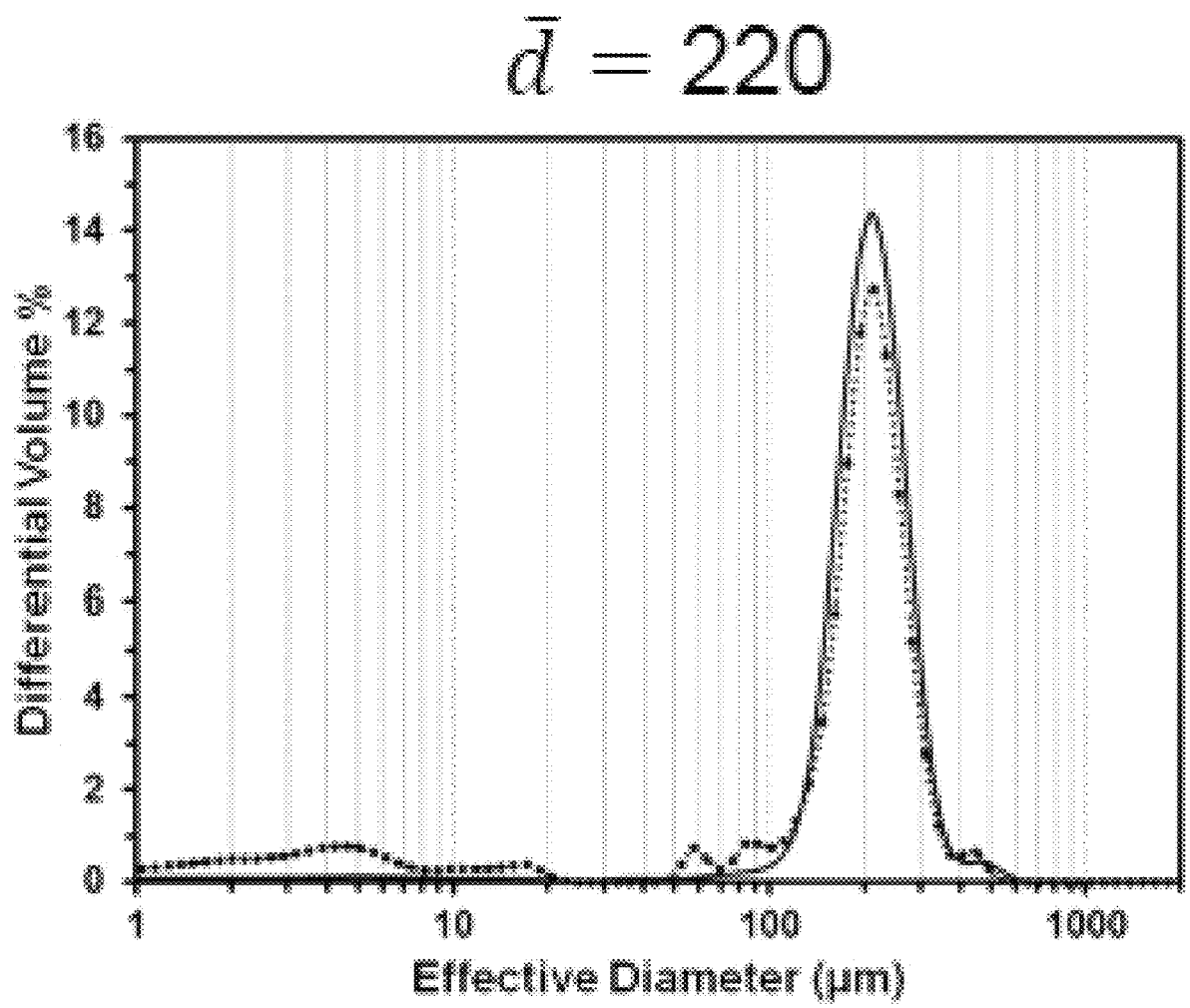
FIG. 31B is a graph showing the PSDs of the dried hydrothermally modified material (dotted line) shown in FIG. 31A and the feedstock mixture (solid line) shown in FIG. 30 for a mean diameter, $\bar{d}$, of 220 μm.
Figure 31C:
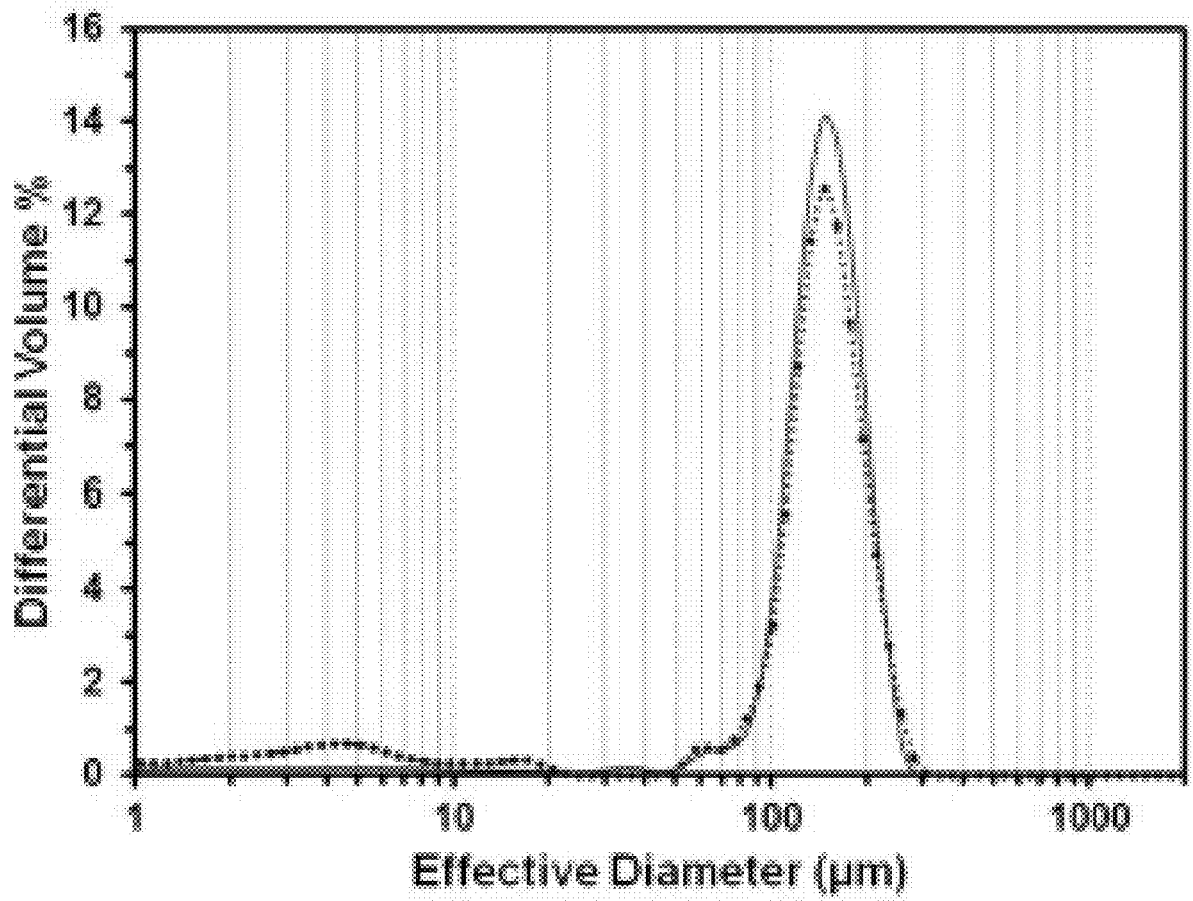
FIG. 31C is a graph showing the PSDs of the dried hydrothermally modified material (dotted line) shown in FIG. 31A and the feedstock mixture (solid line) shown in FIG. 30 for a mean diameter, $\bar{d}$, of 151 μm.
Figure 31D:
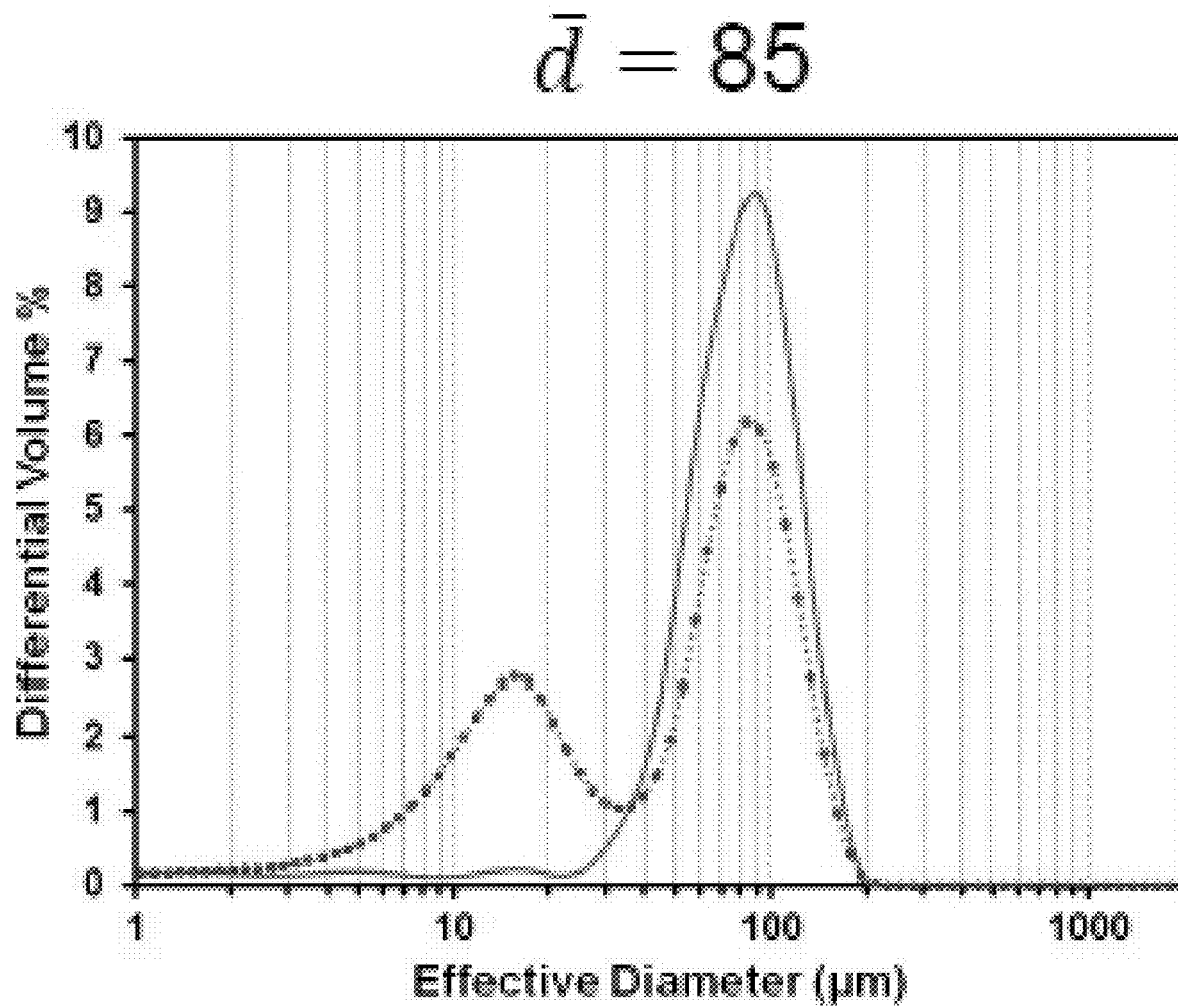
FIG. 31D is a graph showing the PSDs of the dried hydrothermally modified material (dotted line) shown in FIG. 31A and the feedstock mixture (solid line) shown in FIG. 30 for a mean diameter, $\bar{d}$, of 85 μm.
Figure 31E:
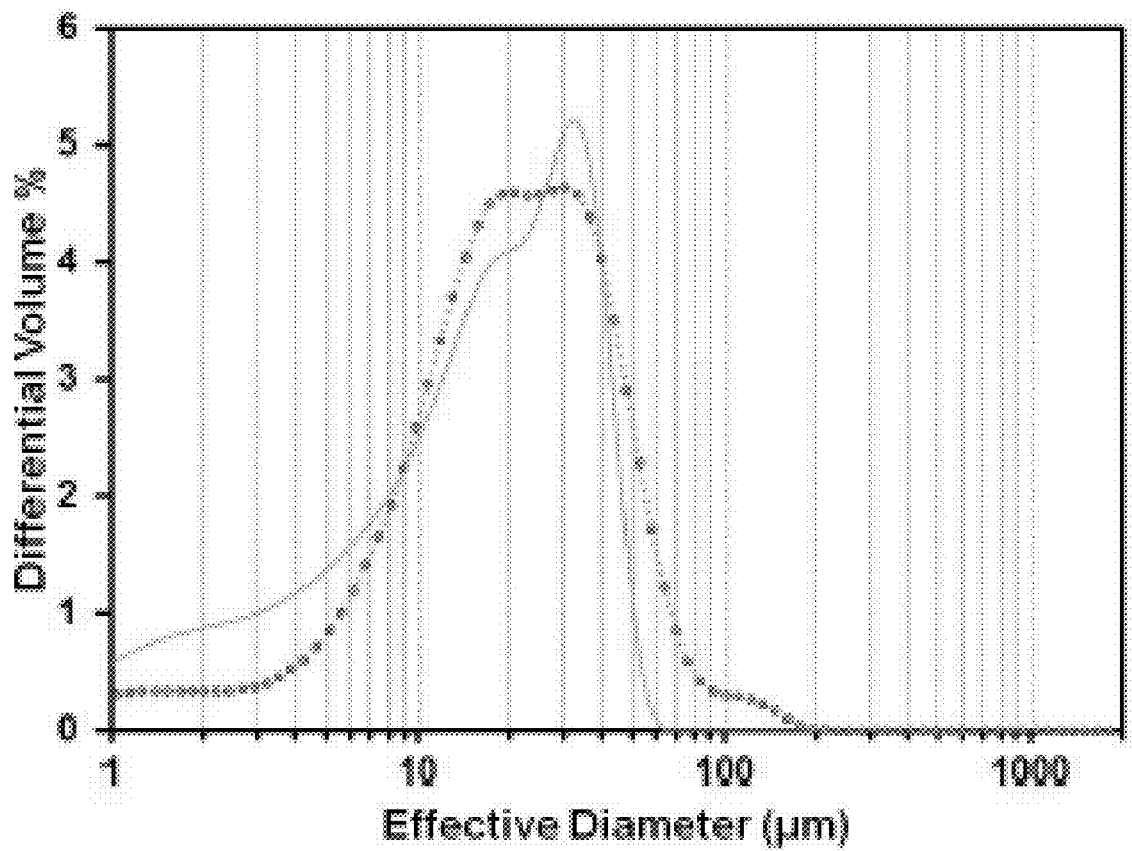
FIG. 31E is a graph showing the PSDs of the dried hydrothermally modified material (dotted line) shown in FIG. 31A and the feedstock mixture (solid line) shown in FIG. 30 for a mean diameter, $\bar{d}$, of 17 μm.

The feed mixtures were then prepared by physically mixing said fractions with the desired amount of CaO rather than by co-milling. Dried hydrothermally modified materials were produced from the four fractions. The PSD of the dried hydrothermally modified materials were measured (FIG. 31A) and overlaid with the PSD of the corresponding raw material (FIGS. 31B-31E) in order to note similarities and deviations. For the most part, there was strong resemblance of the materials before and after processing with only some minor differences noted when $\bar{d}$=85 µm and $\bar{d}$=17 µm. Consequently, the PSD of the dried hydrothermally modified material can be modulated by varying the PSD of the raw material.

Figure 31F:
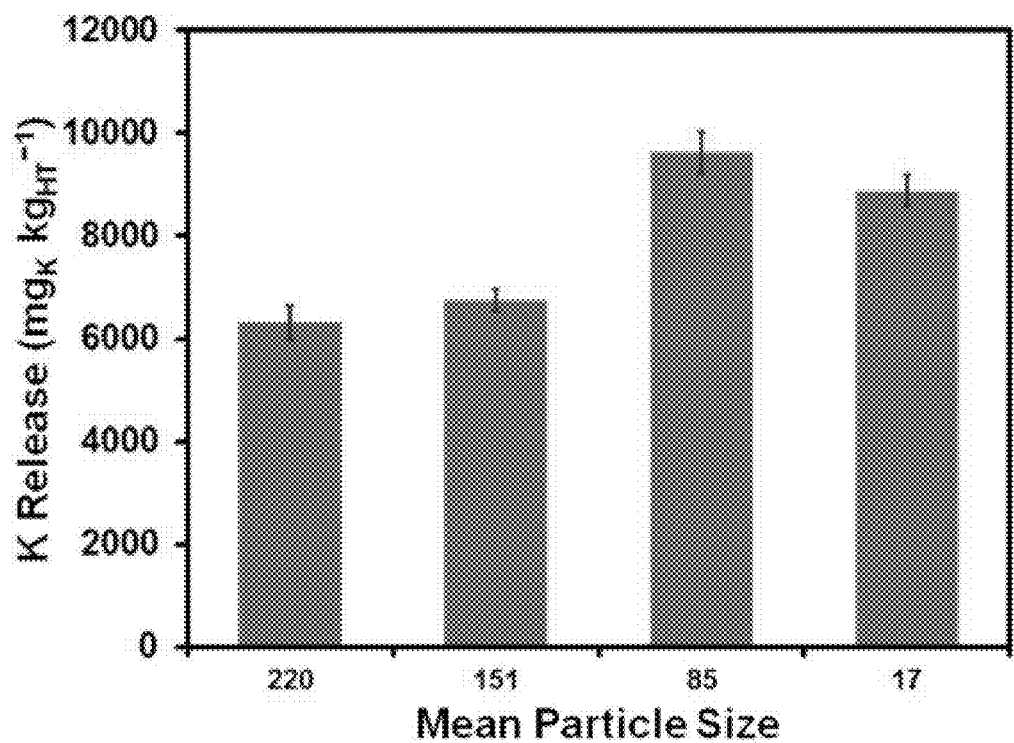
FIG. 31F is a bar graph showing the leaching properties of potassium from the dried hydrothermally modified materials shown in FIG. 31A as a function of mean particle size.
Figure 31G:
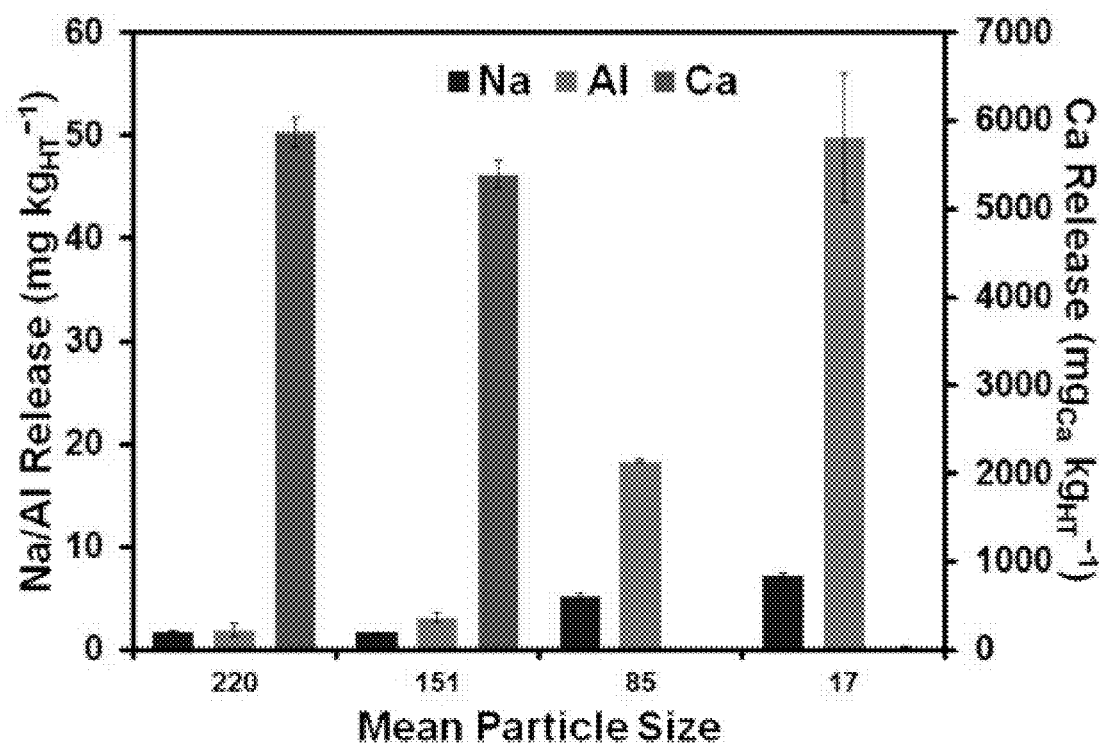
FIG. 31G is a bar graph showing the leaching properties of sodium, aluminum, and calcium from the dried hydrothermally modified materials shown in FIG. 31A as a function of mean particle size.

The effect of raw-mix PSD on leaching was examined. K-release was maximized for a mean particle size of 85 µm. The larger particle sizes of 151 µm and 220 µm afforded nearly equivalent amounts of K-release with the smallest particle size providing an intermediate value (FIG. 31F). For Na and Al, the highest release occurred at the smallest mean particle size. Leaching tended to decrease as particle size increased. Calcium leaching was maximized when the raw-mix PSD was 220 µm, with no leaching detected at either 85 µm or 17 µm (FIG. 31G).

According to the data, the reactivity of the raw material can be modulated by varying the degree of milling of the raw material. Thus, the surface area of the raw material may be increased to promote the reactivity of the raw material. Because of the strong correlation, the PSD of the raw material can be adjusted to obtain a desired PSD of the dried hydrothermally modified material.

Example 7: Sensitivity of the Dried Hydrothermally Modified Material to Decalcification As shown in FIG. 7A, drying the dried hydrothermally modified material with $CO_2$ leads to a decalcification reaction that eliminates the α-dicalcium silicate hydrate phase and replaces it with a calcite phase (Table 11). An amorphous phase is still present and slightly increased. To arrive at the data in Table 1, phase weight fraction HT-air was normalized to HT-CO$_2$, i.e., an artificial phase fraction was added to the quantification of HT-air phases corresponding to the amount of CO$_2$ incorporated in HT-CO$_2$ as determined from the weight fraction of CaCO$_3$.

TABLE 11

XRD Phase Quantification Using CO$_2$ or Air Drying Atmosphere.

| Phase | Drying Atmosphere | |
|---|---|---|
| | CO$_2$ | Air |
| K-feldspar | 50.2 | 51.9 |
| Tobermorite | 3.3 | 4.1 |
| α-Dicalcium silicate hydrate | 0 | 5.5 |
| Hydrogarnet | 8.4 | 10.9 |
| Albite | 0.6 | 3.1 |
| Panunzite | 2.1 | 2.5 |
| Biotite | 0 | 0.3 |
| Calcite | 14.2 | 0 |
| "CO$_2$" | n/a | 6.5 |
| Amorphous Content | 21.2 | 15.2 |

The following experimental set-up was implemented in order to further study the impact of CO$_2$ drying on the structure and composition of the dried hydrothermally modified material:

1) Hydrothermal (HT) material is dried with the supernatant blanketed under an atmosphere X (Ar or CO$_2$).
2) The dried HT material is rinsed with Ar-purged water to remove soluble K (FIG. 27; e.g., KOH or K$_2$CO$_3$).
3) After filtering to remove the water, the rinsed material (retentate) is vacuum dried in a Schlenk flask (~10$^{-2}$ Torr) for 24-36 h.
4) The dried rinsed material is subjected to leaching experiments.

Once the dried hydrothermally modified material was rinsed and dried (Ar or CO$_2$), XRD was used to determine the mineralogy of each of the phases (Table 12). Of note, the calcite phase of the rinsed material dried with CO$_2$ increased from 14.2 to 18.2, while the amorphous content decreased from 21.2 to 13.0. Other changes to the composition are also detectable.

TABLE 12

XRD Quantification of Rinsed Phases Using CO$_2$ or Air Drying Atmosphere.

| Phase | Drying Atmosphere | |
|---|---|---|
| | CO$_2$ | Ar |
| K-feldspar | 55.5 | 52.0 |
| Tobermorite | 4.0 | 4.8 |
| α-Dicalcium silicate hydrate | 0 | 5.1 |
| Hydrogarnet | 6.8 | 11.6 |
| Albite | 2.5 | 2.8 |
| Panunzite | 0 | 2.1 |
| Biotite | 0 | 0.3 |
| Calcite | 18.2 | 0 |
| "CO$_2$" | n/a | 6.5 |
| Amorphous Content | 13.0 | 14.9 |

Figure 33A:
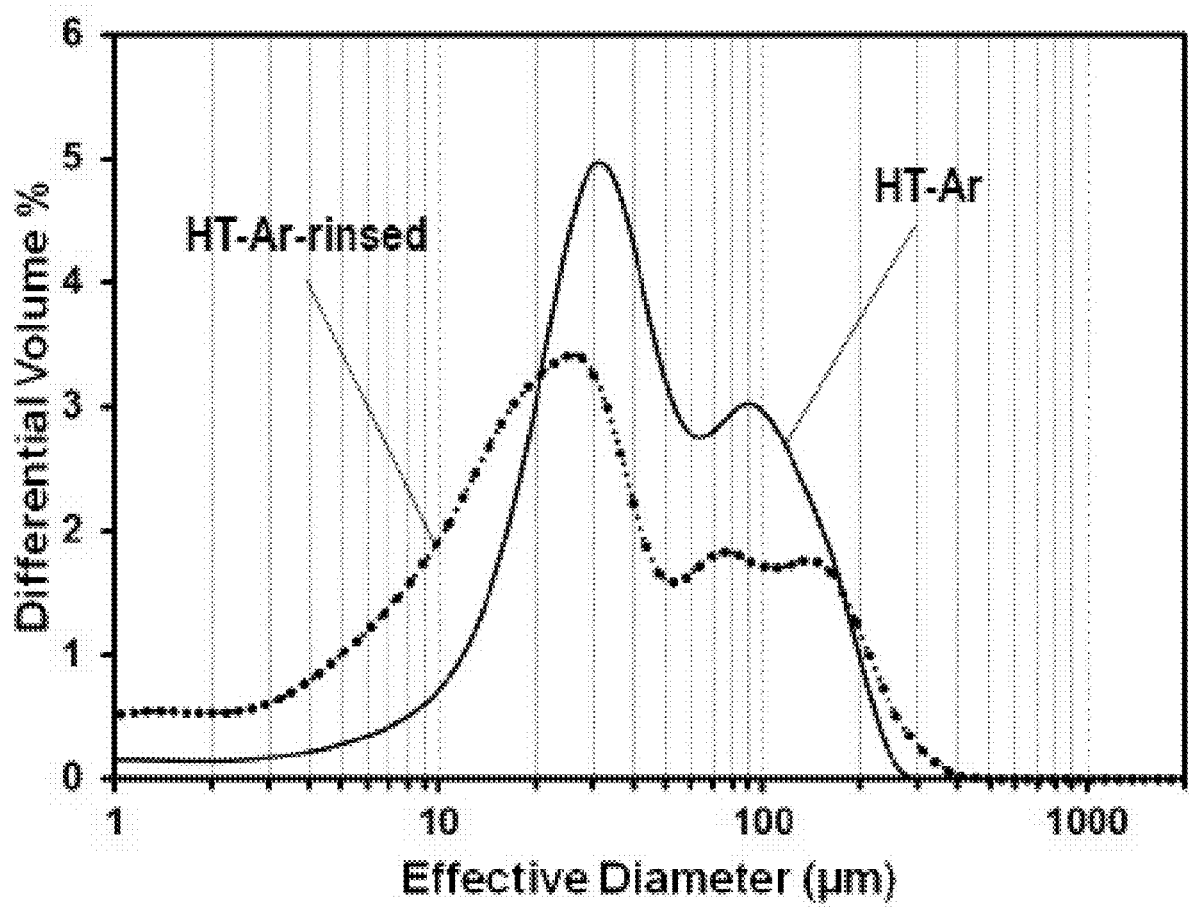
FIG. 33A is a graph showing the PSDs of rinsed and unrinsed hydrothermally modified materials and dried under argon, according to some embodiments.
Figure 33B:
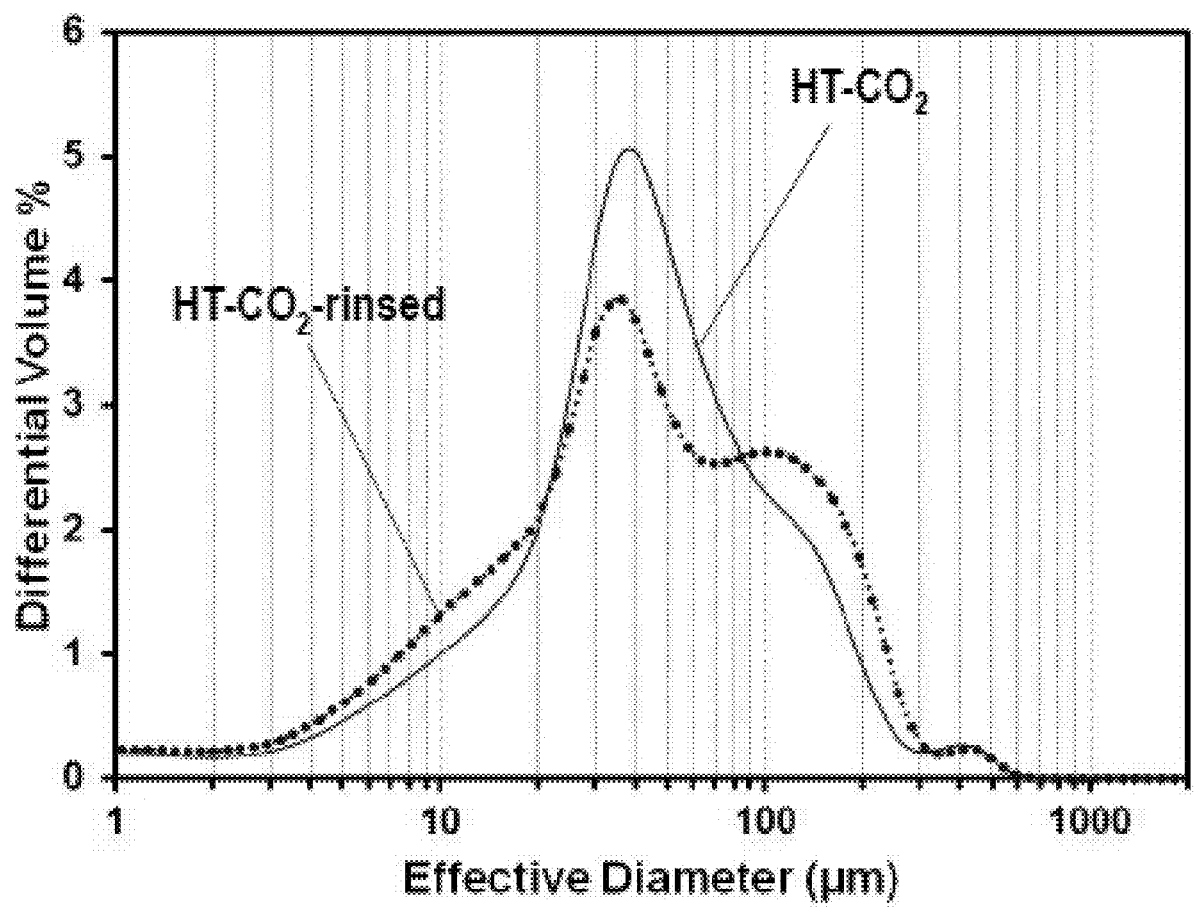
FIG. 33B is a graph showing the PSDs of rinsed and unrinsed hydrothermally modified materials and dried under carbon dioxide, according to some embodiments.
Figure 33C:
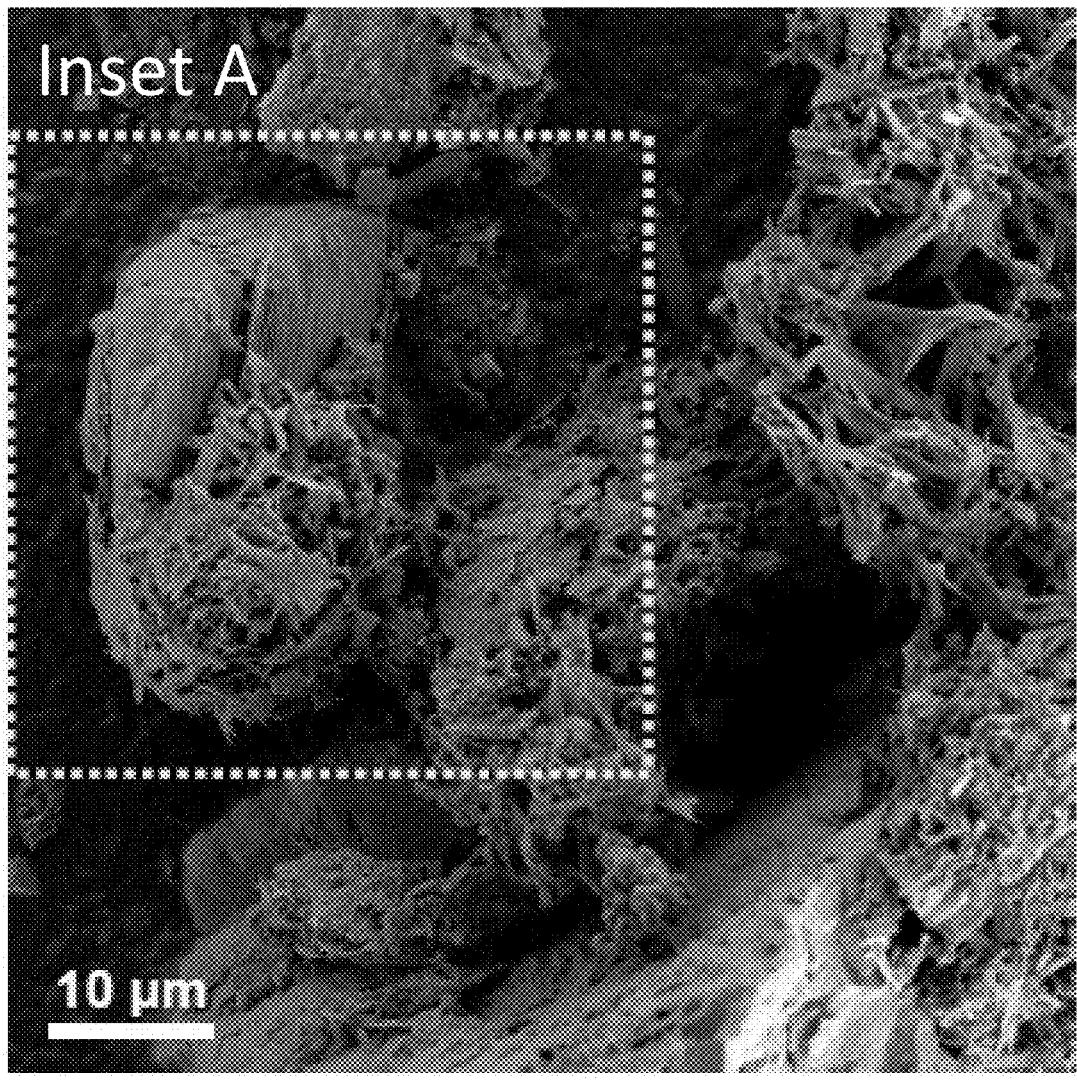
FIG. 33C is an image of the hydrothermally modified material that was rinsed and dried under argon in FIG. 33A.
Figure 33D:
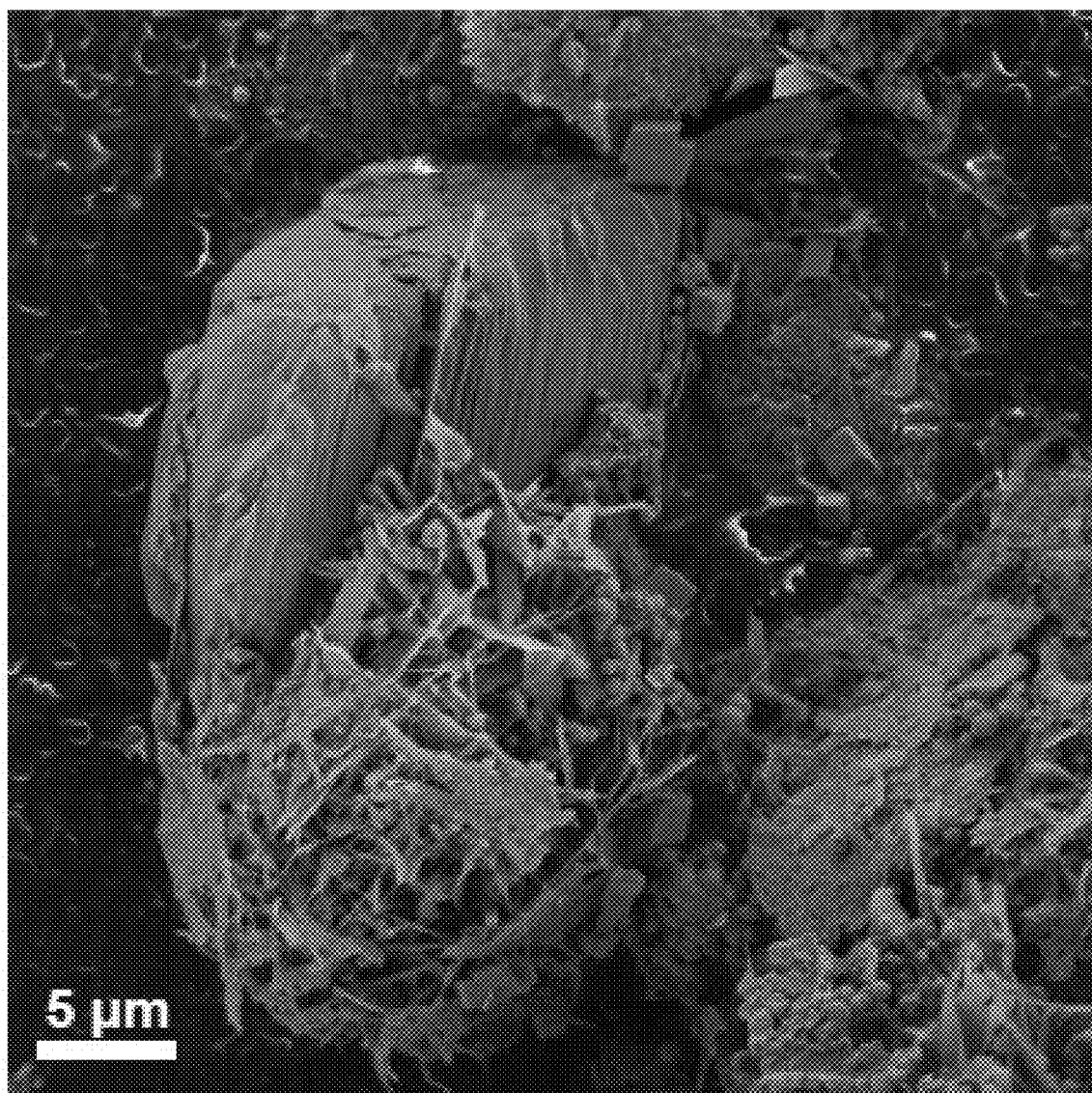
FIG. 33D is an inset image of the hydrothermally modified material shown in FIG. 33C.
Figure 33E:
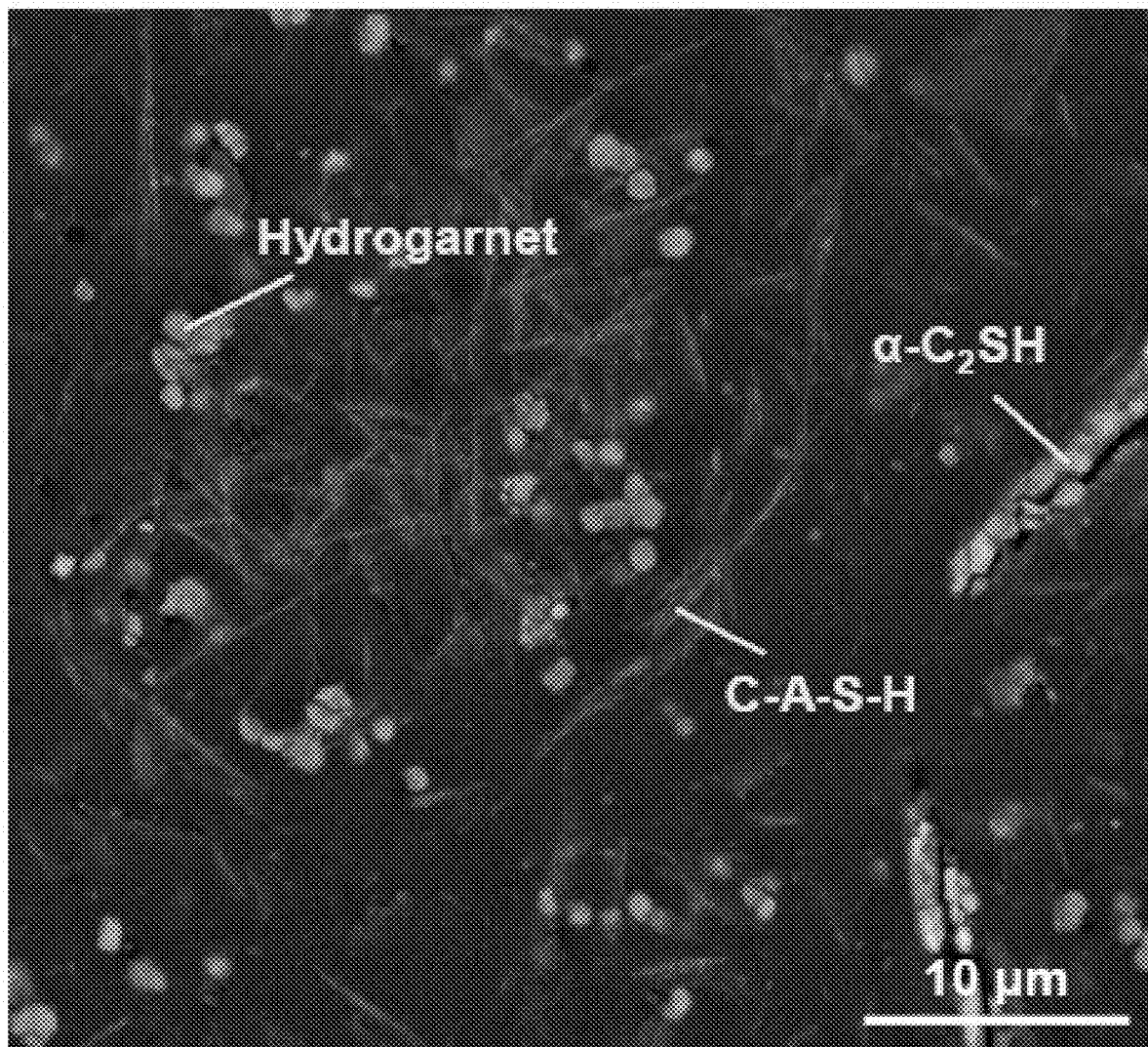
FIG. 33E is an image of a thin section of the hydrothermally modified material shown in FIG. 33C.
Figure 33F:
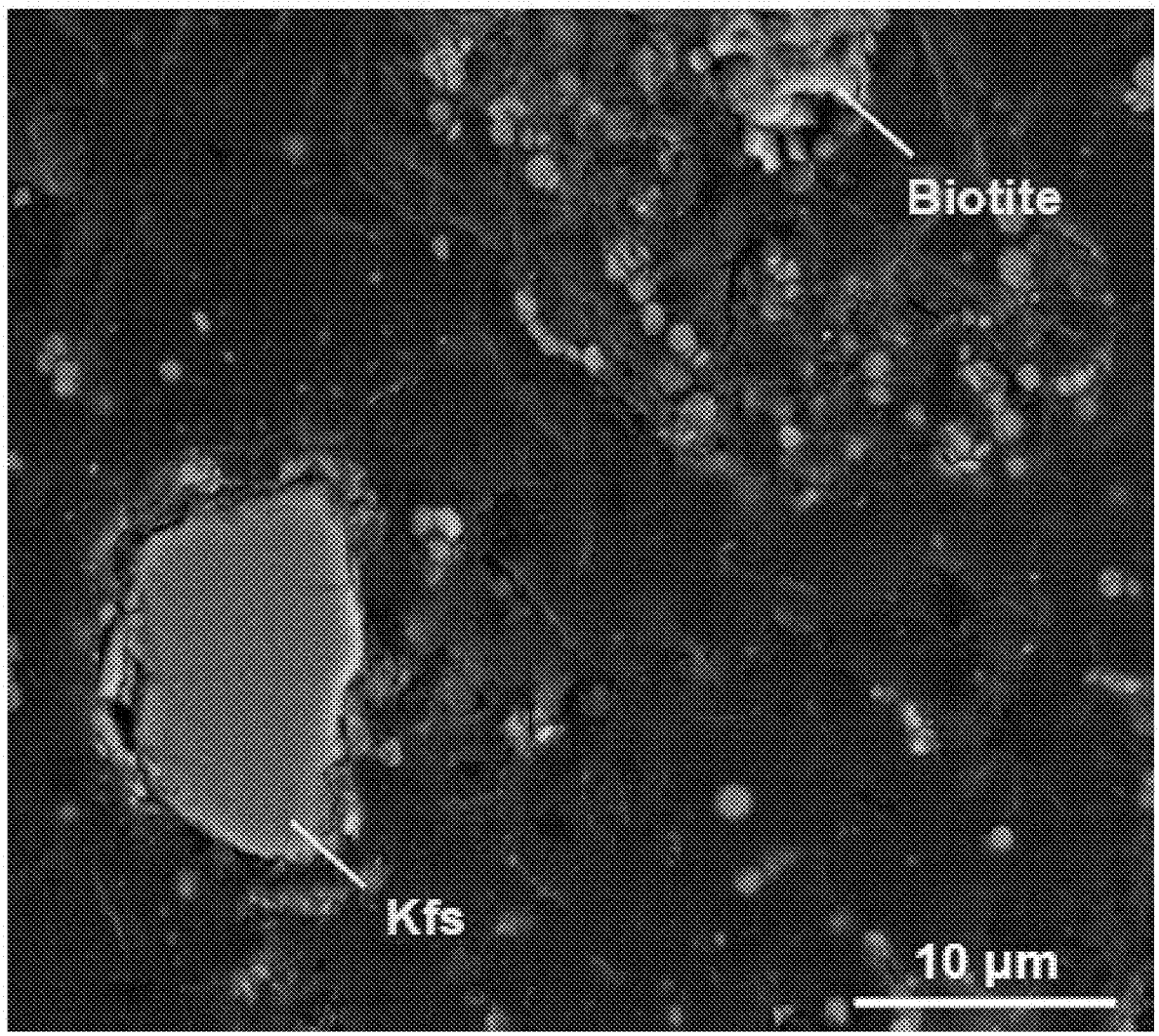
FIG. 33F is another image of the thin section of the dried hydrothermally modified material shown in FIG. 33C.
Figure 33G:
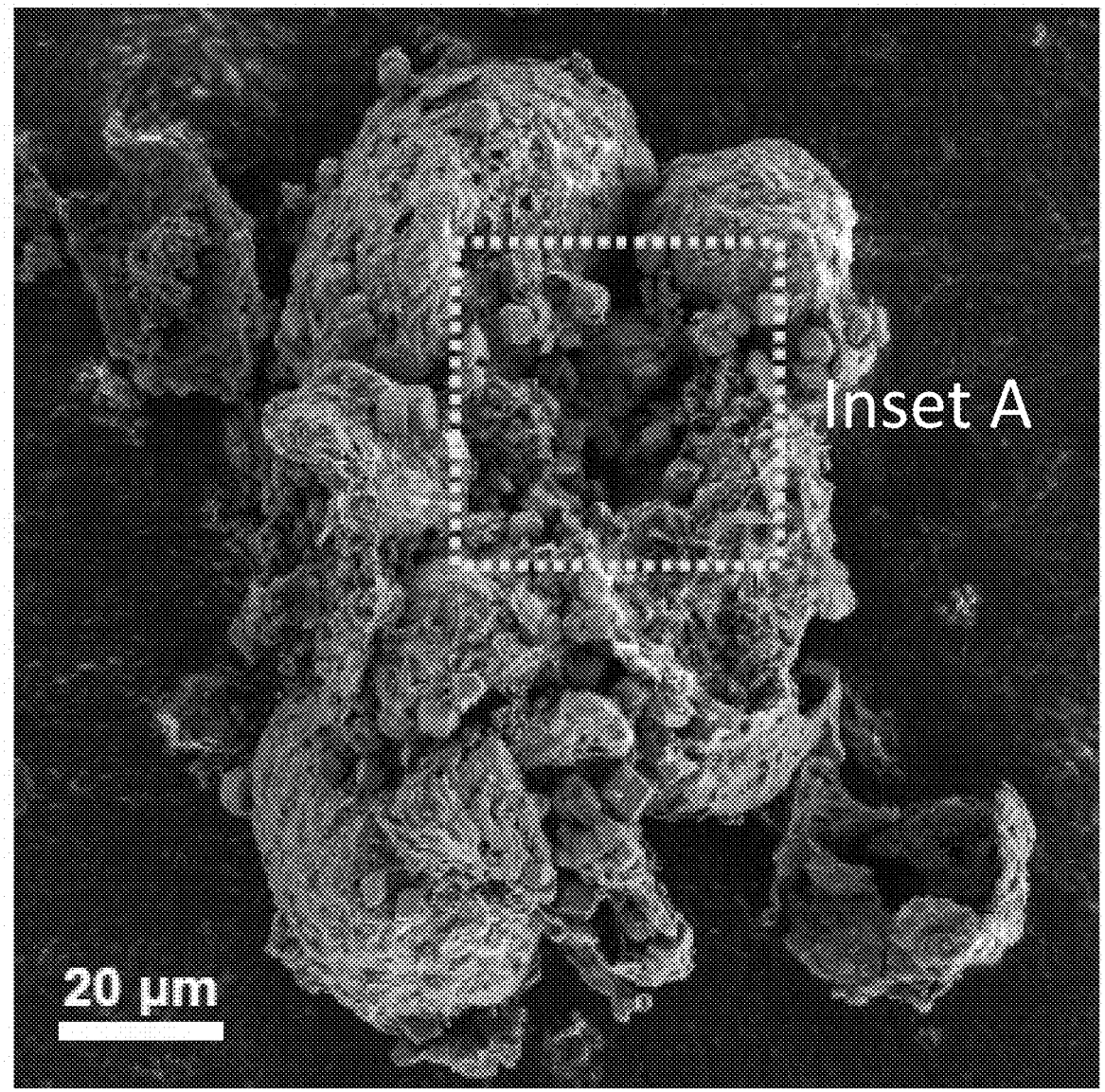
FIG. 33G is an image of the hydrothermally modified material that was rinsed and dried under carbon dioxide in FIG. 33B.
Figure 33H:
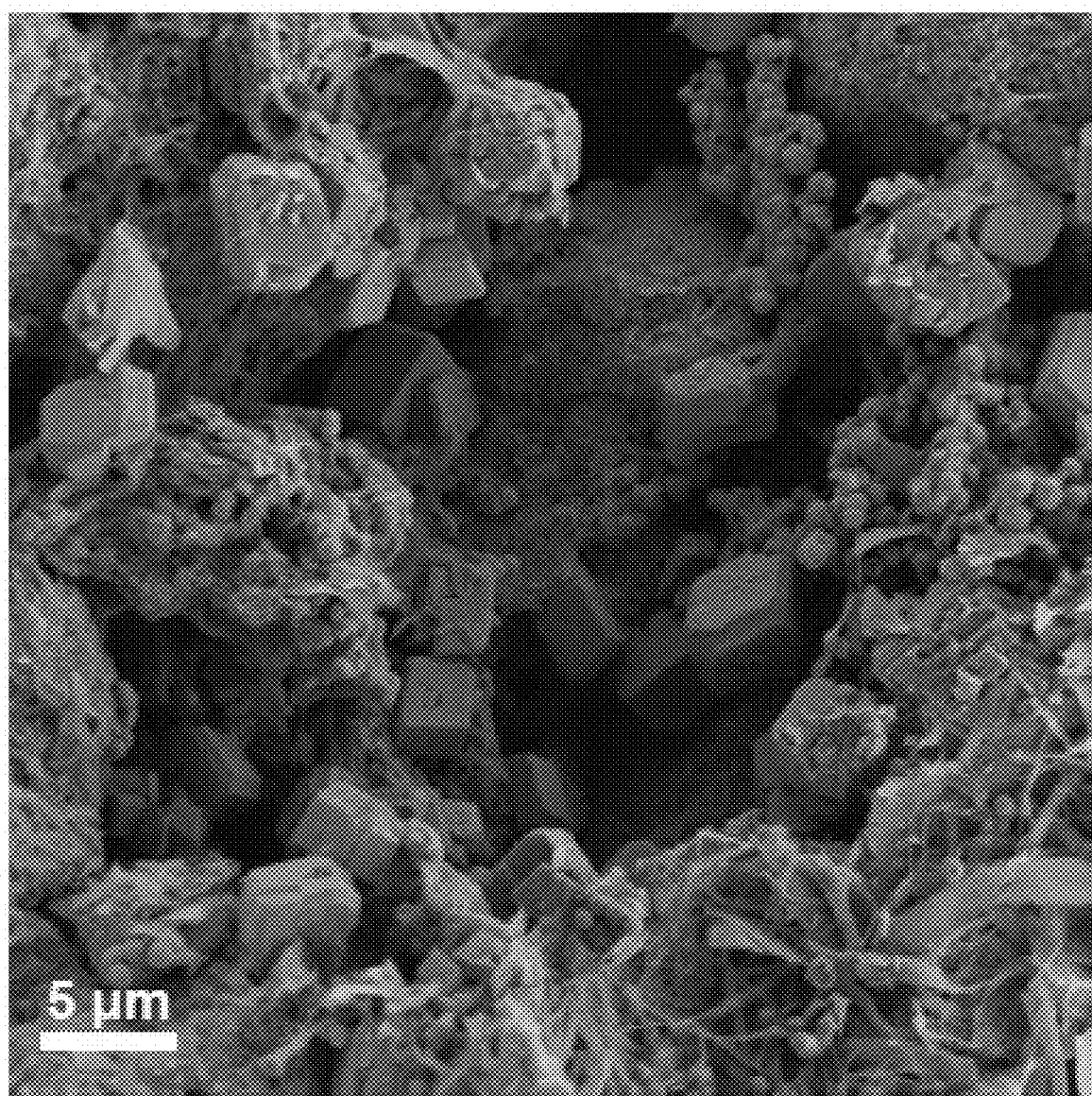
FIG. 33H is an inset image of the hydrothermally modified material shown in FIG. 33G.
Figure 33I:
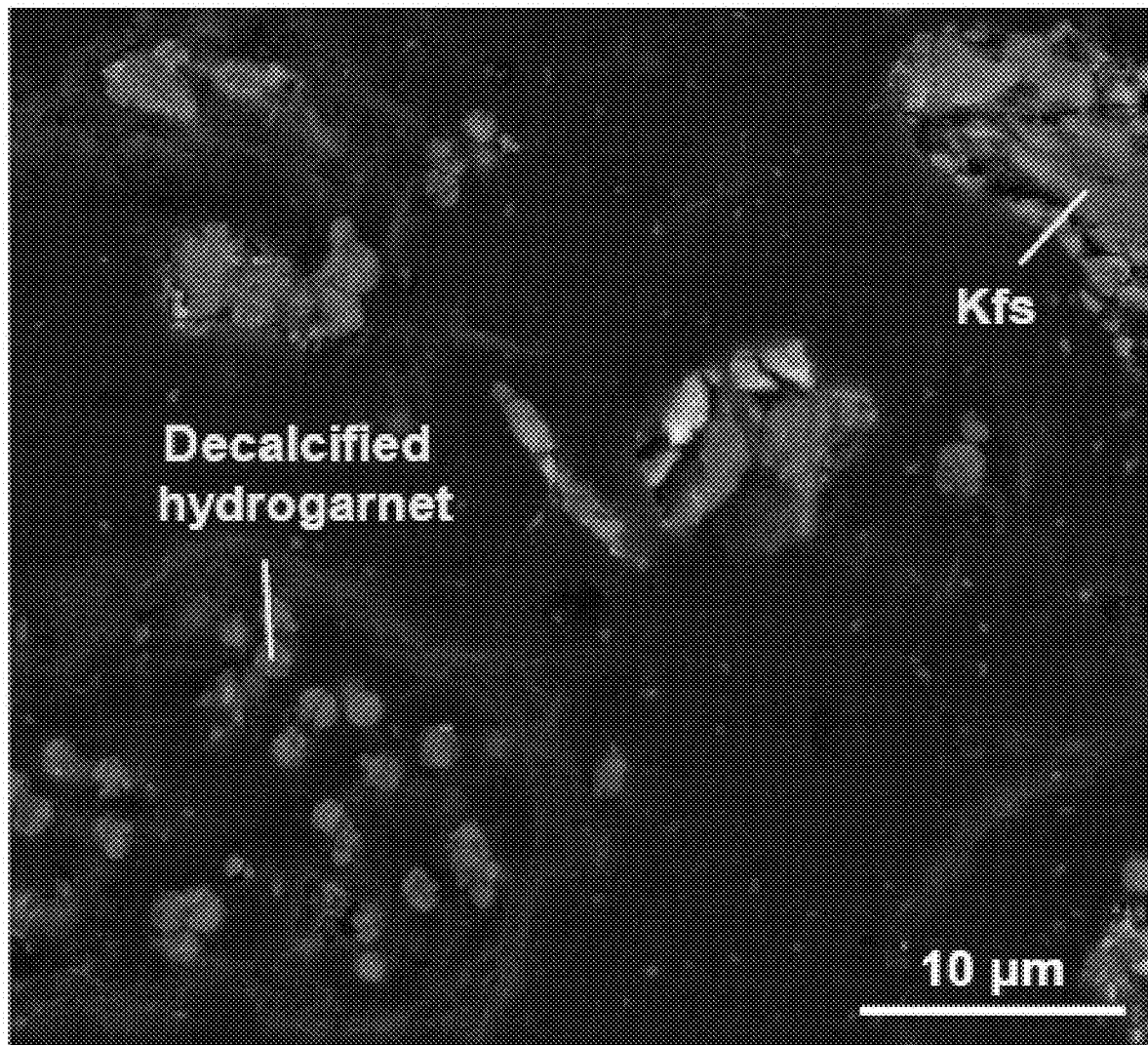
FIG. 33I is an image of a thin section of the hydrothermally modified material shown in FIG. 33G.
Figure 33J:
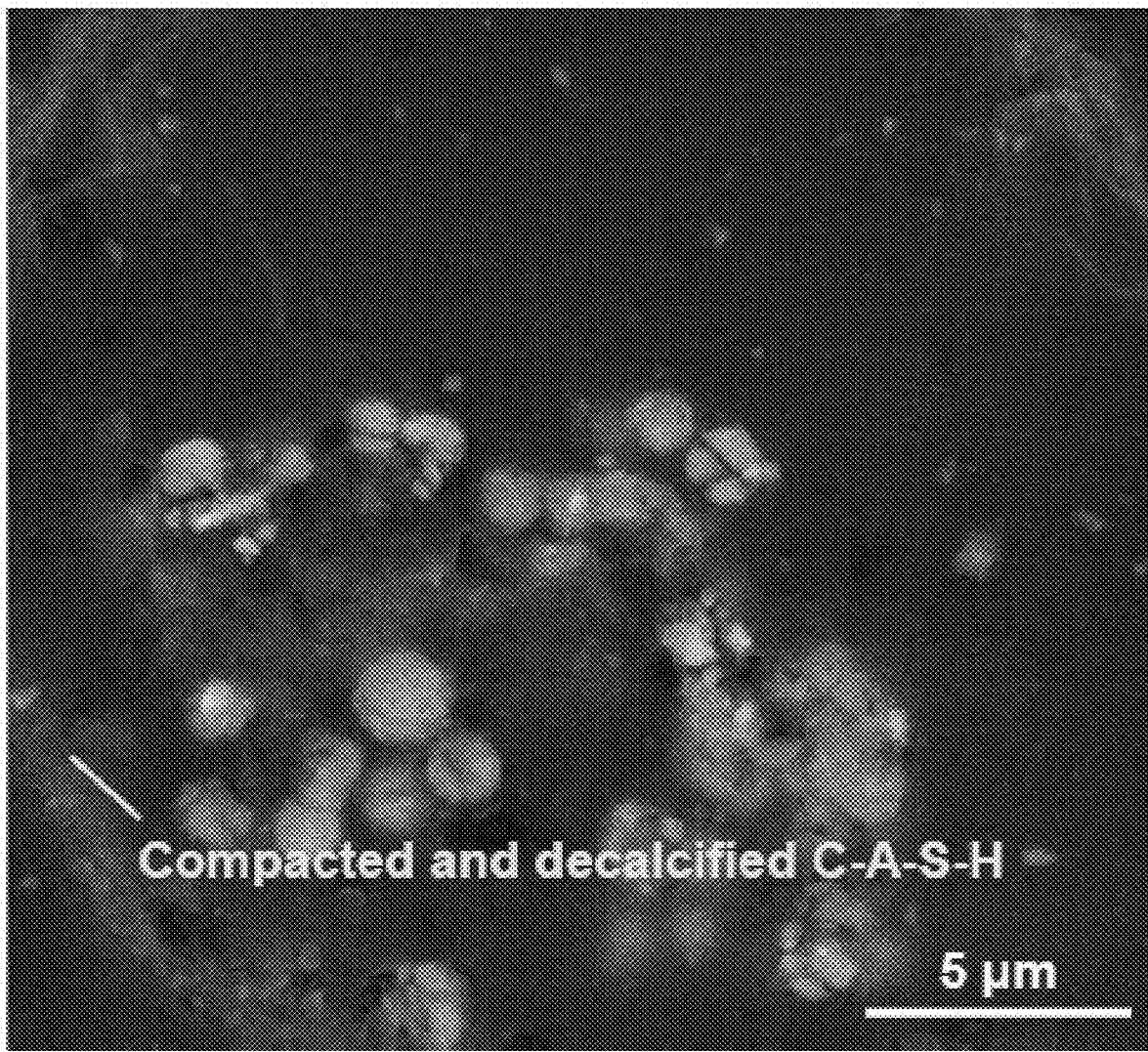
FIG. 33J is another image of the thin section of the dried hydrothermally modified material shown in FIG. 33G.

The large particle-size population is less in the rinsed than in the non-rinsed dried hydrothermally modified materials (FIGS. 33A-33B). An overlay of HT-CO$_2$ and HT-CO$_2$-rinsed indicates that the effective diameter of the particles remains the same.

Scanning electron microscope (SEM) images Drying Atmosphere of HT-Ar-rinsed reveal that calcium aluminum silicate hydrate (C-A-S-H) sheets can be found shrouding K-feldspar. In addition, globular hydrogarnet phases are embedded in the C-A-S-H matrix (FIGS. 33C-33F). The biotite phase is also identified.

SEM images of HT-CO$_2$-rinsed provide further evidence that carbonation leads to compaction and decalcification of the C-A-S-H sheets. Decalcified hydrogarnet is also clearly pictured. Carbonation promotes the growth of Ca-rich polyhedral particles providing another structurally distinct feature (FIGS. 33G-33J).

Figure 33K:
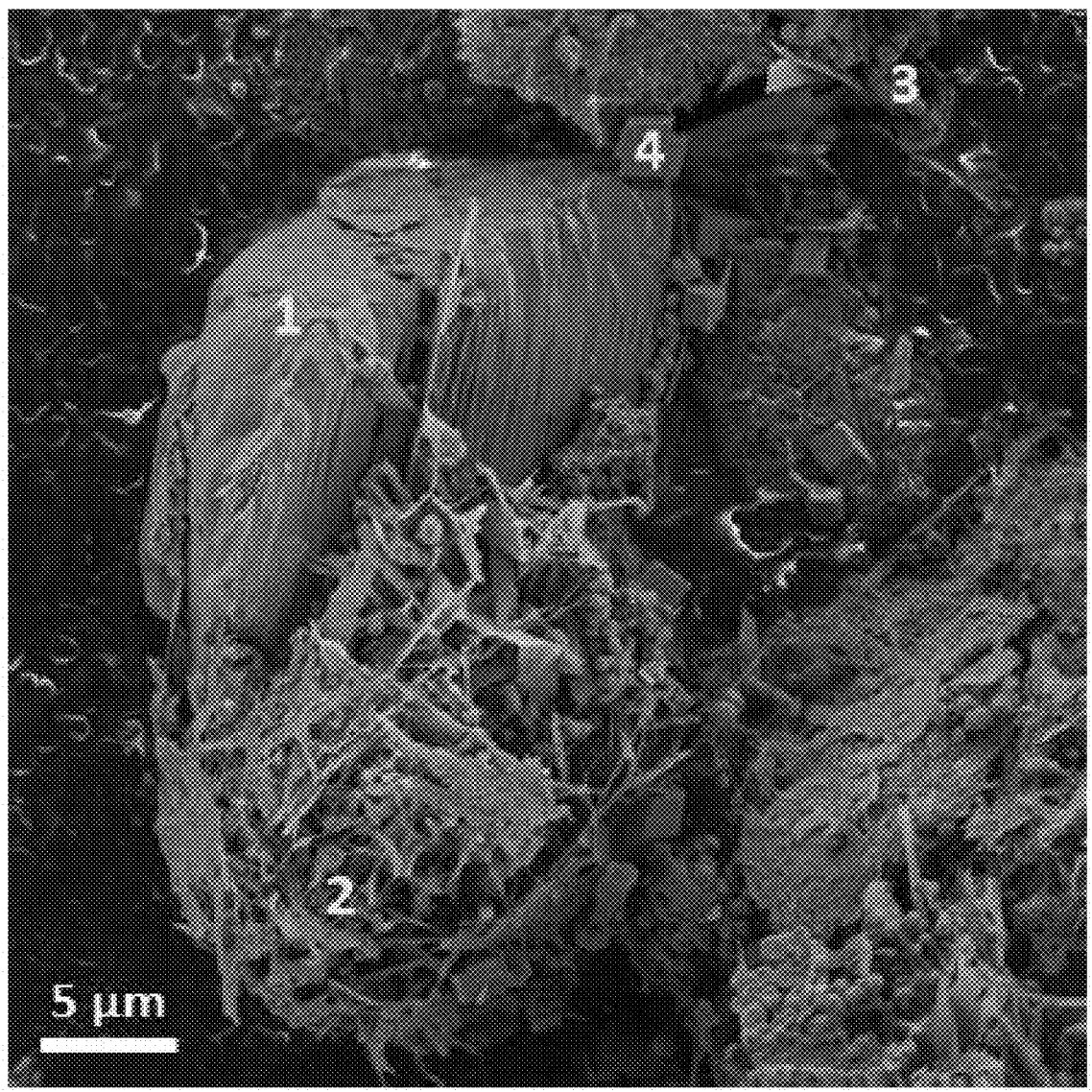
FIG. 33K is an image of the hydrothermally modified material that was rinsed and dried under argon in FIG. 33A with numeric labels of various features.

SEM micrograph of HT-Ar-rinsed is shown in FIG. 33K. Numbers in the image refer to features typical to a corresponding phase, which were assigned as follows: 1) K-feldspar (microcline and orthoclase), 2)C-A-S-H (tobermorite, α-dicalcium silicate hydrate, and amorphous), 3) hydrogarnet, and 4) CaCO$_3$/Ca(OH)$_2$. Similar features were used to identify phases in HT-CO$_2$-rinsed.

Figure 33L:
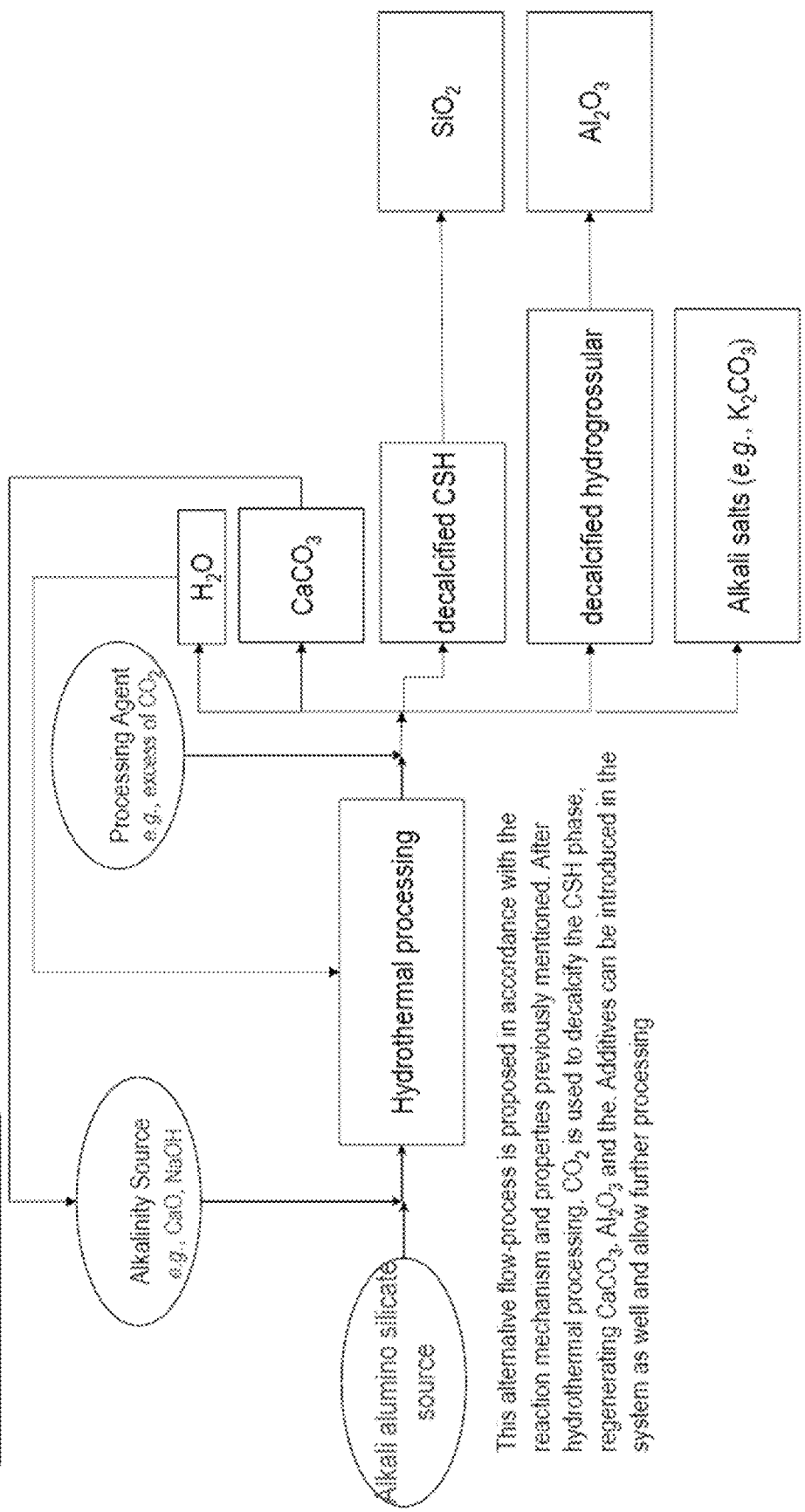
FIG. 33L is a schematic illustration showing a process for decalcification that produces $SiO_2$ and $Al_2O_3$ from K-feldspar, according to some embodiments.
Figure 33M:
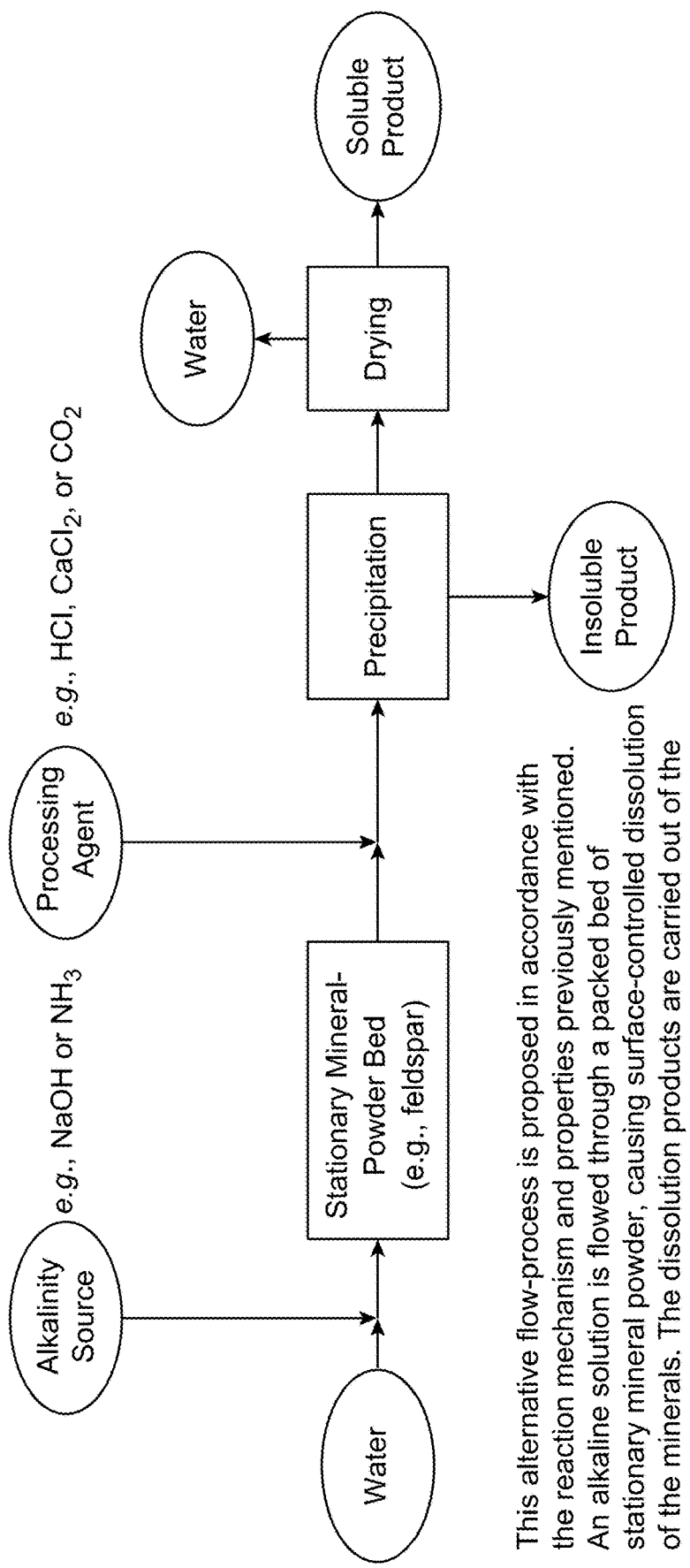
FIG. 33M is a schematic illustration showing a process for differentiating various soluble products by passing an alkaline solution through a packed bed of stationary mineral powder, according to some embodiments.

Energy dispersive X-ray spectrometry (EDS) has been used to quantify the nominal atomic fraction of the elements K, Ca, Al, and Si in each phase (Table 13). While there are no major discrepancies for three of the elements, Ca-bearing phases exhibit lower Ca/(Al+Si) in CO$_2$ dried samples than when dried under Ar. Thus, CO$_2$ is able to "extract" Ca from the minerals during processing. Consequently, the action of CO$_2$ on the mineralogy of the material also demonstrates the feasibility of a "decalcification" process that leads to the formation of SiO$_2$ and Al$_2$O$_3$ out of K-feldspar, as depicted in FIG. 33L. The transformation of K-feldspar into its constituent components serves to further highlight the utility of the disclosed methods in an array of industries and applications.

TABLE 13

Nominal Atomic Fraction of the Phases Identified by SEM and EDS.

| Hydrothermal Material | Nominal Atomic Fraction | | | |
|---|---|---|---|---|
| | K/ (M$^a$ + Al + Si) | Ca/ (M + Al + Si) | Al/ (M + Al + Si) | Si/(M + Al + Si) |
| HT-Ar-rinsed | | | | |
| K-feldspar | 0.18(2) | n/a | 0.22(2) | 0.6(1) |
| C-A-S-H | 0.01(1) | 0.47(4) | 0.09(2) | 0.43(3) |
| Hydrogarnet | n/a | 0.54(3) | 0.16(3) | 0.30(2) |
| CaCO$_3$/Ca(OH)$_2$ | n/a | 0.97(1) | n/a | 0.3(2) |
| HT-CO$_2$-rinsed | | | | |
| K-feldspar | 0.22(3) | n/a | 0.17(3) | 0.61(2) |
| C-A-S-H | 0.05(4) | 0.08(5) | 0.14(3) | 0.73(4) |
| Hydrogarnet | n/a | 0.23(3) | 0.26(4) | 0.51(2) |
| CaCO$_3$/Ca(OH)$_2$ | 0.01(1) | 0.96(1) | 0.01(1) | 0.01(1) |

$^a$M corresponds to K or Ca or the sum of K and Ca.

Figure 37A:
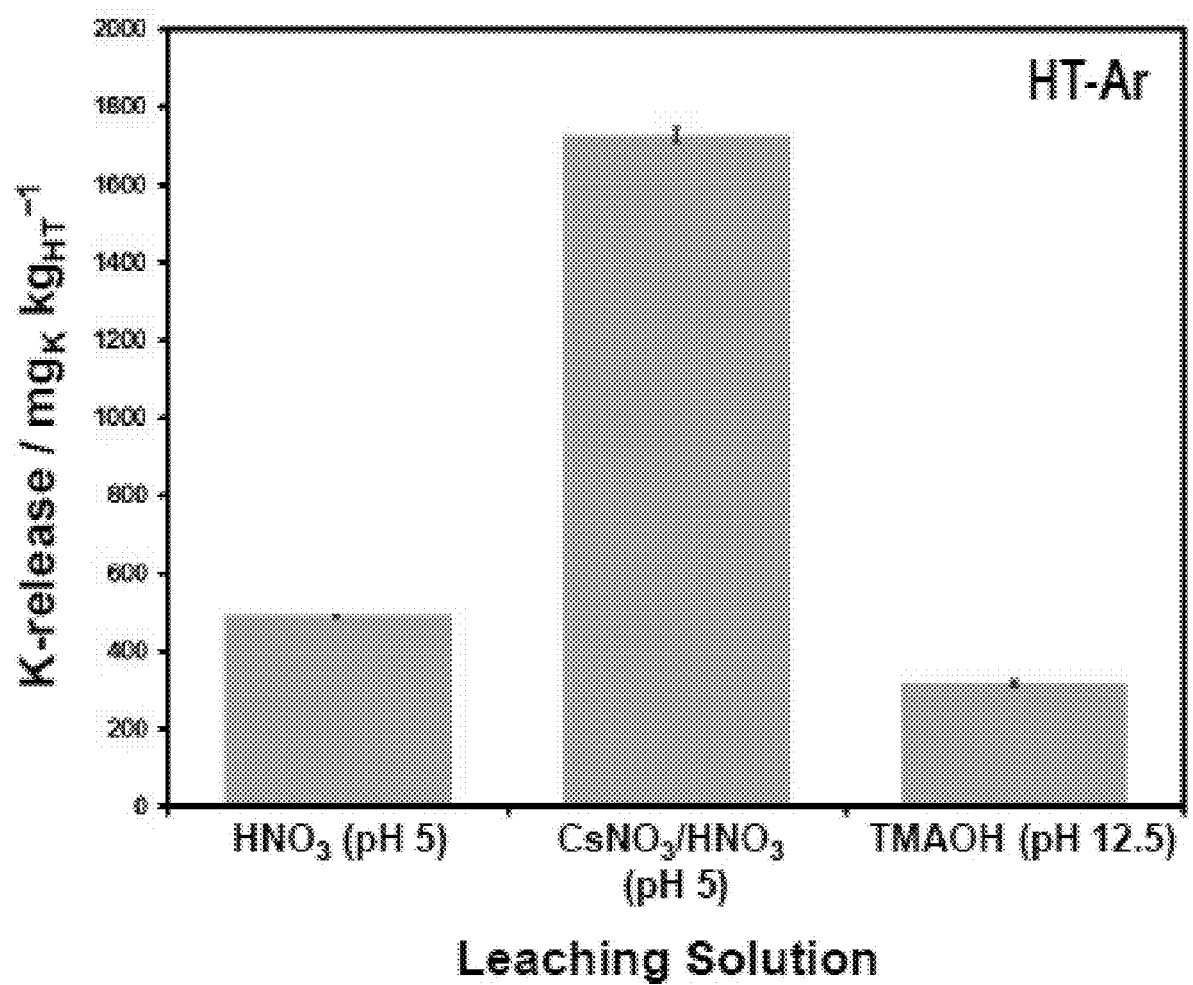
FIG. 37A is a bar graph showing the mass of potassium (K) released from a hydrothermally modified material dried under argon for various leaching solutions, according to some embodiments.

Example 8: pH and Concentration Dependent Leaching and Dissolution Comparing Leaching in CsNO$_3$/HNO$_3$ and Tetramethylammonium Hydroxide It is possible that the extent of leaching can be enhanced with effective exchange of a cation with potassium in the relevant phases. Based on the proposal that cation-exchange occurs in the hydrated interlayers of tobermorite and/or amorphous C-A-S-H phases, there should be a limit to the size of the cation in which the supposed exchange sites can fit. Therefore, leaching was evaluated in multiple leaching solutions to gain an understanding as to the size of the cation capable of exchange and subsequent release of potassium (K). In particular, $Cs^+$ and $NMe_4^+$ (TMA), with cationic radii of 1.67 Å and ~4.5 Å, respectively were compared. Using a leaching solution of $CsNO_3/HNO_3$ (pH 5), the amount of K released was significantly increased compared to pH 5 $HNO_3$ (FIG. 37A). It was found that $Cs^+$, based on its appropriate size, is highly effective in the cation exchange with $K^+$. On the other hand, the large TMA cation from tetramethylammonium hydroxide (TMAOH) is ineffective at ion exchange with sites containing $K^+$. It is also clear from the results that hydroxide mediated framework dissolution is not the primary mechanism for K-release from the solid phase. Still, the dried hydrothermally modified material is shown to be stable under basic conditions ~ pH 12.

Mineral-Release in Acetate Buffer

Figure 37B:
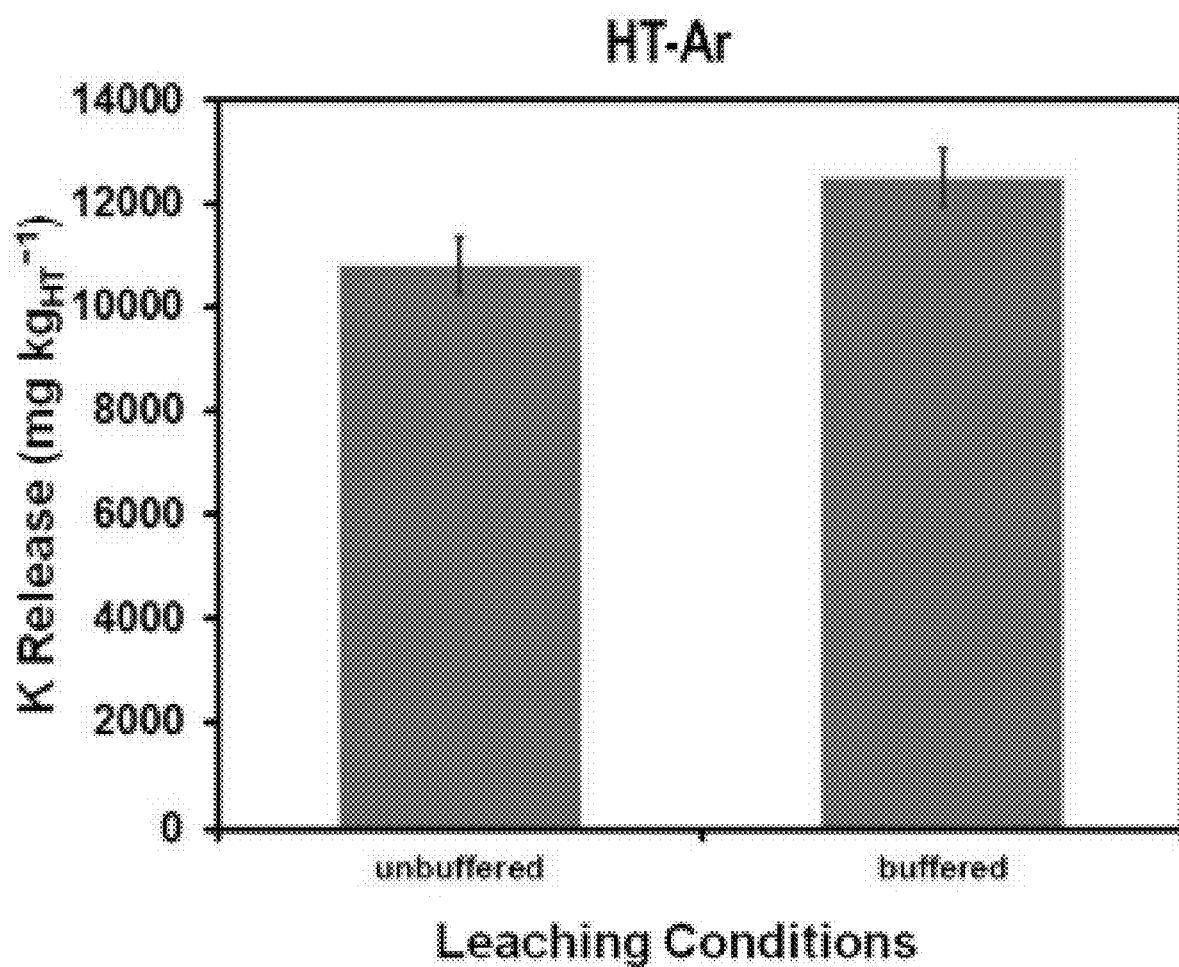
FIG. 37B is a bar graph showing the mass of potassium (K) released from a hydrothermally modified material dried under argon under buffered or unbuffered leaching conditions, according to some embodiments.
Figure 37C:
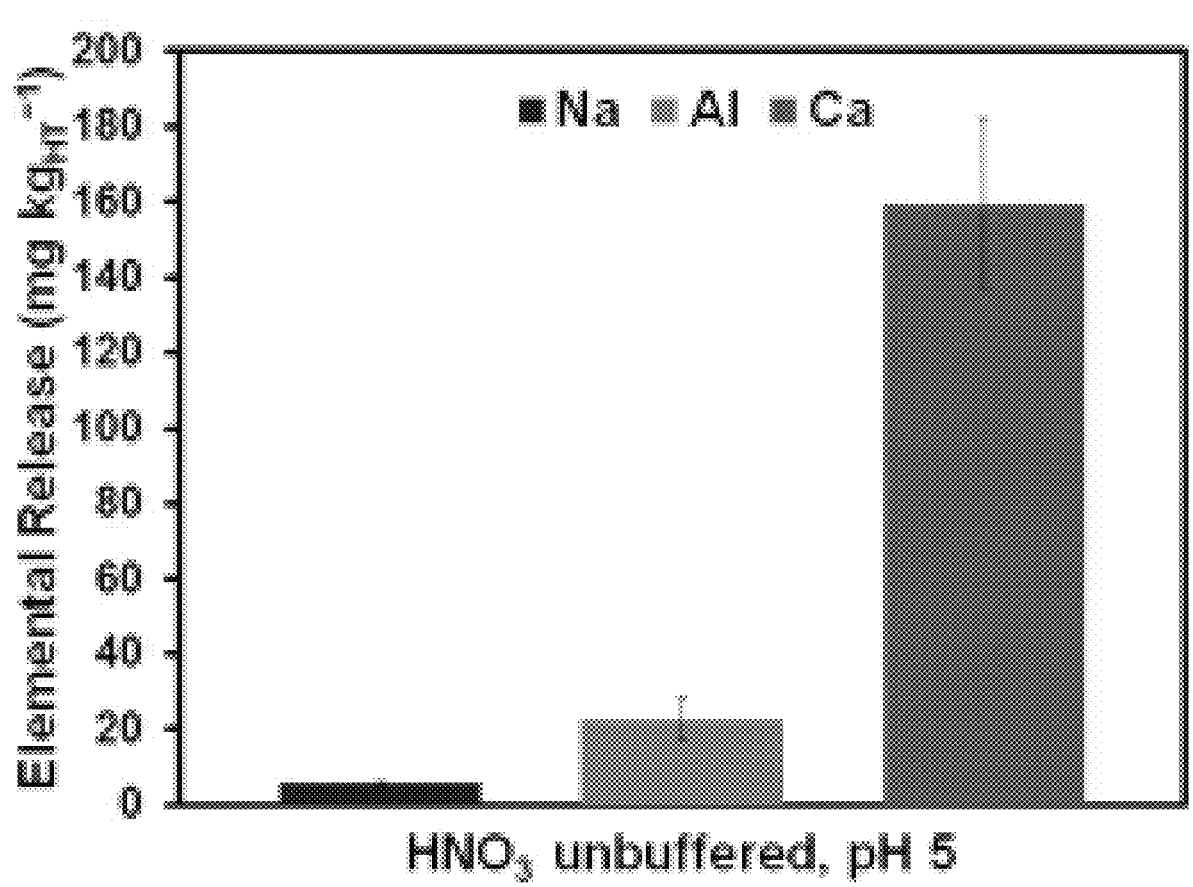
FIG. 37C is a bar graph showing the mass of sodium (Na), aluminum (Al), and calcium (Ca) released from a hydrothermally modified material dried under argon under unbuffered leaching conditions, according to some embodiments.
Figure 37D:
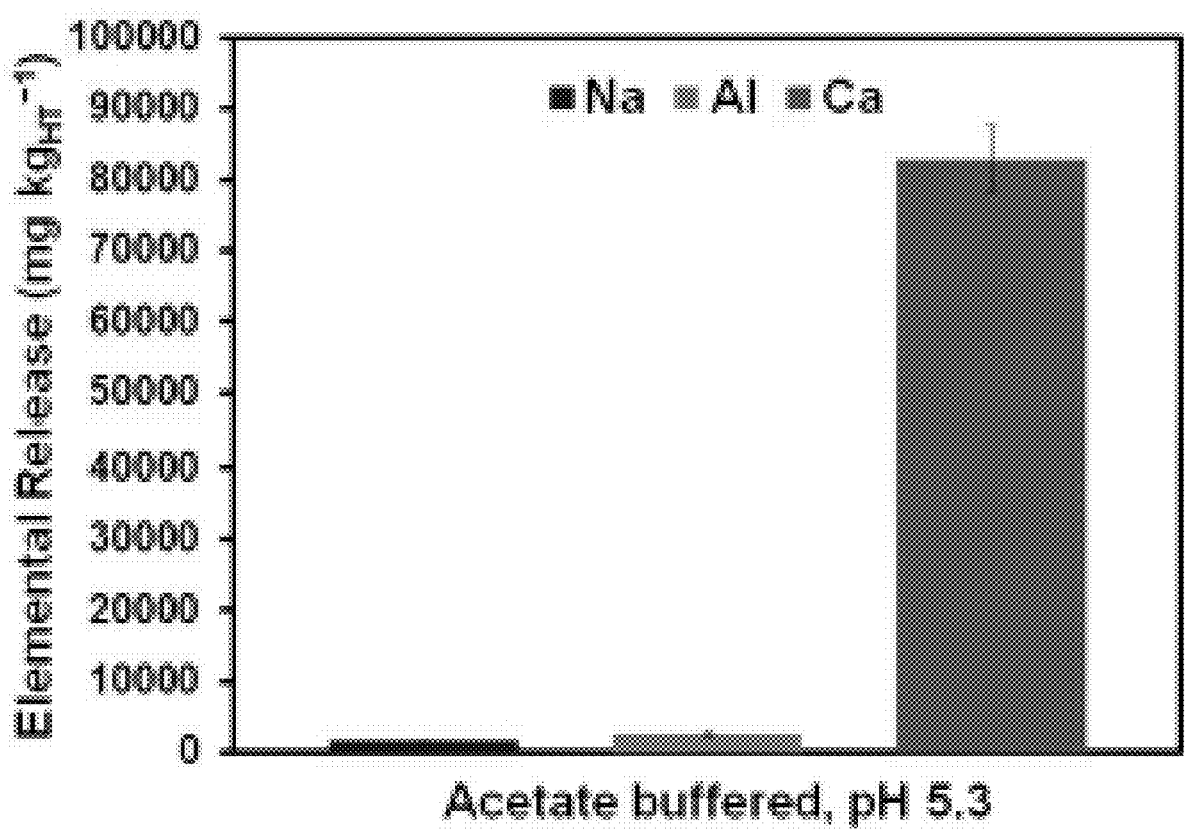
FIG. 37D is a bar graph showing the mass of sodium (Na), aluminum (Al), and calcium (Ca) released from a hydrothermally modified material dried under argon under buffered leaching conditions, according to some embodiments.

Buffered leaching conditions were compared with the standard $HNO_3$ solution (pH 5). K-release in the presence of acetate buffer (pH 5.3) was only slightly increased, but slightly acidic buffer conditions substantially promote dissolution of Ca-bearing phases (FIG. 37B). As demonstrated in pH 5.3 buffered solutions, components of the dried hydrothermally modified material can be dissolved when the material is subjected to acidic pH levels. In addition, the material may serve as a useful source of soluble Al under acidic conditions (see FIGS. 37C-37D and 26 for data).

Leaching in $CsNO_3$ in Rinsed Dried Hydrothermally Modified Material

Figure 32:
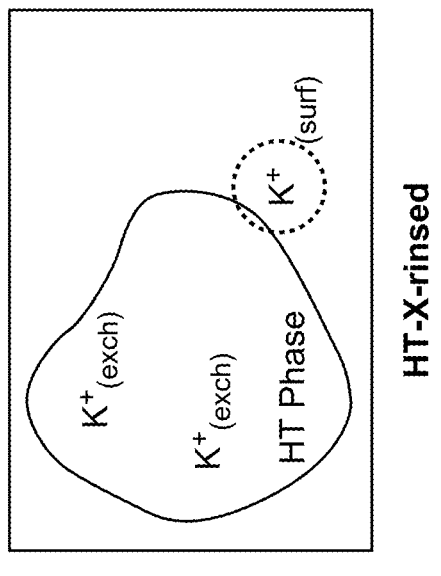
FIG. 32 is a schematic diagram showing a process to remove soluble $K^+$ from a dried hydrothermally modified material by washing with water, according to some embodiments.
Figure 32:
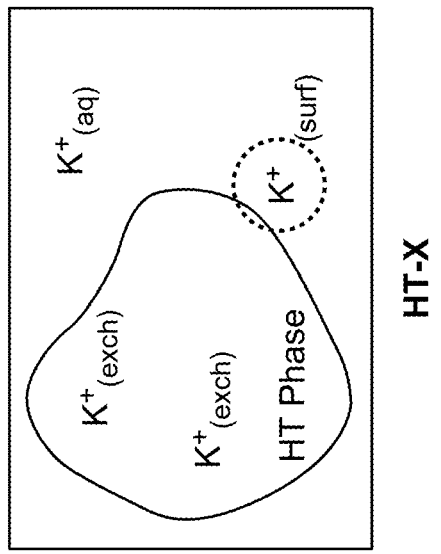
Figure 37E:
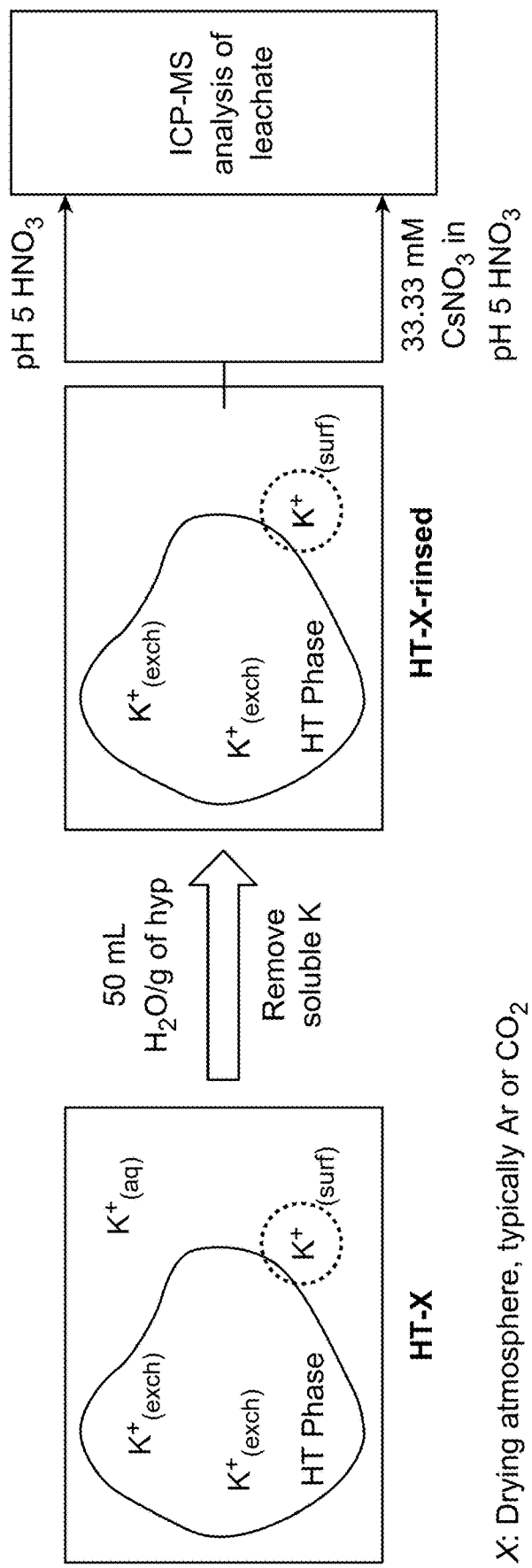

Similar to the conditions used in Example 7 (FIG. 32), dried hydrothermally modified material was rinsed with water to separate the K-release contribution of the solid phase from the soluble components. The key difference in this study was that a $CsNO_3/HNO_3$ leaching solution was utilized to understand if K-release from the solid phase could also be enhanced by effective cation exchange with $Cs^+$(FIG. 37E).

Figure 37F:
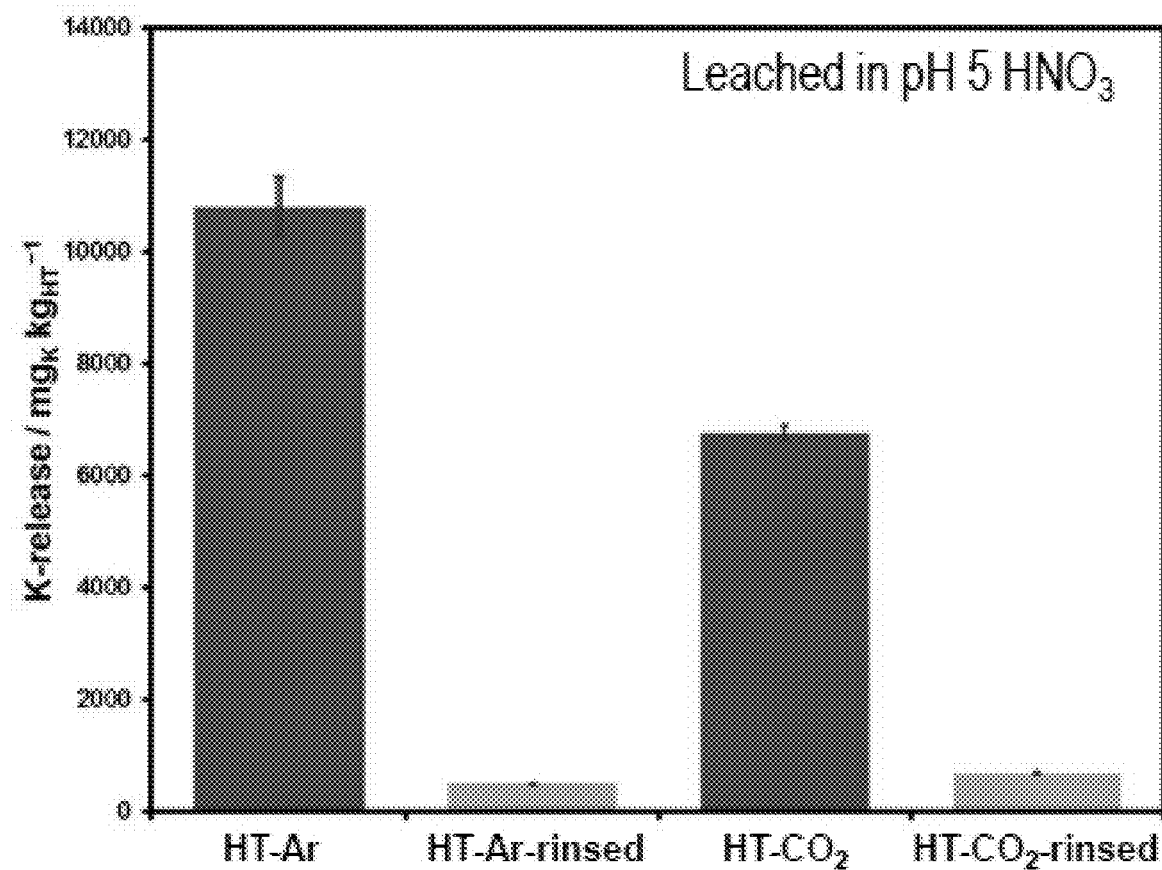
Figure 37G:
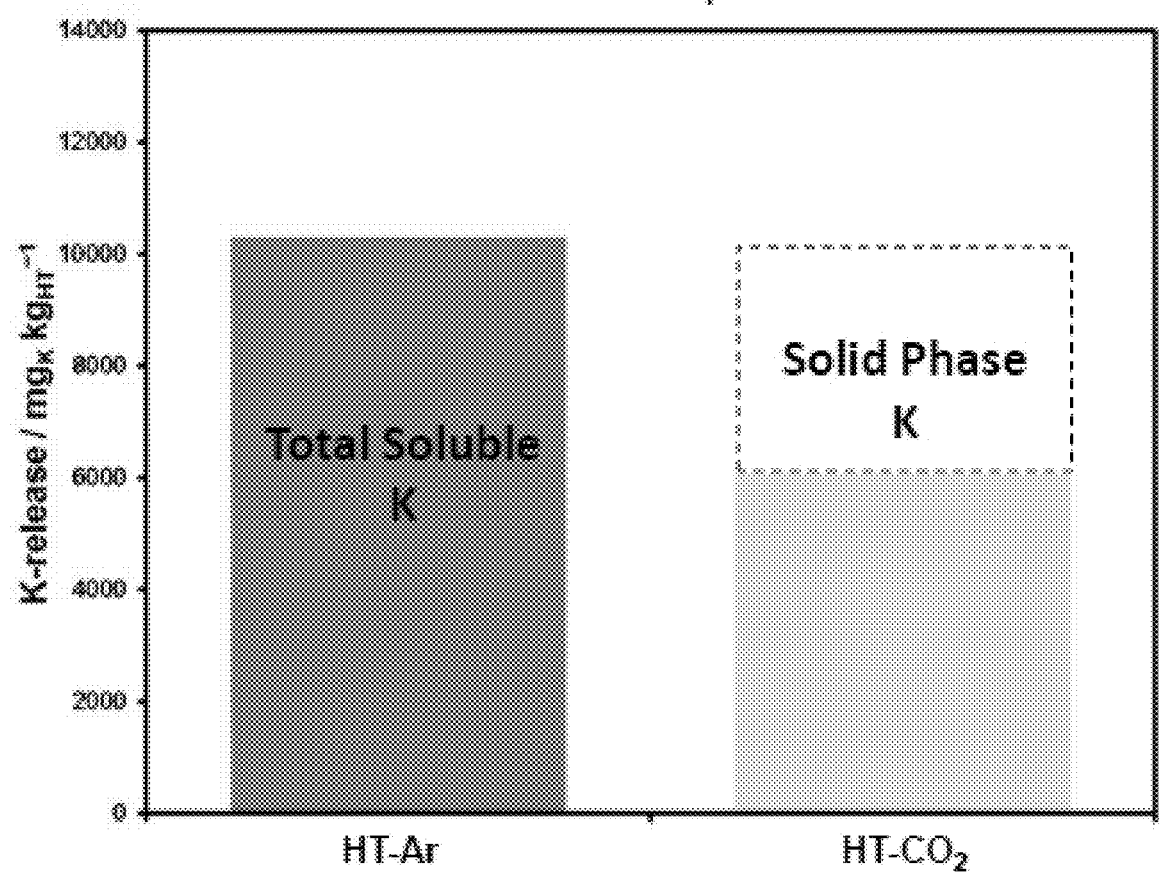

The K from the solid phase comprises a fraction of the total K available for release, therefore the rinsed materials dried with either Ar or $CO_2$ exhibit less K-release than corresponding unrinsed samples in $HNO_3$ leaching solution (FIG. 37F). This difference gives the fraction of soluble/fast-release K in the dried hydrothermally modified material. In the case with $CO_2$ drying, mass balance dictates the missing K in $HT\text{-}CO_2$ is in the solid phase (i.e., K repartitioned by carbonation, see FIG. 37G).

Figure 37H:
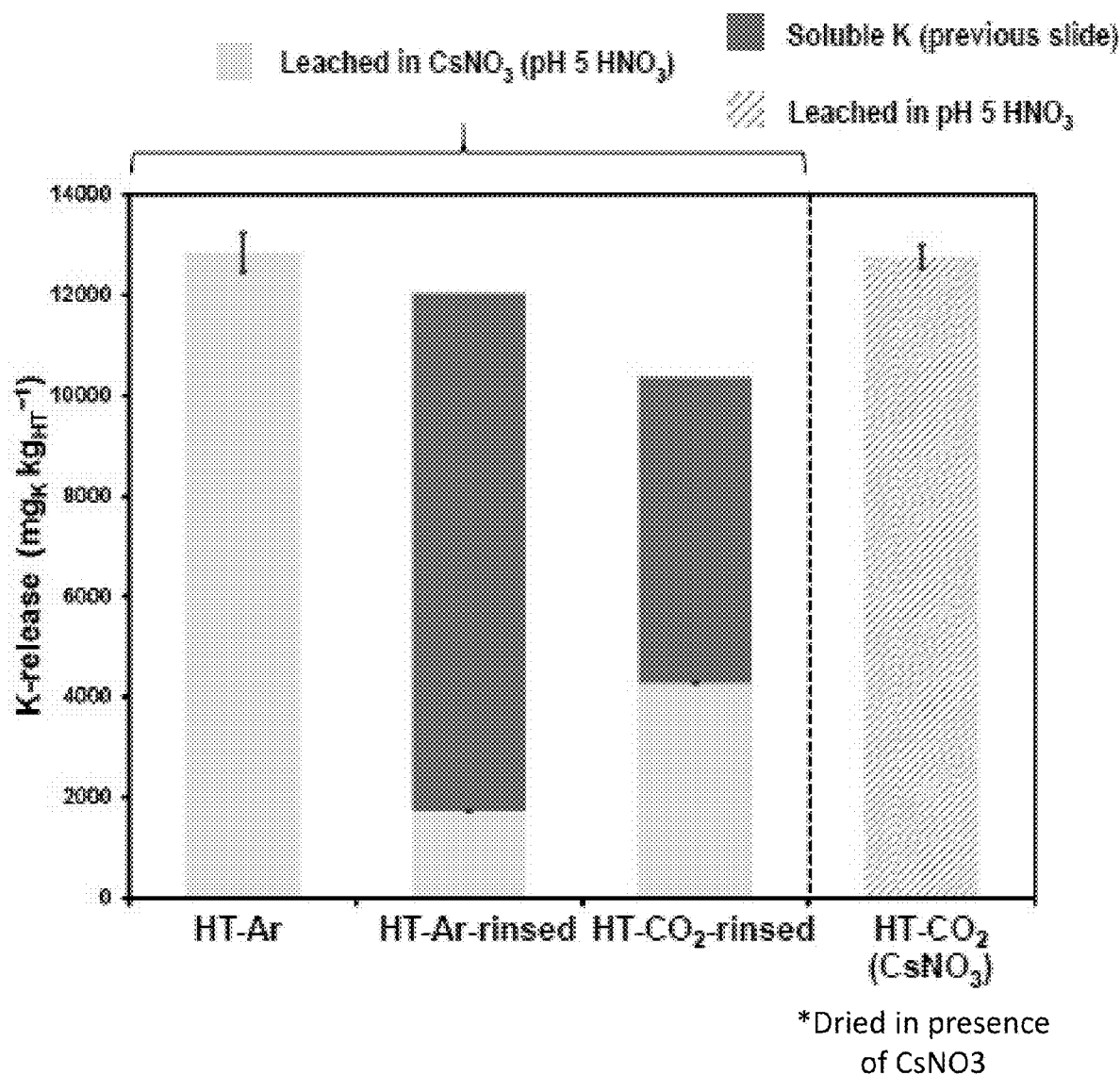

In FIGS. 37H and 37F, a comparison is made between K leaching in dried hydrothermally modified material subsequently rinsed with water and then redried under different atmospheric conditions. Based on the data, it was found that components of the solid phase favor uptake of Cs and release of K. That is evidenced by the three materials (HT-Ar, HT-Ar-rinsed, and HT-$CO_2$-rinsed) each subjected to leaching in $CsNO_3/HNO_3$ that all show more K being released than when $HNO_3$ solution alone is used (FIG. 37H vs. FIG. 37F). Additionally, drying under $CO_2$ in the presence of $CsNO_3$ is found to have the same effect as leaching in $CsNO_3$, affording another approach to increase soluble K.

Example 9: Effect of Further Refluxing the Dried Hydrothermally Modified Material Dried hydrothermally modified material was prepared as follows:
1) 25 g of feed mixture (Ca/Si=0.3) in 100 g of water.
2) Hydrothermal processing was carried out at 200° C. for 5 h.
3) The combined solids/supernatant were dried under an air atmosphere at 100-110° C. for 18 h.

The dried hydrothermally modified material was then further refluxed at 90° C. to examine the effects of this treatment. With a 5 h processing time and using an air atmosphere, the complex mineralogy summarized in Table 14 was achieved. The primary components were Kfs (44.5% for orthoclase/microcline combined), an amorphous phase (26.7%), and tobermorite (17%). Tobermorite was present in significantly greater quantity than in dried hydrothermally modified material prepared without additional refluxing.

TABLE 14

Mineralogy of Refluxed Material.

| | | air-air-5 h-96 h_reflux_90° C. |
|---|---|---|
| $KAlSi_3O_8$ | (Orthoclase/Feldspar) | 12.2 |
| $KAlSi_3O_8$ | (Microcline) | 32.3 |
| $Ca_5Si_6O_{16}(OH)_2 \cdot 4H_2O$ | (Tobermorite) | 17 |
| $Ca_2SiO_3(OH)_2$ | (α-Dicalcium silicate hydrate) | 0 |
| $Ca_3Al_2(SiO_4)_{3-x}(OH)_{4x}$ | (Plazolite/Hydrogrossular) | 7.3 |
| $NaAlSi_3O_8$ | (Albite) | 2 |
| (K, Na)$AlSiO_4$ | (Panunzite) | 2.5 |
| $K(Mg, Fe)_3(AlSi_3O_{20})(F, OH)_2$ | (Biotite) | 0 |
| $CaCO_3$ | (Calcite) | 0 |
| Amorphous Content | | 26.7 |
| KFS (w/o Panunzite) | | 44.5 |
| KFS (w/Panunzite) | | 47 |
| Total | | 100 |

Figure 36:
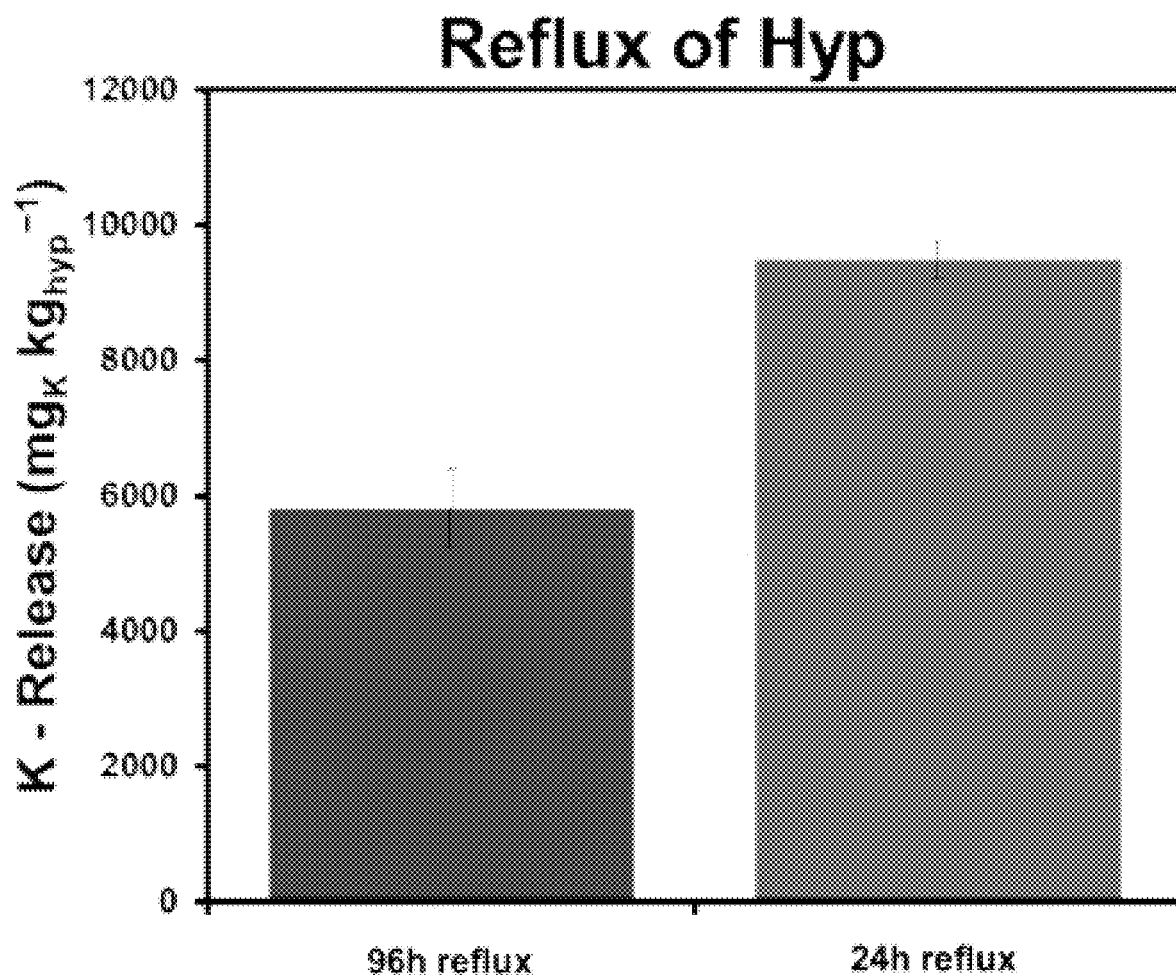
FIG. 36 is a graph showing K-release from dried hydrothermally modified materials additionally refluxed at 90° C. for either 24 h or 96 h at ambient pressure, according to some embodiments.

The refluxed dried hydrothermally modified material was also studied for its K-releasing properties (FIG. 36). Comparing the tested conditions, leaching was found to be greater when refluxing was carried out for 24 h. Extending the amount of time to 96 h significantly attenuated the ability of the material to release K. Trapping of K in one or more of the particular phases may explain the results obtained.

All references, articles, publications, patents, patent publications, and patent applications cited herein are incorporated by reference in their entireties for all purposes. However, mention of any reference, article, publication, patent, patent publication, and patent application cited herein is not, and should not be taken as acknowledgment or any form of suggestion that they constitute valid prior art or form part of the common general knowledge in any country in the world.

What is claimed is:

1. A soil health product, comprising:
   a K-feldspar phase; and
   a calcium silicate hydrate phase comprising at least one phase selected from the group consisting of a dicalcium silicate hydrate phase, a tobermorite phase, and a hydrogarnet phase;
   wherein:
   the soil health product is configured to alter soil health;
   the soil health product comprises the K-feldspar phase in an amount of at most about 65 wt. %; and
   at least one of the following holds:
   the soil health product comprises at least about 1 wt. % of the dicalcium silicate hydrate phase;
   the soil health product comprises at least about 1 wt. % of the tobermorite phase; and
   the soil health product comprises at least about 1 wt. % of the hydrogarnet phase.

2. The soil health product of claim 1, wherein the soil health product is a fertilizer.

3. The soil health product of claim 1, wherein the soil health product is a soil remediation product.

4. The soil health product of claim 1, wherein the soil health product is a soil conditioner.

5. The soil health product of claim 1, wherein the soil health product is a soil fertility product.

6. The soil health product of claim 1, wherein the soil health product is configured to buffer soil pH.

7. The soil health product of claim 1, wherein soil health product is configured to improve soil pore space.

8. The soil health product of claim 1, wherein the soil health product is configured to promote soil strength.

9. The soil health product of claim 1, wherein the soil health product is configured to improve soil mechanics.

10. The soil health product of claim 1, comprising a nutrient.

11. The soil health product of claim 10, wherein the nutrient is selected from the group consisting of magnesium, potassium, silicon, calcium, sodium and aluminum.

12. The soil health product of claim 1, comprising a plurality of nutrients selected from the group consisting of magnesium, potassium, silicon, calcium, sodium and aluminum.

13. The soil health product of claim 1, wherein the soil health product comprises at most about 60 wt. % of the K-feldspar phase.

14. The soil health product of claim 1, wherein the soil health product comprises at least about 1 wt. % of the K-feldspar phase.

15. The soil health product of claim 1, wherein the soil health product comprises at least about 1 wt. % of the calcium silicate hydrate phase.

16. The soil health product of claim 1, wherein the soil health product comprises from about 1 wt. % to about 30 wt. % of the calcium silicate hydrate phase.

17. The soil health product of claim 1, wherein the soil health product comprises the dicalcium silicate hydrate phase in an amount of at least about 1 wt. %.

18. The soil health product of claim 1, wherein the soil health product comprises the tobermorite phase in an amount of at least about 1 wt. %.

19. The soil health product of claim 1, wherein the soil health product comprises the hydrogarnet phase in an amount of at least about 1 wt. %.

20. The soil health product of claim 19, wherein the hydrogarnet phase comprises plazolite or hydrogrossular.

* * * * *